(12) United States Patent
Hasegawa et al.

(10) Patent No.: US 8,272,243 B2
(45) Date of Patent: Sep. 25, 2012

(54) HEMMING WORKING METHOD AND WORKING APPARATUS

(75) Inventors: Eisaku Hasegawa, Tochigi (JP); Yoshiyuki Kinouchi, Tochigi (JP); Noriko Kurimoto, Tochigi (JP); Takeshi Nakamura, Tochigi (JP); Mitsutaka Igaue, Tochigi (JP); Hiroshi Miwa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 1034 days.

(21) Appl. No.: 12/096,109

(22) PCT Filed: Dec. 5, 2006

(86) PCT No.: PCT/JP2006/324287
§ 371 (c)(1),
(2), (4) Date: Jun. 4, 2008

(87) PCT Pub. No.: WO2007/066670
PCT Pub. Date: Jun. 14, 2007

(65) Prior Publication Data
US 2008/0307630 A1 Dec. 18, 2008

(30) Foreign Application Priority Data

| Dec. 5, 2005 | (JP) | 2005-350615 |
|---|---|---|
| Dec. 5, 2005 | (JP) | 2005-350619 |
| Dec. 5, 2005 | (JP) | 2005-350809 |
| Dec. 5, 2005 | (JP) | 2005-350821 |
| Dec. 5, 2005 | (JP) | 2005-350884 |
| Feb. 27, 2006 | (JP) | 2006-051234 |
| Mar. 10, 2006 | (JP) | 2006-066738 |
| Jul. 7, 2006 | (JP) | 2006-187582 |
| Jul. 25, 2006 | (JP) | 2006-202039 |

(51) Int. Cl.
B21D 7/02 (2006.01)
B23P 11/00 (2006.01)

(52) U.S. Cl. ........ 72/214; 72/220; 29/243.5; 29/243.58; 29/509; 29/513

(58) Field of Classification Search ............... 72/214, 72/220; 29/509, 513, 505, 243.5, 243.57, 29/243.58
See application file for complete search history.

(56) References Cited

U.S. PATENT DOCUMENTS

| 3,680,346 | A | * | 8/1972 | Wilcox | 72/211 |
| 3,875,692 | A | * | 4/1975 | Teel | 40/495 |
| 3,889,618 | A | * | 6/1975 | Jarvis et al. | 29/243.57 |
| 4,021,909 | A | * | 5/1977 | Bollmer | 29/432.1 |

(Continued)

FOREIGN PATENT DOCUMENTS

CN 1347351 A 5/2002

(Continued)

*Primary Examiner* — Essama Omgba
(74) *Attorney, Agent, or Firm* — Rankin, Hill & Clark LLP

(57) ABSTRACT

A moving die is held by a robot and made to approach a vehicle, and a positioning pin is inserted into a positioning hole of the vehicle. The moving die is brought into a floating state of being displaceable relative to the vehicle by reducing a force of the robot for maintaining an attitude thereof. In a state of holding the moving die by the robot, a surface of the moving die is brought into contact with the vehicle by an adsorbing mechanism including an adsorbing portion of an elastic member provided to the moving die. The moving die and the robot are cut to be separated.

1 Claim, 110 Drawing Sheets

U.S. PATENT DOCUMENTS

| | | | |
|---|---|---|---|
| 5,623,805 A * | 4/1997 | Morello | 52/749.1 |
| 6,694,793 B1 | 2/2004 | Persson | |
| 7,121,129 B2 * | 10/2006 | Binggeli | 72/110 |
| 7,152,447 B2 * | 12/2006 | Toeniskoetter | 72/214 |
| 7,290,423 B2 * | 11/2007 | Carsley et al. | 72/214 |
| 7,500,373 B2 * | 3/2009 | Quell | 72/214 |
| 7,870,774 B2 * | 1/2011 | Hasegawa et al. | 72/220 |
| 7,950,260 B2 * | 5/2011 | Kinouchi et al. | 72/220 |
| 2002/0131854 A1 | 9/2002 | Baulier | |
| 2005/0262912 A1 | 12/2005 | Toeniskoetter | |
| 2006/0070418 A1 * | 4/2006 | Quell | 72/214 |
| 2008/0184544 A1 * | 8/2008 | Hasegawa et al. | 29/243.57 |
| 2008/0236236 A1 | 10/2008 | Toeniskoetter | 72/214 |
| 2008/0250835 A1 * | 10/2008 | Hasegawa et al. | 72/220 |
| 2008/0256779 A1 * | 10/2008 | Ryu et al. | 29/505 |
| 2009/0083962 A1 * | 4/2009 | Sandman et al. | 29/509 |
| 2009/0139293 A1 * | 6/2009 | Kinouchi et al. | 72/220 |
| 2010/0313621 A1 * | 12/2010 | Kumagai et al. | 72/220 |
| 2011/0107807 A1 * | 5/2011 | Sato et al. | 72/220 |

FOREIGN PATENT DOCUMENTS

| | | |
|---|---|---|
| CN | 1486802 A | 4/2004 |
| DE | 2004016385 | 9/2005 |
| DE | 202004012580 | 9/2005 |
| DE | 202005005880 | 9/2005 |
| EP | 0802001 | 10/1997 |
| EP | 1 389 498 | 2/2004 |
| EP | 1445043 | 8/2004 |
| EP | 1447155 | 5/2005 |
| EP | 1 518 617 | 9/2005 |
| JP | 2-070325 | 3/1990 |
| JP | 02070325 | 3/1990 |
| JP | 3-258428 | 11/1991 |
| JP | 4157028 | 5/1992 |
| JP | 5-78327 | 10/1993 |
| JP | 6-297046 | 10/1994 |
| JP | 7-060370 | 3/1995 |
| JP | 7-068324 | 3/1995 |
| JP | 7068324 | 3/1995 |
| JP | 7132327 | 5/1995 |
| JP | 7-227677 | 8/1995 |
| JP | 7-90299 | 10/1995 |
| JP | 2579530 | 11/1996 |
| JP | 2561596 | 10/1997 |
| JP | 2924569 | 5/1999 |
| JP | 11314121 | 11/1999 |
| JP | 2002102957 | 4/2002 |
| JP | 2002-143952 | 5/2002 |
| JP | 2002-349564 | 12/2002 |
| JP | 2003-103325 | 4/2003 |
| JP | 2003103325 | 4/2003 |
| JP | 2004-050265 | 2/2004 |
| JP | 2004050265 | 2/2004 |
| JP | 2005014069 | 1/2005 |
| JP | 2005-333756 | 12/2005 |
| JP | 2005-349471 | 12/2005 |

* cited by examiner

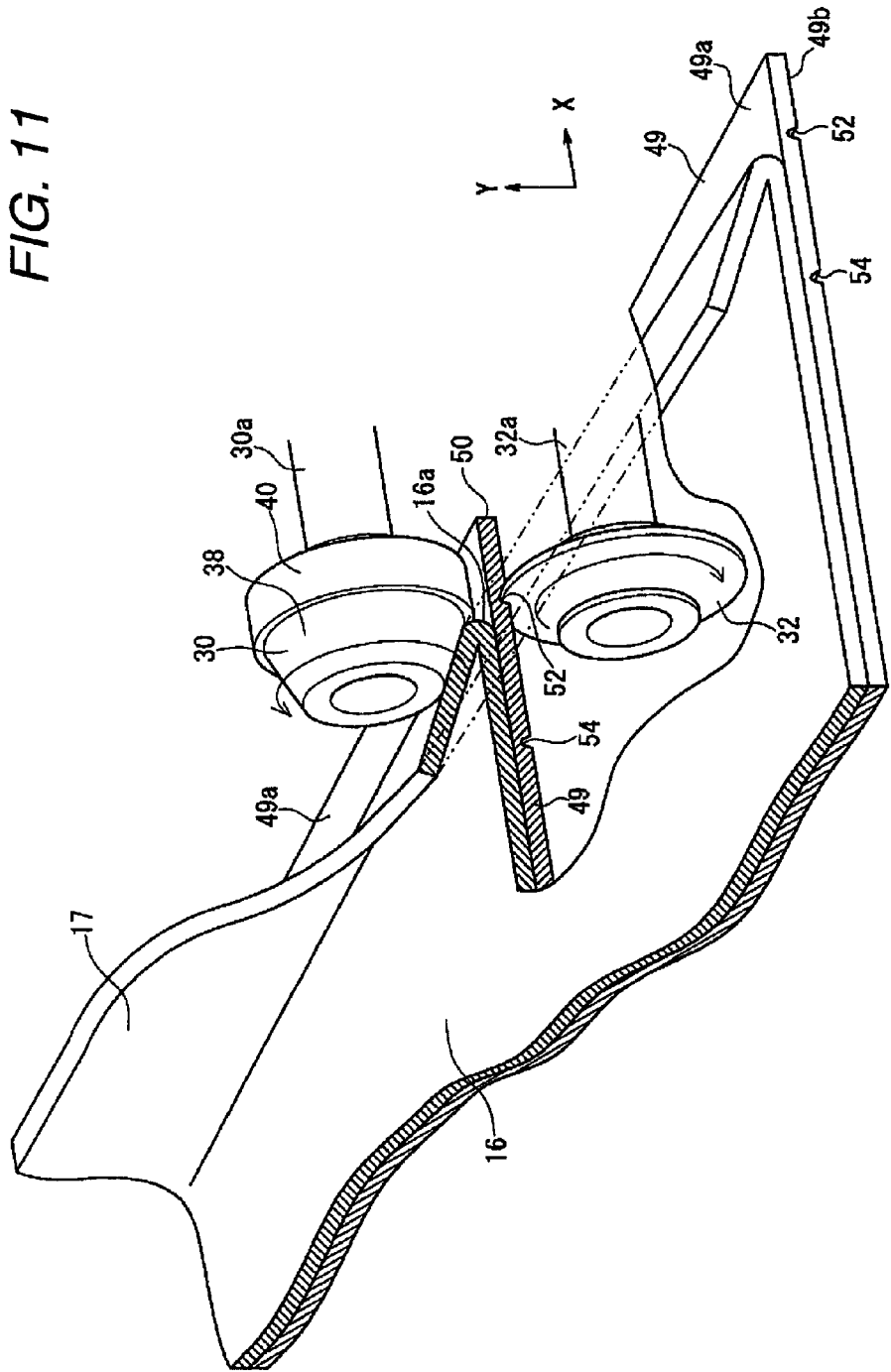

HEMMING WORKING METHOD AND WORKING APPARATUS

TECHNICAL FIELD

The present invention relates to a hemming working method and a hemming working apparatus for folding to bend a hem portion of a work by using a work roller.

BACKGROUND ART

There is carried out hemming working for folding to bend a flange constituted by erecting a hem portion of a panel in a direction of an inner side of the panel with regard to hem portions of a bonnet, a trunk, a door and a wheel house of an automobile. As the hemming working, there can be pointed out roll hemming working of positioning to hold a panel above a die and folding to bend a flange at an end portion of the panel while pressing a roller thereto. In roll hemming working, a fold-to-bend angle is large, and therefore, there is a case in which working is carried out by being processed by a plurality of stages of steps of preparatory bending (or pre-hemming) and finish bending (or regular hemming) in consideration of a fold-to-bend accuracy.

As an apparatus for rolling hemming working, there is proposed an apparatus of fixing a die to a work by clamps arranged at a plurality of portions thereof (refer to, for example, JP-A-06-297046).

It is preferable to form a shape of a work without error to be aligned to a shape of a die, and when the work is constituted by one sheet of a panel member as in a door panel or a bonnet, portions to be worked are few and an error is difficult to be brought about. On the other hand, when the work is constituted by a box structure or the like constituted by welding a plurality of plate members as in a white body, there is a tendency of bringing about a distortion by heat of welding and a clearance is liable to be brought about at an interval from a die.

Even when a clearance is brought about between a work and a die, in a case in which the work is constituted by one sheet of a panel member, the panel member is temporarily bent to follow a shape of the die in rolling a roller relative to the panel member, and therefore, a portion to be hemmed is pertinently bent.

However, when the work is constituted by a box structure or the like, the work is highly rigid and bending is not produced, and therefore, a die is not effectively operated at a portion having a clearance and there is a concern of bringing about a wrinkle in a wavy shape at a portion to be hemmed. Further, when a press force of a roller is excessively increased to eliminate a clearance, the work is distorted.

Hence, it is an object of the invention to provide a hemming working method and working apparatus capable of firmly bringing a work into contact with a die, folding to bend a portion to be hemmed by a pertinent shape and preventing a distortion or a deformation of the work even when the work is constituted by a shape having an error relative to the die.

Further, as hemming working, there is proposed a method of carrying out hemming working by setting a work to a die provided at an exclusive space for carrying out an exclusive step and rolling a unit held at a front end of a robot along a flange (refer to, for example, JP-A-07-060370, JP-B2-2924569).

Meanwhile, in an automobile industry in recent times, it is desired to develop a product in a short period of time and fabricate a number of vehicle kinds at the same time and it is desired to shorten a hemming working time period by making a rolling speed of a roller for hemming working high from a view point of further promoting a productivity and shortening a cycle time.

However, according to the method described in JP-A-07-060370, a movement of a press roller constituting a roller for hemming working in hemming working is controlled only by a movement of a robot, particularly in preparatory bending, it is difficult to regulate an attitude and a press force of the press roller, for example, when a rolling speed of the press roller is made to be high, there is a concern of bringing about a working failure in which a flange is excessively folded to bend or wavy.

Further, according to the method described in JP-B2-2924569, although there is provided a guide portion of guiding a direction of rolling a roller for hemming constituting a roller for hemming working, a groove for guiding is constituted only by one streak, and therefore, different hemming rollers need to be used in preparatory bending and finish bending, and an extraneous time period is required for interchanging the rollers. Further, when the rolling speed of the roller for hemming is made to be high, a moving locus and a teaching locus (a guiding direction of a guide groove) of a robot are considerably shifted from each other, a friction between the guide portion and the guide groove is increased, depending on cases, there is a concern that the guide portion rides over the guide groove. Further, the roller for hemming and the guide portion are coaxially and integrally constituted, and therefore, when the guide portion rides over the guide groove, the roller for hemming is floated from the flange and there is a concern of bringing about an extreme working failure.

Further, according to the method described in JP-B2-2924569, a roller shaft for coaxially and integrally supporting the roller for hemming and the guide portion is constituted to be able to move up and down while maintaining a horizontal state by a universal joint, and in positioning before hemming working, the guide portion can be moved in a lower direction to be installed at the guide groove by a pinching cylinder for moving the roller shaft up and down. However, in hemming working, the roller shaft is fixed to a wrist portion of the robot by a press force of the pinching cylinder, and therefore, as described above, the guide portion rides over the guide groove by increasing a friction between the guide portion and the guide groove, the roller for hemming is floated up from the flange, and there is a concern of bringing about an extreme working failure.

Hence, it is an object of the invention to provide a hemming working method and a hemming working apparatus capable of making a roller follow along a flange at a high speed and accurately by flexibly supporting the roller in hemming working.

Further, it is an object of the invention to provide a hemming working method and a hemming working apparatus capable of swiftly positioning a roller before hemming working even in a constitution of flexibly supporting the roller in hemming working as descried above.

Further, it is an object of the invention to provide a hemming working apparatus capable of making a roller follow along a flange at a high speed and accurately.

When hemming working is carried out, it is convenient to leave a portion of a flange to be erected. However, according to rolling hemming working of the background art, a roller is vertically pressed to a flange to be folded to bend at a work start portion, and therefore, a change in a stress and a shape at a boundary portion of a portion of leaving a portion of the flange to be erected and a fold-to-bend portion and there is a concern of bringing about a wrinkle.

Hence, it is an object of the invention to provide a hemming working method and working apparatus capable of realizing a gradual change in a shape and preventing a wrinkle, a crack or the like from being brought about by adjusting a fold-to-bend angle of a flange in accordance with a portion to be worked.

Further, it is an object of the invention to provide a hemming working method and working apparatus capable of bringing a moving die into contact with a work by a pertinent attitude.

Further, there is a case in which a panel member of a door or the like of a vehicle is constituted by combining an inner panel and an outer panel. When the inner panel and the outer panel are combined, the inner panel is pinched by carrying out hemming working of folding to bend a flange of the outer panel, thereafter, spot welding is carried out further to ensure a bonding strength.

In order to firmly carry out spot welding, a projection may be provided at the inner panel, the flange may be folded to bend such that the flange is brought into contact with an upper portion of the projection, thereafter, spot welding may be carried out by pressing a welding electrode to press the projection from a surface of the flange. Thereby, a current is concentrated on the projected portion to achieve firmly melting and a welding stress is promoted.

In this case, when the projection is pressed to crush by a back face of the flange in folding to bend the flange, an effect of concentrating the current in spot welding is reduced, and therefore, there is desired a measure of folding to bend the flange while leaving the projection.

In order to prevent a projection or the like of the panel member from being pressed to crush, there is proposed a method of rolling a roller while following recesses and projections by using a hemming roller a surface of which is brought into a gel state (refer to, for example, JP-Y2-2561596).

Further, in hemming working, when a flange is folded to bend in steps by being divided by a plurality of times, a highly accurate fold-to-bend portion is provided, which is preferable. The applicant has proposed a method of carrying out hemming working by being divided at least by two times in JP-A-2005-349471 or the like.

Meanwhile, according to the hemming roller described in JP-Y2-2561596, although an entire face thereof is constituted by a gel member and can follow a recessed and projected portion of a projection or the like, also other portion is pressed by way of the gel member, and therefore, a sufficient press force is not achieved. Further, the gel member repeats deformation at each time of riding over a projection or the like, and therefore, service life thereof is shortened, which is not practical.

Hence, it is an object of the invention to provide a hemming roller capable of folding to bend a flange without crushing a projection provided at a panel member, a roll hemming method, and a weld structure welding a panel worked by the method with high strength.

Further, JP-Y2-2561596 describes a hemming working apparatus including a guide roller for increasing a press force in hemming and providing a guide portion with which the guide roller is engaged to a die mounted with a work.

Further, JP-B2-2579530 discloses technical thought in which hemming working by a work roller is carried out at a linear portion of a work, and hemming working is carried out by a forming die at a corner portion having a small radius of curvature of the work.

Meanwhile, a bonnet, a trunk and a door or the like of an automobile as described above normally includes a corner portion having a small radius of curvature.

When the above-described corner portion is worked by the apparatus described in JP-Y2-2561596, it is necessary to constitute the guide portion by a shape comprising a small radius of curvature to be along a shape of the corner portion.

Then, it is difficult for the guide roller to follow the shape of the guide portion provided at the corner portion, there is a concern of bringing about derailing from the guide portion or biting the guide portion or the like, as a result, it is difficult to accurately make the work roller follow along the shape of the work.

Further, according to the method of JP-B2-2579530, it is necessary to prepare a plurality of forming dies for carrying out hemming working of corner portions of respective shapes (kinds) of works. Therefore, there poses a problem that a general purpose performance of an equipment is low and cost is increased.

Hence, it is an object of the invention to provide a hemming working method and a hemming working apparatus capable of making a work roller accurately follow even a portion having a radius of curvature of a corner portion or the like of a work. Further, it is an object of the invention to provide a hemming working method and a hemming working apparatus having a high general purpose performance of an equipment and capable of reducing cost.

FIG. 107A and FIG. 107B are views for explaining a basic principle of a roller hemming method according to a related art. (The related art is disclosed in, for example, JP-B-07-090299.) As shown by FIG. 107A, a rolling hemming apparatus 8100 is constituted by a lower die 8102 provided with a guide face 8101 and a flat roller 8104 rotatably supported by a robot hand 8103.

An outer panel 8107 having a flange 8106 is mounted on the lower die 8102, and an inner panel 8108 is mounted on the outer panel 8107. Further, the flat roller 8104 is rotated while being in line with the guide face 8101 to fold to bend the flange 8106 indicated by an imaginary line by about 45° up to a position indicated by a bold line. The step is referred to as a tackedly bending step or a primary bending step.

Next, as shown by FIG. 107B, a direction of the flat roller 8104 is changed by the robot hand 8103. Further, the flange 8106 indicated by an imaginary line is completely folded to bend up to a position indicated by a bold line. The step is referred to as a regular bending step or a secondary bending step.

FIG. 108B is a view for explaining a problem of the rolling method of the related art. As shown by FIG. 108A, assume that the work 8110 is a bonnet in which a front hem portion 8111 and a rear hem portion 8112 are bent. After the primary bending step, a front end portion 8115 of a flange 8113 becomes remoter from a bending center 8116 than a base portion 8114 of the flange 8113. That is, when a radius of the base portion 8114 is designated notation R1 and a radius of the front end portion 8115 is designated by notation R2, R1<R2. As a result, a peripheral length of the front end portion 8115 becomes larger than a peripheral length of the base portion 8114.

A similar peripheral length difference is present also at a guide face 8120 shown in FIG. 108B. When a radius of one hem (which is proximate to the bending center) 8121 of the guide face 8120 is designated by notation R3 and a radius of other hem 8122 is designated by notation R4, R3<R4. As a result, a peripheral length of the other hem 8122 becomes larger than a peripheral length of the one hem 8122.

When a flat roller 8123 is rotated without being slipped relative to the one hem 8121, a slip is necessarily generated between the other hem 8122 and the flat roller 8123.

A lower die 8124 including the guide face 8120 is constituted by hard steel and also the flat roller 8123 is constituted by hard steel. Therefore, at least one of the guide face 8120 and the flat roller 8123 is worn, and it is difficult to continue hemming working.

Therefore, the method of JP-B-07-090299 is not applicable to hemming working constituting an object by the work 8110 in which the front hem portion 8111 and the rear hem portion 8112 are bent.

Hence, it is a problem of the invention to provide a roll hemming technology preferable for a work a hem portion of which is bent.

FIG. 109 is a view for explaining a basic constitution of other related art. A hemming apparatus 9100 is constituted by guide cylinders 9103, 9103 fixedly provided at a support member 9102 attached to a front end of a robot arm 9101, slide shafts 9104, 9104 slidably guided to be supported by the guide cylinders 9103, 9103, sliders 9105, 9105 fixed to the slide shafts 9104, 9104, a cylinder 9106 coupled to the sliders 9105, 9105 and fixedly provided to the support member 9102, a hemming roller 9107 axially supported rotatably by the sliders 9105, 9105, a guide roller 9108 axially supported by the support member 9102, a guide rail 9111 for preparatory bending for guiding the guide roller 9108 and provided to a lower die 9109 to be inclined in a lower direction, and a guide rail 9112 for regular bending for guiding the guide roller 9108 and provided to the lower die 9109 vertically in a lower direction.

First, the guide roller 9108 is engaged with the guide rail 9112 for regular bending. Thereby, the hemming roller 9107 is disposed in a horizontal direction. Next, by operating to move back the cylinder 9106, regular bending working of constituting a pinched state is carried out by folding to bend an end hem 9114 of a lower side sheet 9113 which has been preparatorily bent by 45° over an end hem 9116 of an upper side sheet 9115. Hems of the lower side sheet 9113 and the upper side sheet 9115 can be connected thereby.

Meanwhile, the guide roller 9108 is constituted by a shape similar to that of a flanged wheel, and therefore, when the guide rail 9112 for regular bending is bent abruptly to some degree or more, the guide roller 9108 is derailed. Therefore, the hemming apparatus 9100 of the related art of FIG. 109 is applicable only to an end hem 9114 gradually bent in a head and tail direction of the drawing.

Further, abrupt bending can be reread as "large radius of curvature" and gradual bending can be reread as "small radius of curvature". A radius of curvature is an inverse number of a radius. A work of a bonnet or the like of a vehicle includes corner portions having large radii of curvature at four corners thereof. Such a work cannot be worked by the hemming apparatus 9100.

FIG. 110 is a view for explaining a basic constitution of still other related art. A hemming forming apparatus 9200 is constituted by a jig 9203 for receiving an outer panel 9202 mounted with an inner panel 9201, an articulated robot 9205 mounted on a conveyor apparatus 9204 arranged in a side direction of the jig 9203, a roller holder 9207 attached to a front end of a robot arm 9206 of the articulated 9205, a forming roller 9208 attached to a front end of the roller holder 9207, die driving apparatus 9209 respectively arranged at vicinities of four corner portions of the jig 9203, and forming dies 9211 respectively attached to the die driving apparatus 9209.

Whereas the forming roller 9208 is run by being pressed from an upper side substantially at a linear portion having a small radius of curvature, by pressing to form the four corner portions having large radii of curvature respectively by the forming dies 9211, hemming working can be finished by folding to bend a fold-to-bend portion provided to the outer panel 9202 to the inner panel 9201.

That is, according to the hemming forming apparatus 9200 of the related art of FIG. 110, the linear portion of the work is worked by the forming roller 9208, and the four corner portions of the work are worked by the forming dies 9211. 4 pieces of the forming dies 9211 are needed, and therefore, the hemming forming apparatus 9200 becomes expensive. As described above, according to the related art of FIG. 109, hemming working is difficult for the portion having a large radius of curvature, and according to the related art of FIG. 110, although hemming working of the portion having the large curvature can be carried out, the hemming apparatus becomes expensive.

Hence, it is a problem of the invention to provide a roller hemming apparatus which can carry out hemming working of a portion having a large radius of curvature and inexpensive.

DISCLOSURE OF THE INVENTION

According one or more embodiments of the invention, a hemming working method of pinching a work by a moving die and a roller and subjecting a flange provided at an end portion of the work to hemming working is provided with an approaching step of holding the moving die by carrying means and making the moving die approach the work, a floating step of making the moving die displaceable relative to the work by reducing a force of the carrying means for maintaining an attitude thereof, and a contacting step of bringing a surface of the moving die into contact with the work by mounting means provided at the moving die in a state of holding the moving die by the carrying means.

By making the moving die displaceable by the floating step and bringing the moving die into contact with the work by the mounting means in this way, a rigidity of a movable portion of the carrying means is lowered, and therefore, the movable portion is pertinently deformed and the moving die is brought into contact with the work to constitute a pertinent attitude in conformity with the shape of the surface.

Further, by dividedly providing the carrying means and the mounting means, the approaching step can be constituted by a high speed by setting the carrying means to a large output, and the work can be prevented from being deformed at a contacting step by setting the mounting means to a low output.

According one or more embodiments of the invention, a hemming working apparatus is provided with a moving die and a roller for pinching a work and subjecting a flange provided at an end portion of the work to hemming working, carrying means for making the moving die approach the work, adjusting means for reducing a force of maintaining an attitude when the carrying means makes the moving die approach the work, and mounting means provided at the moving die for bringing a surface of the moving die into contact with the work in a state of holding the moving die by the carrying means.

In this way, according to the maintaining force adjusting means, the force of the carrying means for maintaining the attitude is reduced when the moving die approaches the work, and therefore, the rigidity of the movable portion of the carrying means is lowered. Therefore, when the moving die is mounted to the work by the mounting means, the moving die is brought into contact with the work while being displaced to constitute the pertinent attitude in conformity with the shape of the surface.

According to a hemming working method and working apparatus of one or one or more of embodiments of the invention, the carrying means is brought into the floating state and the moving die is made to be displaceable, and the moving die is brought into contact with the work by the mounting means. At this occasion, the rigidity of the movable portion of the carrying means is lowered, and therefore, the movable portion is pertinently deformed, and the moving die is brought into contact with the work while being displaced to constitute the pertinent attitude in conformity with the surface shape. Therefore, the moving die is not excessively pressed to the work in an unaligned state, and the work can be prevented from being deformed.

Further, by dividedly providing the carrying means and the mounting means, the approaching step can be constituted by a high speed by setting the carrying means to a large output and the work can be prevented from being deformed in the contacting step by setting the mounting means to a low output.

Further, according to the moving die capable of being carried, the moving die is applicable generally regardless of a size of a total of the work. Further, the moving die is applicable also on a production line, and therefore, it is not necessary to provide a space exclusive for hemming working separately from the production line.

According to one or more embodiments of the invention, in a hemming working method of pinching a work by a die and a roller and subjecting a flange provided at an end portion of the work to hemming working, the die is elastically urged to the work such that the die can be brought into contact with the work at a portion of pressing the work by the roller and the die can be separated from the work at other than the portion of working the work.

Further, according to one or more embodiments of the invention, a hemming apparatus is provided with a die and a roller for pinching a work and subjecting a flange provided at an end portion of the work to hemming working, and an elastic member provided between the die and the work and elongatable and contractable in a pressing direction of the roller.

In this way, by elastically urging the die to the work such that only the portion pressed by the roller can be brought into contact with the die and the die can be separated from the work at other than the pressed portion, the work can firmly be brought into contact with the die at the pressed portion, the hemming portion can be worked to be folded to bend in a pertinent shape, and warping or deformation of the work can be prevented.

According to the hemming working method and the working apparatus of one or more embodiments of the invention, even when the work is constituted by a shape having an error relative to the die, at the portion of being pressed by the roller, the work is brought into contact with the die and the hemming portion can be worked to be folded to bend in a pertinent shape.

Further, by elastically urging the die to the work such that the die can be separated from the work at other than the pressed portion, a clearance is not forcibly crushed and warping or deformation of the work can be prevented.

According to one or more embodiments of the invention, in a hemming working method of carrying out hemming working for a flange of a work by using a hemming roller displaceably supported by a moving mechanism, when the hemming roller is made to approach the work by the moving mechanism, a displacement of the hemming roller relative to the moving mechanism is restricted, and in the hemming working, the hemming roller is made to be displaceable relative to the moving mechanism.

In this way, by bringing about the state of restricting the deformation relative to the moving mechanism of the hemming roller when the hemming roller is made to approach the work, positioning can be carried out accurately and swiftly without bringing about rocking or rattling of the hemming roller.

Further, by bringing the hemming roller into a state of being displaceable relative to the moving mechanism in hemming working, the hemming roller can be made to follow the flange of the work at a higher speed and accurately.

Further, it is preferable to use a receiving roller for pinching the work along with the hemming roller and displaceably supported by the moving mechanism, when the hemming roller is made to approach the work, the hemming roller and the receiving roller are brought into a state of restricting displacements thereof relative to the moving mechanism, and in the hemming working, the hemming roller and the receiving roller are brought into a state of being displaceable relative to the moving mechanism in a state of maintaining a press force or a distance between the hemming roller and the receiving roller to a predetermined value.

Thereby, positioning in making the hemming roller approach the work can be made to be further accurate and swift.

Further, in hemming working, the hemming roller can be made to follow the flange of the work at a higher speed and accurately and further uniform hemming working can be carried out.

According to one or more embodiments of the invention, a hemming working apparatus is provided with a hemming roller for carrying out hemming working for a flange of a work, a receiving roller for pinching the work along with the hemming roller, a hemming unit including a movable mechanism for making the hemming roller and the receiving roller proximate to each other and remote from each other, a moving mechanism for supporting the hemming unit and moving the hemming unit to a predetermined position, and a floating mechanism for displaceably connecting the hemming unit to the moving mechanism.

In this way, by using the floating mechanism of displacebly connecting the hemming unit to the moving mechanism, the hemming roller can be made to follow the flange at a higher speed and accurately.

Further, when there is provided the restricting means capable of restricting a displacement of the hemming unit relative to the moving mechanism by the floating mechanism, the operation at the floating mechanism can be restricted in accordance with an operating step.

Further, there may be constructed a constitution in which the moving mechanism comprises a base portion connected to the moving mechanism by way of the floating mechanism, and a movable portion constituted to be able to displace the hemming roller and the receiving roller in directions of making the hemming roller and the receiving roller proximate to each other and remote from each other relative to the base portion, the restricting means comprises a first locking portion provided at the movable portion, and a second locking portion provided at the moving mechanism and engaged with the first locking portion.

By constructing such a constitution, use and restriction of the floating mechanism can be controlled by further simple constitution and simplification and low cost formation of the apparatus can be achieved.

According to one or more embodiments of the invention, the roller can be made to follow the work at a high speed and accurately along the flange and a hemming working time period can be shortened and a working failure can be avoided. Further, according to the invention, before hemming working, the roller for hemming working can swiftly be positioned to the work, the cycle time can be shortened.

According to one or more embodiments of the invention, a hemming working apparatus having a hemming roller for carrying out hemming working for a flange of a work is provided with a moving mechanism for supporting the hemming roller and moving the hemming roller to a predetermined position, and a guide member for guiding the hemming roller along the flange while restricting a displacement of the hemming roller relative to the flange in a direction of a rotating shaft of the hemming roller. The hemming roller is provided displaceably in the direction of the rotating shaft of the hemming roller relative to the moving mechanism.

In this way, by providing the hemming roller to the moving mechanism displaceably in the direction of the rotating shaft of the hemming roller, in hemming working, the hemming roller can be made to follow the flange at a high speed and accurately.

According one or more embodiments of the invention, the roller can be made to follow the flange at a high speed and accurately, the hemming working time period can be shortened and the working failure can be avoided.

According one or more embodiments of the invention, in a hemming working method of folding to bend a flange of a work in a direction of an inner side of the work by a roller, the roller is rolled in an extending direction of the flange while being displaced in a direction orthogonal to the extending direction. In this way, by rolling the roller while being displaced in the direction orthogonal to the extending direction of the flange, an angle of folding to bend the flange can be adjusted in accordance with the portion to be worked, a change in the shape becomes gradual, wrinkle or crack or the like can be prevented from being brought about.

Further, according one or more embodiments of the invention, a hemming working apparatus for folding to bend a flange of a work in a direction of an inner side of the work by a roller is provided with a distance restricting portion projected in a direction of erecting the flange and brought into contact with the roller on an outer side of an end portion of the work. The distance restricting portion includes an inclined face a height of which is changed in the extending direction.

In this way, by providing the distance restricting portion having the inclined face the height of which is changed in the extending direction of the flange, a pressing amount of the roller for pressing the flange is restricted in accordance with the portion to be worked, an angle of folding to bend the flange can be adjusted, a change in the shape becomes gradual and wrinkle or crack or the like can be prevented from being brought about.

Further, according to one or more embodiments of the invention, a hemming working apparatus for folding to bend a flange of a work in a direction of an inner side of the work by a roller is provided with a guide portion for guiding the roller. The guide portion comprises a parallel portion extended in parallel with the flange, and a separating portion for separating the work in a direction of an outer side thereof by being compared with the parallel portion at a portion of starting and (or) a portion of finishing hemming working for the flange such that the roller is made to be gradually proximate to or remote from the flange.

In this way, by providing the guide portion to be separated to the direction of the outer side of the work, a pressing amount of the roller for pressing the flange is changed in accordance with the portion to be worked, an angle of folding to bend the flange is adjusted, the change in the shape becomes gradual, and wrinkle or crack or the like can be prevented from being brought about.

According to the hemming working method and the working apparatus of one or more embodiments of the invention, by adjusting the angle of folding to bend the flange in accordance with the portion to be worked, a further gradual change in the shape is realized, and wrinkle or crack or the like can be prevented from being brought about.

According one or more embodiments of the invention, there is provided a roll hemming method of pinching an inner panel having a projection by folding to bend a flange of an outer panel by using a hemming roller having a first circular pillar and a second circular pillar coaxial with each other and having the same diameter, and a ring-like recessed portion provided between the first circular pillar and the second circular pillar, the roll hemming method comprising a step of rolling the hemming roller in a first direction of extending the flange such that the ring-like recessed portion passes above the projection by bringing the first circular pillar into contact with an end portion of an outer face of the flange to press and bringing the second circular pillar into contact with a base portion of the outer face of the flange to press, and a step of rolling the hemming roller in a second direction intersected with the first direction such that the ring-like recessed portion passes above the projection by bringing the first circular arc pillar and the second circular pillar into contact with the flange to press.

In this way, in rolling the hemming roller in the first direction of extending the flange, when the ring-like recessed portion is made to pass above the projection above the flange to be folded to bend, the projection is not crushed. Further, when the hemming roller is rolled again the second direction intersected with the first direction and the ring-like recessed portion is made to pass above the projection also at this occasion, a portion remaining as a hollow bulge in the first direction is pressed centering on the projection above the flange. Thereby, the flange becomes a stratified projection centering on the projection of the inner panel. The stratified projection is a small projection which is not almost provided with the hollow portion, and a current can be concentrated thereon in spot welding thereafter.

Further, according one or more embodiments of the invention, a hemming roller is provided with a first circular pillar for pressing an end portion of an outer face of a flange, a second circular pillar coaxial with the first circular pillar and having a diameter the same as a diameter of the first circular pillar for pressing a base portion of an outer face of the flange, and a ring-like recessed portion provided between the first circular pillar and the second circular pillar. Such a hemming roller is preferably used for the above-descried roll hemming method and does not press to crush the projection of the inner panel. Further, by rolling the hemming roller in two different directions constituting an intersection thereof by the projection, a hollow bulge is hardly present by the flange centering on the projection, and a current can be concentrated thereon in spot welding thereafter.

In this case, there may be constructed a constitution in which the ring-like recessed portion is constituted by a shape of a circular arc in a section thereof. According to such a circular arc shape of the section, a press mark is difficult to be attached to the flange by a boundary portion between the ring-like recessed portion and the first circular pillar and a boundary portion between the ring-like recessed portion and the second circular pillar.

Further, a welded structure according to the invention is formed by using a hemming roller having a first circular pillar and a second circular pillar coaxial with each other and having the same diameter and a ring-like recessed portion provided between the circular pillar and the second circular pillar, pinching an inner panel having a projection by folding to bend a flange of an outer panel, providing a stratified projection centering on the projection by rolling the hemming roller such that the ring-like recessed portion passes above the projection in two different directions constituting an intersection thereof by the projection, and carrying out a spot welding by bringing a welding electrode into contact with the stratified projection. According to the welded structure, in carrying out spot welding, a current is made to flow concentratedly to between two layers of the stratified projection, melting is achieved firmly by sufficiently generating heat and a high welding strength is achieved.

According to the roll hemming method according to one or more embodiments of the invention, when the hemming roller is rolled in the first direction of extending the flange, the ring-like recessed portion is made to pass above the projection on the flange to be folded to bend, and therefore, the projection is not crushed. Further, the hemming roller is rolled again in the second direction intersected with the first direction and also at this occasion, the ring-like recessed portion is made to pass above the projection, and therefore, the portion remaining as the bulge along the first direction centering on the projection is pressed on the flange. Thereby, the flange becomes the small stratified projection in which the hollow portion is hardly present centering on the projection of the inner panel and the current can be concentrated thereon in the spot welding thereafter.

Further, according to the hemming roller according to one or more embodiments of the invention, the hemming roller is preferably used for the roll hemming method and does not press to crush the projection of the inner panel. Further, by rolling the hemming roller in two different directions constituting an intersection by the projection, the stratified projection is provided by removing almost the hollow bulge at the bulged portion centering on the projection, and the current can be concentrated thereon in spot welding thereafter.

Further, according to the hemming roller according to one or more embodiments of the invention, the current is made to flow concentratedly to between two layers of the stratified projection in carrying out spot welding, firm melting is achieved by sufficiently generating heat and the high welding strength is achieved.

According to one or more embodiments of the invention, there is provided a hemming working method for carrying out hemming working for a hem portion of a work by using a work roller movably supported by moving means including a step of displacing the work roller in a direction of a rotating axis thereof in hemming working.

According to the hemming working method, even when an error is brought about between a shape of the hem portion of the work and a locus of moving the work roller, by displacing the work roller in the axial direction, the work roller can be made to follow the hem portion of the work accurately. Particularly, according to the invention, the invention is effective for hemming working of a portion having a radius of curvature at the hem portion of the work where the error tends to be increased, for example, a corner portion of the work or a hem portion having a meandering shape.

Further, according to one or more embodiments of the invention, there is provided the hemming working method for carrying out hemming working for the hem portion of the work by using the work roller movably supported by the moving means, and a guide roller arranged to pinch the work to be opposed to the work roller including a step of relatively changing directions of rolling the work roller and the guide roller in the hemming working.

According to the hemming working method, even when it is difficult to provide a locus of moving the guide roller along the hem portion of the work as in, for example, the corner portion of the work, by relatively changing the directions of rolling the work roller and the guide roller, the guide roller can be made to follow the hem portion of the work accurately in a state in which the work roller is made to be independent from the guide roller.

According to one or more embodiments of the invention, there is provided a hemming apparatus comprising a work roller for carrying out hemming working for a hem portion of a work, a guide roller arranged to pinch the work to be opposed to the work roller, a die arranged between the work roller and the guide roller, mounted with the work at a surface thereof, and provided with a guide portion for guiding the guide roller at a back face thereof, moving means for movably supporting the work roller and the guide roller, and position displacing means for displacing positions of the work roller and the guide roller relative to each other by constituting a reference thereof by the guide portion.

According to the apparatus, even when it is difficult to provide a guide portion of the guide roller along the hem portion of the work as in, for example, a portion of the work having a radius of curvature of the corner portion or the like, working can be carried out by displacing the relative positions of the work roller and the guide roller constituting the reference by the guide portion by the position displacing means. Therefore, the work roller can be made to follow the hem portion of the work accurately.

Further, according to one or more embodiments of the invention, there is provided a hemming working apparatus comprising a work roller for carrying out hemming working for a hem portion of a work, a guide roller arranged to pinch the work to be opposed to the work roller, a die arranged between the work roller and the guide roller, mounted with the work at a surface thereof, and provided with a guide portion for guiding the guide roller at a back face thereof, moving means for movably supporting the work roller and the guide roller, and direction changing means for changing directions of rolling the work roller and the guide roller relative to each other.

According to the apparatus, even when it is difficult to provide the guide portion of the guide roller along the hem portion of the work as in the corner portion or the like, working can be carried out by relatively changing the directions of rolling the work roller and the guide roller by the direction changing means. Therefore, the work roller can be made to follow the hem portion of the work accurately in a state of making the work roller independent from the guide roller.

According to the invention, even when an error is brought about between, for example, the shape of the hem portion of the work and the locus of moving the work roller for working the hem portion, by displacing the work roller and the guide roller in the axial direction, the work roller can be made to follow accurately to the hem portion of the work. Further, according to the invention, even when it is difficult to provide, for example, the guide portion of the guide roller along the hem portion of the work, by relatively changing the directions of rolling the work roller and the guide roller, the work roller can be made to follow the hem portion of the work by making the work roller independent from the guide roller.

Therefore, derailing of the guide roller from the guide portion, or biting to the guide portion or the like can firmly be prevented, and the work roller can be made to follow accurately along the shape of the hem portion of the work. Further, hemming working of the linear portion of the work and the portion having the radius of curvature of the corner portion or the like can be carried out by one piece of the hemming working apparatus, a general purpose performance of equipment can be promoted and cost can be reduced.

According to one or more embodiments of the invention, there is provided a hemming working roller used for hemming working of folding to bend a flange erected at a work, the hemming working roller comprising a primary bending face comprising a taper face inclined to a roller rotating shaft by a first angle, and a secondary bending face comprising a taper face inclined to the roller rotating shaft by a second angle, wherein the hemming working roller is used for two stages of hemming working of bending the flange by about a half of a total bending angle by the primary bending face and bending the flange completely by the secondary bending face.

The hemming working roller is a roller preferable for a work a hem portion of which is bent, includes the primary bending face comprising the taper face and the secondary bending face comprising the taper face. When primary bending is carried out by the primary bending face, the secondary bending face can be made to be in line with the guide portion. At this occasion, a peripheral speed difference is not brought about between the secondary bending face and the guide portion, and therefore, there is not a concern of bringing about defect or wear at the secondary bending face or the guide portion.

According to one or more embodiments of the invention, there is provided a roller hemming apparatus used for hemming working for folding to bend a flange erected at a work, the roller hemming apparatus including a work mounting member for mounting the work, a hemming working roller having a primary bending face comprising a taper face inclined to a roller rotating shaft by a first angle and a secondary bending face comprising a taper face inclined to the roller rotating shaft by a second angle, a roller moving mechanism for moving the hemming working roller relative to the work along the flange, and a guide portion for guiding the secondary bending face when the flange is bent by the primary bending face.

The roller hemming apparatus is a roller hemming apparatus preferable for a work a hem portion of which is bent and includes the hemming working roller having the primary bending face comprising the taper face and the secondary bending face comprising the taper face. When the primary bending is carried out by the primary bending face, the secondary bending face can be made to be in line with the guide portion. At this occasion, a peripheral speed difference is not brought about between the secondary bending face and the guide portion, and therefore, there is not a concern of bringing about defect or wear at the secondary bending face or the guide portion.

According to one or more embodiments of the invention, there is provided a roller hemming working method of folding to bend a flange erected at a work by a roller, the roller hemming working method comprising a preparing step of preparing a hemming working roller having a primary bending face comprising a taper face inclined to a roller rotating shaft by a first angle and a secondary bending face comprising a taper face inclined to the roller rotating shaft by a second angle, and a guide portion for guiding the secondary bending face when the flange is bent by the primary bending face, a primary bending step of bending the flange by the primary bending face by about a half of a total flange bending angle while making the secondary bending face in line with the guide portion, and a secondary bending step of completely bending the flange by the secondary bending face.

The roller hemming method is a roller hemming method preferable for a work a hem portion of which is bent and carries out hemming by the hemming working roller having the primary bending face comprising the taper face and the secondary bending face comprising the taper face. When primary bending is carried out by the primary bending face, the secondary bending face can be made to be in line with the guide portion. At this occasion, a peripheral speed difference is not brought about between the secondary bending face and the guide portion, and therefore, there is not a concern of bringing about defect or wear at the secondary bending face or the guide portion.

According to one or more embodiments of the invention, there is provided a roller hemming apparatus of folding to bend an erected flange by preparing a die including a guide groove at a lower face thereof and a press roller moved independently from the die and a guide member progressing and regressing to and from the press roller, mounting a plate member including the erected flange at a hem thereof on an upper face of the die, fitting the guide member to the guide groove, and operating the press roller to the erected flange under a state thereof, wherein the guide member includes a spherical member rolled along the guide groove.

The guide member includes the spherical member rolled along the guide groove. The spherical body is not detached from the guide groove having a large radius of curvature. Therefore, there can be provided a roll hemming apparatus which is able to carry out hemming working of a portion having a large radius of curvature and inexpensive.

In addition thereto, the roller hemming apparatus is a simple apparatus constituted by the die having the guide groove, the press roller and the guide member, and therefore, low cost formation of the roller hemming apparatus can easily be achieved.

Other aspects and advantages of the invention will be apparent from the following description, the drawings and the claims.

BRIEF DESCRIPTION OF THE DRAWINGS

FIG. 11 is a partially sectional perspective view of a wheel arch portion of a vehicle, a hemming roller and a guide roller in carrying out a first hemming step.

BEST MODE FOR CARRYING OUT THE INVENTION

An explanation will be given of a hemming working method and a hemming working apparatus according to exemplary embodiments of the invention in reference to the drawings as follows.

<First Exemplary Embodiment>

Figure 1:
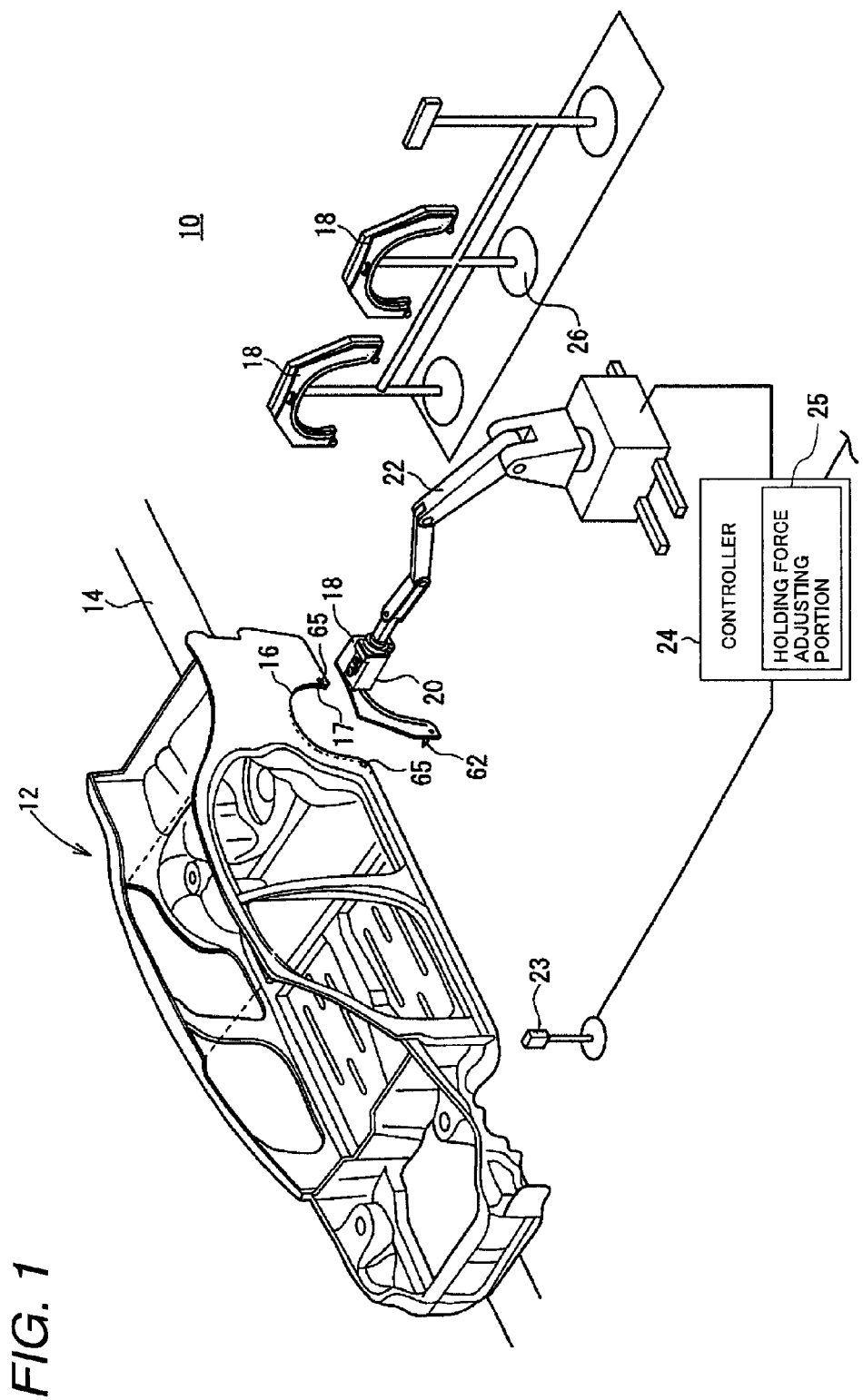
FIG. 1 is a perspective view of a hemming working apparatus according to a first exemplary embodiment.

As shown by FIG. 1, a hemming working apparatus 10 according to the embodiment is an apparatus set to a middle step of a production line 14 for assembling and working a vehicle (work) 12 in a so-to-speak white body state for carrying out roll hemming working for a flange 17 of a wheel arch portion on a left rear wheel side. A wheel arch portion 16 is constituted by a shape of a substantially a circular arc of 180°. In a state before working by the hemming apparatus 10, a flange 17 is constituted by a shape of being bent by 90° from an end portion 16a (refer to FIG. 6) of the wheel arch portion 16 to an inner side.

The hemming working apparatus 10 includes a moving die 18 to be brought into contact with the wheel arch portion 16 of the vehicle 12 constituting the work, a robot (carrying means) 22 for moving the moving die 18 and including a hemming unit 20 at a front end thereof, an photoelectric sensor 23 for detecting that the vehicle 12 is carried to a predetermined position of the production line 14, and a controller 24 for carrying out a comprehensive control.

The controller 24 includes a holding force adjusting portion (adjusting means) 25 for adjusting a force for the robot 22 for maintaining an attitude. The holding force adjusting portion 25 adjusts a torque generated by each motor by adjusting a voltage applied to a drive circuit for driving the motor provided at each joint of the robot 22. Thereby, the forces generated by the respective joints can uniformly be reduced or increased.

The robot 22 is of an industrial articulated type and can move the hemming unit 20 to an arbitrary position and in an arbitrary attitude by a programmed operation. A vicinity of the robot 22 is provided with a storing base 26 arranged with a plurality of kinds of moving dies 18 in accordance with a kind of the vehicle 12, and a position data of the storing base 26 is stored to the controller 24. The controller 24 is connected to an external production control computer (not illustrated) for controlling an operation of the projection line 14, and the controller 24 is supplied with information showing a kind or the like of the vehicle 12 carried on the production line 14.

Figure 2:
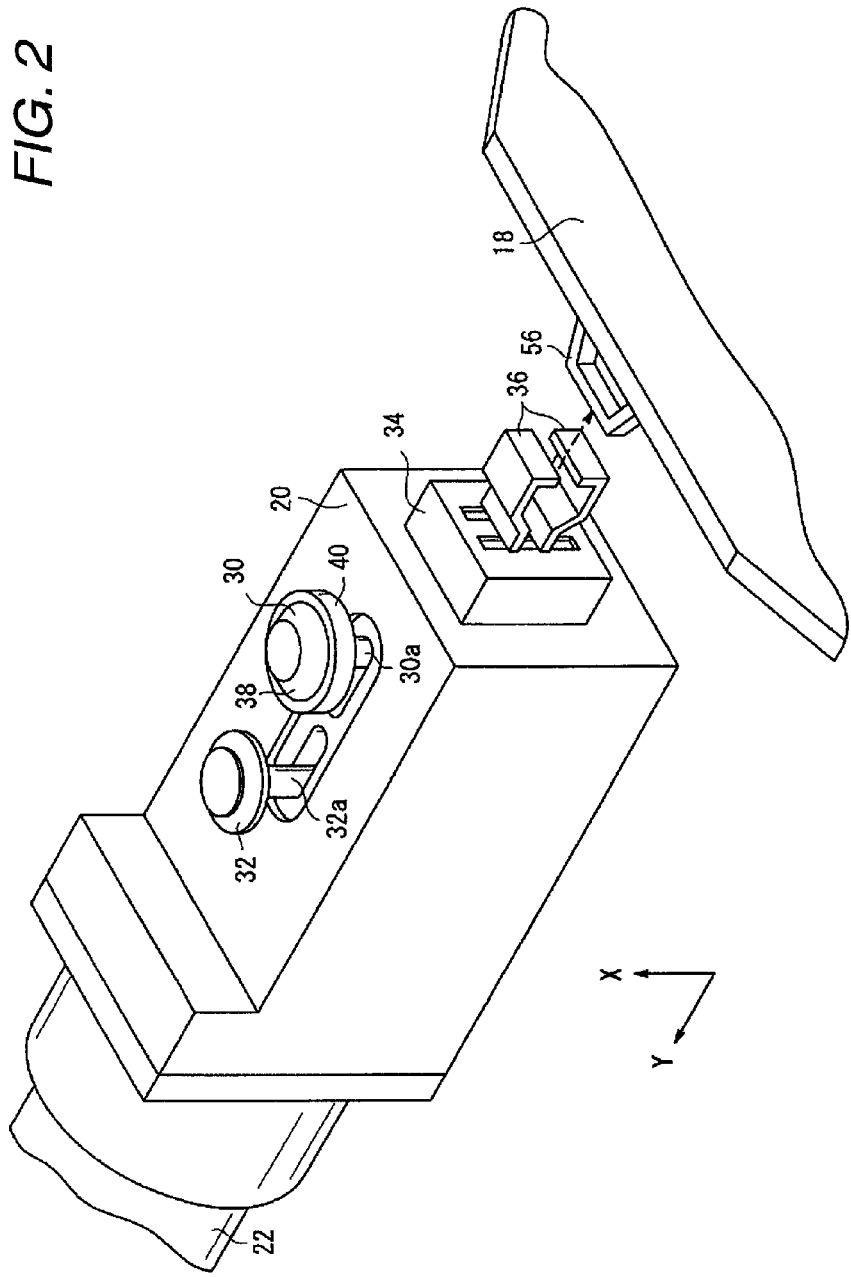
FIG. 2 is a perspective view of a hemming unit provided at a front end of a robot of the hemming working apparatus according to the first exemplary embodiment.

As shown by FIG. 2, the hemming unit 20 includes a hemming roller 30 and a guide roller 32 provided to project from an end face, and a chuck 34 provided at a side face portion.

The chuck 34 includes a pair of fingers 36 opened and closed under an operation of the controller 24, which are used for moving the moving die 18.

The hemming roller 30 and the guide roller 32 are axially supported rotatably by support shafts 30a and 32a. Further, the hemming roller 30 and the guide roller 32 can be moved in Y direction (direction of aligning the support shafts 30a and 32a), an interval between the support shaft 30 and the support shaft 32a is adjusted to be able to press a member pinched by the hemming roller 30 and the guide roller 32. Further, the hemming roller 30 and the guide roller 32 are of so-to-speak floating structure, movable in Y direction and X direction (axial directions of the support shafts 30a and 32a) while maintaining positions relative to each other and moving drivenly and elastically by an external force. That is, the support shaft 30 and the support shaft 32a are made to be cooperatively movable in X direction and Y direction while maintaining an adjusted interval therebetween.

The hemming roller 30 is constituted by a taper roller 38 provided on a front end side, and a circular cylinder roller 40 provided on a base end side by a structure integral with the taper roller 38. The taper roller 38 is a frustum of a circular cone in a converging shape inclined by 45° in a side view thereof, and an edge line length L1 (refer to FIG. 6) is set to be slightly longer than a height H (refer to FIG. 6) of the flange 17. The circular cylinder roller 40 is constituted by a shape of a cylinder having a diameter slightly larger than a maximum diameter portion on the base end side of the taper roller 38, and a height H2 in an axial direction (refer to FIG. 6) is set to be slightly smaller than the height H of the flange 17.

Figure 6:
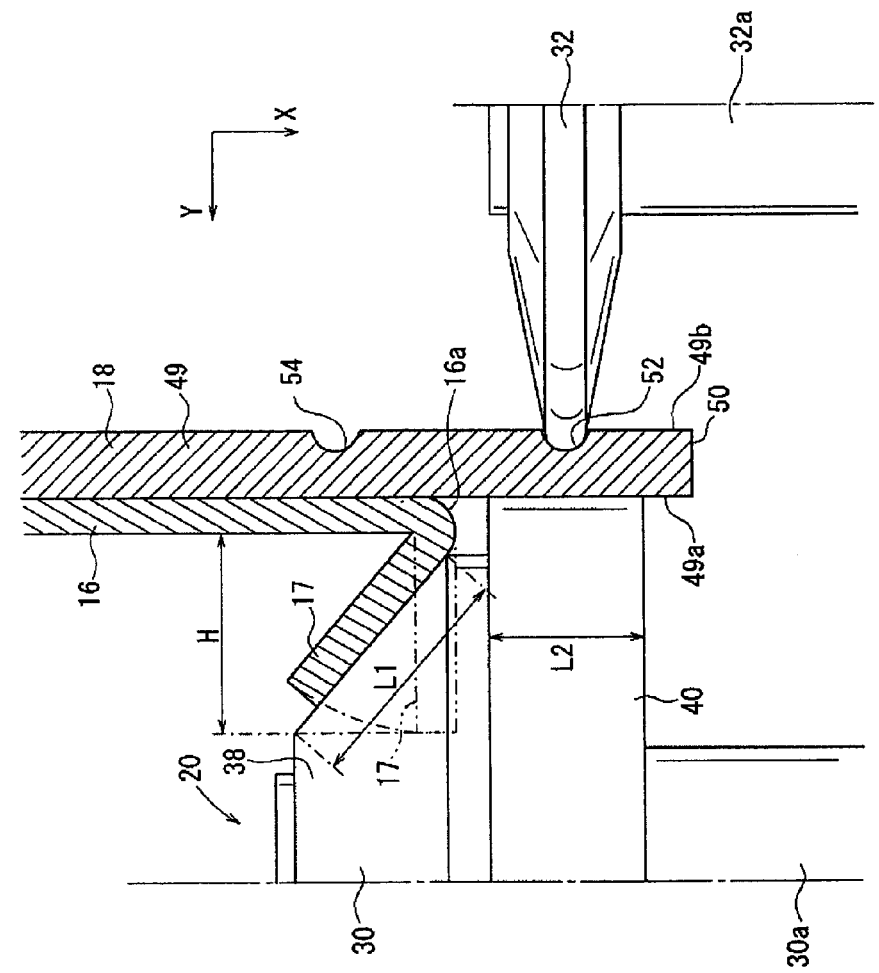
FIG. 6 is a sectional side view of a flange, a hemming unit and a moving die when the hemming unit is disposed at an end portion of the flange at a first hemming step.

The guide roller 32 is constituted by a shape of a circular disk a surrounding of which is set to a narrow width, and is engageable with a first groove (guide portion) 52 or a second groove (guide portion) 54 (refer to FIG. 6).

Figure 3:
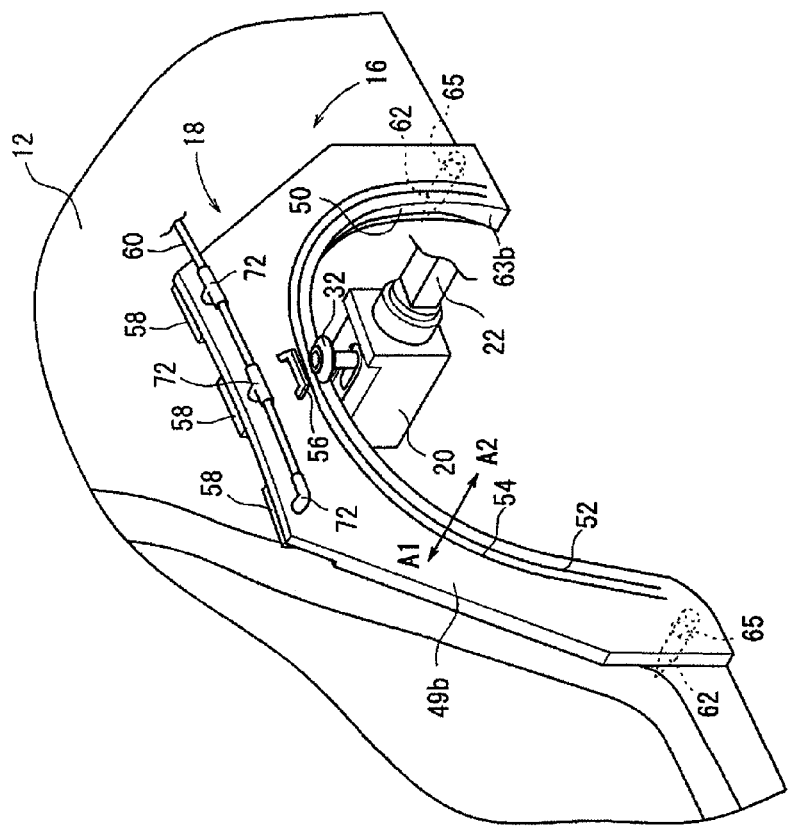
FIG. 3 is a perspective view of a moving die fixed to a wheel arch portion.
Figure 4:
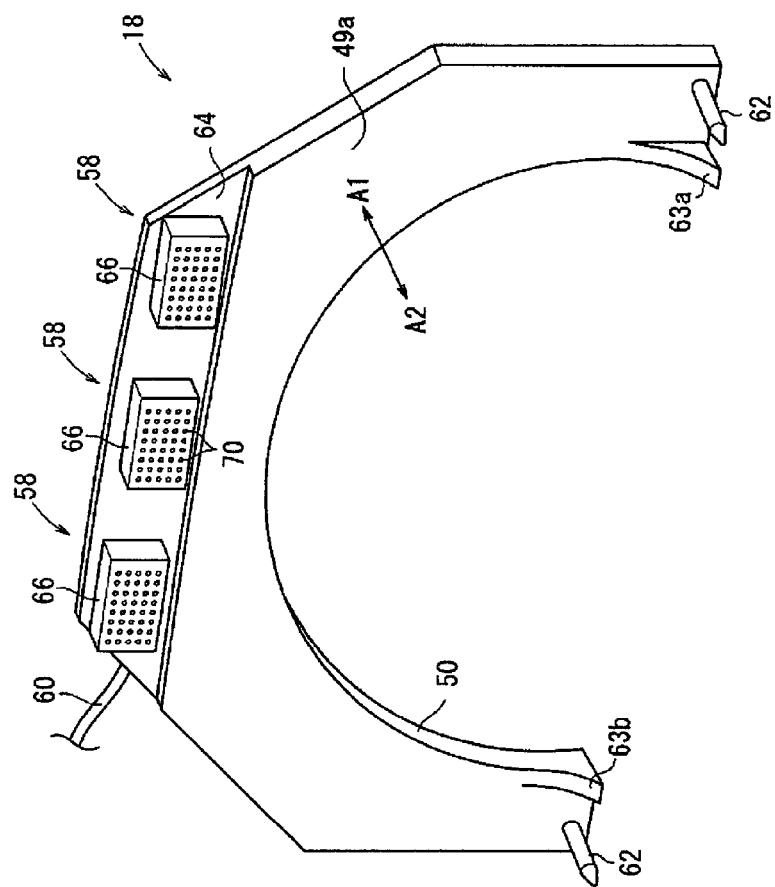
FIG. 4 is a perspective view of the moving die viewed from a surface side.

As shown by FIG. 3 and FIG. 4, the moving die 18 is constituted by constituting a base thereof by a die plate 49.

The die plate 49 is constituted by a shape of a plate and a side thereof brought into contact with the wheel arch portion 16 is referred to as a surface 49a and a face on a side opposed thereto is referred to as a back face 49b to be differentiated from each other. Further, a work side in view from the end portion 16a of the wheel arch portion 16 is referred to as an inner side (arrow mark A1 side) and a side opposed thereto is referred to as an outer side (arrow mark A2) to be differentiated from each other.

The die plate 49 is constituted by a shape of a plate in an arch shape and the surface 49a of which is brought into contact with a surrounding of the wheel arch portion 16, and the surface 49a is set to a three-dimensional curved face in conformity with a shape of a surface of the vehicle 12. Therefore, when the moving die 18 is attached to the wheel arch portion 16, the first groove 52 and the second groove 54 and the flange 17 are arranged in parallel with each other, and the surface 49a is brought into face contact with the vehicle 12 by a wide area.

The moving die 18 includes an outer side circular arc portion 50 formed along a slightly outer side of an end portion 16a of the wheel arch portion 16, the first groove 52 and the second groove 54 provided in parallel with each other along the outer side circular arc portion 50 at the back face 49b, a knob 56 provided at the back face 49b, three adsorbing mechanisms (mounting means) 58 provided to align at an upper portion thereof, and a pipe 60 for sucking air by way of the adsorbing mechanism 58. The first groove 52 is provided on an outer side projected from the end portion 16a of the flange 17 on the die plate 49, and the second groove 54 is provided on an inner side of the end portion 16a. Further, the moving die 18 includes 2 pieces of positioning pins 62 respectively projected from both ends of a lower portion of the surface 49a.

Further, means for mounting the moving die 18 to the wheel arch portion 16 is not limited to the adsorbing mechanism 58 but a clamp mechanism or the like for grabbing a predetermined portion of the vehicle 12 by a lever or the like, or both of the clamp mechanism or the like and the adsorbing mechanism 58 may be used.

The positioning pin 62 is set to a diameter capable of being inserted into a positioning hole 65 (refer to FIG. 1) of the vehicle 12, and a front end thereof is contracted in a diameter direction in a taper shape to facilitate insertion.

Further, the moving die 18 is supported and fixed mainly by the adsorbing mechanism 58, and therefore, the positioning pin 62 does not need a strength for supporting a self weight of the moving die 18 and is sufficiently constituted by a slender diameter.

Figure 5:
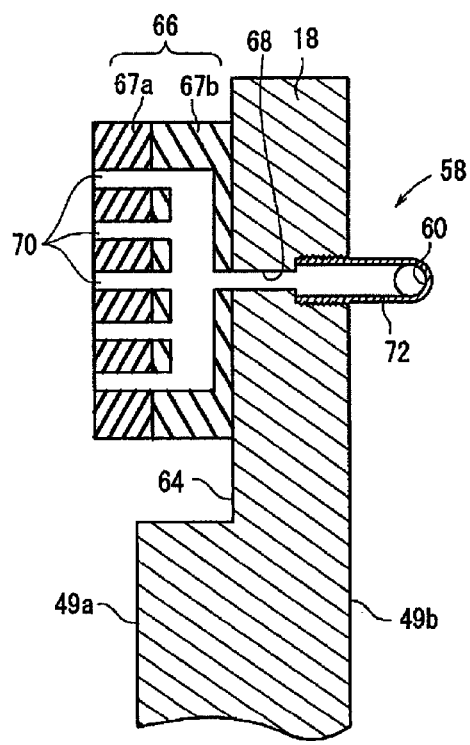
FIG. 5 is a sectional side view of an adsorbing mechanism.

As shown by FIG. 5, the adsorbing mechanism 58 is provided at a lower stage portion 64 constituted by slightly machining the surface 49a, and includes a gripper 66 having an area suitable for adsorption and a sucking port 68 communicated with the gripper 66. The gripper 66 is constituted by a two-layers structure of an adsorbing portion 67a of an elastic member (for example, rubber, sponge or the like) and a base portion 67b harder than the adsorbing portion 67a, and the base portion 67b is fixed to the lower stage portion 64. The gripper 66 is slightly projected from the surface 49a.

The gripper 66 is provided with a number of horizontal holes 70 at a surface thereof. The horizontal holes 70 are gathered to the base portion 67b and are communicated with the sucking port 68. The sucking port 68 is connected to the pipe 60 by a joint 72.

According to the sucking mechanism 58, a sucking operation is achieved by sucking air from the respective horizontal holes 70 by sucking air from the pipe 60, the gripper 66 can be adsorbed to a surface of the wheel arch portion 16, and the moving die 18 is fixed. At this occasion, the adsorbing portion 67a of the gripper 66 is adsorbed by being slightly compressed elastically. Air may be sucked from the pipe 60 by using an ejector or a vacuum pump or the like.

The moving die 18 is brought into contact with only the surrounding of the wheel arch portion 16, and therefore, the moving die 18 is small-sized. Further, the moving die 18 is brought into contact with the vehicle 12 from the side face, and therefore, the moving die 18 is not applied with a weight of the vehicle 12, and is not constituted by a load resistant structure, and therefore, the moving die 18 is set to be lightweighted. Therefore, the moving die 18 is made to be movable simply and conveniently by the robot 22 by grabbing the knob 56 by the chuck 34 and can be adsorbed by the adsorbing mechanism 58.

When the moving die 18 is fixed to the wheel arch portion 16 by the adsorbing mechanism 58 in a state of being positioned by the positioning pin 62, as shown by FIG. 6, the outer side circular arc portion 50 is arranged on an outer side (lower side of FIG. 6) of the end portion 16a of the wheel arch portion 16. The first groove 52 is arranged slightly on an outer side of the end portion 16a and the second groove 54 is arranged on the inner side of the end portion 16a. The first groove 52 and the second groove 54 are arranged in parallel with each other along the end portion 16a at positions substantially symmetrical with each other by constituting a reference by the end portion 16a.

Figure 7:
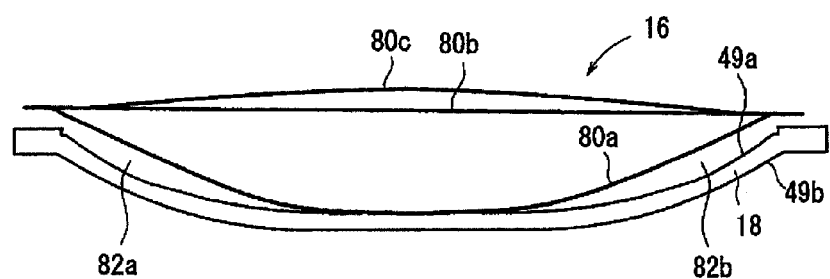
FIG. 7 is a schematic plane view showing a state of bringing about a clearance by bringing a moving die into contact with a wheel arch portion having a distortion.

As shown by FIG. 7, the wheel arch portion 16 is constituted by a box structure welding 3 sheets of plate members of an outer plate 80a, a middle plate 80b and an inner plate 80c and is highly rigid. According to the welded structure, there is a case of producing a clearance from the surface 49a of the moving die 18 by generating a thermal strain by welding.

For example, as shown by FIG. 7, there are brought about clearances 82a and 82b between the surface 49a of the moving die 18 and the outer plate 80a of the wheel arch portion 16, center portions thereof are brought into contact with each other and intervals therebetween are respectively widened to both end portions.

Next, an explanation will be given of a working method of carrying out roll hemming working for the flange 17 of the wheel arch portion 16 by using the hemming working apparatus 10 constituted in this way in reference to FIG. 8 and FIG. 9.

Figure 8:
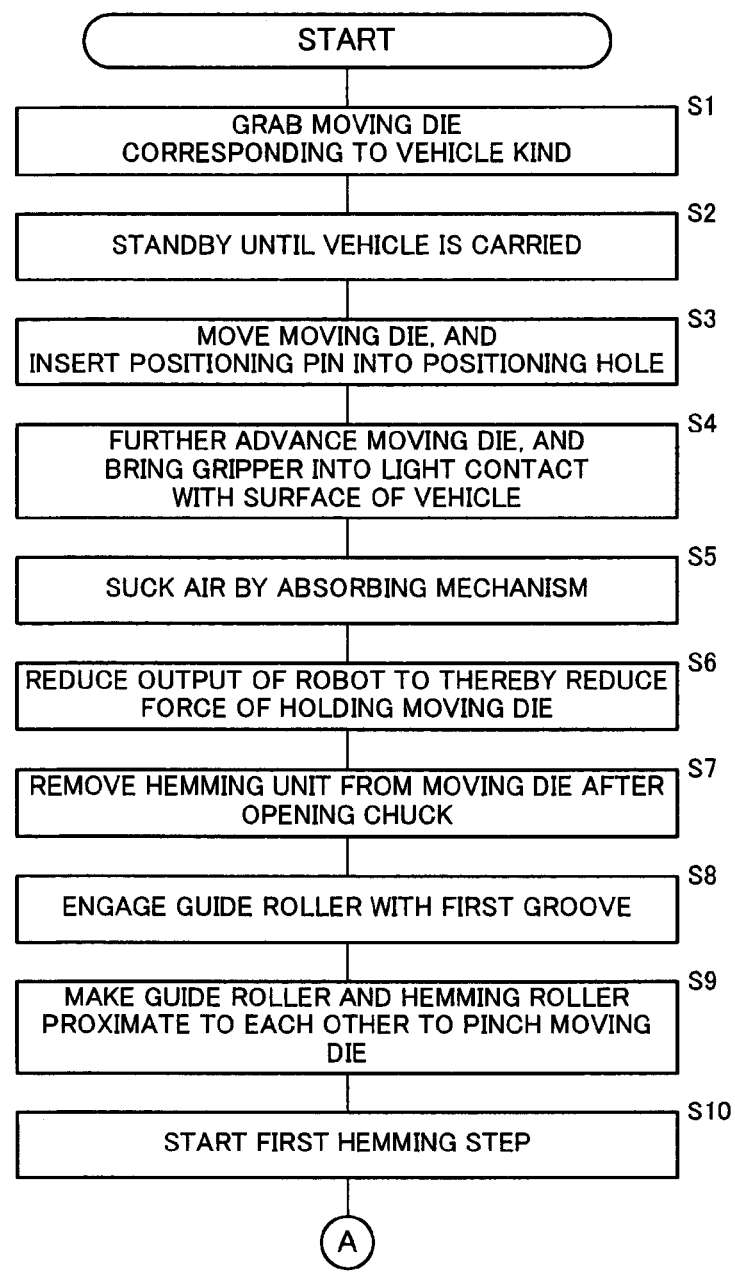
FIG. 8 is a flowchart (part 1) showing a procedure of a hemming working method by the hemming working apparatus according to the first exemplary embodiment.
Figure 9:
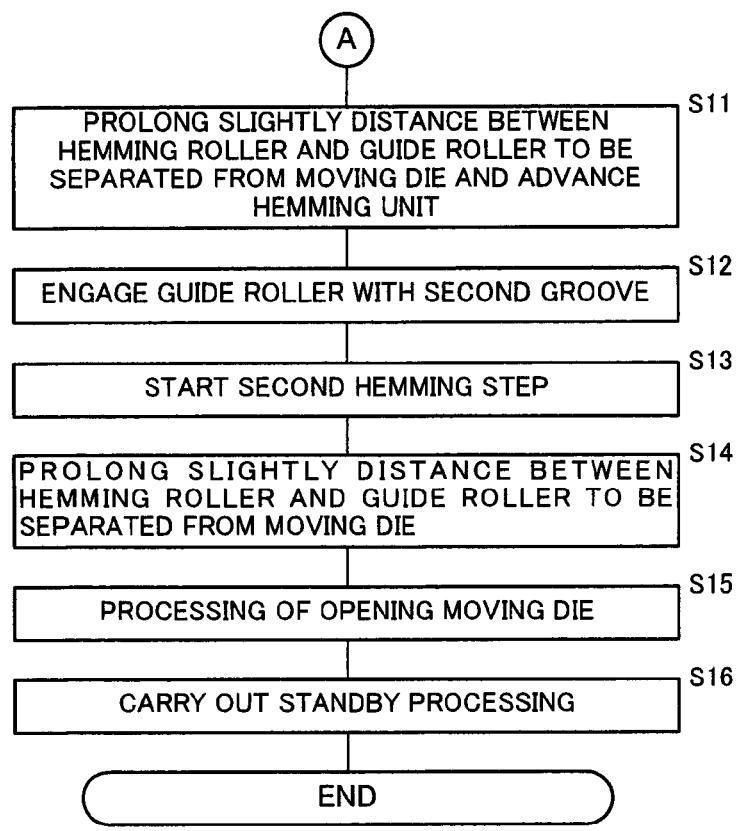
FIG. 9 is a flowchart (part 2) showing the procedure of the hemming working method by the hemming working apparatus according to the first exemplary embodiment.

Processings shown in FIG. 8 and FIG. 9 are carried out by the moving die 18, the hemming unit 20 and the robot 22 mainly under the control by the controller 24.

First, at step S1, information of the vehicle kind of the vehicle 12 successively carried from a production control computer is confirmed, thereafter, the robot 22 returns the currently grabbed moving die 18 to a rectified position of the storing base 26, and grabs other moving die 18 in correspondence with the vehicle kind by the chuck 34. When the corresponding moving die 18 has already been held, the hold and change operation is not needed, further, when a plurality of pieces of the vehicles 12 of the same vehicle kind are carried, it is not naturally necessary to hold and change the moving die 18.

At step S2, the operation is at standby until the vehicle 12 is carried by confirming the signal of the photoelectric sensor 23. The vehicle 12 is carried by the production line 14 and is stopped at a predetermined position at a vicinity of the robot 22. The operation proceeds to step S3 at a time point of confirming carrying of the vehicle 12 by the photoelectric sensor 23.

Figure 10A:
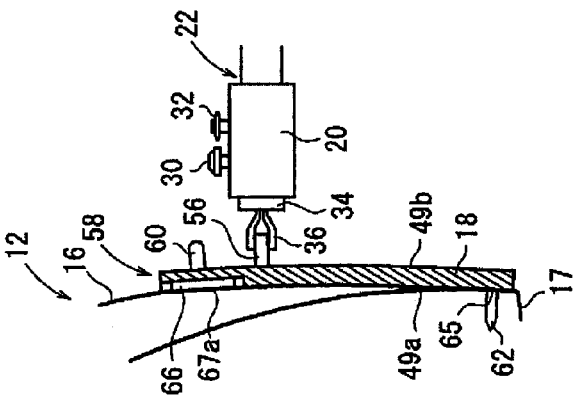
FIG. 10A is a sectional front view of a wheel arch portion showing a state of moving a moving die and inserting a positioning pin of the moving die into a positioning hole of a vehicle.

At step S3 (approaching step), as shown by FIG. 10A, positioning in vertical and horizontal directions is carried out by moving the moving die 18 by operating the robot 22 and inserting the positioning pin 62 to the positioning hole 65 of the vehicle 12. At the time point, the surface 49a of the moving die 18 and the gripper 66 are separated from the vehicle 12.

At this occasion, an output of the robot 22 is brought into an unrestricted high output state, and therefore, the moving die 18 can be carried at high speed to shorten cycle time.

Figure 10B:
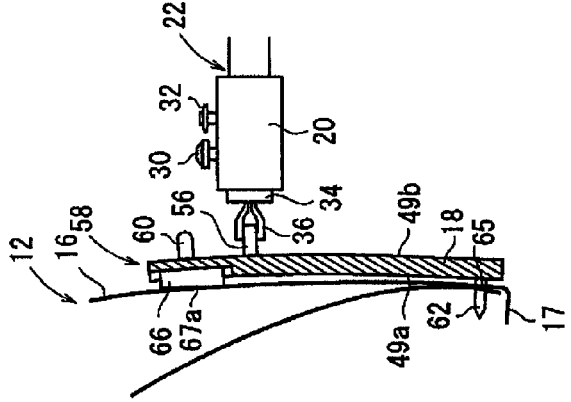
FIG. 10B is a sectional front view of the wheel arch portion showing a state of further advancing the moving die to be brought into light contact with a surface of the wheel arch portion.

At step S4, as shown by FIG. 10B, the moving die 18 is further made to advance and the gripper 66 is brought into light contact with the surface of the vehicle 12 by operating the robot 22. At the time point, the surface 49a of the moving die 18 is slightly separated from the vehicle 12.

At step S5, air is sucked from the pipe 60 and an operation of sucking air by the adsorbing mechanism 58 is started.

At the time point, the force of the robot 22 for maintaining the attitude is maintained to be sufficiently larger than an adsorbing force of the adsorbing mechanism 58 and the moving die 18 is not displaced.

At step S6 (mounting step), rigidities of the respective joints of the robot 22 are reduced by reducing the output of the robot 22 under the operation of the holding force adjusting portion 25 to thereby reduce the force for maintaining the attitude. Thereby, the moving die 18 is brought into an elastically displaceable state (so-to-speak floating state). Thereby, the adsorbing force of the adsorbing mechanism 58 of the robot 22 exceeds the force of maintaining the attitude of the robot 22 and the moving die 18 is displaced to the vehicle 12. That is, by bringing about the floating state by reducing the output of the robot 22, the force of the robot 22 for maintaining the attitude is reduced, and therefore, even when the adsorbing force of the adsorbing mechanism 58 is reduced, the moving die 18 can be adsorbed to the vehicle 12.

Figure 10C:
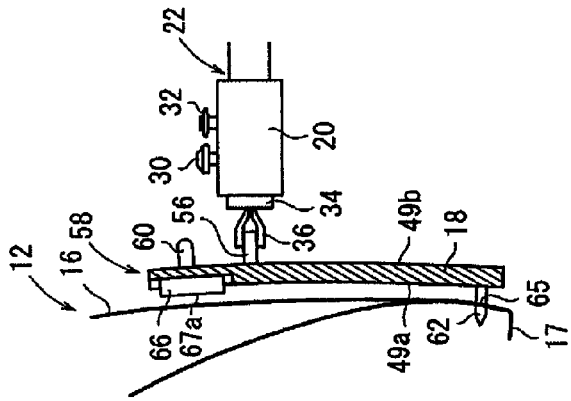
FIG. 10C is a sectional front view of the wheel arch portion showing a state of bringing a surface of the moving die into contact with the surface of the wheel arch portion while elastically compressing an adsorbing portion of a gripper.

As a result, as shown by FIG. 10C, the moving die 18 is displaced to the front side while elastically compressing the adsorbing portion 67a to bring the surface 49a into contact with the vehicle 12.

At this occasion, the robot 22 is brought into a floating state, and therefore, the respective joints are pertinently deformed, and the moving die 18 is brought into contact with the vehicle 12 while being displaced to constitute a pertinent attitude of aligning the surface shape to the vehicle 12. Therefore, the moving die 18 does not press the vehicle 12 excessively in a state of not being aligned to the vehicle 12 and the vehicle 12 can be prevented from being deformed.

Further, the moving die 18 is attached to be accurately positioned to fix to the wheel arch portion 16.

Further, the robot 22 supports the self weight of the moving die 18 and the robot 22 per se in the vertical direction even in the floating state, and therefore, the adsorbing mechanism 58 does not need to support the weight but may generate only the force of being adsorbed to the vehicle 12. Therefore, the adsorbing force of the adsorbing mechanism 58 is sufficiently constituted by a lower output. In this way, the low output is set to the adsorbing mechanism 58, and therefore, the vehicle 12 is not pressed excessively and the vehicle 12 can be prevented from being deformed.

The adsorbing portion 67a for fixing the moving die 18 to the vehicle 12 is constituted by the elastic member, and therefore, the adsorbing portion 67a can firmly be fixed to the surface of the vehicle 12 by being brought into close contact therewith out leaking air, a stress is not locally concentrated and the vehicle 12 can further be prevented from being deformed.

At step S7, the fingers 36 of the chuck 34 are opened, thereafter, the robot 22 and the hemming unit 20 are detached from the moving die 18. At this occasion, the moving die 18 is fixed to the vehicle 12 by the adsorbing mechanism 58 integrally provided to the moving die 18, and therefore, even when the chuck 34 is disengaged therefrom, the moving die 18 is not dropped, or a position of which is not shifted.

At step S8, a direction of the hemming unit 20 is changed, thereafter, the hemming unit 20 is made to be proximate to the outer side circular arc portion 50 of the moving die 18 and the guide roller 32 is engaged with the first groove 52.

At step S9, the guide roller 32 and the hemming roller 30 are made to be proximate to each other, and as shown by FIG. 6, the moving die 18 is pinched by the guide roller 32 and the circular cylinder roller 40. At this occasion, the flange 17 is pressed by the taper roller 38 and is bent to be inclined by 45° along the cone face.

At step S10, as shown by FIG. 11, there is continuously carried out a first hemming step of bending the flange 17 to incline by 45° in an inner side direction by rolling the guide roller 32 while being engaged with the first groove 52. That is, there is carried out the first hemming step of rolling the hemming roller 30 and the guide roller 32 while being rotated in directions reverse to each other and continuously bending the flange 17 by the circular cone face of the taper roller 38. Hemming working by the first hemming step is carried out over an entire length of the flange 17.

Figure 12:
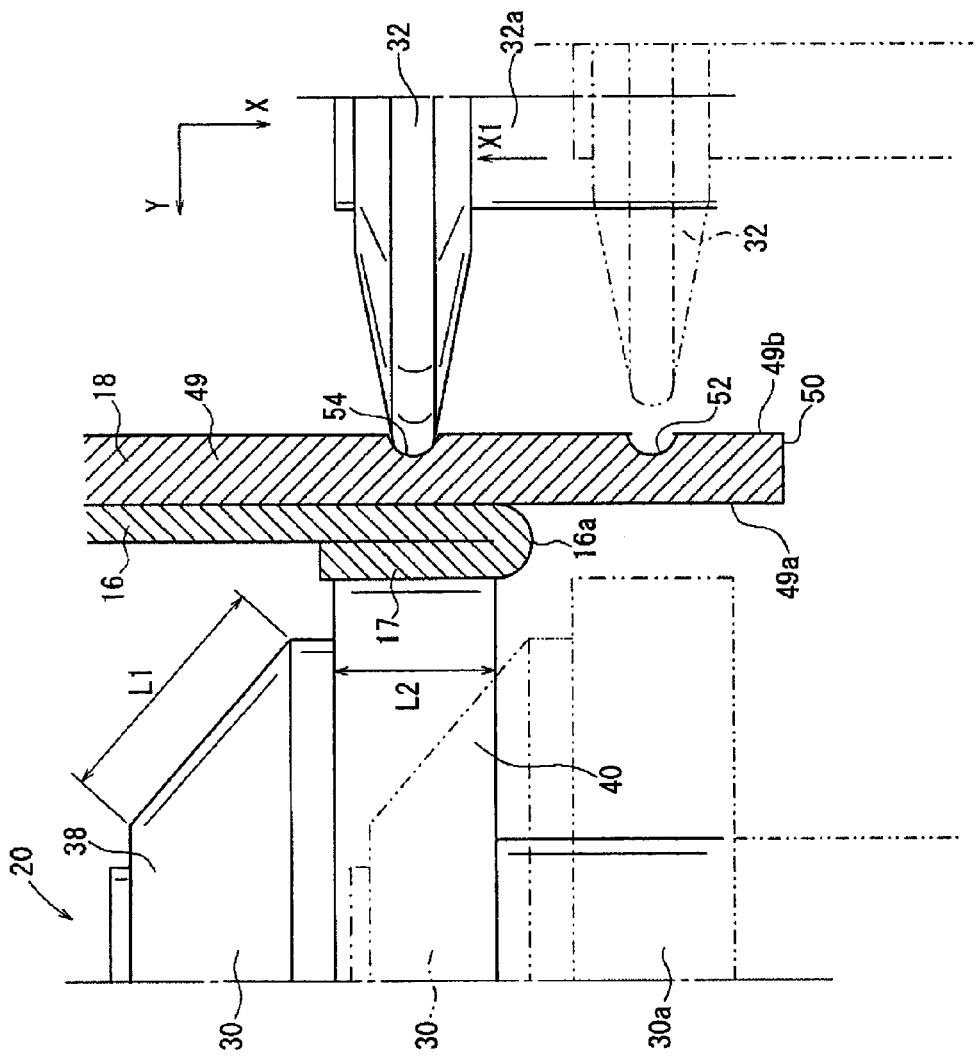
FIG. 12 is a sectional view showing positions of the hemming roller, the guide roller, the flange and the moving die at a second hemming step.

At step S11, as indicated by a two-dotted chain line portion of FIG. 12, the hemming roller 30 and the guide roller 32 are made to advance in an arrow mark X1 direction by slightly prolonging a distance between the hemming roller 30 and the guide roller 32 to be separated from the moving die 18 and advancing the hemming unit 20. The advancing distance is a distance equal to a distance between the first groove 52 and the second groove 54.

At step S12, the guide roller 32 is engaged with the second groove 54. Further, the guide roller 32 and the hemming roller 30 are made to be proximate to each other, as shown by FIG. 12, the moving die 18 is pinched to press by the guide roller 32 and the cylinder roller 40. The flange 17 is pressed by the circular cylinder roller 40 to be bent to be brought into contact with the back face of the wheel arch portion 16. That is, the flange 17 is bent by 45° further from the first hemming step and by 90° from an initial angle.

Figure 13:
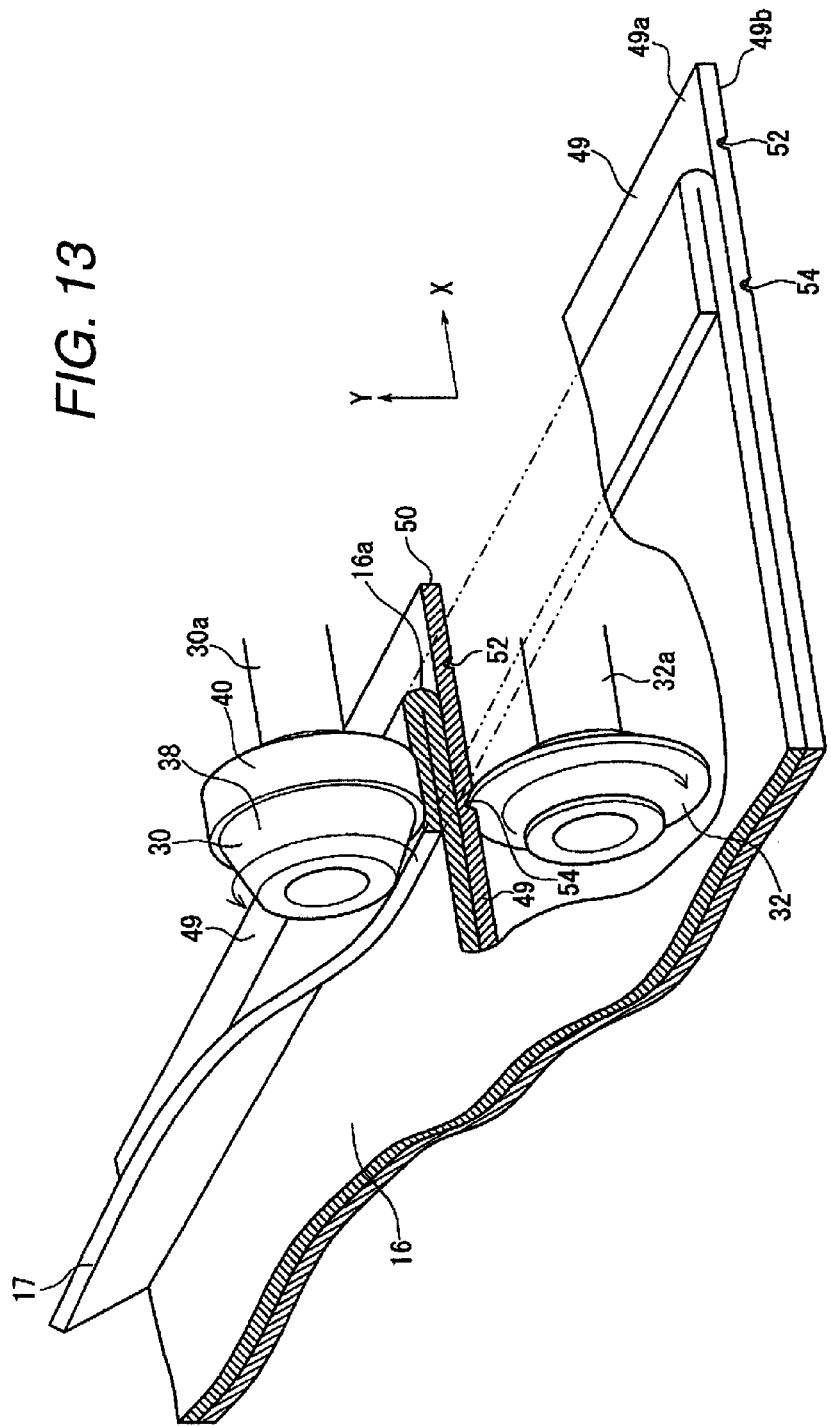
FIG. 13 is a partially sectional perspective view of the wheel arch portion of the vehicle, the hemming roller and the guide roller in carrying out the second hemming step.

At step S13, as shown by FIG. 13, there is continuously carried out a second hemming step of folding to bend the flange 17 until being brought into contact with the back face of the wheel arch portion 16 by rolling the guide roller 32 while engaging the guide roller 32 with the second groove 54. That is, the second hemming step is carried out by continuously bending the flange 17 by the outer peripheral circular cylinder face of the circular cylinder roller 40 by rolling the hemming roller 30 and the guide roller 32 while rotating the hemming roller 30 and the guide roller 32 in directions reverse to each other.

Also with regard to the second hemming step, similar to the first hemming step, the guide roller 32 is moved on an accurate path along the second groove 54 by the floating structure of the hemming roller 30 and the guide roller 32 and working is carried out over the entire length of the flange 17.

At step S14, the distance between the hemming roller 30 and the guide roller 32 is slightly prolonged to be separated from the moving die 18. Further, the hemming unit 20 is temporarily separated from the moving die 18.

At step S15, a processing of opening the moving die 18 is carried out. That is, after changing the direction of the hemming unit 20, the hemming unit 20 is made to be proximate to the back face 49b to grab the knob 56 by the chuck 34, further, sucking by the pipe 60 is finished.

At step S16, a standby processing is carried out.

That is, the robot 22 is moved to a predetermined standby position to separate the moving die 18 from the vehicle 12.

The controller 24 informs that the hemming working has been finished normally to the production control computer. The informed production control computer confirms that a condition is established with regard to other predetermined requirement and drives the production line 14 to carry the vehicle 12 finished with the hemming working to a next step.

In this way, according to the hemming working method and the hemming working apparatus 10 according to the first exemplary embodiment, the moving die 18 is made to be elastically deformable by bringing the robot 22 into the floating state, and the moving die 18 is brought into contact with the vehicle 12 by the adsorbing mechanism 58. At this occasion, the rigidities of the respective joints of the robot 22 are reduced, and therefore, the respective joints are pertinently deformed, and the moving die 18 is brought into contact with the work while being displaced to constitute the pertinent attitude of aligning the surface shape thereto. Therefore, the moving die 18 does not excessively press the vehicle 12 in the state of not being aligned thereto and the vehicle 12 can be prevented from being deformed.

Further, by dividedly providing the robot 22 as the carrying means and the adsorbing mechanism 58 as the mounting means, the floating step can be constituted by high speed by setting the robot 22 to the large output, and the work can be prevented from being deformed in the contact step by setting the adsorbing mechanism 58 to the relatively low output.

The moving die 18 is constituted by the weight to a degree of capable of being carried by the robot 22 and is generally applicable to other than the vehicle 12 regardless of the size of the work. Further, the moving die 18 is applicable also on the production line 14, and therefore, it is not necessary to provide a space exclusive for the hemming working separately from the production line 14.

Although according to the above-described example, one piece of the robot 22 is made to serve the means for carrying the moving die 18 and the means for moving the hemming unit 20, a function as the carrying means of the moving die 18 and a function as the moving means of the hemming unit 20 may respectively distributed to individual robots. Further, a system of folding to bend the flange 17 is not limited to a system of folding to bend the flange 17 to an inner side but the flange 17 may be folded to bend to pinch a predetermined inner panel or the like.

Figure 14:
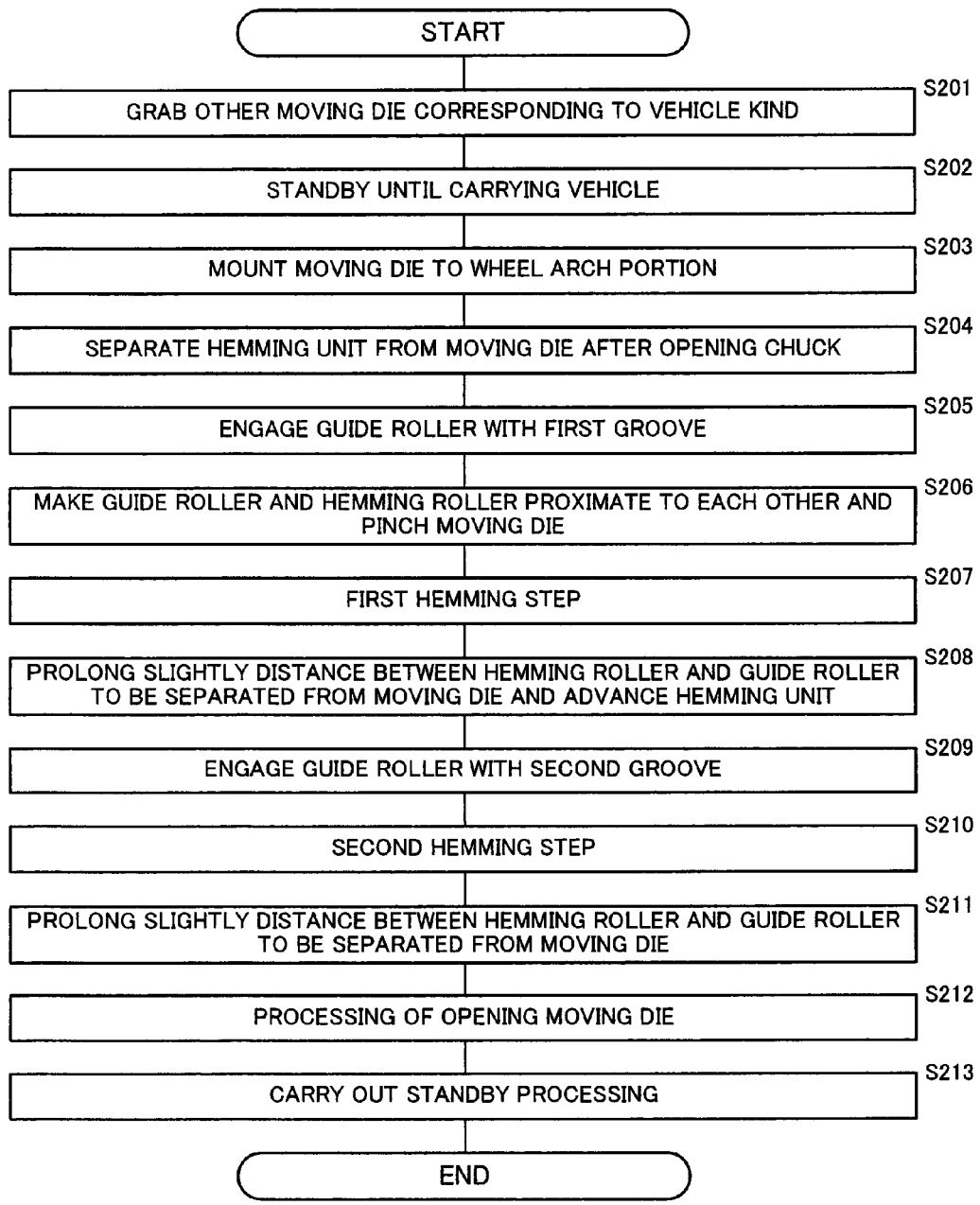
FIG. 14 is a flowchart showing a procedure of a hemming working method by a hemming working apparatus according to a modified example of the first exemplary embodiment.

Next, an explanation will be given of a modified example of the hemming working method according to the first exemplary embodiment in reference to FIG. 14. Processings shown in FIG. 14 are carried out by the moving die 18, the hemming unit 20 and the robot 22 mainly under the control by the controller 24. In the following explanation, three of the grippers 66 are differentiated to describe as the grippers 66a, 66b and 66c as necessary (refer to FIG. 15).

First, at step S201, the information of the vehicle kind of the vehicle 12 successively carried from the production control computer is confirmed, thereafter, the robot 22 returns the currently grabbed moving die 18 to a rectified position of the moving base 26 and grabs the other moving die 18 in correspondence with the vehicle kind by the chuck 34. When the corresponding moving die 18 has been held, the hold and change operation is not needed, further, when a plurality of pieces of the vehicles 12 of the same vehicle kind are continuously carried, it is not naturally necessary to hold and change the moving die 18.

At step S202, the operation is at standby until the vehicle 12 is carried by confirming the signal of the photoelectric sensor 23. The vehicle 12 is carried by the production line 14 and is stopped at a predetermined position at a vicinity of the robot 22. The operation proceeds to step S203 and the time point of confirming carrying of the vehicle 12 by the photoelectric sensor 23.

At step S203, the moving die 18 is mounted to the wheel arch portion 16. That is, the moving die 18 is moved by operating the robot 22, and positioned in the vertical and horizontal directions by inserting the positioning pin 62 into the positioning hole 65 of the vehicle 12, thereafter, the moving die 18 is further advanced and the gripper 66 is brought into light contact with the surface of the vehicle 12.

Further, the robot 22 reduces the force of holding the moving die 18 to make the moving die 18 elastically displaceable relative to the vehicle 12, thereafter, air is sucked from the pipe 60 to bring the surface 49a of the moving die 18 into contact with the vehicle 12 by the adsorbing mechanism 58. Thereby, the moving die 18 is attached to the wheel arch portion 16 and accurately positioned to fix.

Figure 15:
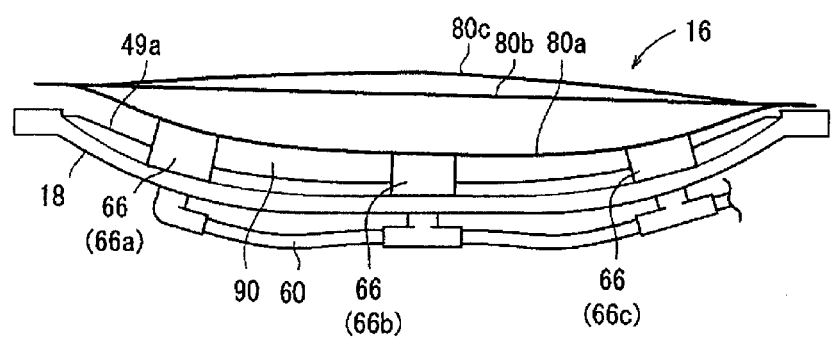
FIG. 15 is a schematic plane view showing a state of attaching a moving die to a wheel arch portion by an adsorbing mechanism.

At this occasion, as shown by FIG. 15, although the gripper 66 is compressed and the outer plate 80a is made to be proximate to the surface 49a of the moving die 18, a more or less clearance 90 is formed over an entire face.

At step S204, after opening the fingers 36 of the chuck 34, the robot 22 and the hemming unit 20 are detached from the moving die 18. At this occasion, the moving die 18 is fixed to the vehicle 12 by the adsorbing mechanism 58 integrally provided to the moving die 18, and therefore, even when the chuck 34 is disengaged, the moving die 18 is not dropped, or a position thereof is not shifted.

At step S205, a direction of the hemming unit 20 is changed, thereafter, the hemming unit 20 is made to be proximate to the outer side circular arc portion 50 of the moving die 18, and the guide roller 32 is engaged with the one end portion 52a of the first groove 52.

At step S206, the guide roller 32 and the hemming roller 30 are made to be proximate to each other, and as shown by FIG. 6, the moving die 18 is pinched by the guide roller 32 and the circular cylinder roller 40. At this occasion, the flange 17 is bent by being inclined by 45° along the cone face by being pressed by the taper roller 38.

Figure 16:
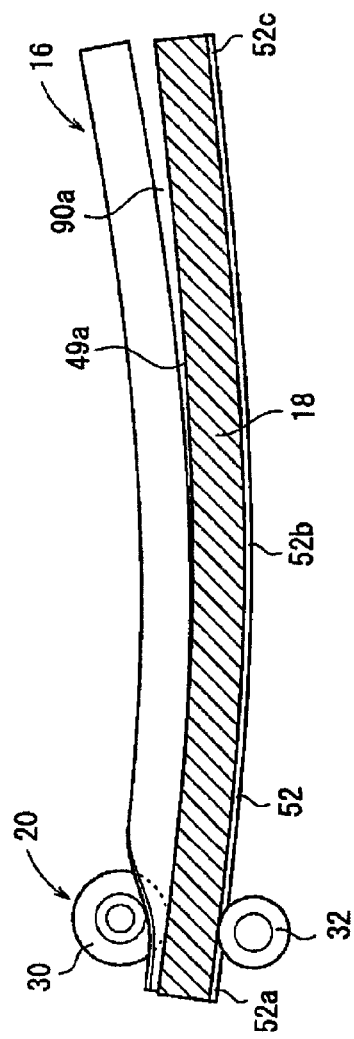
FIG. 16 is a schematic sectional view developing a state of working one end portion of a flange along a first groove.

Further, the guide roller 32 and the hemming roller 30 strongly attract each other, and therefore, as shown by FIG. 16, at the one end portion 52a of the first groove 52, the surface 49a and the outer plate 80a are brought into contact with each other without a clearance therebetween and the flange 17 is firmly folded to bend. In contrast thereto, at a center portion 52b and the other end portion 52c of the first groove 52, there is produced a clearance 94a widened in accordance with a distance from the one end portion 52a.

Figure 17:
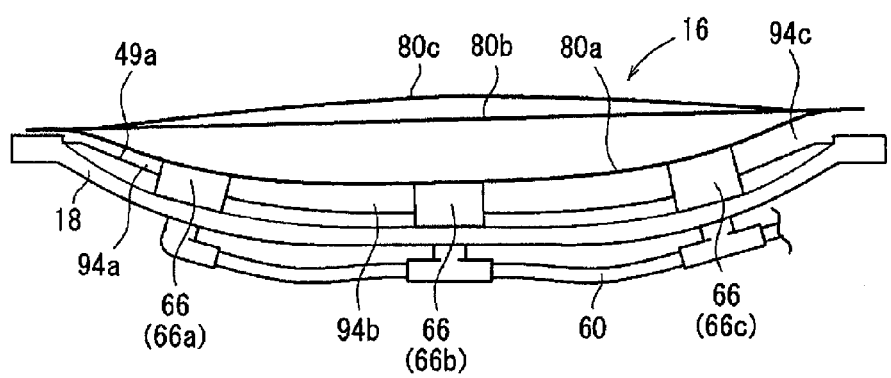
FIG. 17 is a schematic plane view showing a state of working one end portion of a flange.

At this occasion, in accordance with pinching the end portion 52a strongly by the guide roller 32 and the hemming roller 30, as shown by FIG. 17, at an upper portion of the moving die 18, the gripper 66a on a side of being proximate to the end portion 52a is considerably compressed and a clearance 94a of the portion becomes very narrow. On the other hand, clearances 94b and 94c in correspondence with the gripper 66b proximate to the center portion 52b and the gripper 66c proximate to the other end portion 52c are widened in accordance with distance from the end portion 52a.

Figure 18:
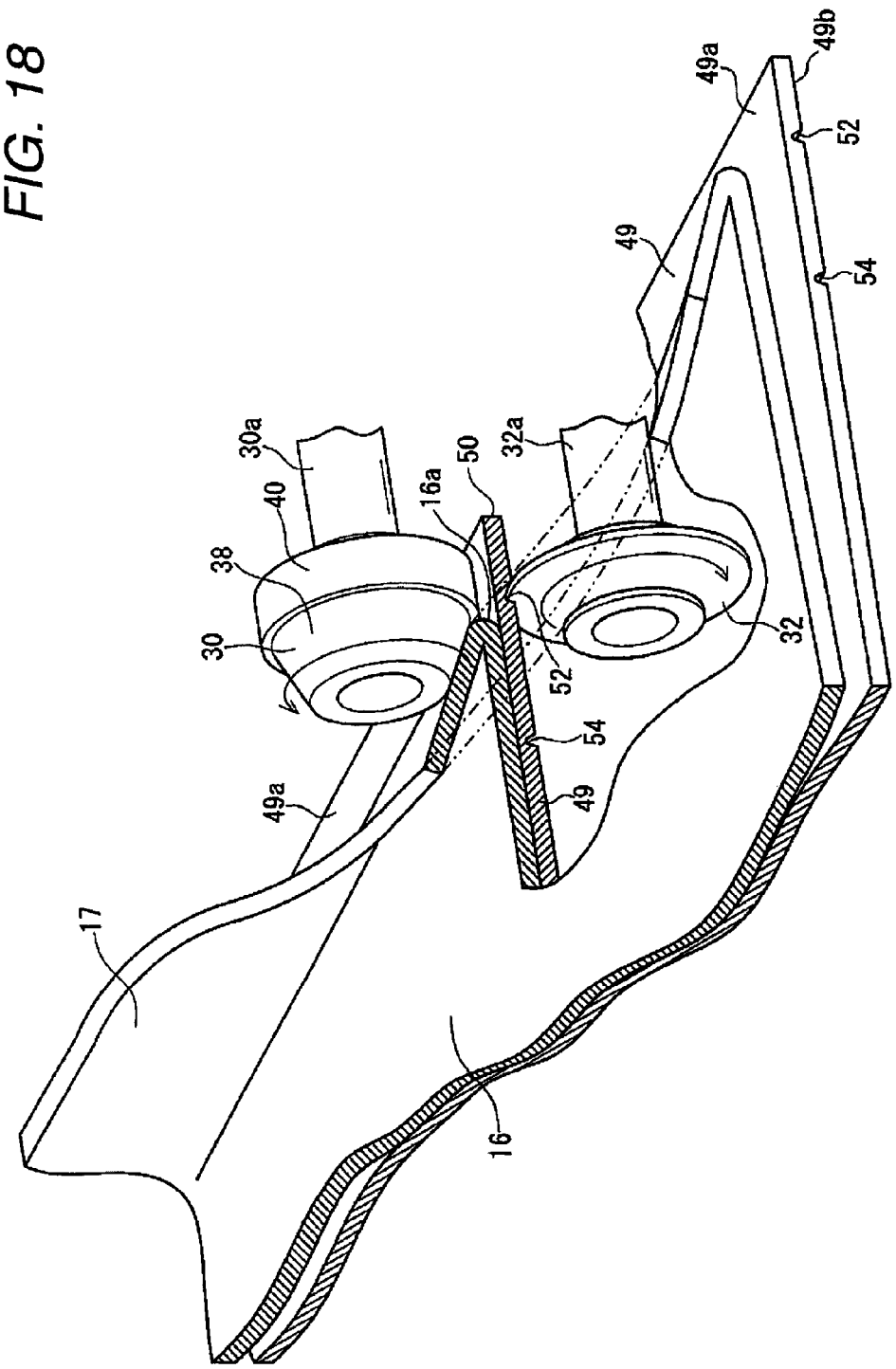
FIG. 18 is a partially sectional perspective view of the wheel arch portion of the vehicle, the hemming roller and the guide roller in carrying out the first hemming step.

At step S207, as shown by FIG. 18, there is continuously carried out the first hemming step of inclining the flange 17 by 45° in the inner side direction to bend by rolling the roller 32 while engaging the guide roller 32 with the first groove 52. That is, there is carried out the first hemming step of rolling the hemming roller 30 and the guide roller 32 while being rotated in directions reverse to each other and continuously bending the flange 17 by the conical face of the taper roller 38.

Figure 19:
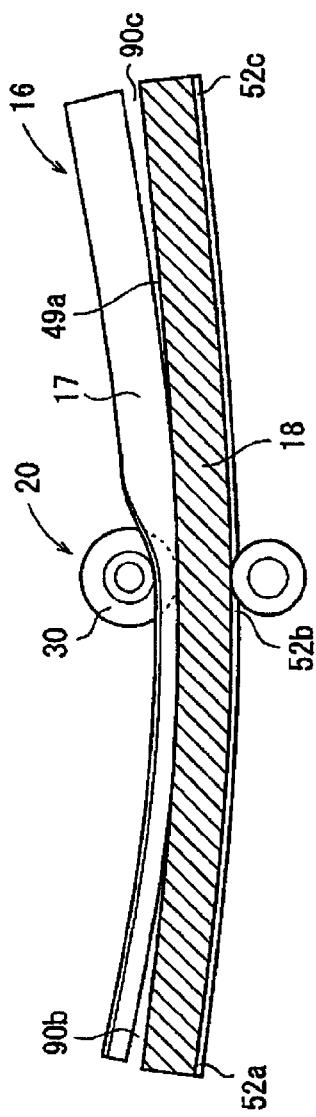
FIG. 19 is a schematic perspective view developing a state of working a center portion of a flange along a first groove.

In the midst of rolling, as shown by FIG. 19, when the guide roller 32 reaches the center portion 52b, at the center portion 52b, the surface 39a and the outer plate 80a are brought into contact with each other without a clearance therebetween by being strongly pinched by the guide roller 32 and the hemming roller 30, and the flange 17 is firmly folded to bend. In contrast thereto, at vicinities of the end portions 52a and 52c on both sides thereof, clearances 90b and 90c are produced.

Figure 20:
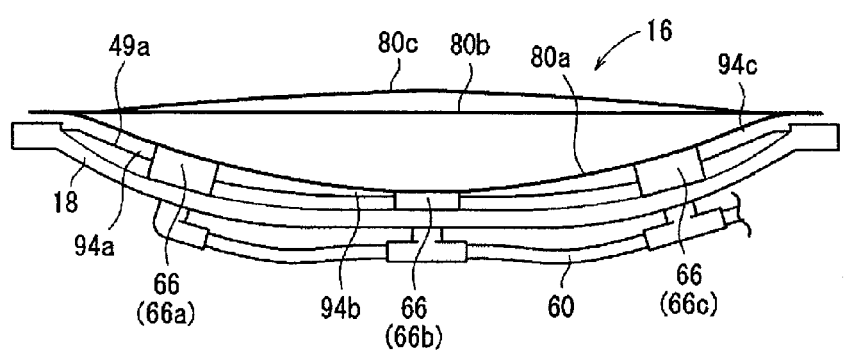
FIG. 20 is a schematic plane view showing a state of working the center portion of the flange.

Further, in accordance with strongly pinching the center portion 52b by the guide roller 32 and the hemming roller 30, as shown by FIG. 20, at the upper portion of the moving die 18, the gripper 66b at the center proximate to the center portion 52b is considerably compressed and the clearance 94b of the portion becomes very narrow. On the other hand, the clearances 94a and 94c of portions in correspondence with the grippers 66a and 66c are widened in accordance with the distance from the center portion 52b.

Figure 21:
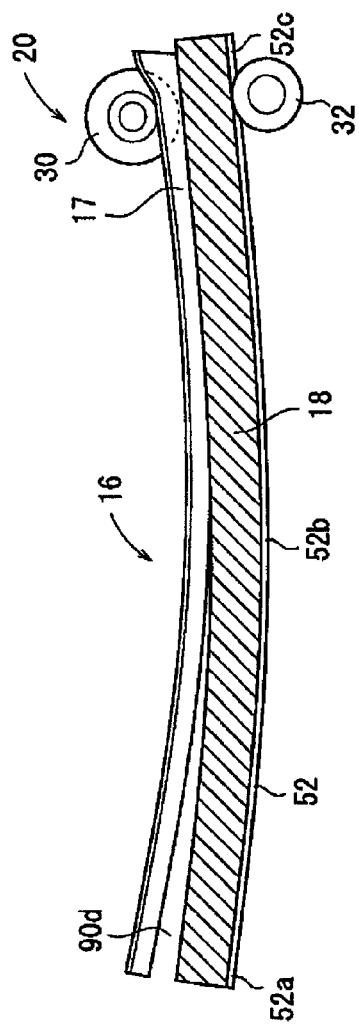
FIG. 21 is a schematic sectional view developing a state of working other end portion of the flange along the first groove.
Figure 22:
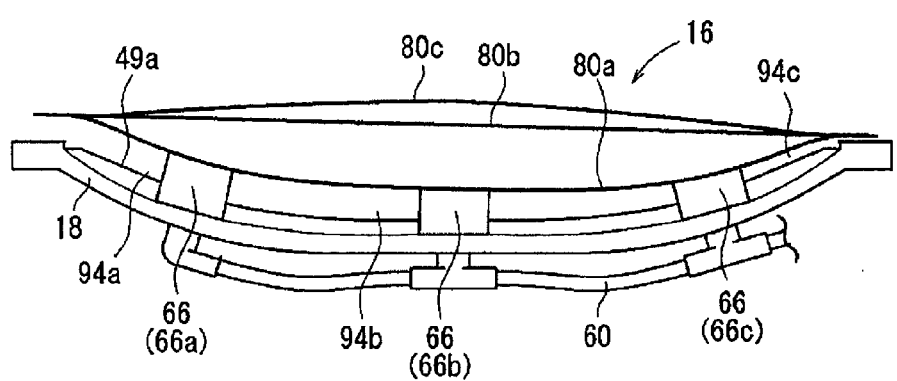
FIG. 22 is a schematic plane view showing a state of working other end portion of the flange.

Further, when the rolling is continued and as shown by FIG. 21, the guide roller 32 reaches the end portion 52c on the finish side, the end portion 52c is pinched by the guide roller 32 and the hemming roller 30, the surface 49a and the outer plate 80a are brought into contact with each other without a clearance therebetween, the flange 17 is firmly folded to bend and a clearance 90d at the end portion 52a and the center portion 52b. Further, as shown by FIG. 22, at the upper portion of the moving die 18, the gripper 66c proximate to the end portion 52c is considerably compressed and the clearance 94c of the portion becomes very narrow. In contrast thereto, the clearances 94a and 94b of the portions in correspondence with the grippers 66a and 66b are widened in accordance with the distance from the end portion 52c.

In this way, the hemming working by the first hemming step is carried out over the entire length of the flange 17.

In the first hemming working, the outer plate 80a and the surface 49a are brought into contact with each other without a clearance therebetween at a portion of being pinched by the guide roller 32 and the hemming roller 30, and therefore, the flange 17 is firmly folded to bend. Further, in such a working portion, the surface 49a is brought into contact with the outer plate 80a by being moved based on elastic deformation of the gripper 66, and therefore, an excessive outer force is not exerted to the outer plate 80a and the middle plate 80b and the inner plate 80c and a distortion or a deformation is not brought about.

Further, the portion at which the surface 49a of the moving die 18 and the outer plate 80a are brought into contact with each other is only the working portion pinched by the guide roller 32 and the hemming roller 30, and at the other portion, the surface 49a and the outer plate 80a are maintained in a separated state by achieving a cushioning operation by the gripper 66. Therefore, a scratch or the like can be prevented from being attached to the outer plate 80a.

Figure 23:
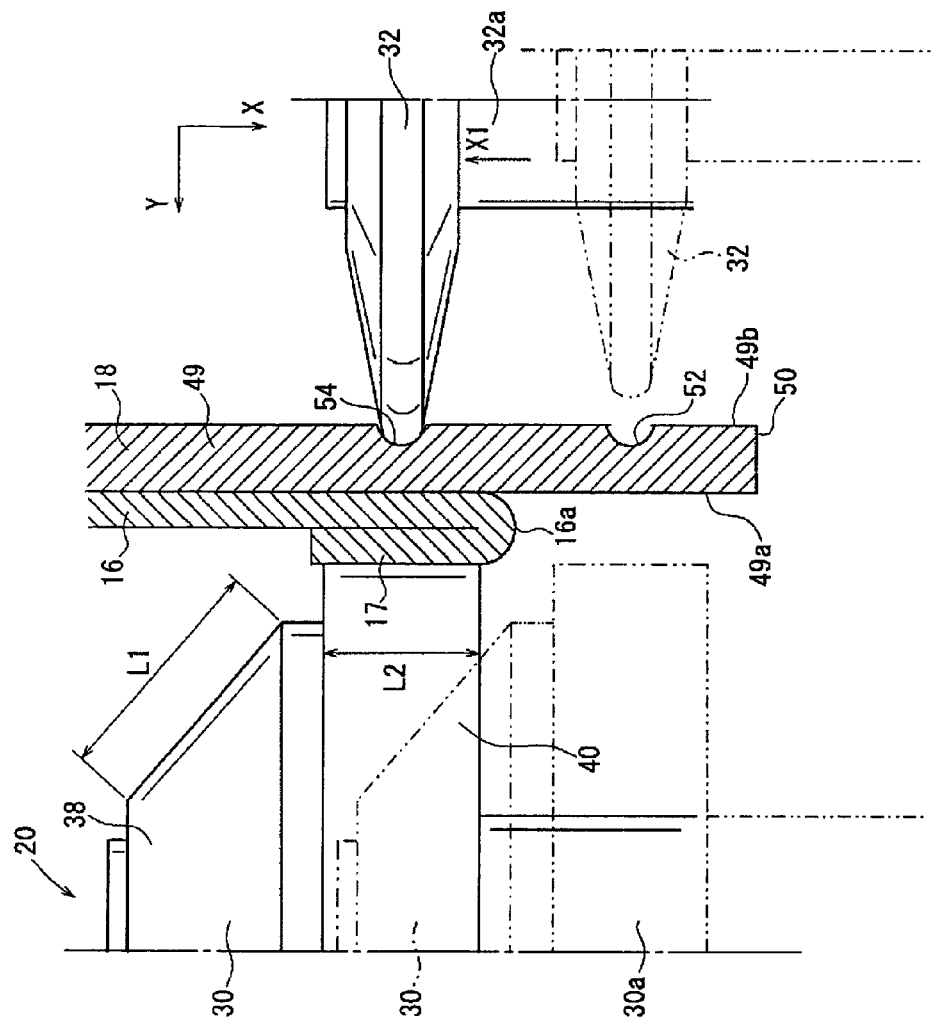
FIG. 23 is a sectional view showing positions of the hemming roller, the guide roller, the flange and the moving die at the second hemming step.

At step S208, as indicated by a two-dotted chain line portion of FIG. 23, a distance between the hemming roller 30 and the guide roller 32 are slightly prolonged to be separated from the moving die 18, further, the hemming roller 30 and the guide roller 32 are made to advance in an arrow mark X1 direction by advancing the hemming unit 20. The advancing distance is a distance equal to the distance between the first groove 52 and the second groove 54.

At step S209, the guide roller 32 is engaged with the second groove 54. Further, the guide roller 52 and the hemming roller 30 are made to be proximate to each other, as shown by FIG. 23, the moving die 18 is pinched to press by the guide roller 32 and the circular cylinder roller 40. The flange 1 is pressed by the circular cylinder roller 40 to be bent to be brought into contact with the back face of the wheel arch portion 16. That is, the flange 17 is bent further by 45° from the first hemming step and by 90° from the initial angle.

Figure 24:
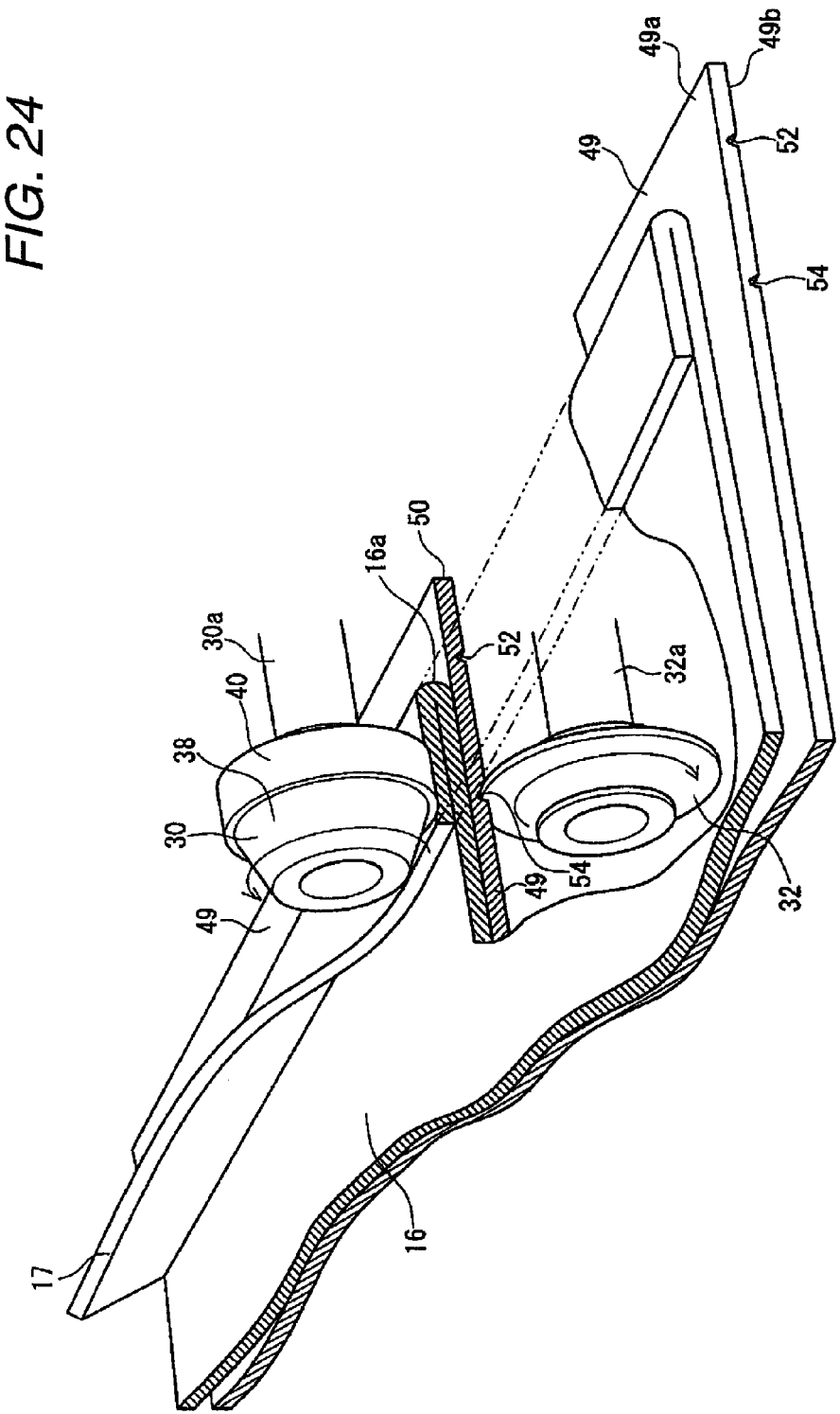
FIG. 24 is a partially sectional perspective view of the wheel arch portion of the vehicle, the hemming roller and the guide roller in carrying out the second hemming step.

At step S210, as shown by FIG. 24, there is continuously carried out the second hemming step of folding to bend the flange 17 to be brought into contact with the back face of the wheel arch portion 16 by rolling the guide roller 32 while engaging the guide roller 32 with the second groove 54. That is, the second hemming step is carried out by continuously bending the flange 17 by the outer peripheral circular cylinder face of the circular cylinder roller 40 by rolling the hemming roller 30 and the guide roller 32 while being rotated in directions reverse to each other.

Further, an effect similar to the first hemming step is achieved also with regard to the second hemming step although illustration thereof is omitted. That is, at a portion of being pinched by the guide roller 32 and the hemming roller 30, the outer plate 80 and the surface 49a are brought into contact with each other without a clearance therebetween and the flange 17 is firmly bent by 90° from the initial angle, further, the surface 49a is moved based on the elastic deformation of the gripper 66 to be brought into contact with the outer plate 80a, and therefore, a distortion or a deformation is not brought about at the outer plate 80a and the middle plate 80b and the inner plate 80c. Further, at other than the working portion, the outer plate 80a and the surface 49a are maintained in a separated state by achieving the cushioning operation by the gripper 66 and a scratch or the like can be prevented from being attached to the outer plate 80a.

At step S211, the distance between the hemming roller 30 and the guide roller 32 is slightly prolonged to be separated from the moving die 18. Further, the hemming unit 20 is temporarily separated from the moving die 18.

At step S212, a processing of opening the moving die 18 is carried out. That is, the direction of the hemming unit 20 is changed, thereafter, the hemming unit 20 is made to be proximate to the rear face 49b, the knob 56 is grabbed by the chuck 34, further, sucking of the pipe 60 is finished.

A standby processing is carried out at step S213. That is, the moving die 18 is separated from the vehicle 12 by moving the robot 22 to a predetermined standby position. The controller 24 informs that the hemming working has normally been finished to the production control computer. The informed production control computer confirms that a condition is established with regard to other predetermined requirement and drives the production line 14 to carry the vehicle 12 finished with the hemming working to a next step.

In this way, according to the hemming working apparatus 10 and the hemming working method, even in a case in which the wheel arch portion 16 constituting the work is constituted by a shape having an error relative to the moving die 18, at the working portion by the hemming roller 30 and the guide roller 32, the hemming portion can be folded to bend by the pertinent shape by bringing the surface of the wheel arch portion 16 into contact with the surface 49a of the moving die 18. Further, the gripper 66 is constituted by the elastic member, and therefore, the moving die 18 is elastically urged to the wheel arch portion 16 to be able to separate the moving die 18 from the wheel arch portion at other than the pressing portion, the clearance is not forcibly crushed, and a distortion or a deformation of the outer plate 80a, the middle plate 80b and the inner plate 80c can be prevented.

Figure 25:
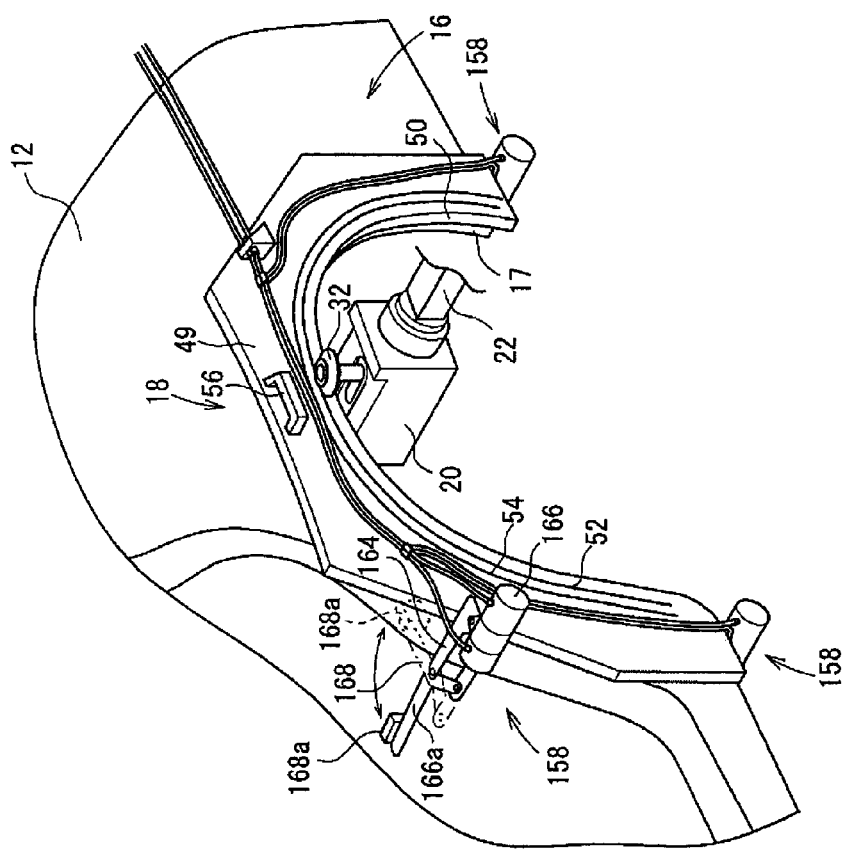
FIG. 25 is a perspective view showing a state of fixing a moving die having a clamp mechanism to a wheel arch portion.

Further, the means for elastically mounting the moving die 18 to the vehicle 12 is not limited to a case of providing the means between the moving die 18 and the vehicle 12 as in the adsorbing portion 67a but, for example, a plurality of clamp mechanisms 158 as shown by FIG. 25 may be used in accordance with a shape, a material or the like of the work.

The clamp mechanism 158 includes a stay 164 extended from an end portion of the die plate 49, a cylinder 166 pivotably provided to the stay 164, and an opening/closing lever 168 inclined centering on a support shaft provided at the stay 164. One end of the opening/closing lever 168 constitutes a grip portion 168a engaged with and held by a reference position of the vehicle 12. According to the grip portion 168a of the elastic member, similar to the adsorbing portion 67a, the moving die 18 can elastically be urged to the vehicle 12 to be able to bring the moving die 18 into contact with the wheel arch portion 16 at the working portion by the hemming roller 30 and separate the moving die 18 from the wheel arch portion 16 at other than the pressing portion. Both of the clamp mechanism 158 and the adsorbing mechanism 58 may be used.

Further, although according to the above-described example, one piece of the robot 22 is made to be serve the means for carrying the moving die 18 and the means for moving the moving unit 20, a function as the carrying means of the moving die 18 and a function as the moving means of the hemming unit 20 may respectively distributed to individual robots. Further, the system of folding to bend the flange 17 is not limited to the system of folding to bend the flange 17 simply to the inner side but the flange 17 may be folded to bend to pinch a predetermined inner panel or the like.

<Second Exemplary Embodiment>

Figure 26:
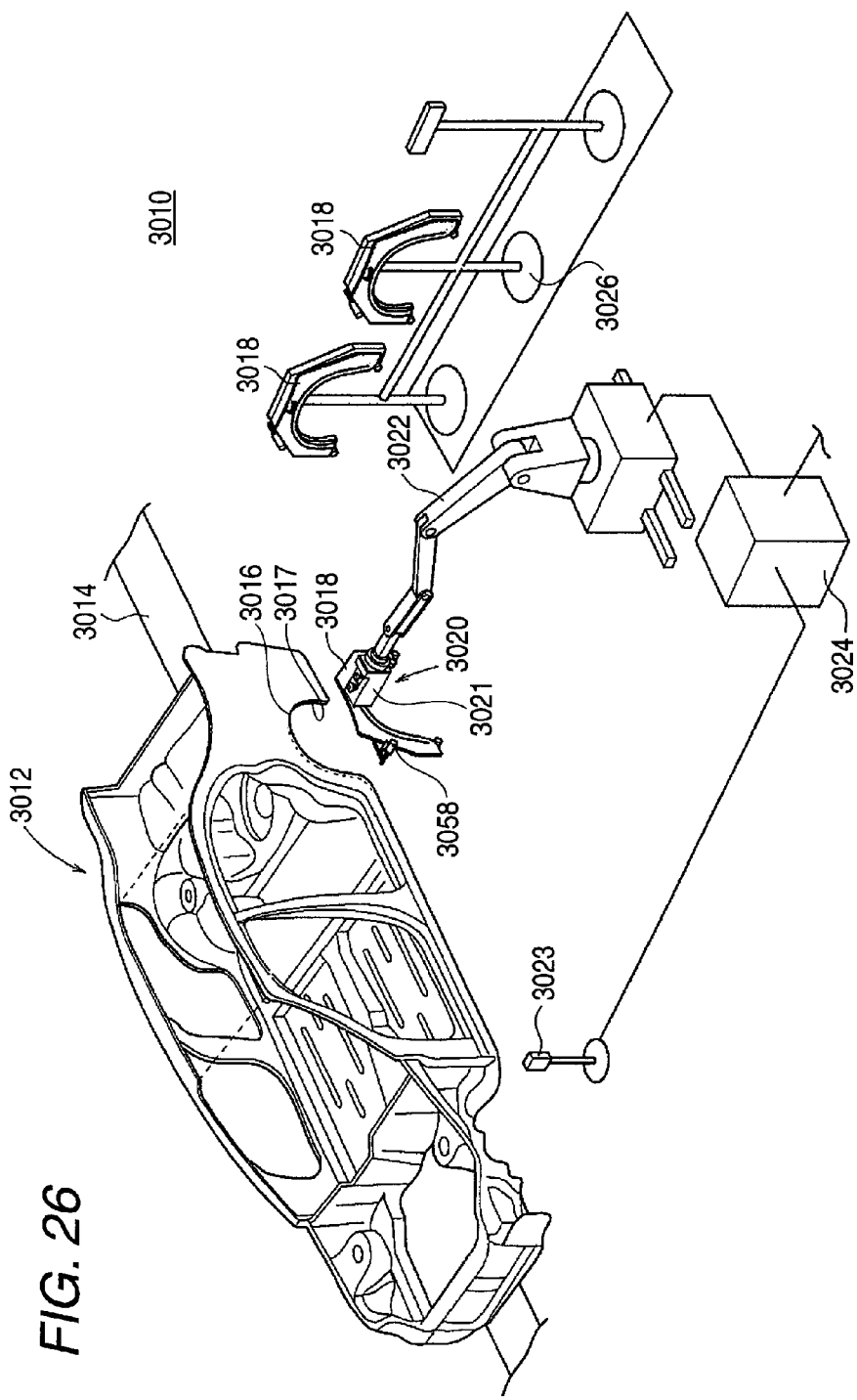
FIG. 26 is an outline perspective view for explaining a behavior of carrying out hemming working for a flange of a wheel arch portion of a vehicle by a hemming working apparatus according to a second exemplary embodiment.

FIG. 26 is an outline perspective view for explaining a behavior of carrying out hemming working for a flange of a wheel arch portion of a vehicle by a hemming working apparatus according to a second exemplary embodiment of the invention.

A hemming working apparatus 3010 according to the second exemplary embodiment is an apparatus set to a middle step of a production line 3014 for assembling and working a vehicle 3012 as a work in a so-to-speak white body for carrying out hemming working for a flange 3017 of a wheel arch portion 3016 on a left rear wheel side. The wheel arch portion 3016 is constituted by a shape of substantially a circular arc of about 180°. In a state before working by the hemming working apparatus 3010, the flange 3017 is constituted by a shape of being bent by 90° from an end portion 3016a (refer to two-dotted chain line of FIG. 30) of the wheel arch portion 3016 to an inner side by 90°.

As shown by FIG. 26, the hemming working apparatus 3010 includes a moving die 3018 to be brought into contact with the wheel arch portion 3016 of the vehicle 3012, a robot 3022 as a moving mechanism for moving the moving die 3018 and supporting a hemming unit 3020 at a front end thereof, a photoelectric sensor 3023 for detecting that the vehicle 3012 is carried to a predetermined position of the production line 3014, and a controller 3024 for carrying out a comprehensive control.

The robot 3022 is of an industrial articulated type, and can move the hemming unit 3020 to an arbitrary position and in an arbitrary attitude by a programmed operation. Further, a vicinity of the robot 3022 is provided with a storing base 3026 arranged with a plurality of kinds of the moving dies 3018 in accordance with kinds of the vehicle 3012, and a position data of the storing base 3026 is stored to the controller 3024. The controller 3024 is connected to an external production control computer, not illustrated, for controlling an operation of the production line 3014, and information indicating a kind or the like of the vehicle 3012 carried on the production line 3014 is supplied to the controller 3024.

Figure 27:
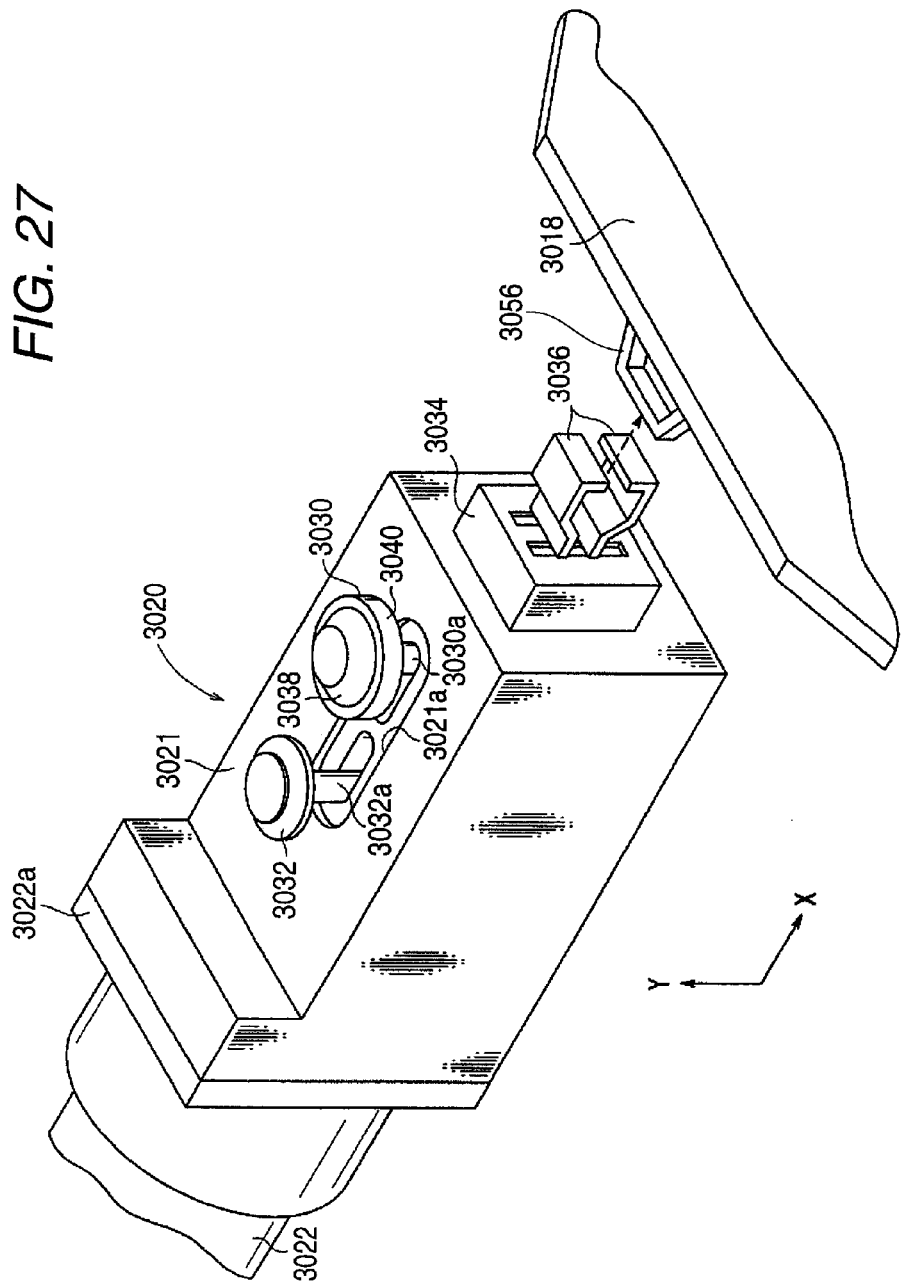
FIG. 27 is a perspective view of a hemming unit provided at a front end of a robot of a hemming working apparatus according to the second exemplary embodiment.

As shown by FIG. 27, the hemming unit 3020 is supported by way of a bracket 3022a fixed to a front end of the robot 3022, and is contained at inside of an outer box 3021 attached to the bracket 3022a, and is provided with a hemming roller 3030 provided to project from a hole portion 3021a at an upper face of the outer box 3021, and a guide roller 3022 as a receiving roller. Further, a chuck 3034 is provided at a front end face of the outer box 3021. The chuck 3034 includes a pair of fingers 3036 opened and closed under an operation of the controller 3024 and is used for moving the moving die 3018.

The hemming roller 3030 and the guide roller 3032 are axially supported rotatably by support shafts 3030a and 3032a. Further, the hemming roller 3030 and the guide roller 3032 are made to be movable in X direction (direction of aligning the support shafts 3030a and 3032a), and can be pressed to a member pinched by the hemming roller 3030 and the guide roller 3032. Further, the hemming roller 3030 and the guide roller 3032 are supported by the robot 3032 by way of a floating mechanism, not illustrated, and can be moved in X direction and Y direction (axial directions of the support shafts 3030a and 3032a) while maintaining positions thereof relative to each other and are moved drivenly and elastically by an external force. That is, the support shaft 3030a and the support shaft 3032a are cooperatively made to be movable in X direction while maintaining an adjusted interval therebetween.

The hemming roller 3030 is constituted by a taper roller 3038 provided at a front end side, and a circular cylinder roller 3040 provided on a base end side by a structure integral with a taper roller 3038. The taper roller 3038 is a frustum of a circular cone in a converging shape inclined by 45° in a side view thereof, and an edge line length L1 (refer to FIG. 32) is set to be slightly longer than a height H of the flange 3017. The circular cylinder roller 3040 is constituted by a shape of a circular cylinder having a diameter slightly larger than a maximum diameter portion on the base end side of the taper roller 3038.

The guide roller 3032 is constituted by a shape of a circular disk a surrounding of which is set to a narrow width and made to be engageable with a first groove 3052 or a second groove 3054 (refer to FIG. 32) provided at the moving die 3018.

That is, by the first groove 3052 and the second groove 3054 and the guide roller 3032 operated as a guide member, the hemming roller 3030 is guided along the flange 3017 while restraining a displacement relative to the flange 3017 in Y direction constituting an axial direction of the support shaft 3030a of the hemming roller 3030 and X direction constituting a direction of aligning the support axis 3030a and 3032a. Further, a position in Y direction of the guide roller 3032 coincides with a position of a center of a height L2 (L2/2) of the circular cylinder roller 3040 of the hemming roller 3030 (refer to FIG. 32).

Figure 28:
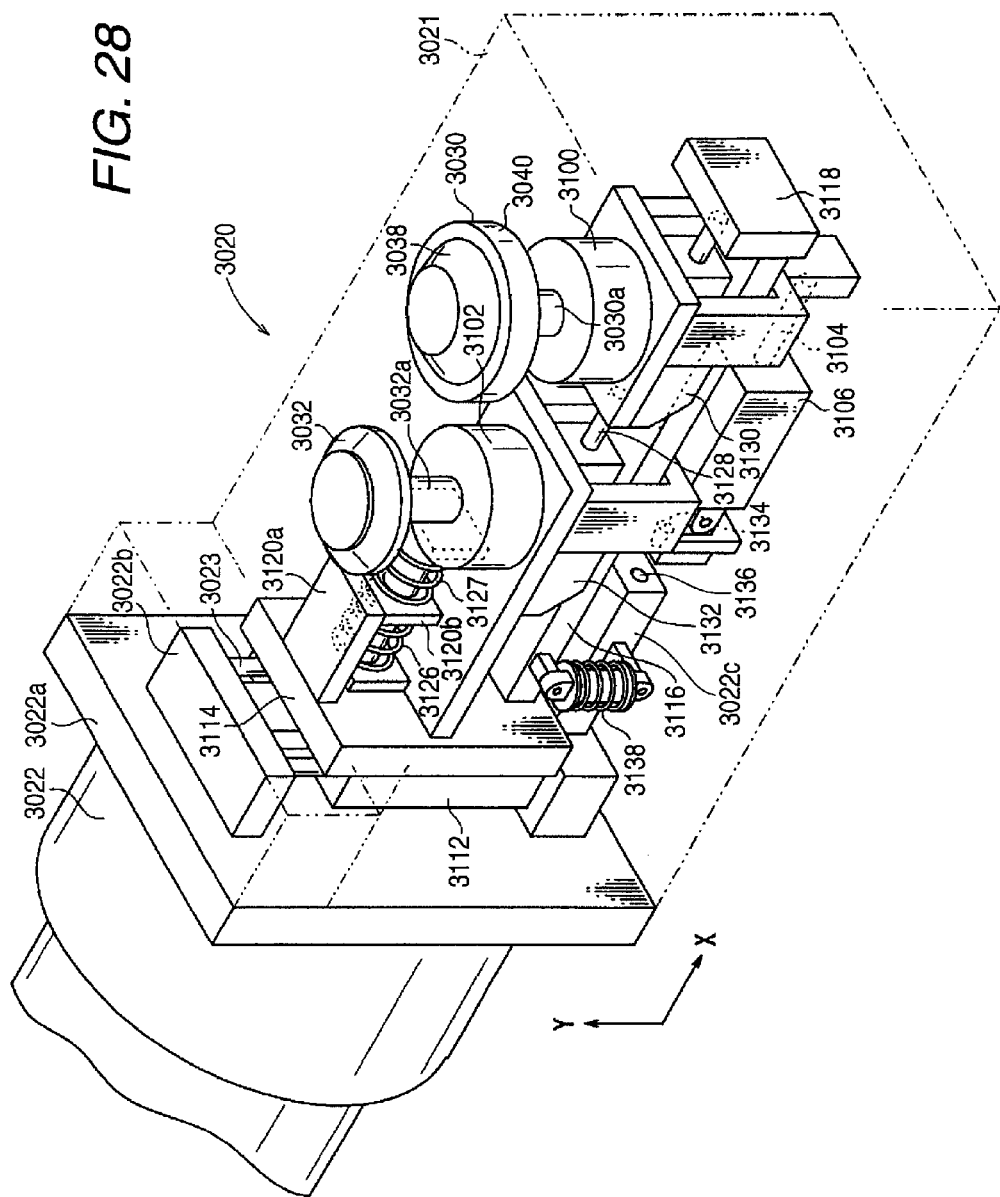
FIG. 28 is a perspective view of the hemming unit according to the second exemplary embodiment.
Figure 29:
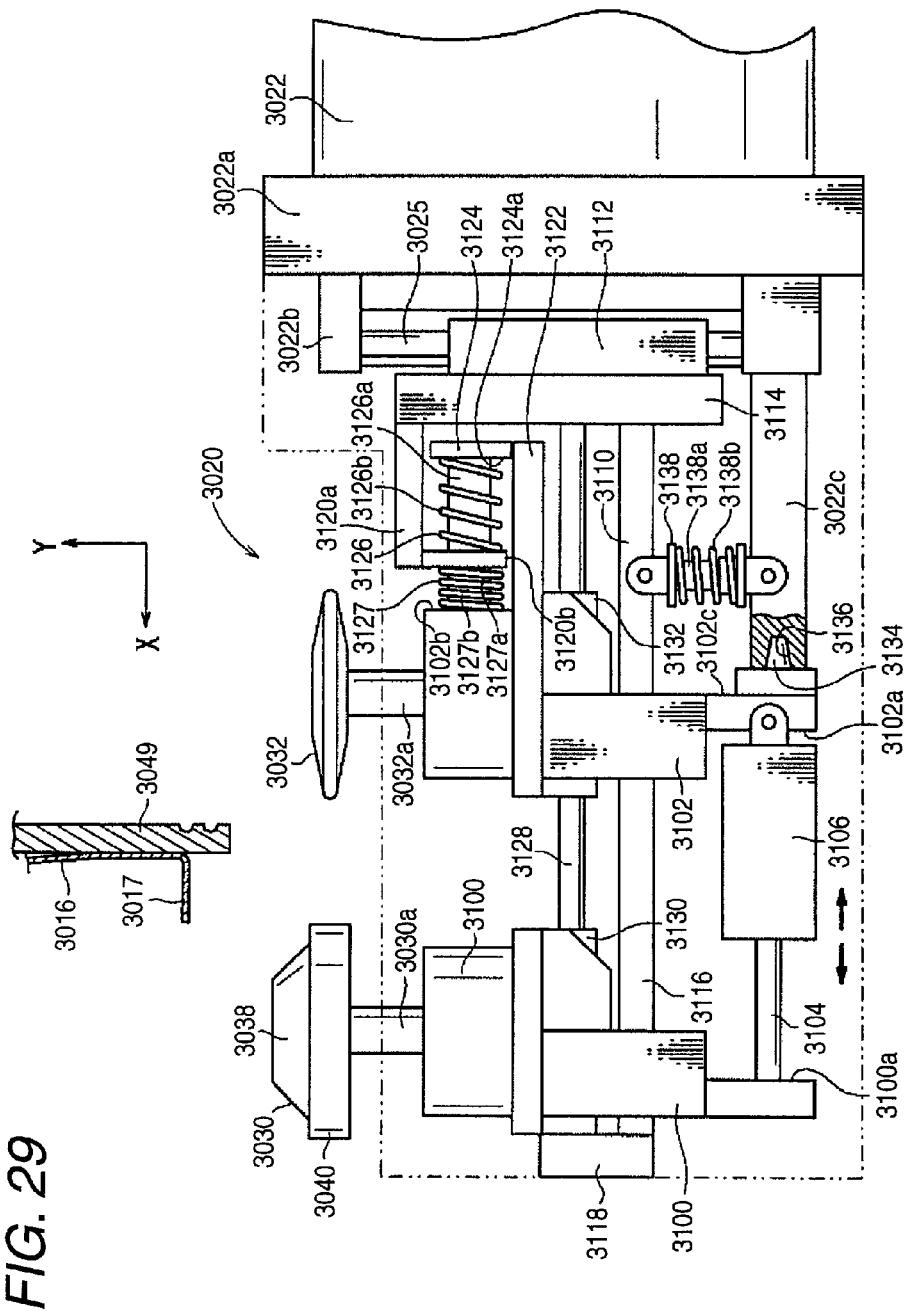
FIG. 29 is a partially sectional side view showing the hemming unit before hemming working.
Figure 30:
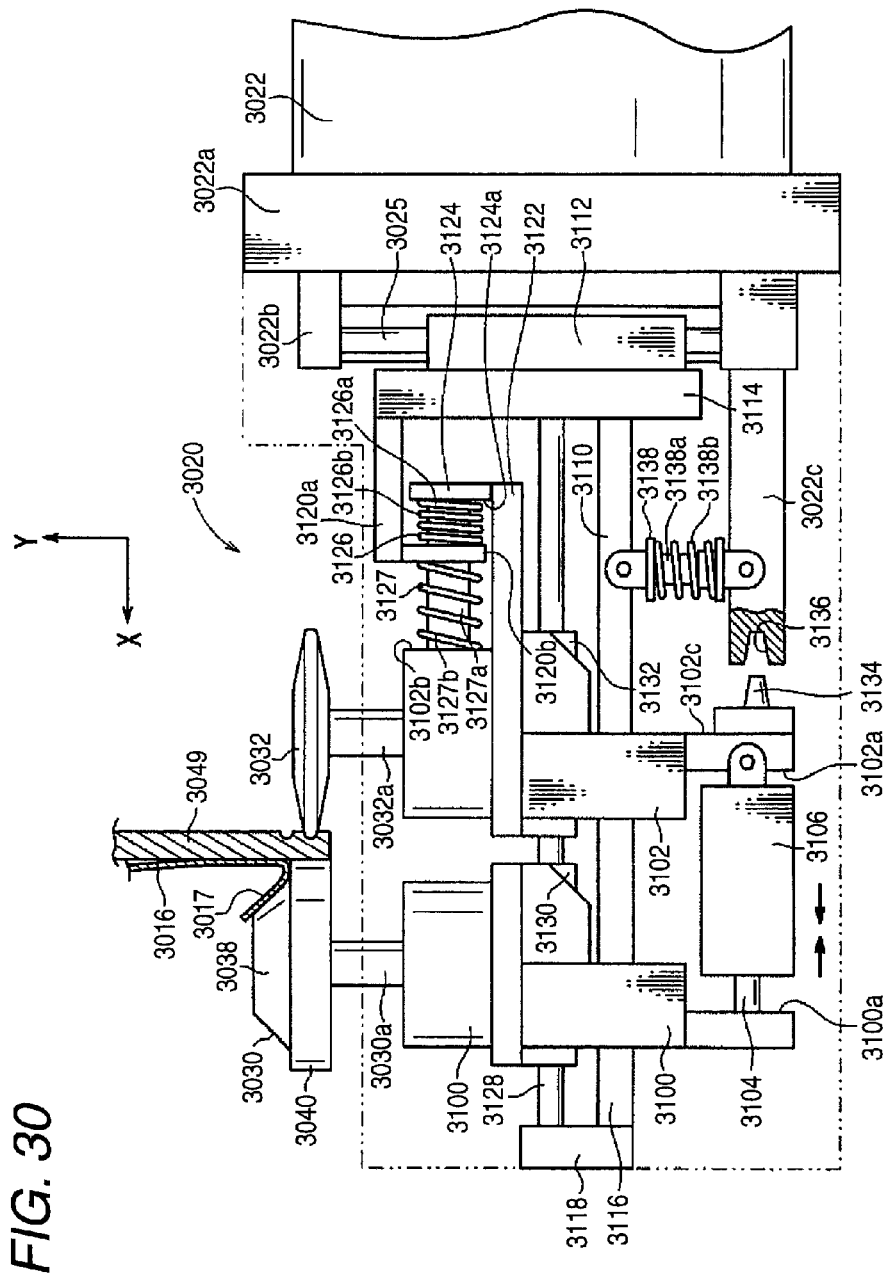
FIG. 30 is a partially sectional side view showing the hemming unit in hemming working.

Here, the hemming unit 3020 will be explained in details in reference to FIG. 28 through FIG. 30. FIG. 28 is a perspective view of the hemming unit 3020, FIG. 29 is a partially sectional side view showing the hemming unit 3020 before hemming working, and FIG. 30 is a partially sectional side view showing the hemming unit 3020 in hemming working. Further, in FIG. 28 through FIG. 30, the outer box 3021 is illustrated perspectively by a two-dotted chain line to be able to optically recognize a structure of the hemming unit 3020.

The hemming unit 3020 includes the hemming roller 3030 and the guide roller 3032, the support shafts 3030a and 3032a for axially supporting these, a first movable portion 3100 as a movable portion having the support shaft 3032a at an upper end face thereof, a second movable portion 3102 as a movable portion having the support shaft 3032a at an upper end face thereof, a cylinder 3106 for connecting and displacing in X direction the first movable portion 3100 and the second movable portion 3102, and a base portion 3110 for supporting the first movable portion 3100, the second movable portion 3012 and the cylinder 3106 relative to the robot 3022.

The base portion 3110 is constituted by a shape of a substantially channel-like shape in which a lower side thereof is longer than an upper side thereof in a side view thereof (refer to FIG. 29), and the base portion 3110 is provided with a third movable portion 3114 displaceably supported in Y direction by a second rail 3025 extended in Y direction to be supported by a support member 3022b fixed to a bracket 3022a and substantially in a channel-like shape in a side view thereof (refer to FIG. 29) by way of a linear guide 3112, a base 3116 in a rectangular shape projected from a slightly lower portion of a center in Y direction of the third movable portion 3114, a front end support member 3118 in a rectangular shape provided at a front end face of the base 3116, a flat plate 3120a in a rectangular shape projected from an upper portion of the third movable portion 3114 in a direction in parallel with the base 3116, and a partitioning portion 3120b in a rectangular shape provided at a front end portion of the flat plat 3120a in parallel with the third movable portion 3114. Further, first supporting means 3126 and second supporting means 3127 are arranged in series between a side face 3102b of an upper portion of the second movable portion 3120 on a side of the third movable portion 3114, and a side face 3124a projected from a front end portion of an extending portion 3122 extended from the second movable portion 3120 to a side of the third movable portion 3114 in Y direction so as not to be brought into contact with the flat plate 3120a, and the partitioning portion 3120b is provided to partition therebetween.

Further, a first rail 3128 is extended in parallel with the base 3116 at an upper space of the base 3116 at which the third movable portion 3114 and the front end support member 3118 are opposed to each other. Further, the first movable portion 3100 and the second movable portion 3102 are supported by the first support rail 3128 displaceably in X direction respectively by way of linear guides 3100 and 3132. That is, the first movable portion 3100 and the second movable portion 3102 are supported by the base portion 3110 by way of the linear guides 3130 and 3132 or the like, and these function as a movable mechanism. Further, the second movable portion 3102 is supported by the first supporting means 3126 and the second supporting means 3127 drivenly and elastically in X direction by interposing the above-described partitioning portion 3120b.

That is, when the second movable portion 3102 is displaced in a direction of being separated from the first movable portion 3100, the second supporting means 3127 is contracted by the partitioning portion 3120b, and when the second movable portion 3102 is displaced in a direction of being proximate to the first movable portion 3100, the first supporting means 3126 is contracted by the partitioning portion 3120b.

Further, a horizontally projected portion 3022c projected in X direction from a lower end face of the support member 3022b and the base 3116 are drivenly and elastically supported by third supporting means 3138. Although a pair of two pieces of the third supporting means are provided to connect end portions on both sides of the horizontally projected portion 3022c and the base 3116, one piece thereof may naturally be constituted to connect center portions in width directions of the horizontally projected portion 3022c and the base 3116.

Further, all of the third supporting means 3126, the second supporting means 3127 and the third supporting means 3138 are constructed by similar constitutions, the first supporting means 3126 is constituted by a shaft portion 3126a and a spring 3126b installed at a surrounding of the shaft portion 3126a, and the second supporting means 3127 is constituted by a shaft portion 3127a and a spring 3127b arranged at a surrounding of the shaft portion 3127a. Similarly, the third supporting means 3138 is constituted by a shaft portion 3138a and a spring 3138b installed at a surrounding of the shaft portion 3138a. Further, the respective shaft portions 3126a, 3127a, and 3128a may be constituted by hydraulic dampers or pneumatic dampers or the like.

The first supporting means 3126 and the second supporting means 3127 are constructed by the above-described constitutions, and therefore, as described above, the second movable portion 3102 is supported at the base portion 3110 displaceably in X direction by the linear guide 3132, and drivenly and elastically supported in X direction relative to the base portion 3110 by the first supporting means 3126 and the second supporting means 3127 by way of the partitioning portion 3120b.

Similarly, the third supporting means is constructed by the above-described constitution, and therefore, the base 3116 is drivenly and elastically supported in Y direction relative to the horizontally projected portion 3022c fixed to the robot 3022 by the third supporting means.

Meanwhile, the second movable portion 3102 includes one side face 3102a and other side face 3102c extended in a lower direction, the other side face 3102c is provided with a first stopper 3134 as a first locking portion, and the first stopper 3134 is engageable with a second stopper 3136 provided at a front end portion of the horizontally projected portion 3122c. That is, a front end of the first stopper 3134 is constituted by a projected portion substantially in a shape of a frustum of a circular cone, and the second stopper 3136 is constituted by a recessed portion substantially in a shape of a cone capable of inserting the front end of the first stopper 3134. Therefore, as shown by FIG. 29, the first stopper 3134 and the second stopper 3136 are engaged in a state in which an interval between the hemming roller 3030 and the guide roller 3032 is maximally opened by extending a rod 3104 of the cylinder 3106, that is, in a state in which the hemming roller 3030 is separated from the vehicle 3012 before hemming working or after hemming working, mentioned later. On the other hand, the first stopper 3134 and the second stopper 3136 are not engaged with each other in a state in which the interval between the hemming roller 3030 and the guide roller 3032 is narrowed by retracting the rod 3104 and the cylinder 3106 as shown by FIG. 30, that is, in a state in which the hemming roller 3030 is brought into contact with the vehicle 3012 in hemming working, mentioned later.

Further, in the state in which the rod 3104 of the cylinder 3106 is extended and the first stopper 3134 and the second stopper 3136 are engaged (refer to FIG. 29), the first movable portion 3100 is brought into contact with and supported by the front end support member 3138 by a press force in a direction opposed to the side of the second movable portion 3102 by the rod 3104 connected to the cylinder 3106. On the other hand, in the state in which the rod 3104 of the cylinder 3106 is contracted and the first stopper 3134 and the second stopper 3136 are not engaged with each other (refer to FIG. 30), the first movable portion 3100 is held in a state of being proximate to the second movable portion 3102 by a force attracted to a side of the second movable portion 3102 by the rod 3104.

The hemming unit 3020 according to the second exemplary embodiment is constituted as described above. Therefore, in a state in which the first stopper 3134 and the second stopper 3136 are not engaged with each other as shown by FIG. 30, the first movable portion 3100 and the second movable portion 3102 are supported by the base portion 3110 integrally and displaceably in X direction by way of the linear guides 3130 and 3132, and the displacement in X direction is drivenly and elastically supported by the first supporting means 3126 and the second supporting means 3127. Further, the base portion 3116 supporting the first movable portion 3100 and the second movable portion 3102 in this way is supported by the robot 3022 displaceably in Y direction by way of the linear guide 3112, the displacement in Y direction is drivenly and elastically supported by the third supporting means 3038. Therefore, in this case, the first movable portion 3100 and the second movable portion 3102, in other words, the hemming roller 3030 and the guide roller 3032 are supported by the robot 3022 displaceably in X direction and Y direction and drivenly and elastically. That is, the linear guides 3132, 3130 and 3132, the first supporting means 3126, the second supporting means 3127 and the third supporting means 3138 are operated as the floating mechanism interposed between the hemming unit 3020 and the robot 3022, and a performance of the guide roller 3032 following the first groove 3052 or the second groove 3054 in hemming working is considerably promoted, and the hemming roller 3030 can be made to follow the flange 3017 at high speed and accurately, and details thereof will be described later (refer to FIG. 34 and FIG. 35).

On the other hand, in a state in which the first stopper 3134 and the second stopper 3136 are engaged as shown by FIG. 29, the displacement of the first movable portion 3100 and the second movable portion 3102 in X direction is restricted by a force of extending the rod 3104 of the cylinder 3106, further, the displacement of the base portion 3100 in Y direction is restricted by engaging the stopper 3134 and the second stopper 3136. In this case, a floating operation by the floating mechanism is restricted, and the hemming roller 3030 and the guide roller 3032 are fixedly supported by the robot 3022. Therefore, when the hemming roller 3030 and the guide roller 3032 are made to be proximate to position the vehicle 3012 and the moving die 3018, for example, before hemming working, by restricting the floating mechanism, the positioning can swiftly be carried out and details thereof will be described later.

Figure 31:
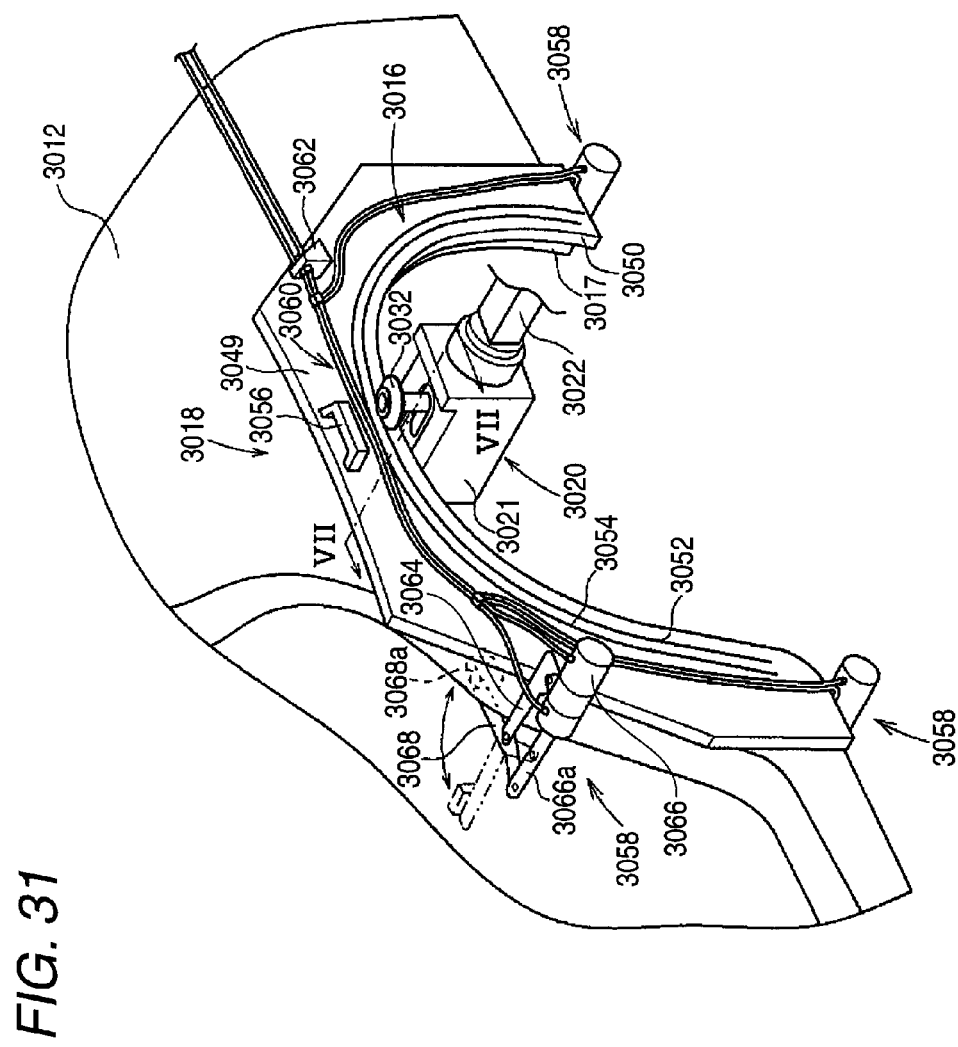
FIG. 31 is a perspective view of a moving die fixed to a wheel arch portion.

Next, the moving die 3018 will be explained. As shown by FIG. 31, the moving die 3018 is constituted by constituting a base by a die plate 3029. The die plate 3049 is constituted by a plate shape, a side thereof brought into contact with the wheel arch portion 3016 is referred to as a surface 3049a (refer to FIG. 32) and a face on an opposed side thereof is referred to as a back face 3049b to be differentiated from each other. Further, a work side (upper side in FIG. 32) in view from an end portion 3016a of a wheel arch portion 3016 is referred to as an inner side, and a side opposed thereto (lower side in FIG. 32) is referred as an outer side to be differentiated from each other.

The die plate 3049 is constituted by a shape of a plate in an arch shape the surface 3049a of which is brought into contact with a surrounding of the wheel arch portion 3016, and the surface 3049a is set to a three-dimensional curved face in conformity with a surface of the vehicle 3012. Therefore, when the moving die 3018 is attached to the wheel arch portion 3016, the first groove 3052 and the second groove 3054 are arranged in parallel with the flange 3017, and the surface 3049a is brought into face contact with the vehicle 3012 by a wide area.

The moving die 3018 includes an outer side circular arc portion 3050 formed along slightly on an outer side of the end portion 3016a of the wheel arch portion 3016, the first groove 3052 and the second groove 3054 provided in parallel with each other along the outer side circular arc portion 3050 at the back face 3049b, a knob 3056 provided at the back face 3049b, three clamp mechanisms 3058 provided at the surrounding, a pipe 3060 for supplying and recovering a compressed fluid to and from the clamp mechanism 3058, and a control valve 3062 for controlling to switch a fluid supply direction of the pipe 3060 or the like. The control valve 3062 is controlled by the controller 3024. The first groove 3052 is provided on an outer side of being projected from the end portion 3016a of the flange 3017 on the die plate 3049, and the second groove 3054 is provided on an inner side of the end portion 3016a.

The moving die 3018 is small-sized since the moving die 3018 is brought into contact only with the surrounding of the wheel arch portion 3016. Further, the moving die 3018 is brought into contact with the vehicle 3012 from a side face thereof, and therefore, the moving die 3018 is not applied with a weight of the vehicle 3122, and the moving die 3018 is not constituted by a load resistant structure, and therefore, the moving die 3018 is set to be light-weighted. Therefore, the moving die 3018 is made to be movable simply and conveniently by the robot 3022 by grabbing the knob 3056 by the chuck 3034 (refer to FIG. 26 and FIG. 27).

The clamp mechanism 3058 includes a stay 3064 extended from an end portion of the die plate 3049, a cylinder 3066 pivotably provided to the stay 3064, and an opening/closing lever 3068 inclined centering on a support shaft provided at the stay 3064. One end portion of the opening/closing lever 3068 constitutes a grip portion 3068a engaged with and held by a reference position of the vehicle 3012, and an end portion on an opposed side is rotatably coupled to a rod 3066a of the cylinder 3066 by way of a support shaft. That is, by extending the rod 3066a of the cylinder 3066, the opening/closing lever 3068 is closed to hold the vehicle 3012 by the grip portion 3068a, and by contracting the rod 3066a, the opening/closing lever 3068 is opened (refer to a two-dotted chain line portion of FIG. 31), and the moving die 3018 is made to be able to be proximate or separated from the vehicle 3012. Although there is a case in which a stop position of the vehicle 3012 on the production line 3014 is more ore less shifted from a rectified value, the moving die 3018 is accurately positioned to the wheel arch portion 3016 by the clamp mechanism 3058.

Figure 32:
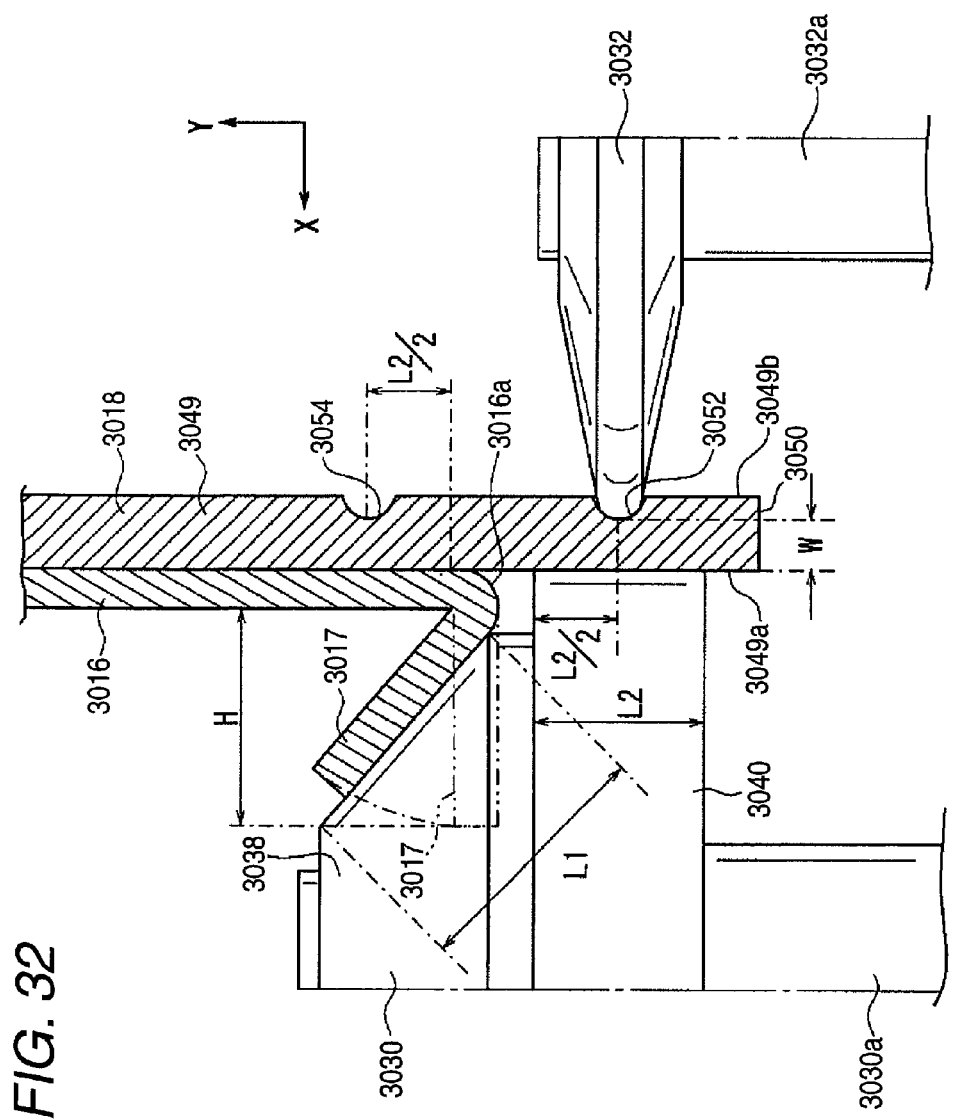
FIG. 32 is an enlarged sectional view viewed from VII-VII arrow mark shown in FIG. 31.

When the moving die 3018 is fixed to the wheel arch portion 3016 by the clamp mechanism 3058, as shown by FIG. 32, the outer side circular arc portion 3050 is arranged on an outer side (lower side of FIG. 32) of the end portion 3016a of the wheel arch portion 3016. The first groove 3052 is slightly on an outer side of the end portion 3016a, further, the second groove 3054 is on an inner side of the end portion 3016a. That is, the first groove 3052 and the second groove 3054 are arranged at positions substantially symmetrical with each other by constituting a reference by the end portion 3016a and in parallel with each other along the end portion 3016a.

Figure 33:
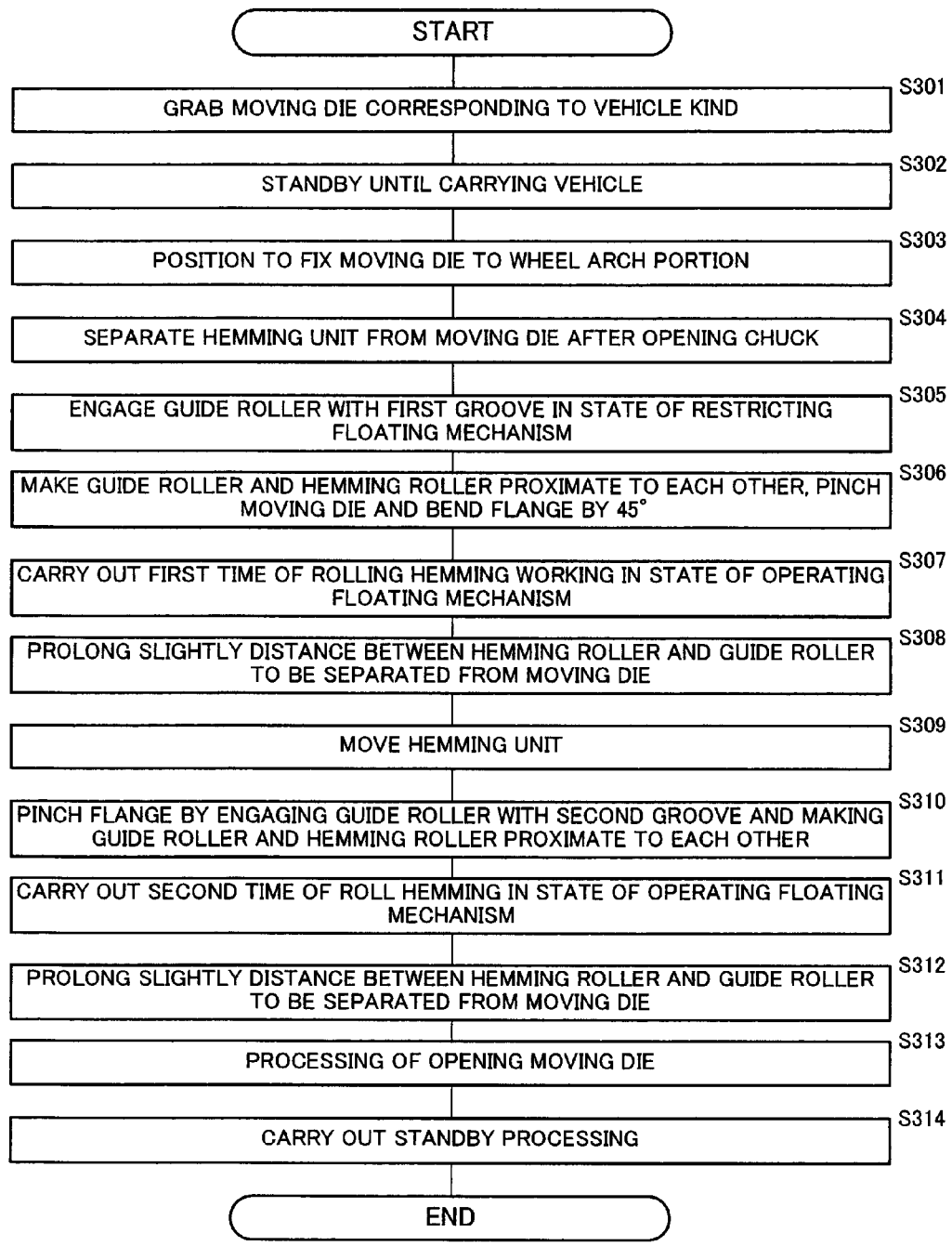
FIG. 33 is a flowchart showing a procedure of a hemming working method by the hemming working apparatus according to the second exemplary embodiment.

Next, an explanation will be given of a working method of carrying out hemming working with regard to the flange 3017 of the wheel arch portion 3016 by using the hemming working apparatus 3016 constituted as described above in reference to FIG. 33. Processings shown in FIG. 33 are carried out by the moving die 3018, the hemming unit 3020 and the robot 3022 mainly under a control by the controller 3024.

First, at step S301, information of a vehicle kind of the vehicle 3012 carried successively is confirmed from the production control computer, thereafter, the robot 3022 returns the currently grabbed moving die 3018 to a rectified position of the storing base 3026 and grabs other moving die 3018 in correspondence with the vehicle kind by the chuck 3034. When the corresponding moving die 3018 has been held already, the hold and switch operation is not needed, further, when a plurality of pieces of the vehicles 3012 of the same vehicle kind is continuously carried, it is not naturally needed to hold and change the moving die 3018.

At step S302, the operation is at standby until the vehicle 3012 is carried by confirming a signal of the photoelectric sensor 3023. The vehicle 3012 is carried by the production line 3014 and is stopped at a predetermined position at a vicinity of the robot 3022. The operation proceeds to step S303 at a time point of confirming carrying of the vehicle 3012 by the photoelectric sensor 3023.

At step S303, the opening/closing lever 3068 of the clamp mechanism 3058 is closed by bringing the surface 3049a of the moving die 3018 into contact with the wheel arch portion 3016 of the vehicle 3012 by operating the robot 3022 and driving to switch the control valve 3062. Thereby, the moving die 3018 is attached to the wheel arch portion 3016 and is accurately positioned to fix. That is, at step S303, the vehicle 3012 constituting a large-sized weighted object is completely stopped, and by making the small-sized and light-weighted moving die 3018 proximate thereto, positioning and fixing are carried out simply and conveniently.

Further, the moving die 3018 may be made to be proximate thereto while correcting a path of moving the robot 3022 while confirming a position of the moving die 3018 relative to the wheel arch portion 3016 in real time by a predetermined sensor. Further, positioning may be carried out by providing a reference pin at the moving die 3018 and inserting the reference pin into a predetermined reference hole of the vehicle 3012. Both of the positioning means may naturally be used.

At step S304, after opening the finger 3036 of the chuck 3034, the hemming unit 3020 is temporarily separated from the moving die 3018.

At step S305, after changing a direction of the hemming unit 3020, the hemming unit 3020 is made to be proximate to and positioned to the outer side circular arc portion 3050 of the moving die 3018, and the guide roller 3032 is engaged with the first groove 3052.

At this occasion, in the hemming unit 3020, the first stopper 3134 and the second stopper 3136 are engaged with each other by bringing about a state of extending the rod 3014 of the cylinder 3106. Thereby, the interval between the hemming roller 3030 and the guide roller 3032 is brought into a maximally separated state, the flange 3017 and the die plate 3049 is made to be able to be easily inserted to the separated portion, further, by maintaining a state of restricting the floating operation at the hemming unit 302, the hemming roller 3030 and the guide roller 3032 are positioned in a state of being integrally fixed to the robot 3022 without bringing about rocking or rattling. That is, the hemming working apparatus 3010 of the embodiment achieves a simple and excellent positioning function of sufficiently separating the interval between the hemming roller 3030 and the guide roller 3032 by only extending the rod 3104 of the cylinder 3016 and preventing rocking or rattling of the hemming unit 3020 including the hemming roller 3030 and the guide roller 3032 by restricting the floating mechanism simultaneously.

Therefore, positioning of the hemming roller 3030 and the guide roller 3032 can accurately and swiftly be carried out, the cycle time can be shortened. Further, even in step S304, similar to step S305, the floating operation of the hemming unit 3020 may be restricted, in this case, there can be restrained occurrence of noise sound or vibration at the front end portion of the robot 3022 caused by rocking or rattling of the hemming unit 3020 in an operation of moving the robot 3022.

At step S306, the rod 3014 of the cylinder 3106 is contracted, the guide roller 3032 and the hemming roller 3030 are made to be proximate to each other, and as shown by FIG. 32, the moving die 3018 is pinched by the guide roller 3032 and the circular cylinder roller 3040. At this occasion, the flange 3017 is pressed by the taper roller 3038 and is inclined to bend by 45° along the conical face. Further, as is apparent from FIG. 32, a distance between the guide roller 3032 and the circular cylinder roller 3040 is rectified by a width w between a bottom portion of the first groove 3052 and the surface 3049*a* and the guide roller 3032 and the circular cylinder roller 3040 are not made to be excessively proximate to each other.

Therefore, the flange 3017 is not bent by a rectified amount or more or is not constituted by a wavy shape. Further, the moving die 3018 can firmly be pinched by arranging the guide roller 3032 and the circular cylinder roller 3040 such that positions thereof in Y direction coincide with each other. Thereby, the moving die 3018 is not applied with a moment force and an elastic deformation or a shift can be prevented from being brought about.

Further, at this occasion, simultaneously with an operation of pressing the taper roller 3038 to the flange 3017 by retracting the rod 3104 of the cylinder 3106, the engagement between the first stopper 3134 and the second stopper 3136 is disengaged and the restriction of the floating mechanism is released at the hemming unit 3020. That is, according to the hemming working apparatus 3010 of the second exemplary embodiment, by a simple operation of retracting the rod 3014 of the cylinder 3106, the operation of pressing the flange 3017 is carried out by the taper roller 3038, further, also the restriction of the floating mechanism is released to be able to prepare for hemming working explained in the following steps.

Figure 34:
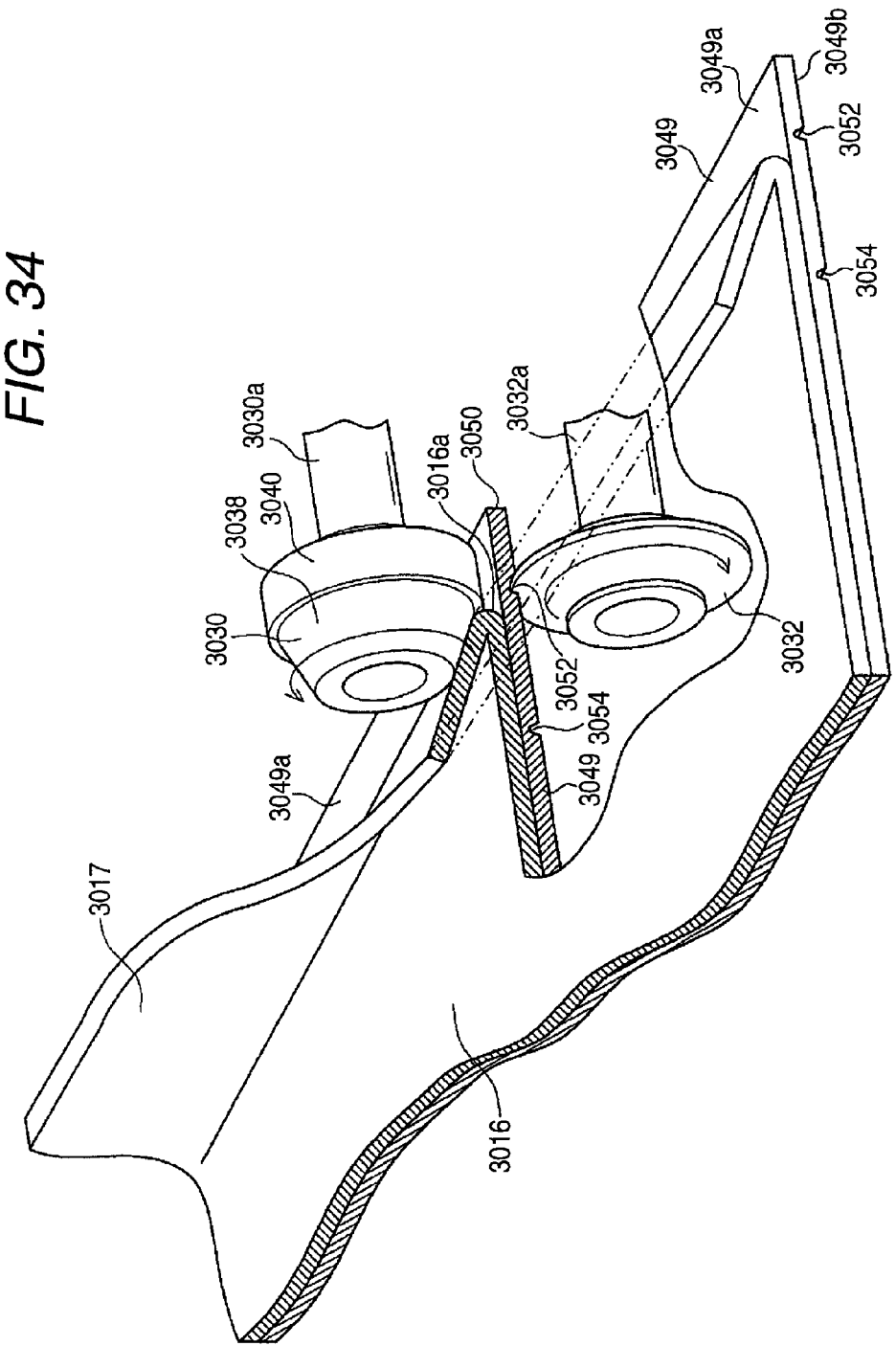
FIG. 34 is a partially sectional perspective view of a wheel arch portion of a vehicle, a hemming roller and a guide roller in carrying out a first hemming step.

At step S307, as shown by FIG. 34, by rolling the guide roller 3032 while engaging the guide roller 3032 with the first groove 3052, a first hemming step of inclining to bend the flange 3017 by 45° in an inner side direction is continuously carried out. That is, there is carried out a first hemming step of rolling the hemming roller 3030 and the guide roller 3032 while rotating the hemming roller 3030 and the guide roller 3032 in directions reverse to each other in a state of maintaining a press force and a distance therebetween to predetermined values and continuously bending the flange 3017 by a conical face of the taper roller 3038. At this occasion, the hemming roller 3030 and the guide roller 3032 are supported by the floating mechanism as described above, and therefore, the hemming roller 3030 and the guide roller 3032 can be displaced in X direction and Y direction while maintaining positions thereof relative to each other, and even when more or less error is present in a locus of operating the robot 3022, the guide roller 3032 can be moved by accurately following the first groove 3052, and therefore, a speed of rolling the hemming roller 3030 and the guide roller 3032 can be constituted by a high speed.

Therefore, the taper roller 3038 can press and deform the flange 3017 in a rectified direction. Further, an accuracy of operating the robot 3022 is not needed to be an extremely high accuracy, and high speed formation of the operating speed and simplification of control procedure are achieved. Hemming working by the first hemming step is carried out over an entire length of the flange 3017.

Figure 35:
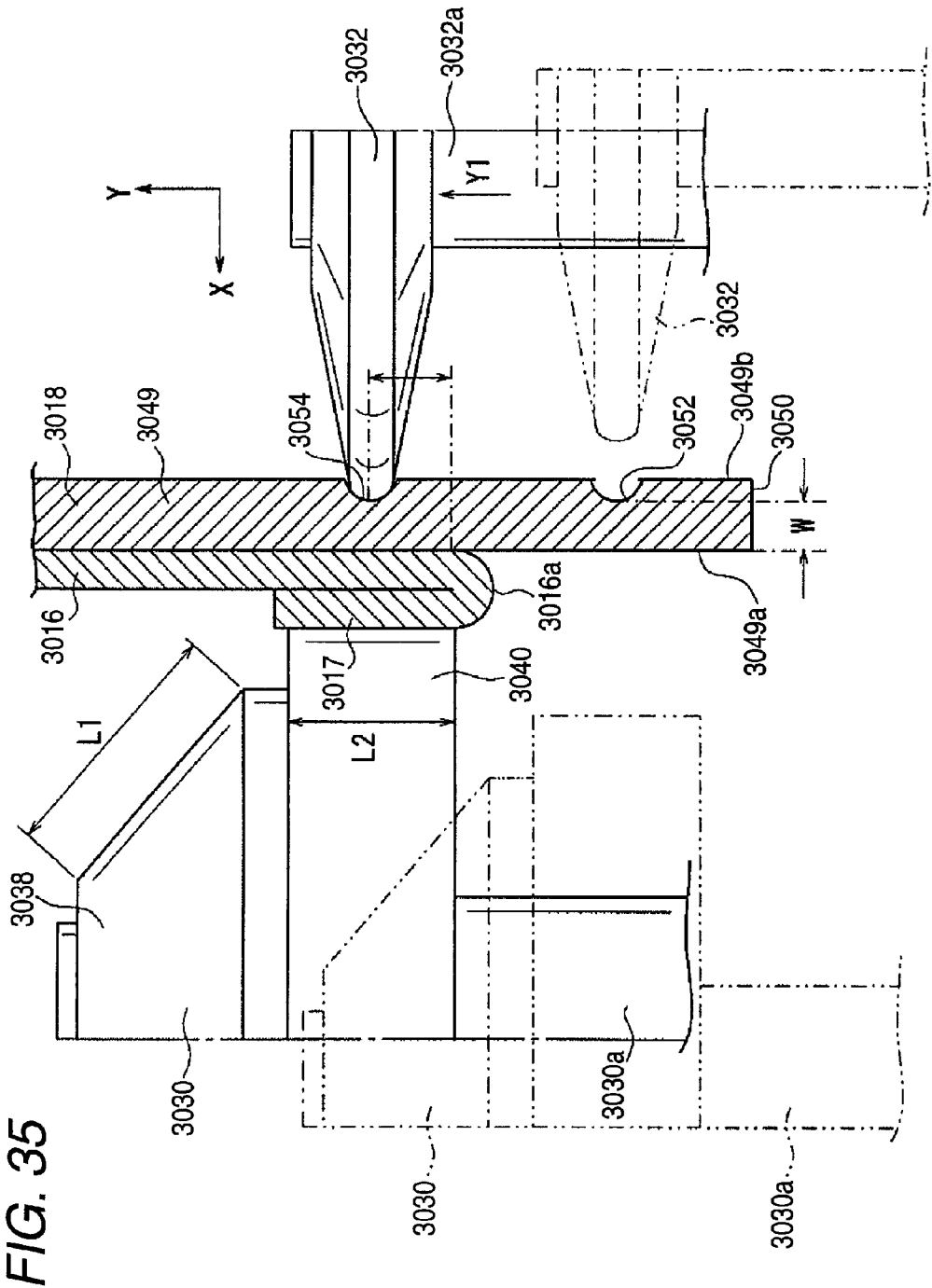
FIG. 35 is a sectional view showing positions of the hemming roller, the guide roller, a flange and a moving die at the second hemming step.

At step S308, as shown by a two-dotted chain line portion of FIG. 35, the rod 3104 of the cylinder 3106 is more or less extended, and a distance between the hemming roller 3030 and the guide roller 3032 is slightly prolonged to be separated from the vehicle 3012 and the moving die 3018. In this case, when the rod 3014 of the cylinder 3106 is maximally extended, the floating mechanism of the hemming unit 3020 is restricted, positioning at the following step S309 can swiftly be carried out, however, according to the embodiment, the rod 3104 is extended more or less as described above in consideration that the distance of moving the hemming unit 3020 at the following step S309 is comparatively short or the like.

At step S309, the hemming roller 3030 and the guide roller 3032 are moved in an arrow mark Y1 direction by moving the hemming unit 3020. The moving distance is equal to a distance between the first groove 3052 and the second groove 3054.

At step S310, the guide roller 3032 is engaged with the second groove 3054 by retracting the rod 3104 of the cylinder 3106. Further, the guide roller 3032 and the hemming roller 3030 are made to be proximate to each other, and as shown by FIG. 35, the moving die 3018 is pressed to pinch by the guide roller 3032 and the circular cylinder roller 3040. In this way, the operating procedure in moving the guide roller 3032 from the first groove 3052 to the second groove 3054 is simple and the guide roller 3032 is only moved in the arrow mark Y1 direction while making the direction of the hemming unit 3020 constant. Further, also the moving distance is comparatively short, and therefore, the shifting is finished in a short period of time.

Further, at this occasion, the flange 3017 is pressed by the circular cylinder roller 3040 and is bent to be brought into contact with the back face of the wheel arch portion 3016.

That is, the flange 3017 is further bent by 45° from the first hemming step, that is, by 90° from an initial angle.

Figure 36:
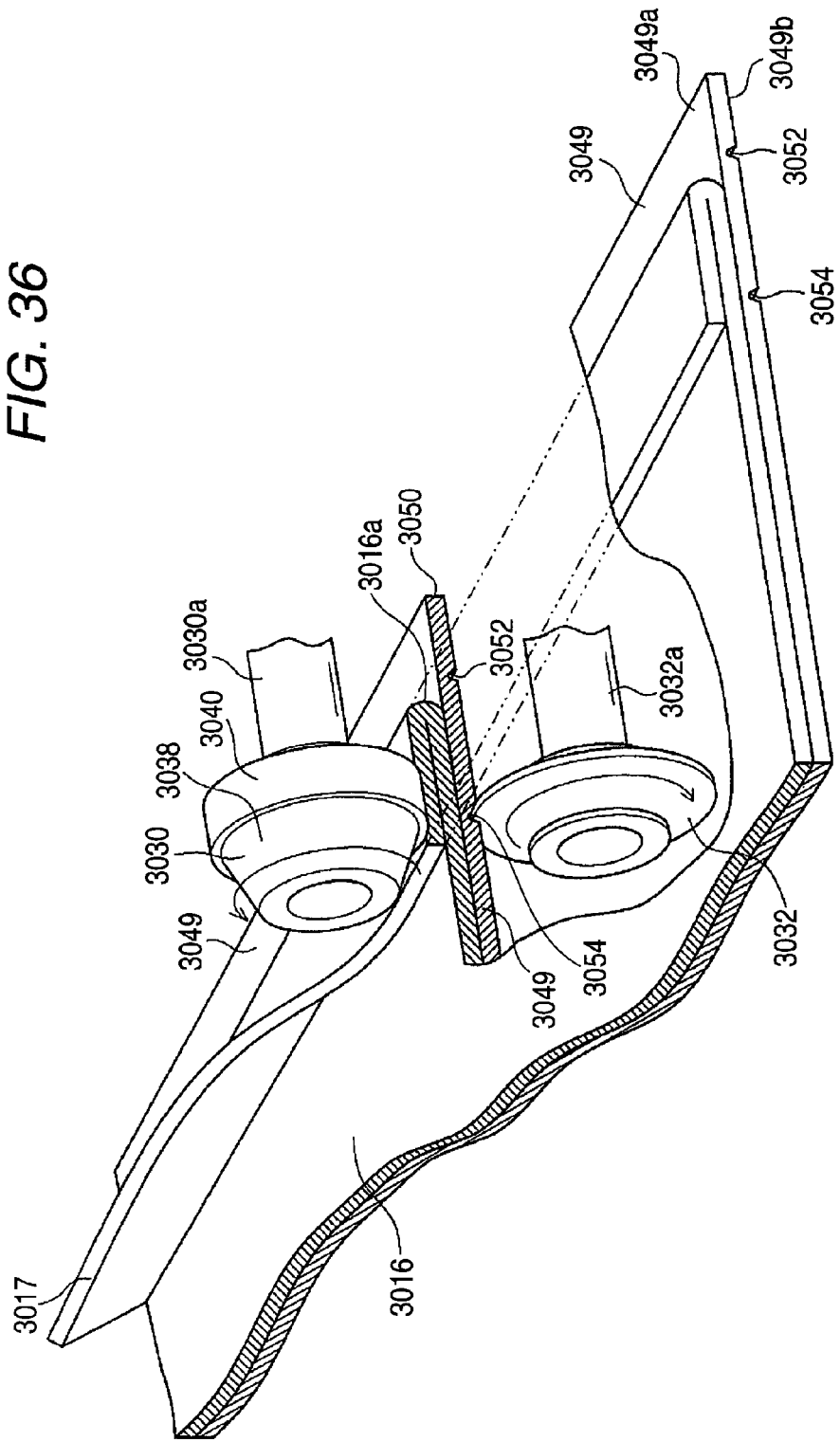
FIG. 36 is a partially sectional perspective view of the wheel arch portion of the vehicle, the hemming roller and the guide roller in carrying out the second hemming step.

At step S311, as shown by FIG. 36, by rolling the guide roller 3032 while engaging the guide roller 3032 with the second groove 3054, a second hemming step of folding to bend the flange 3017 to be brought into contact with the back face of the wheel arch portion 3016 is continuously carried out. That is, the second hemming step is carried out by continuously bending the flange 3017 by an outer peripheral circular cylinder face of the circular cylinder roller 3040 by rolling the hemming roller 3030 and the guide roller 3032 in directions reverse to each other in a state of maintaining a press force or a distance between the hemming roller 3030 and the guide roller 3032 to predetermined values.

Further, the second groove 3054 is provided on the side of the back face 3049b of the die plate 3049, and therefore, the flange 3017 and the die plate 3049 are firmly pressed by being pinched by the circular cylinder roller 3040 and the guide roller 3032, further, a press force is not dispersed to other portion and there is not a stopper of restricting the press force and the press force is concentratedly operated to the flange 3017. Thereby, the flange 3017 is firmly bent.

Also with regard to the second hemming step, similar to the first hemming step, the hemming roller 3030 and the guide roller 3032 are moved on an accurate path along the second groove 3054 by the operation of the floating mechanism and the working is carried out over the entire length of the flange 3017.

At step S312, similar to step S308, the rod 3104 of the cylinder 3106 is retracted, and the distance between the hemming roller 3030 and the guide roller 3032 is slightly prolonged to be separated from the moving die 3018. Further, the hemming unit 3020 is temporarily separated from the moving die 3018.

At step S313, a processing of opening the moving die 3018 is carried out. That is, after changing the direction of the hemming unit 3020, the hemming unit is made to be proximate to the back face 3049b, the knob 3056 is grabbed by the chuck 3034, further, the opening/closing lever 3068 of the clamp mechanism 3058 is opened by driving to switch the control valve 3062.

A standby processing is carried out at step S314.

That is, the moving die 3018 is separated from the vehicle 3012 by moving the robot 3022 to a predetermined standby position.

The controller 3024 informs that the hemming working has normally been finished to the production control computer. The informed production control computer confirms that a condition is established for other requirement and drives the production line 3014 and carry the vehicle 3012 finished with the hemming working to a next step.

As described above, according to the hemming working method and the hemming working apparatus according to the second exemplary embodiment, the hemming unit 3020 including the hemming roller 3030 and the guide roller 3032 is supported by the robot 3022 displaceably in X direction constituting the direction of aligning the support shaft 3030a and the support shaft 3032a and in Y direction constituting the axial directions of the support shaft 3030a and the support shaft 3032a by way of the floating mechanism constituted by the linear guides 3112, 3130 and 3132, the first supporting means 3126, the second supporting means 3127 and the third supporting means 3138, and therefore, a performance of the guide rollers 3032 of following the first groove 3052 and the second groove 3054 in hemming working is significantly promoted, the hemming roller 3030 is made to be able to accurately follow the flange 3017, and a drawback that the guide roller 3032 rides over the first groove 3052 or the second groove 3054 can be avoided. Further, by the floating mechanism, even when there is more or less error in a locus of operating the robot 3022, the guide roller 3032 can be moved by accurately following the first groove 3052.

Therefore, the speed of rolling the hemming roller 3030 and the guide roller 3032 can be constituted by a high speed, and a time period of an operation required for hemming working can be shortened.

Furthermore, the hemming working apparatus 3010 includes the first stopper 3134 and the second stopper 3136 constituting the restricting means for restricting the floating mechanism, and therefore, the operation of the floating mechanism can be restricted in accordance with respective operation steps.

Therefore, by restricting the operation of the floating mechanism in positioning the hemming roller 3030 and the guide roller 3032, the hemming roller 3030 and the guide roller 3032 can accurately and swiftly be positioned in a state of being integrally fixed to the robot 3022 without bringing about rocking or rattling.

Further, according to the second exemplary embodiment, use or restriction of the floating mechanism in accordance with the respective operation steps can be selected integrally with an operation of extracting or an operation of retracting the rod 3014 of the cylinder 3106 of making the hemming roller 3030 and the guide roller 3032 proximate to each other and remote from each other. That is, in positioning the hemming roller 3030 and the guide roller 3032, by extending the rod 3104 for separating the hemming roller 3030 and the guide roller 3032, the first stopper 3134 and the second stopper 3136 are engaged and the floating mechanism is restricted. On the other hand, in hemming working, by retracting the rod 3104 for making the hemming roller 3030 and the guide roller 3032 proximate to each other, an engagement of the first stopper 3134 and the second stopper 3136 is disengaged, and the floating mechanism is operated. Therefore, according to the hemming working apparatus 3010, the use and the restriction of the floating mechanism are realized by a simple mechanism and simplification of the apparatus and the low cost formation can be carried out.

Further, according to the hemming working apparatus 3010, by using the small-sized and light weighted moving die 3018, hemming working can be carried out by bringing the moving die 3018 into contact with the vehicle 3012 carried on the production line 3014, and an exclusive space for hemming working is not needed. Further, hemming working is carried out in the production line 3014 similar to other assembling and working step, and therefore, a productivity is promoted by dispensing with time and labor of carrying the vehicle 3012 to other exclusive space only for the hemming working. Further, according to the hemming working apparatus 3010, working is carried out while bringing the moving die 3018 into contact with a working portion of the work, and therefore, the hemming working apparatus 3010 is applied regardless of the size of the work. The moving die 3018 is small-sized and light-weighted, and therefore, a plurality of pieces of the moving dies can be stored to the storing base 3026, storing and control thereof is simple and convenient, the robot 3022 can carry out hemming working by selecting the moving die 3018 in accordance with the vehicle kind, and a general purpose performance is promoted.

Furthermore, the hemming roller 3030 can be used both in the first roll hemming and the second roll hemming, and therefore, interchange of the roller is not needed. The first groove 3052 and the second groove 3054 are provided on the side of the back face 3049*b*, and therefore, in the second hemming step, the flange 3017 and the die plate 3049 can be pinched to press by the circular cylinder roller 3040 and the guide roller 3032.

Further, according to the hemming working apparatus 3010, one piece of the robot 3022 can be made to serve as the moving means of the moving die 3018 and the working means of the hemming working.

Further, the invention is not limited to the above-described embodiment but can naturally adopt various constitutions without deviating from the gist of the invention.

For example, although according to the second exemplary embodiment, in order to simplify the mechanism and the control, the operation of engaging the first stopper 3134 and the second stopper 3136 as means for restricting the floating mechanism is operated integrally with operations of making the hemming roller 3030 and the guide roller 3032 proximate to each other and remote from each other, the invention is not limited thereto but the restricting means may be constituted to operate separately from the operations of making the hemming roller 3030 and the guide roller 3032 proximate to each other and remote from each other to be controlled by the controller 3024 or the like.

Further, the first groove 3052 and the second groove 3054 are not necessarily limited to the groove shape so far as the guide roller 3032 is guided thereby, for example, a peripheral face of the guide roller 3032 may be provided with a ring-groove by constituting a projected rail (guide streak).

Further, the floating mechanism is applicable also to other than the hemming working apparatus using the guide roller 3032 as in the embodiment, for example, an apparatus of omitting the guide roller 3032 may be constructed by a constitution in which an upper end face of the second movable portion 3012 is arranged with the hemming roller 3030, the front end support member 3138 is extended to a lower side, and the rod 3104 of the cylinder 3106 is fixed to the front end support member 3118. Further, the floating mechanism can naturally be provided to operate to only either one of the side of the guide roller 3032 or the side of the hemming roller 3030 in accordance with a condition of using the hemming working apparatus or the like.

Although according to the hemming working apparatus 3010, an example of carrying out hemming working for the wheel arch portion 3016 of the left rear wheel of the vehicle 3012 is shown, the invention is not limited thereto but is naturally applicable to other portion by setting a corresponding moving die thereto. For example, as an applied portion of carrying out hemming working, a hem portion of a front wheel house, a hem portion of a door, a hem portion of a bonnet and a hem portion of a trunk and the like in the vehicle 3012 can be pointed out. Further, roll hemming is not limited to a case of folding to bend one sheet of a thin plate but, for example, an end portion of an inner panel constituting a thin plate provided separately may be pinched by folding to bend the flange 3017.

<Third Exemplary Embodiment>

Figure 37:
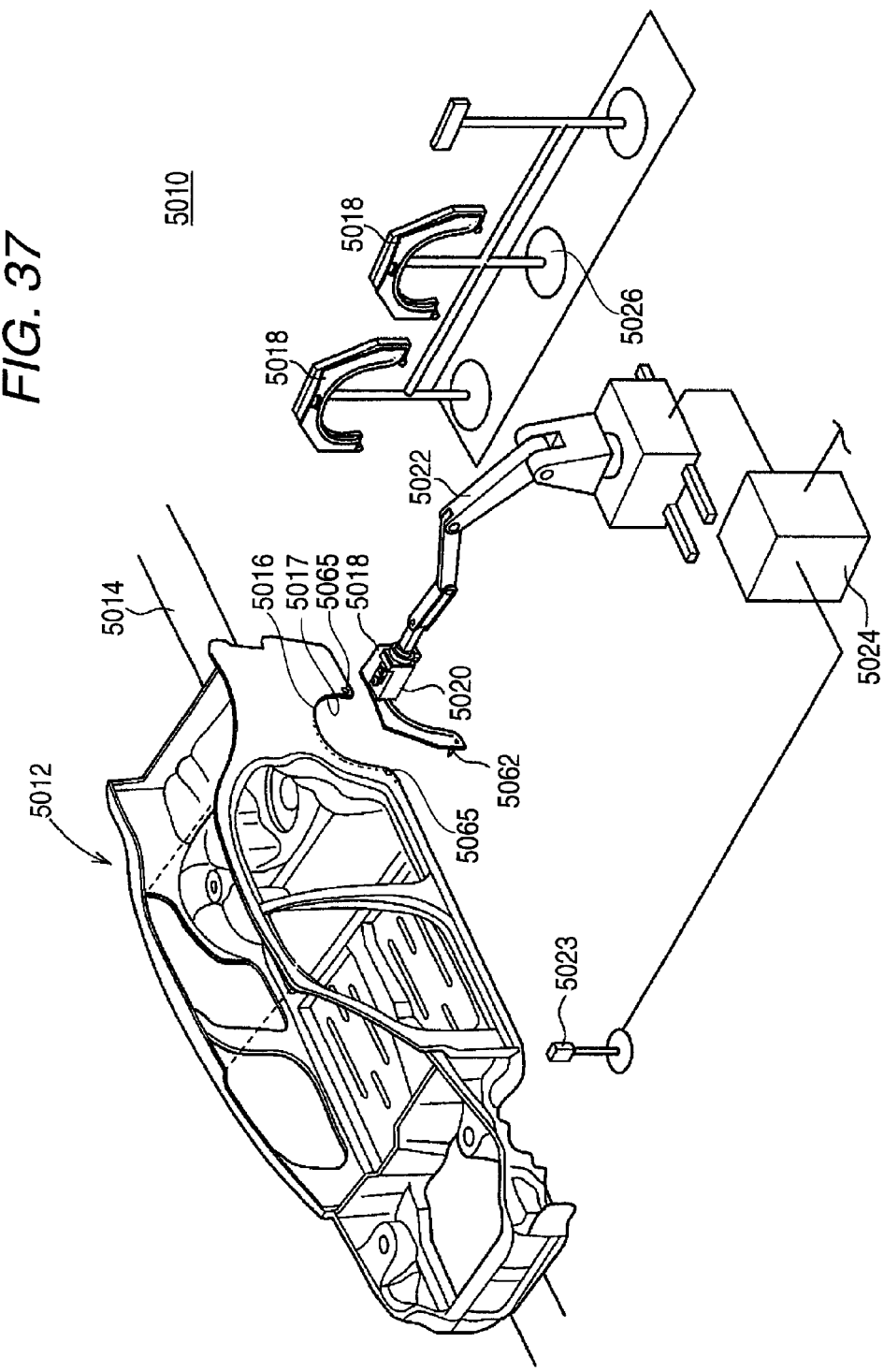
FIG. 37 is a perspective view of a hemming working apparatus according to a third exemplary embodiment.

As shown by FIG. 37, a hemming working apparatus 5010 according to a third exemplary embodiment is an apparatus set to a middle step of a production line 5014 for assembling and working a vehicle (work) 5012 in a so-to-speak white body state for carrying out roll hemming working for a flange 5017 of a wheel arch portion 5016 on a left rear wheel side. The wheel arch portion 5016 is constituted by a shape of substantially a circular arc of 180°. Before a state of working by the hemming working apparatus 5010, the flange 5017 is constituted by a shape of being bent by 90° from an end portion 5016*a* (refer to FIG. 42) of the wheel arch portion 5016 to an inner side.

The hemming working apparatus 5010 includes a moving die 5018 brought into contact with the wheel arch portion 5016 of the vehicle 5012 constituting a work, a robot 5022 moving the moving die 5018 and including a hemming unit 5020 at a front end thereof, a photoelectric sensor 5023 for detecting that the vehicle 5012 is carried to a predetermined position of the production line 5014, and a controller 5024 for carrying out a comprehensive control.

The robot 5022 is of an industrial articulated type and can move the hemming unit 5020 to an arbitrary position and in an arbitrary attitude by a programmed operation. A vicinity of the robot 5022 is provided with a storing base 5026 arranged with a plurality of kinds of the moving dies 5018 in accordance with a kind of the vehicle 5012, a position data of the moving base 5016 is stored to the controller 5024. The controller 5024 is connected to an external production control computer (not illustrated) for controlling an operation of the production line 5014 and information indicating the kind or the like of the vehicle 5012 carried on the production line 5014 is supplied to the controller 5024.

Figure 38:
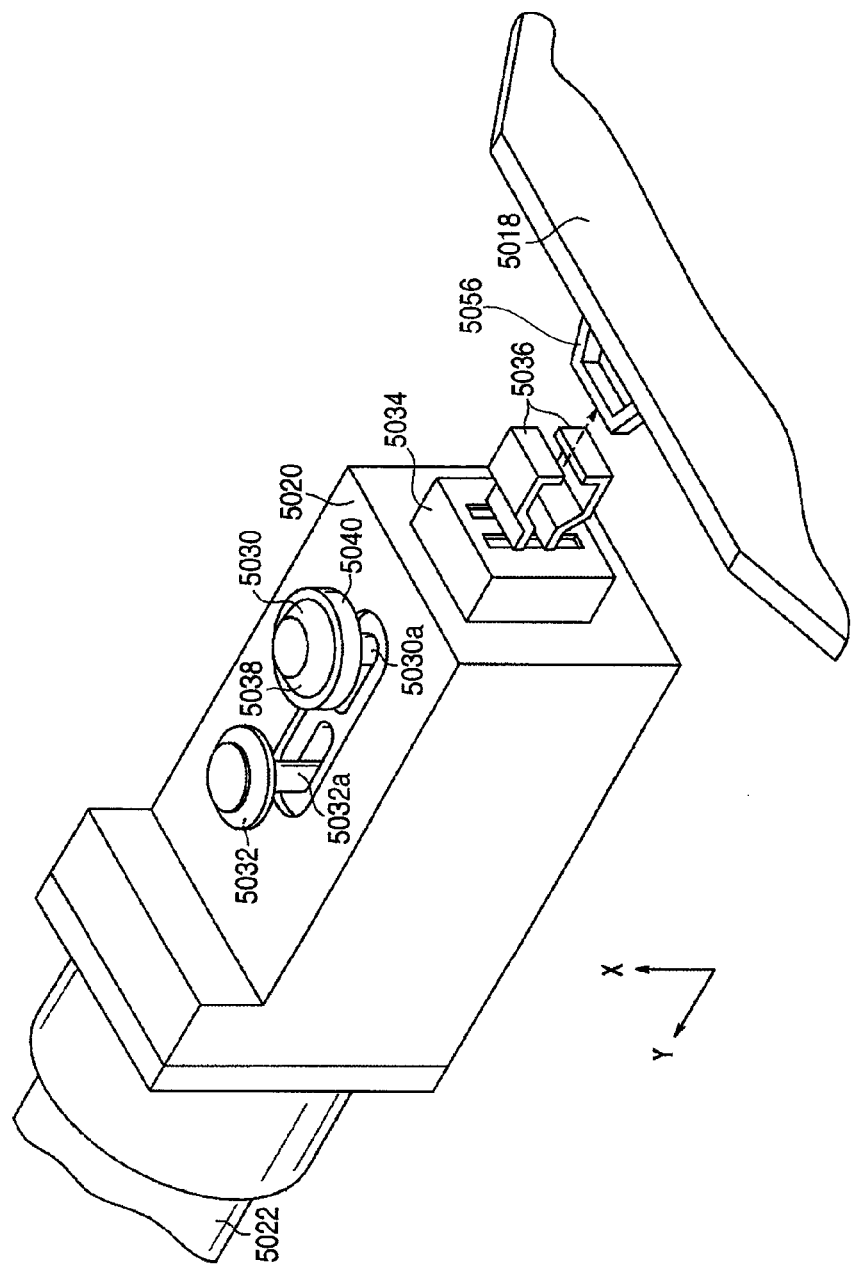
FIG. 38 is a perspective view of a hemming unit provided at a front end of a robot of the hemming working apparatus according to the third exemplary embodiment.

As shown by FIG. 38, the hemming unit 5020 includes a hemming roller 5030 and a guide roller 5032 provided to project from an end face thereof, and a chuck 5034 provided at a side face portion. The chuck 5034 includes a pair of fingers 5036 opened and closed under operation of the controller 5024 and is used for moving the moving die 5018.

The hemming roller 5030 and the guide roller 5032 are axially supported rotatably by support shafts 5030*a* and 5032*a*. Further, the hemming roller 5030 and the guide roller 5032 are made to be movable in Y direction (direction of aligning the support shafts 5030*a* and 5032*a*), an interval between the support shaft 5030*a* and the support shaft 5032*a* is adjusted, and a member pinched by the hemming roller 5030 and the guide roller 5032 can be pressed. Further, the hemming roller 5030 and the guide roller 5032 are constituted by a so-to-speak floating structure, movable in Y direction and X direction (axial directions of the support shafts 5030*a* and 5032*a*) while maintaining positions thereof relative to each other, and moved drivenly and elastically by an external force. Further, the support shaft 5030*a* and the support shaft 5032*a* are made to be comparatively movable in X direction and Y direction while maintaining the adjusted interval.

The hemming roller 5030 is constituted by a taper roller 5038 provided on a front end side and a circular cylinder roller 5040 provided on a base end side by a structure integral with the taper roller 5038. The taper roller 5038 is a frustum of a circular cone in a converging shape of being inclined by 45° in a side view thereof and an edge line length L1 (refer to FIG. 42) is set to be slightly longer than the height H (refer to FIG. 6) of the flange 5017. The circular cylinder roller 5040 is constituted by a shape of a circular cylinder having a diameter slightly larger than a maximum diameter portion on a base end of the taper roller 5038, and a height L2 in the axial direction (refer to FIG. 42) is sufficiently large in correspondence with the height H of the flange 5017.

The guide roller 5032 is constituted by a shape of a circular disk a surrounding of which is set to a narrow width and is made to be engageable with a first groove (guide portion) 5052 or a second groove (guide portion) 5054 (refer to FIG. 6) provided at the moving die 5018.

Figure 39:
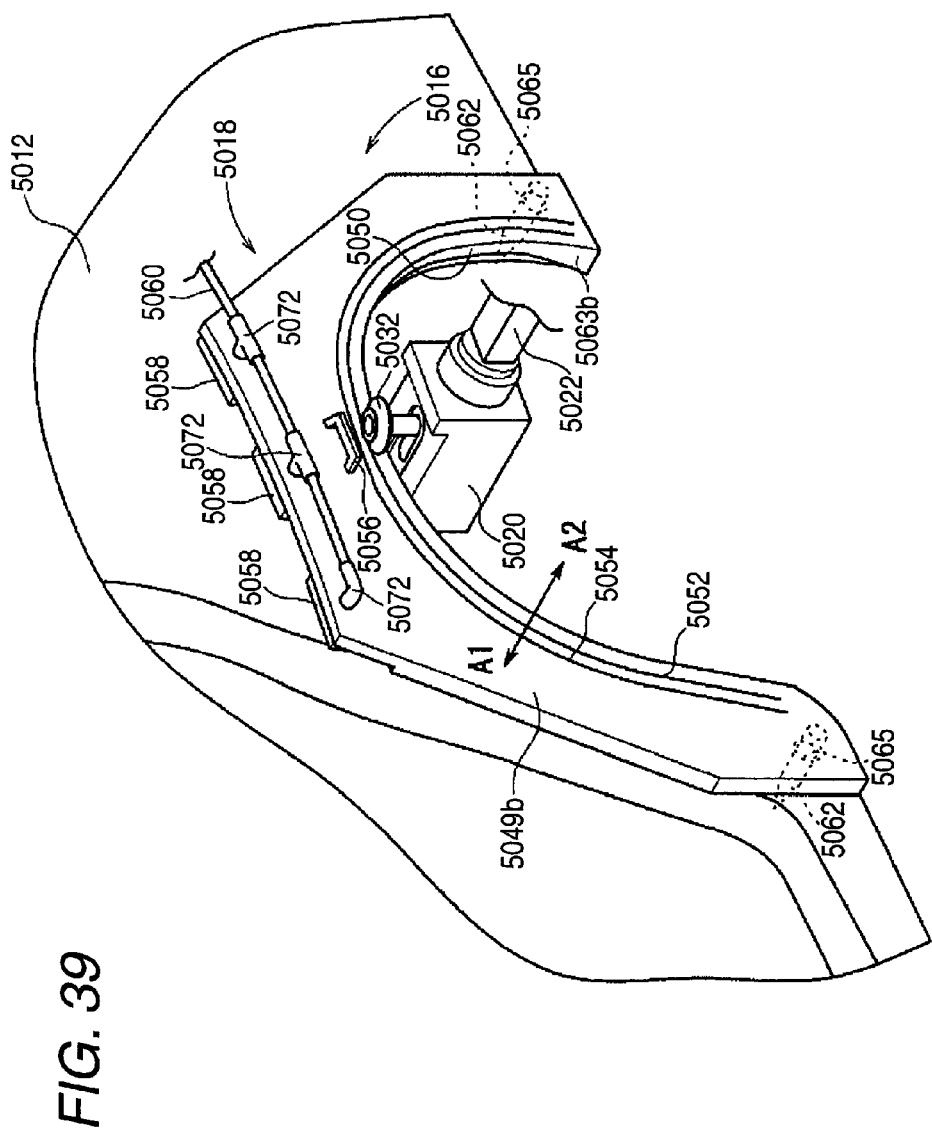
FIG. 39 is a perspective view of a moving die fixed to a wheel arch portion.
Figure 40:
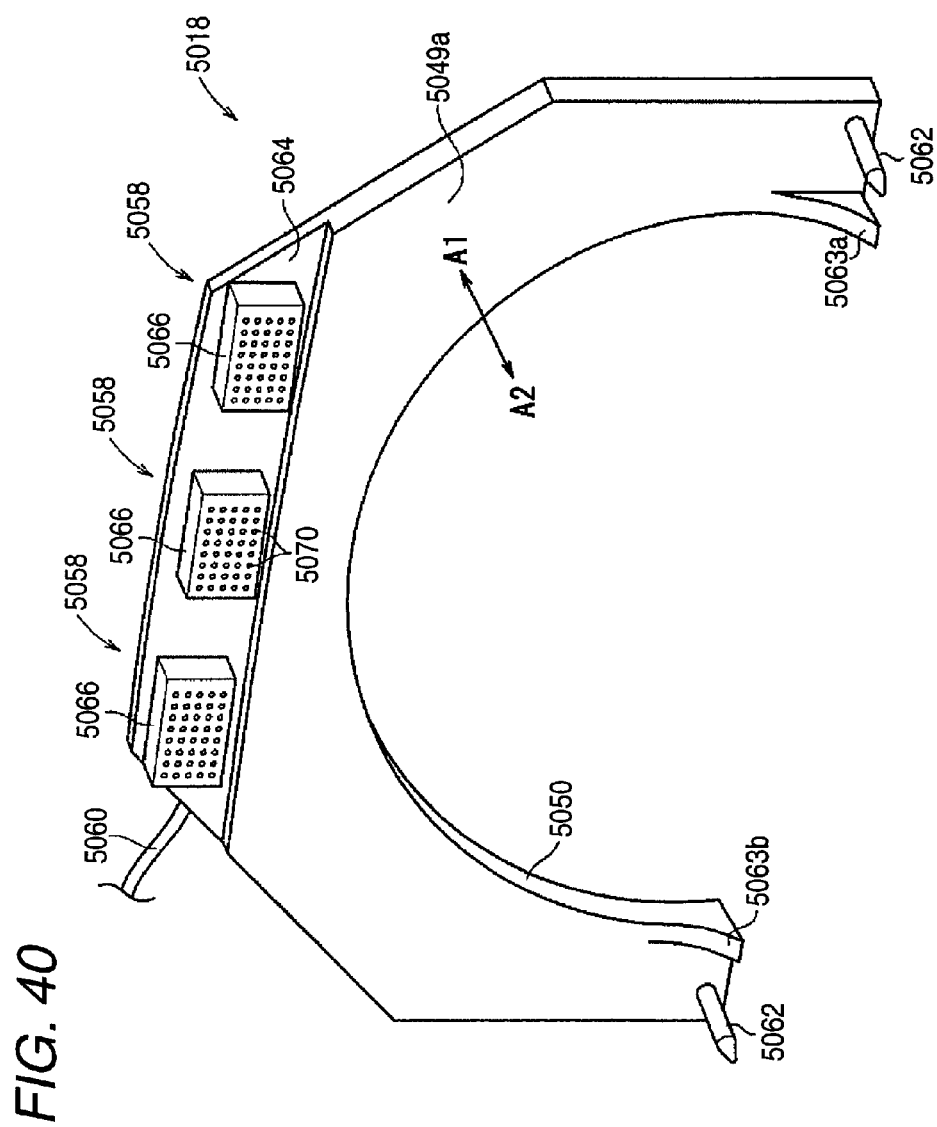
FIG. 40 is a perspective view of the moving die viewed from a surface side.

As shown by FIG. 39 and FIG. 40, the moving die 5018 is constituted by constituting a base by a die plate 5049. The die plate 5049 is constituted by a shape of a plate, a side thereof brought into contact with the wheel arch portion 5016 is referred to as a surface 5049a and a face thereof on a side opposed thereto is referred to as a back face 5049b to be differentiated from each other. Further, a work side in view from the end portion 5016a of the wheel arch portion 5016 is referred to as an inner side (arrow mark A1 side) and a side opposed thereto is referred to as an outer side (arrow mark A2 side) to be differentiated from each other.

The die plate 5049 is constituted by a shape of a plate in an arch shape the surface 5049a of which is brought into contact with a surrounding of the wheel arch portion 5016, and the surface 5049a is set to a three-dimensional curved face in conformity with the surface shape of the vehicle 5012. Therefore, when the moving die 5018 is attached to the wheel arch portion 5016, the first groove 5052 and the second groove 5054 and the flange 5017 are arranged in parallel, and the surface 5049a is brought into face contact with the vehicle 5012 by a wide area.

The moving die 5018 includes an outer side circular arc portion 5050 formed along a slightly outer side of the end portion 5016a of the wheel arch portion 5016, the first groove 5052 and the second groove 5054 provided along the outer side circular arc portion 5050 at the back face 5049a, a knob 5056 provided at the back face 5049b, three adsorbing mechanisms (mounting means) 5058 aligned to be provided at an upper portion, and a pipe 5060 for sucking air by way of the sucking mechanism 5058. The first groove 5052 is provided on an outer side of being projected from the end portion 5016a of the flange 5017 on the die plate 5049, and the second groove 5054 is provided on an inner side of the end portion 5016a. Further, the moving die 5018 includes two pieces of positioning pins 5062 respectively projected from both ends of a lower portion, and inclined portions (distance restricting portions) 5063a and 5063b which become gradually high to the lower side. Highest portions of lower ends of the inclined portions 5063a and 5063b are set to be slightly higher than the height H of the flange 5017.

Further, means for mounting the moving die 5018 to the wheel arch portion 5016 is not limited to the adsorbing mechanism 5058 but a clamp mechanism or the like for grabbing a predetermined portion of the vehicle 5012 by a lever or the like may be used and both of the clamp mechanism or the like and the adsorbing mechanism 5058 may be used.

The positioning pin 5062 is set to a diameter capable of being inserted into a positioning hole 5065 (refer to FIG. 37) of the vehicle 5012, and a front end thereof is contracted in a taper shape to facilitate insertion. Further, the moving die 5018 is supported and fixed mainly by the adsorbing mechanism 5058, and therefore, the positioning pin 5062 is sufficiently constituted by a slender diameter without needing strength for supporting a self weight of the moving die 5018.

Figure 42:
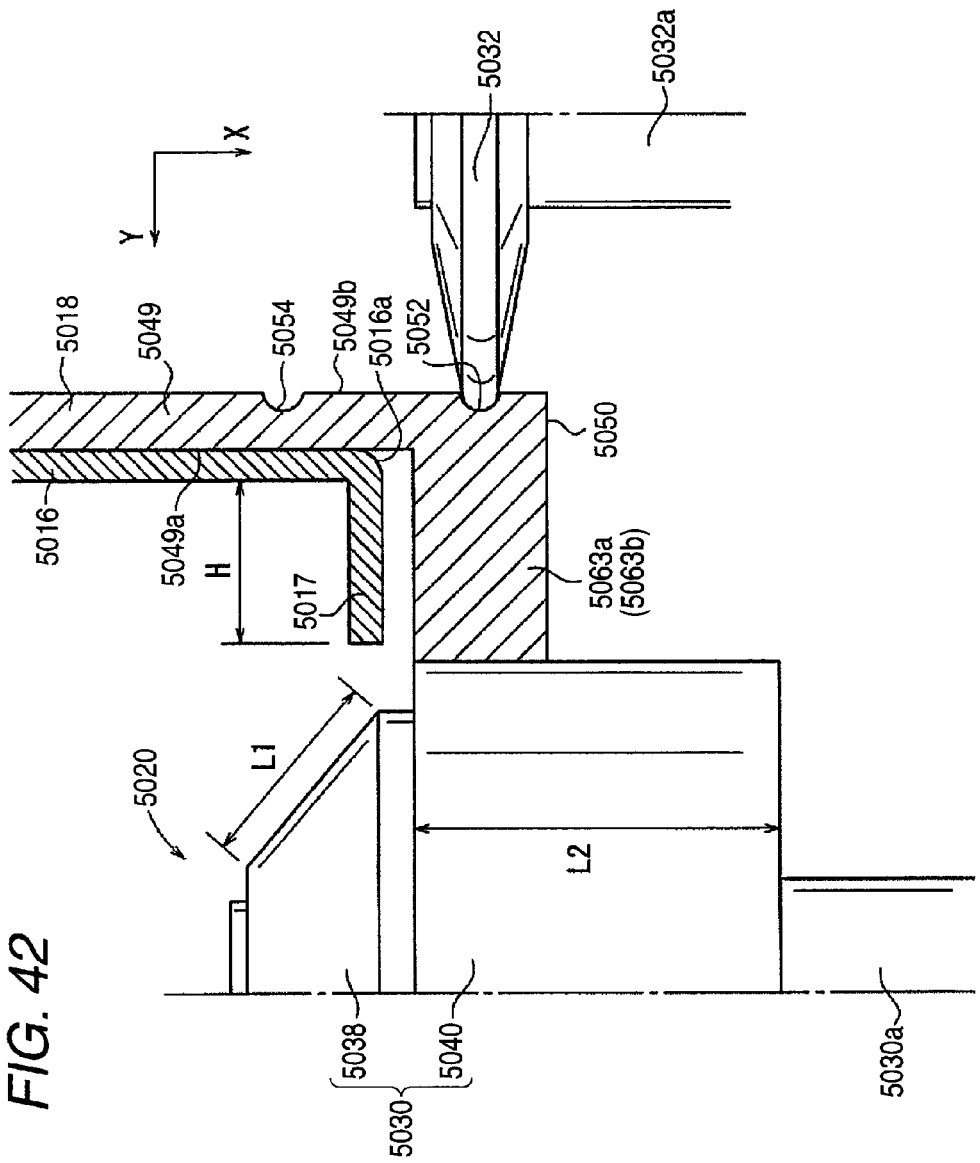
FIG. 42 is a sectional side view of a flange, a hemming unit and a moving die when a hemming unit is disposed at an end portion of the flange at a first hemming step.

One side faces of the inclined portions 5063a and 5063b are constituted by faces the same as the outer side circular arc portion 5050, and other side faces thereof are formed to constitute positions proximate to the flange 5017 (refer to FIG. 42). Inclined faces of the inclined portions 5063a and 5063b are constituted by gradually curved faces, and upper end portions of the inclined portions 5063a and 5063b are smoothly connected to the surface 5049a.

Figure 41:
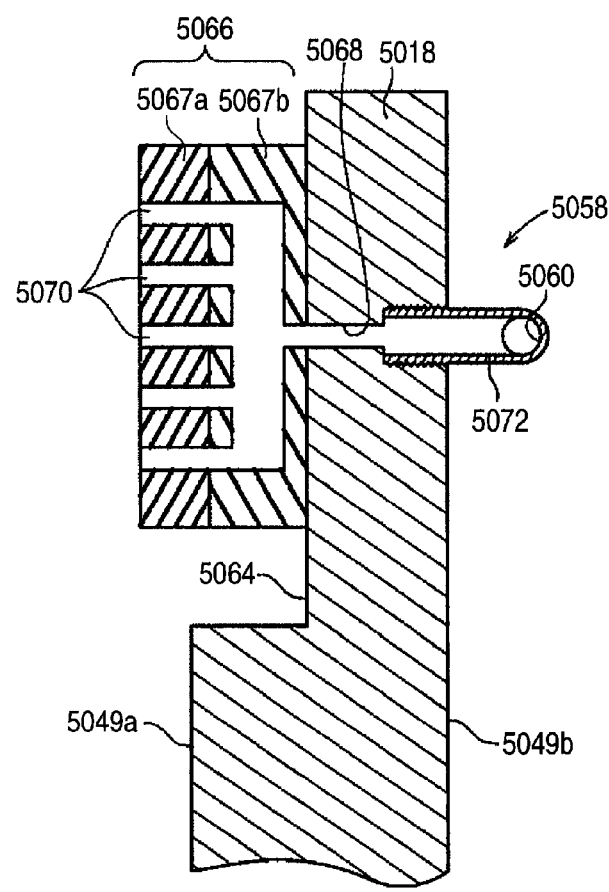
FIG. 41 is a sectional side view of the adsorbing mechanism.

As shown by FIG. 41, the adsorbing mechanism 5058 includes a gripper 5066 provided at a lower stage portion 5064 constituted by slightly machining the surface 5049a, and a sucking port 5068 communicated with a griper 5066. The gripper 5066 is constituted by a two layers structure of an adsorbing portion 5067a of an elastic member (for example, rubber, sponge or the like) and a base portion 5067b harder than the adsorbing portion 5067a, and the base portion 5067b is fixed to the lower stage portion 5064. The gripper 5066 is slightly projected from the surface 5049a.

The gripper 5066 is provided with a number of horizontal holes 5070 at a surface thereof. The horizontal holes 5070 are gathered at the base portion 5067b and communicated with the sucking port 5068. The sucking port 5068 is connected to the pipe 5060 by a joint 5072.

According to the adsorbing mechanism 5058, by sucking air from the pipe 5060, an adsorbing operation of sucking air from respective horizontal holes 5070 is achieved, the gripper 5066 can be adsorbed to the surface of the wheel arch portion 5016, and the moving die 5018 is fixed. At this occasion, the adsorbing portion 5067a of the gripper 5066 is slightly compressed elastically to be adsorbed. For sucking air of the pipe 5060, an ejector, a vacuum pump or the like may be used.

The moving die 5018 is brought into contact with only a surrounding of the wheel arch portion 5016, and therefore, the moving die 5018 is small-sized. Further, the moving die 5018 is set to be light-weighted since the moving die 5018 is not applied with the weight of the vehicle 5012 and there is not constituted a load resistant structure because the moving die 5018 is brought into contact with the vehicle 5012 from a side face thereof. Therefore, the moving die 5018 is made to be movable simply and conveniently by the robot 5022 by grabbing the knob 5056 by the chuck 5034 and can be adsorbed by the adsorbing mechanism 5058.

When the moving die 5018 is fixed to the wheel arch portion 5016 by the adsorbing mechanism 5058 in a state of being positioned by the positioning pin 5062, as shown by FIG. 42, the outer side circular arc portion 5050 is arranged on an outer side (lower side of FIG. 42) of the end portion 5016a of the wheel arch portion 5016. The first groove 5052 is arranged slightly on an outer side of the end portion 5016a, and the second groove 5054 is arranged on an inner side of the end portion 5016a. The first groove 5052 and the second groove 5054 are arranged in parallel with each other along the end portion 5016a.

Figure 43:
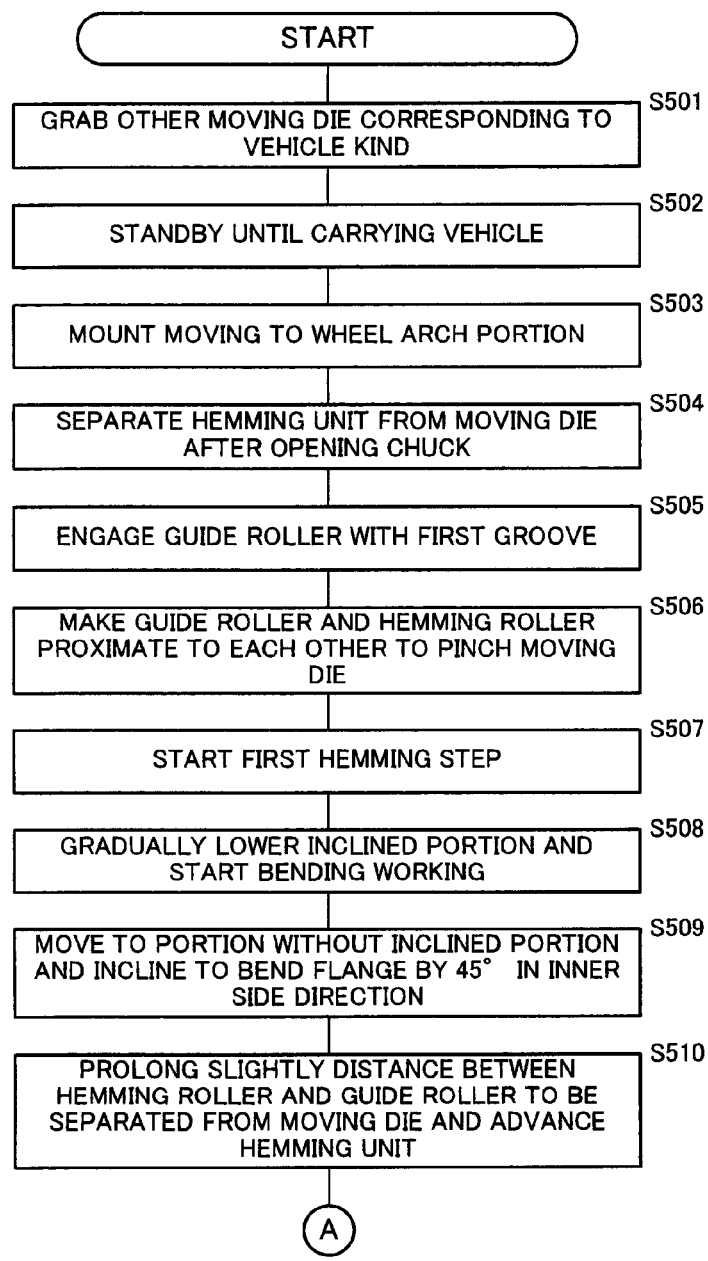
FIG. 43 is a flowchart (part 1) showing a procedure of a hemming working method by the hemming working apparatus according to the third exemplary embodiment.
Figure 44:
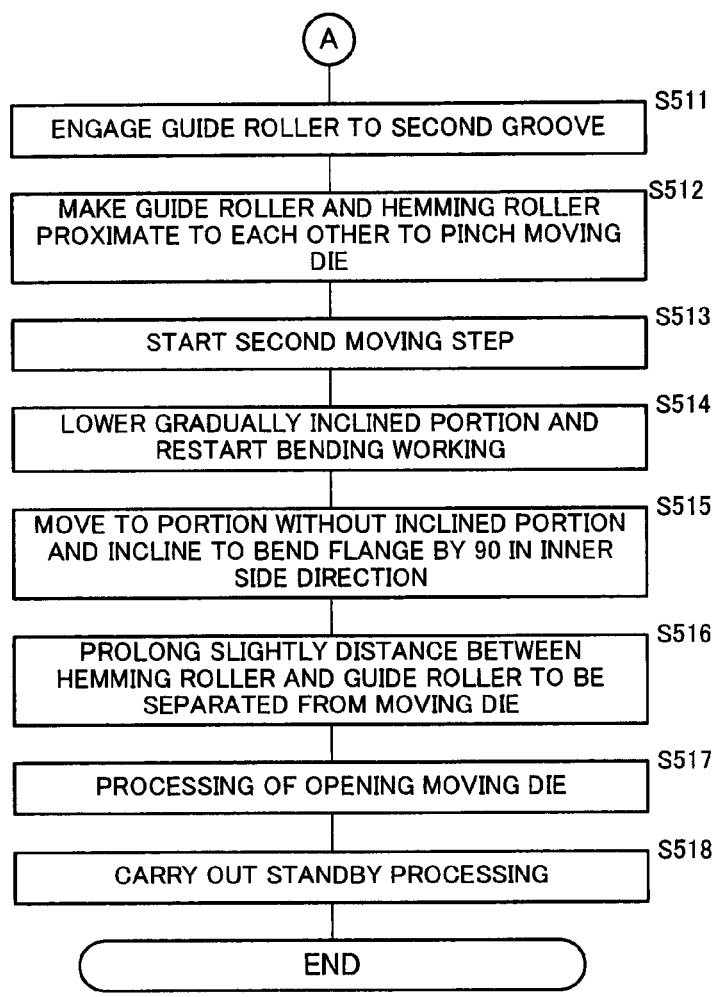
FIG. 44 is a flowchart (part 2) showing the procedure of the hemming working method by the hemming working apparatus according to the third exemplary embodiment.

Next, an explanation will be given of a working method for carrying out roll hemming working for the flange 5017 of the wheel arch portion 5016 by using the hemming working apparatus 5010 constituted as described above in reference to FIG. 43 and FIG. 44. Processings shown in FIG. 43 and FIG. 44 are carried out by the moving die 5018, the hemming unit 5020 and the robot 5022 mainly under the control by the control 5024.

First, at step S501, after confirming information of a vehicle kind of the vehicle 5012 successively carried from the production control computer, the robot 5028 returns the currently grabbed moving die 5018 to a rectified position of the storing base 5026 and grabs other moving die 5018 in correspondence with the vehicle kind by the chuck 5034. When the corresponding moving die 5018 has been held, the hold and switch operation is not needed, further, when a plurality of pieces of the vehicles 5012 of the same vehicle kind are continuously carried, it is not naturally necessary to hold and change the moving die 5018.

At step S502, the operation is at standby until the vehicle 5012 is carried by confirming a signal of the photoelectric sensor 5023. The vehicle 5012 is carried by the production line 5014 and is stopped at a vicinity of the robot 5022. The operation proceeds to step S503 at a time point of confirming carrying of the vehicle 5012 by the photoelectric sensor 5023.

At step S503, the moving die 5018 is mounted to the wheel arch portion 5016. That is, the moving die 5018 is moved by operating the robot 5022, positioning in a vertical and horizontal directions is carried out by inserting the positioning pin 5062 into the positioning hole 5065 of the vehicle 5012, thereafter, the moving die 5018 is further advanced and the gripper 5066 is brought into light contact with a surface of the vehicle 5012.

Further, a force of the robot 5022 for holding the moving die 5018 is reduced, the moving die 5018 is made to be elastically displaceable relative to the vehicle 5012, thereafter, air is sucked from the pipe 5060 and the surface 5049a of the moving die 5018 is brought into contact with the vehicle 5012 by the adsorbing mechanism 5058. Thereby, the moving die 5018 is attached to the wheel arch portion 5016 to be accurately positioned to be fixed.

At step S504, after opening the fingers 5036 of the chuck 5034, the robot 5022 and the hemming unit 5020 are detached from the moving die 5018. At this occasion, the moving die 5018 is fixed to the vehicle 5012 by the adsorbing mechanism 5058 provided integrally therewith, and therefore, even when the chuck 5034 is detached, the chuck 5034 is not dropped, or a position thereof is not shifted.

At step S505, after changing the direction of the hemming unit 5020, the unit is made to be proximate to the outer side circular arc portion 5050 of the moving die 5018, and the guide roller 5032 is engaged with the first groove 5052.

At step 506, the guide roller 5032 and the hemming roller 5030 are made to be proximate to each other, and as shown by FIG. 42, the moving die 5018 is pinched by the guide roller 5032 and the circular cylinder roller 5040. At this occasion, a front end side of the circular cylinder roller 5040 is brought into contact with a lower end portion of the inclined portion 5063a and the taper roller 5038 is separated from the flange 5017.

At step S507, a first hemming step is started by rolling the guide roller 5032 while engaging the guide roller 5032 with the first groove 5052. At an initial time point of the first hemming step, the flange 5017 is not bent since the taper roller 5038 is separated therefrom.

Figure 45:
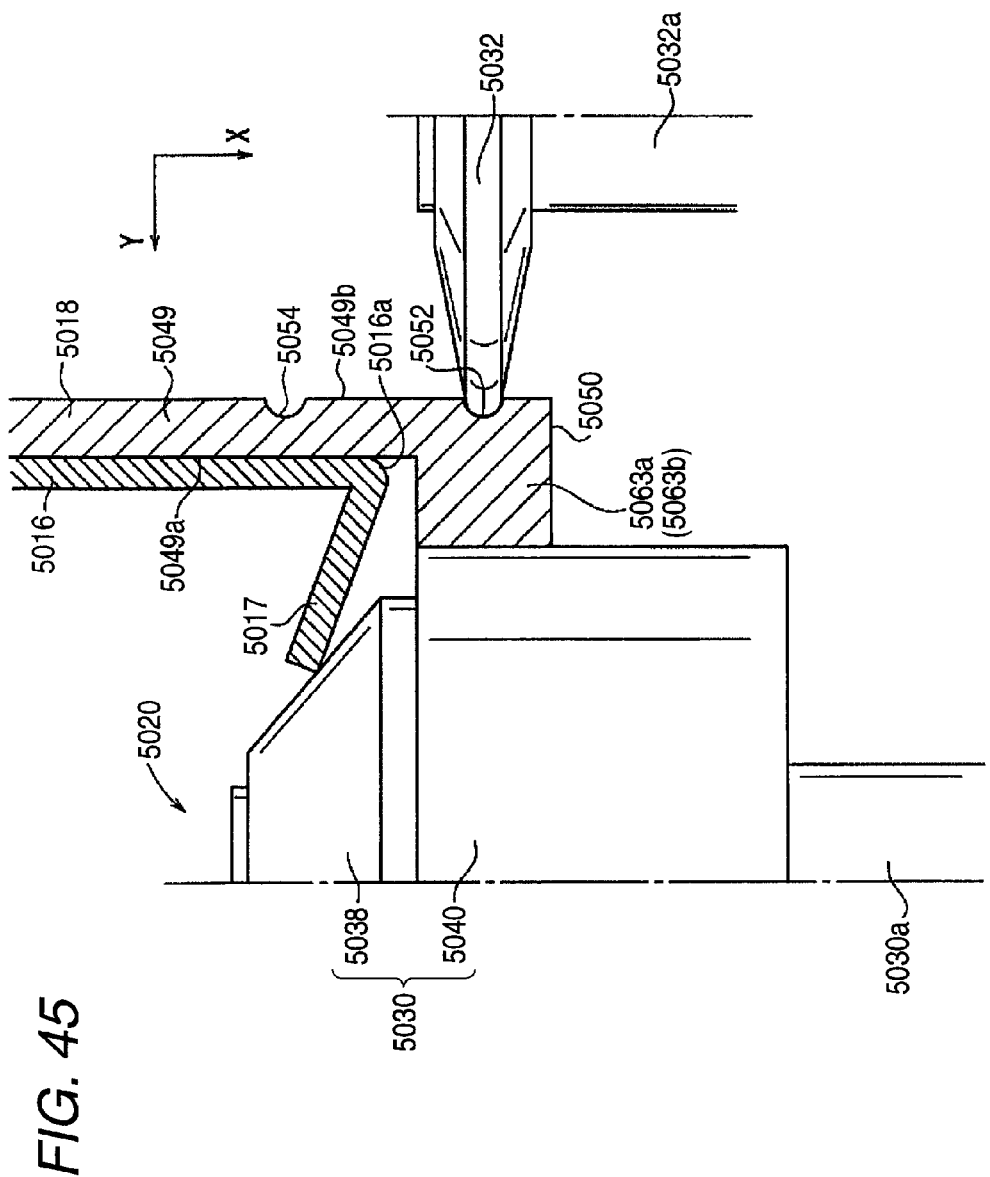
FIG. 45 is a sectional side view of a flange, a hemming unit and a moving die when a hemming unit is disposed at a position slightly moved from an end portion of the flange at the first hemming step.

At step S508, when the guide roller 5032 is rolled while being engaged with the first groove 5052 and the circular cylinder roller 5040 is continued to be rolled while being brought into contact with the inclined portion 5063a, the inclined portion 5063a is gradually lowered, and therefore, as shown by FIG. 45, bending working is started by bringing the taper roller 5038 into contact with an end portion of the flange 5017. The inclined portion 5063a is further lowered in accordance with moving the hemming unit 5020, and therefore, an angle of bending the flange 5017 gradually becomes a steep angle. In this way, the inclined portion 5063a (and 5063b) is operated as a kind of a cam for pertinently restricting a distance between the surface 5049a and the circular cylinder roller 5040 in accordance with a portion to be worked.

Figure 46:
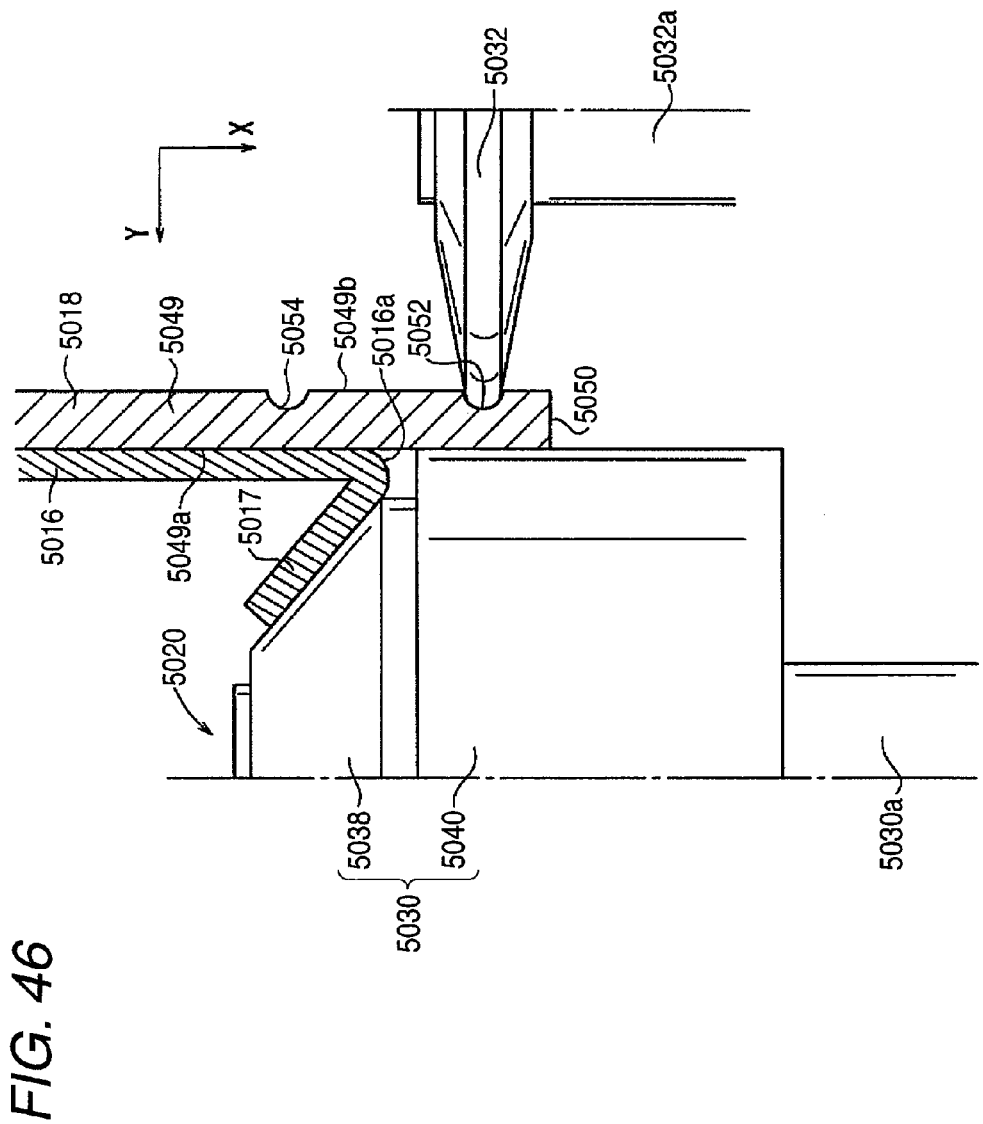
FIG. 46 is a sectional side view of the flange, the hemming unit and the moving die when the hemming unit is disposed at a center portion of the flange at the first hemming step.

At step S509, when the hemming unit 5020 is moved to a portion at which the inclined portion 5063a is not present, as shown by FIG. 46, substantially a total of an edge line of the side face of the taper roller 5038 is brought into contact with the side face of the flange 5017 to incline to bend the flange 5017 in an inner side direction by 45°.

That is, the first hemming step is carried out by rolling the hemming roller 5030 and the guide roller 5032 while being rotated in directions reverse to each other and continuously bending the flange 5017 by a conical face of the taper roller 5038. At this occasion, the hemming roller 5030 and the guide roller 5032 are constituted by the floating structure, and therefore, the hemming roller 5030 and the guide roller 5032 are displaceable in X direction and Y direction while maintaining positions thereof relative to each other and even when there is more or less error in the locus of operating the robot 5022, the guide roller 5032 can be moved by accurately following the first groove 5052.

Figure 47:
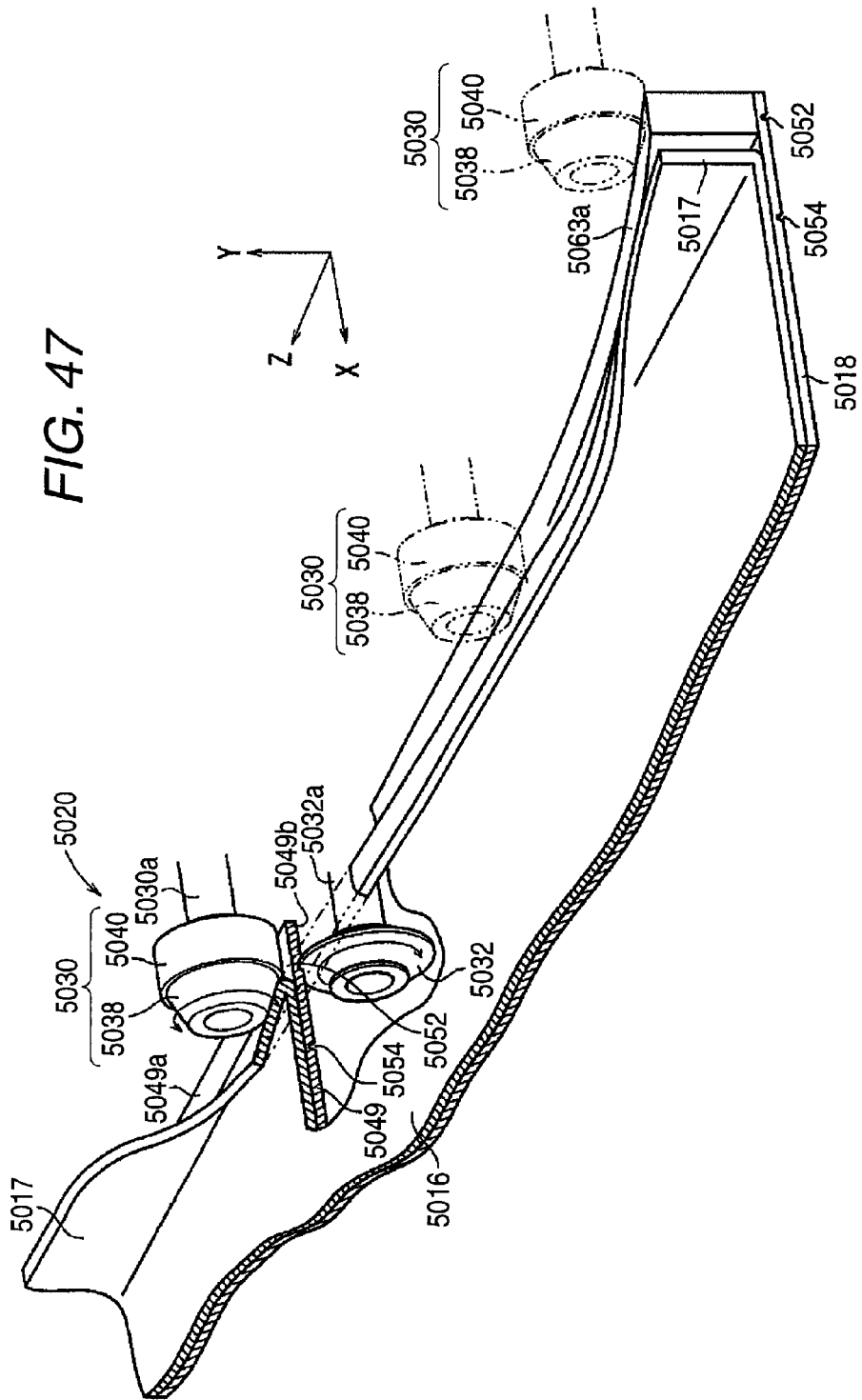
FIG. 47 is a partially sectional side view of a wheel arch portion of a vehicle, a hemming roller and a guide roller in carrying out the first hemming step.

In this way, as shown by FIG. 47, the end portion of the flange 5017 maintains a state of being erected relative to the face of the wheel arch portion 5016 by 90° without being worked, the folding to bend angle becomes gradually steep along the direction of extending the flange 5017 and the flange 5017 is folded to bend substantially by 45° at the portion at which the inclined portion 5063a is not present.

Further, at other end portion of the flange 5017, the circular cylinder roller 5040 rides over the inclined face of the inclined portion 5063b and the taper roller 5038 is gradually separated from the flange 5017 although a detailed explanation thereof will be omitted. Therefore, similar to the end portion on the side of starting working, the flange 5017 is worked such that the fold-to-bend angle becomes steep gradually along an extending direction.

Figure 48:
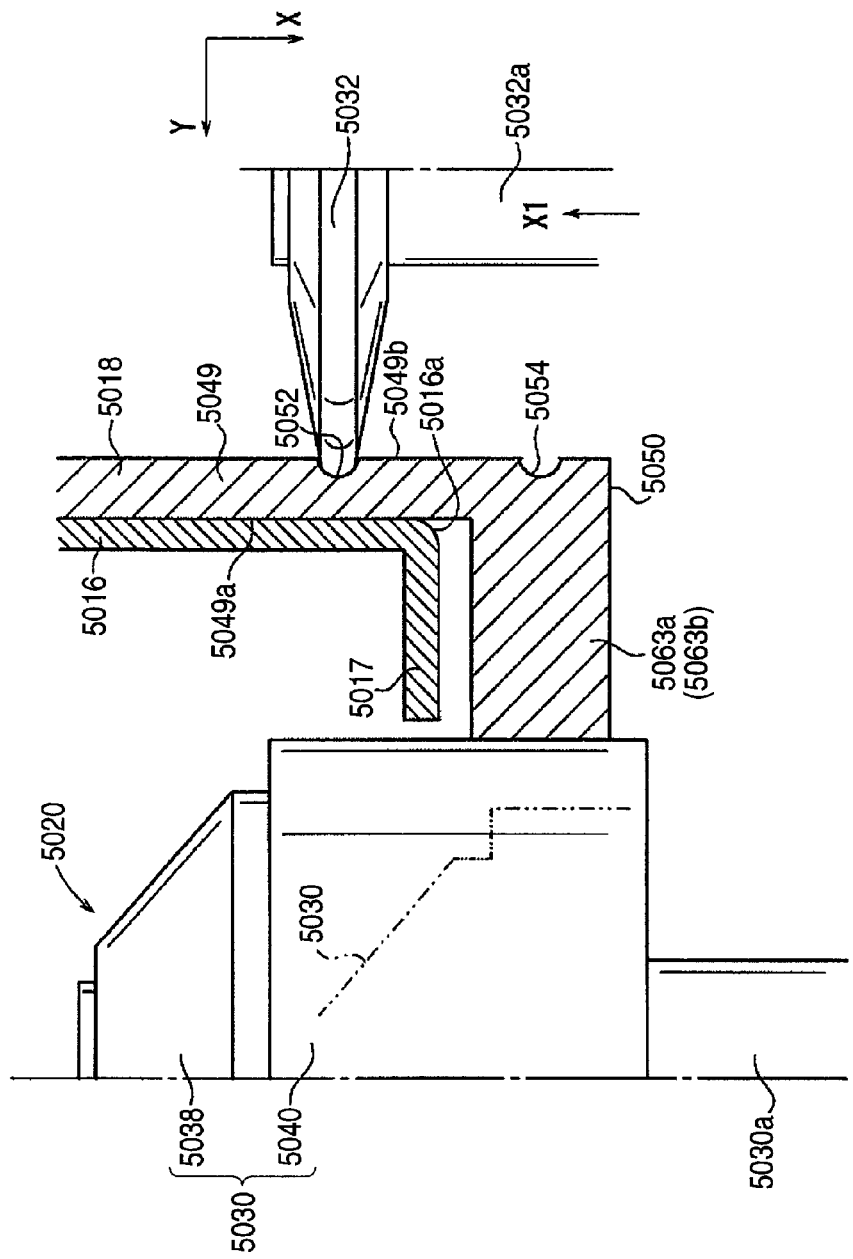
FIG. 48 is a sectional side view of the flange, the hemming unit and the moving die when the hemming unit is disposed at an end portion of the flange at a second hemming step.

At step S510, as shown by a two-dotted chain line of FIG. 48, a distance between the hemming roller 5030 and the guide roller 5032 is made to be slightly prolonged to be remote from the moving die 5018, further, by advancing the hemming unit 5020, the hemming roller 5030 and the guide roller 5032 are advanced in an arrow X1 direction. The advancing distance is a distance equal to a distance between the first groove 5052 and the second groove 5054.

At step S511 of FIG. 44, as shown by FIG. 48, the guide roller 5032 is engaged with the second groove 5054.

At step S512, the guide roller 5032 and the hemming roller 5030 are made to be proximate to each other, and the moving die 5018 is pinched to press by the guide roller 5032 and the circular cylinder roller 5040. At this occasion, a base end side of the circular cylinder roller 5040 is brought into contact with the lower end portion of the inclined portion 5063b and the taper roller 5038 is separated from the flange 5017.

At step S513, a second hemming step is started by rolling the guide roller 5032 while engaging the guide roller 5032 with the second groove 5054. At an initial time point of the second hemming step, the flange 5017 is not bent since the taper roller 5038 is separated therefrom.

Figure 49:
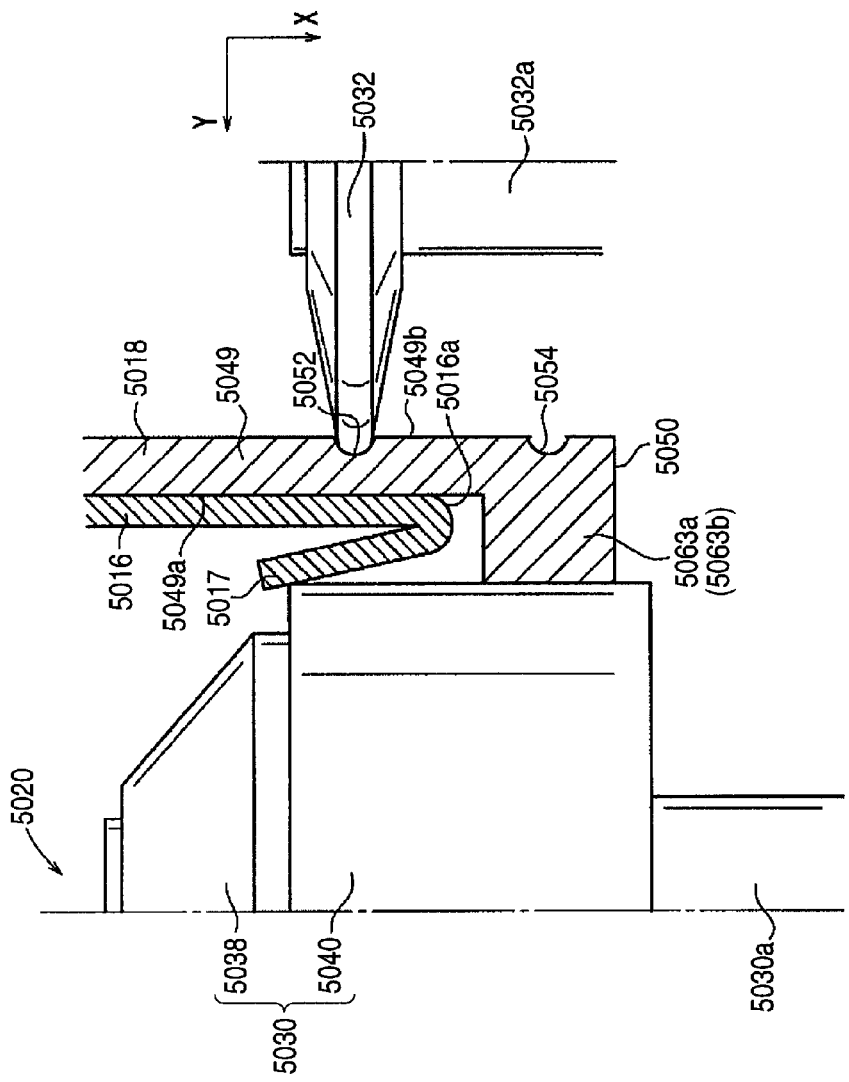
FIG. 49 is a sectional side view of the flange, the hemming unit and the moving die when the hemming unit is disposed at a position slightly moved from the end portion of the flange at the second hemming step.

At step S514, when the guide roller 5032 is rolled while being engaged with the second groove 5054 and the circular cylinder roller 5040 is continued to be rolled while being brought into contact with the inclined portion 5063b, since the inclined portion 5063b is gradually lowered, as shown by FIG. 49, the bending is started again by bringing the taper roller 5038 into contact with the end portion of the flange 5017. The inclined portion 5063b is further lowered in accordance with moving the hemming unit 5020, and therefore, an angle of bending the flange 5017 becomes a further steep angle.

Figure 50:
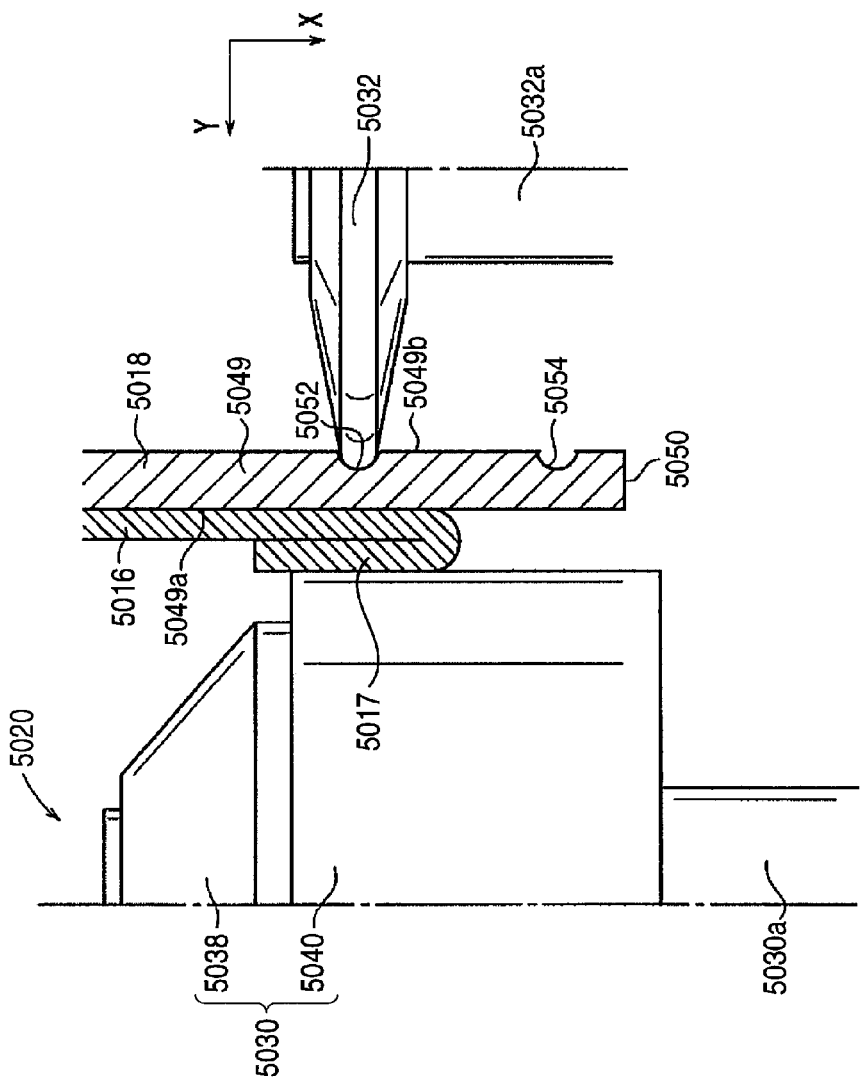
FIG. 50 is a sectional side view of the flange, the hemming unit and the moving die when the hemming unit is disposed at a center portion of the flange at the second hemming step.

At step S515, when the hemming unit 5020 is moved to a portion at which the inclined portion 5063b is not present, as shown by FIG. 50, the flange 5017 is pressed by the circular cylinder roller 5040 and is bent to be brought into contact with the face of the wheel arch portion 5016. That is, the flange 5017 is bent further by 45° from the first hemming step, or 90° from an initial angle.

The second groove 5054 is provided a side of the back face 5049b of the die plate 5049, and therefore, the flange 5017 and the die plate 5049 are firmly pressed by being pinched by the circular cylinder roller 5040 and the guide roller 5032, further, a press force is not dispersed to other portion and there is not a stopper for restricting the press force and the press force is concentratedly operated to the flange 5017. Thereby, the flange 5017 is firmly bent.

Figure 51:
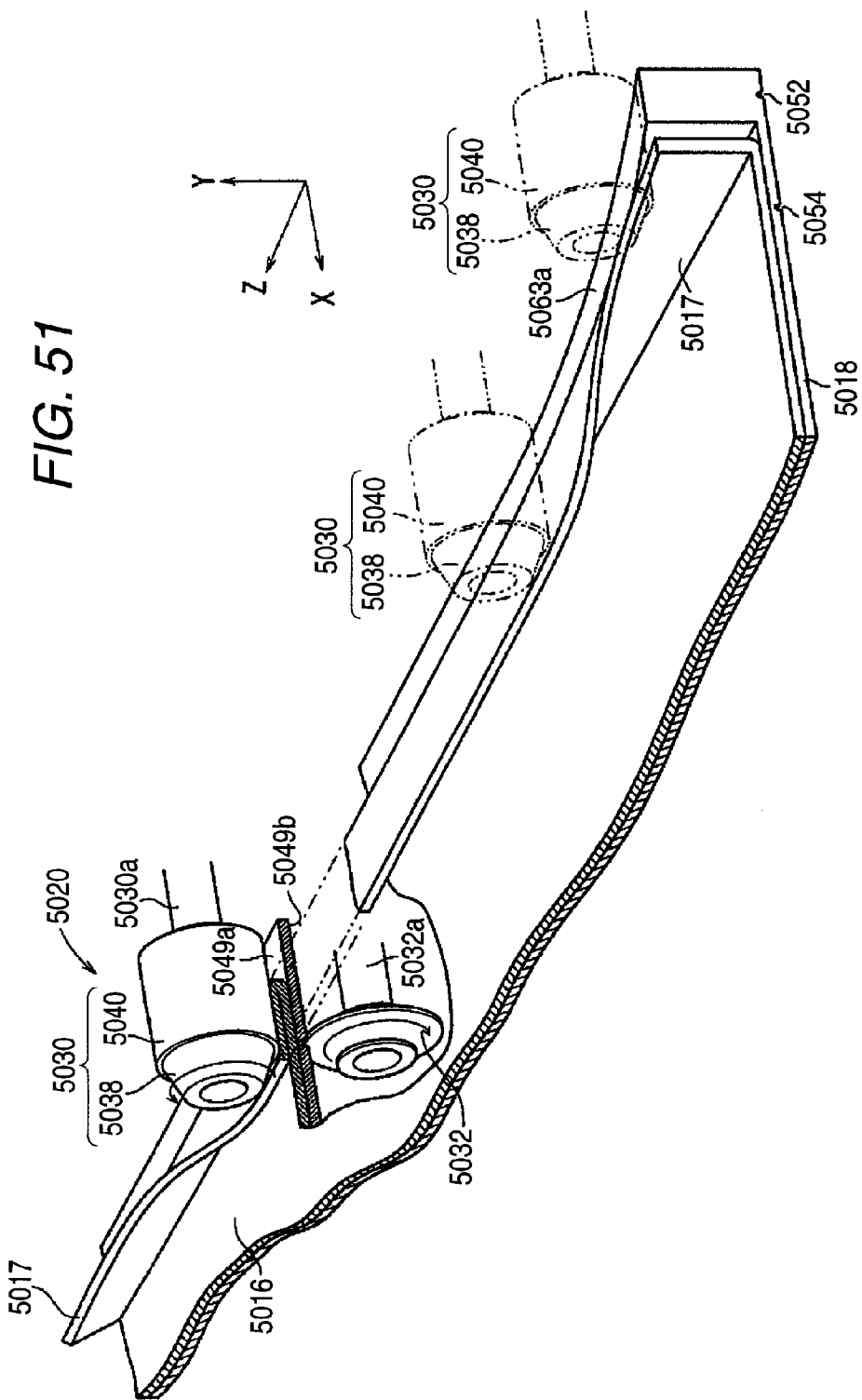
FIG. 51 is a partially sectional perspective view of the wheel arch portion of the vehicle, the hemming roller and the guide roller in carrying out a second hemming step.

In this way, as shown by FIG. 51, the hemming roller 5030 is rolled while being displaced in a direction (Y direction) orthogonal to a direction (Z direction) of extending the flange 5017 and the fold-to-bend angle of the flange 5017 can be adjusted in accordance with a portion to be worked. Therefore, an end portion of the flange 5017 is not worked and maintains a state of being erected by 90° relative to the face of the wheel arch portion 5016, the fold-to-bend angle becomes gradually steep along a direction of extending the flange 5017, and the flange 5017 is folded to bend substantially by 90° at the portion at which the inclined portion 5063*a* is not present. The fold-to-bend angle of the flange 5017 is gradually changed along the extending direction, and therefore, a stress is not locally concentrated or a work amount is not excessively large locally, and wrinkle or crack can be prevented from being brought about.

Further, at other end portion of the flange 5017, the circular cylinder roller 5040 rides over the inclined face of the inclined portion 5063*a* and the circular cylinder roller 5040 is gradually separated from the flange 5017, although a detailed explanation thereof will be omitted. Therefore, similar to the end portion in the working starting portion, the other end portion is worked such that the fold-to-bend angle becomes gradually steep along the extending direction.

At step S516, a distance between the hemming roller 5030 and the guide roller 5032 is slightly prolonged to be separated from the moving die 5018. The hemming unit 5020 is temporarily separated from the moving die 5018.

At step S517, a processing of opening the moving die 5018 is carried out. That is, after changing the direction of the hemming unit 5020, the hemming unit 5020 is made to be proximate to the back face 5049*b*, the knob 5056 is grabbed by the chuck 5034, further, sucking of the pipe 5060 is finished.

At step S518, a standby processing is carried out. That is, the robot 5022 is moved to a predetermined standby position and the moving die 5018 is separated from the vehicle 5012. The controller 5024 informs that the hemming working has been normally finished to the production control computer. The production control computer drives the production line 5014 by confirming that the condition is established also with regard to other predetermined requirement and carries the vehicle 5012 finished with the hemming working to a next step.

In this way, according to the hemming working apparatus 5010 and the working method, by rolling the hemming roller 5030 while being displaced in the direction (Y direction) orthogonal to the direction of extending the flange 5017, the fold-to-bend angle of the flange 5017 is adjusted in accordance with the portion to be worked, a change in the shape becomes gradual and wrinkle, crack or the like can be prevented from being brought about. At this occasion, a displacement of the hemming roller 5030 can simply and conveniently be adjusted by providing the inclined portions 5063*a* and 5063*b* the heights of which are changed in the direction of extending the flange 5017. The flange 5017 is maintained by a high strength since there is not wrinkle or crack.

Next, a moving die 5100 constituting a modified example of the moving die 5018 will be explained in reference to FIG. 52 through FIG. 54. In the following explanation, constituent elements the same as those of the hemming working apparatus 5010 are attached with the same notations and a detailed explanation thereof will be omitted.

Figure 52:
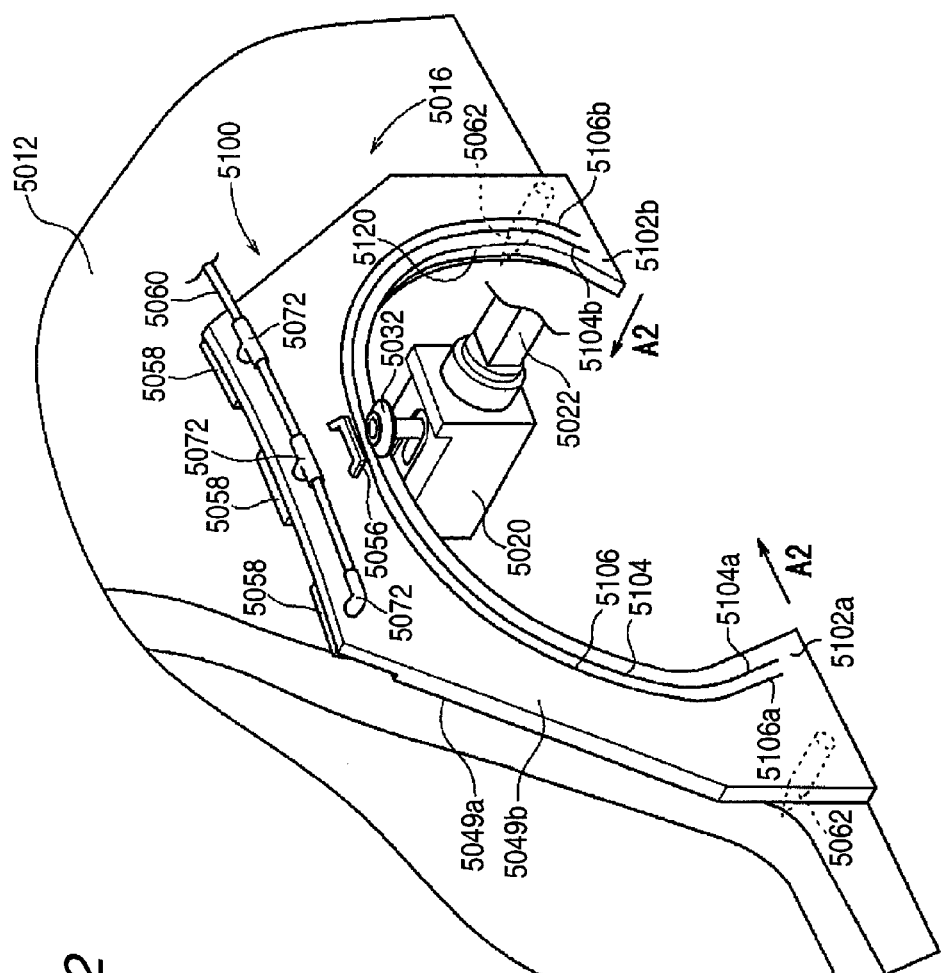
FIG. 52 is a perspective view of a moving die according to a modified example fixed to a wheel arch portion.

As shown by FIG. 52, the moving die 5100 is constituted by constituting a base by the die plate 5049 and includes an outer side circular arc portion 5102, a first groove 5104 and a second groove 5106 provided in parallel with each other along the outer side circular arc portion 5102 at the back face 5049*b*, the knob 5056, the three adsorbing mechanisms 5058, the pipe 5060, and the two positioning pins 5062. The outer side circular arc portion 5102, the first groove 5104 and the second groove 5106 are portions in correspondence with the outer side circular arc portion 5050, the first groove 5052 and the second groove 5054.

The two lower end portions 5102*a* and 5102*b* of the outer side circular arc portion 5102 are expanded in a direction of being separated from the flange 5017*c* (arrow mark A2 direction). The outer side circular arc portion 5102 other than two lower end portions 5102*a* and 5102*b* are constituted by a shape the same as that of the outer side circular arc portion 5050.

The first groove 5104 and the second groove 5106 are provided in parallel with the outer side circular arc portion 5102, and both end portions (separated portions) 5104*a*, 5104*b*, 5106*a*, 5106*b* (that is, portions at the two lower end portions 5102*a* and 5102*b*) are extended from a wheel arch portion 5016 in an arrow mark A2 direction. At portions (parallel portions) other than the both end portions 5104*a*, 5104*b*, 5106*a*, 5106*b*, the first groove 5104 and the second groove 5106 are disposed at positions the same as those of the first groove 5052 and the second groove 5054.

The moving die 5100 constituted in this way is carried to a vicinity of the vehicle 5012 constituting the work by the robot 5022 similar to the moving die 5018 and is attached to the vehicle body to be positioned to fix by the operation of the adsorbing mechanism 5058. Thereafter, the first hemming working is carried out by rolling the guide roller 5032 while being engaged with the first groove 5104 and the second hemming working is carried out by rolling the guide roller 5032 while being engaged with the second groove 5106.

Figure 53:
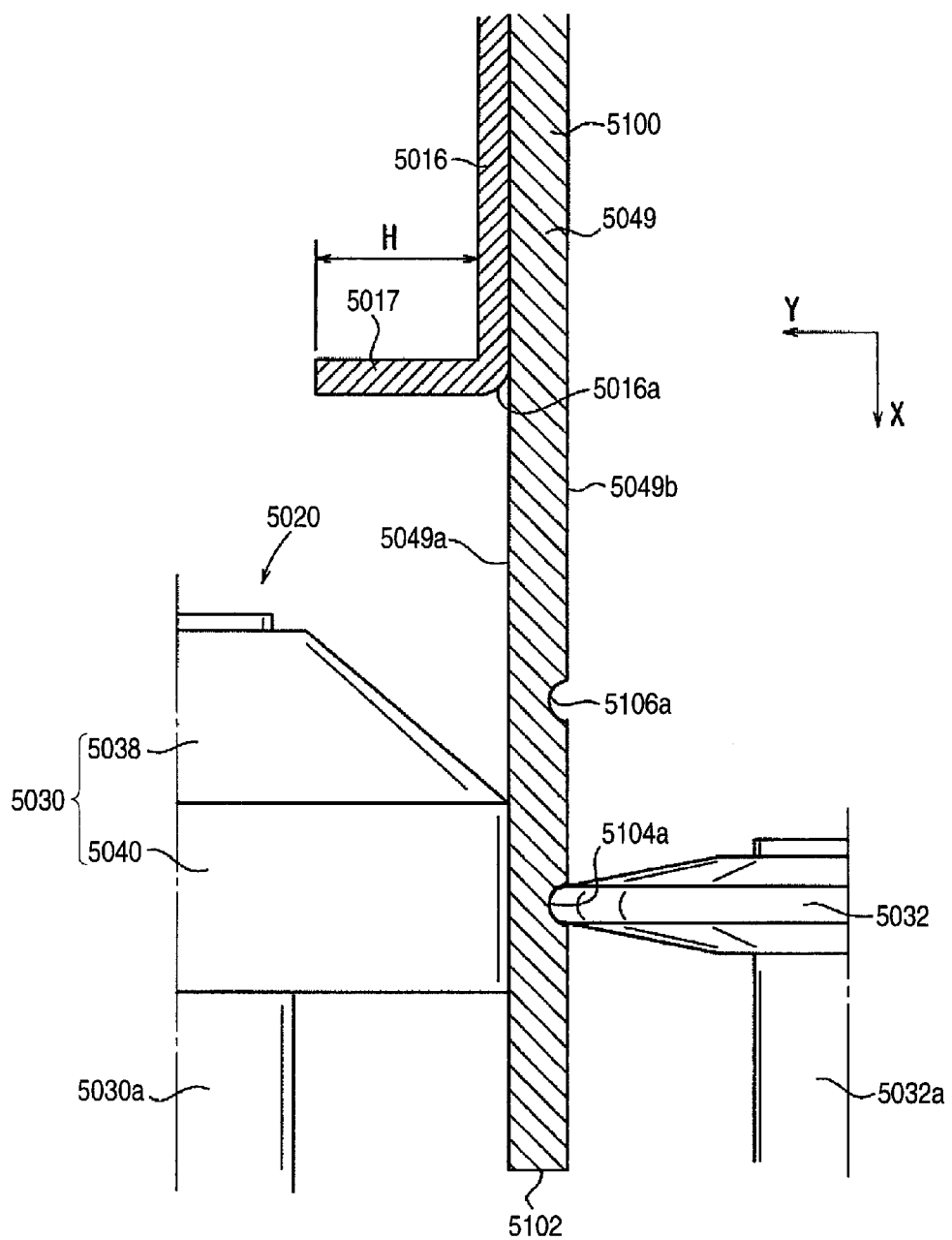
FIG. 53 is a sectional side view of a flange, a hemming unit and a moving die when a hemming unit is disposed at an end portion of the flange at a first hemming step in a case of using a moving die according to a modified example of the third exemplary embodiment.

At first and final time points of carrying out the first hemming working, as shown by FIG. 53, the first groove 5104 is considerably remote from the flange 5017, and therefore, the hemming roller 5030 is not brought into contact with the flange 5017 and the flange 5017 is maintained in a state of being erected by 90°.

Figure 54:
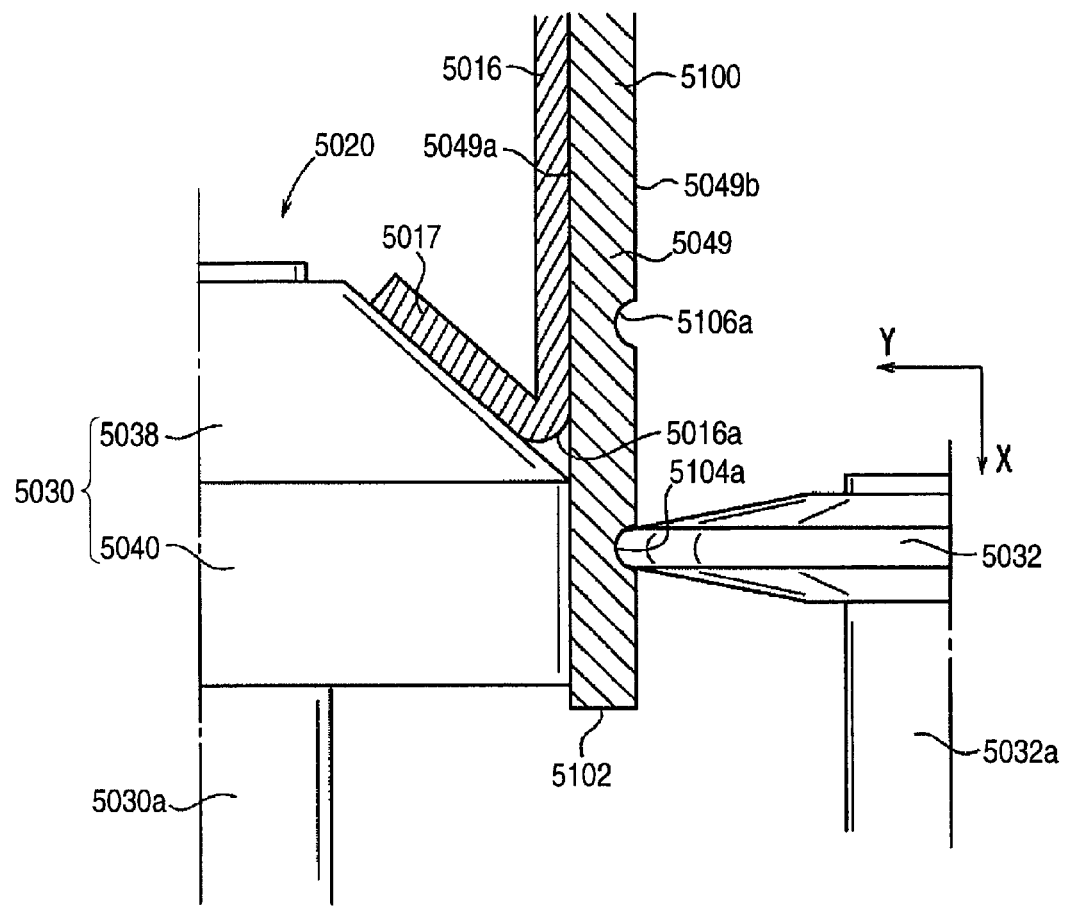
FIG. 54 is a sectional view of the flange, the hemming unit and the moving die when a first hemming unit is disposed at a position slightly moved from an end portion of the flange in a case of using the moving die according to the modified example of the third exemplary embodiment.

In the first hemming working, when the hemming unit 5020 is slightly moved from the first time point, since the first groove 5104 is formed to be gradually proximate to a position in parallel with the flange 5017, and therefore, as shown by FIG. 54, the taper roller 5038 is brought into contact with an end portion of the flange 5017 to start bending working. The first groove 5104 is further made to be proximate to the flange 5017 in accordance with moving the hemming unit 5020, and therefore, an angle of bending the flange 5017 becomes gradually a steep angle. Thereafter, the first groove 5104 is disposed at a position the same as that of the first groove 5052, and therefore, the taper roller 5038 inclines to bend the flange 5017 by 45° in the inner side direction. Further, also at the final portion of working, the first groove 5104 is formed to be gradually remote from the position in parallel with the flange 5017, and therefore, also the taper roller 5038 becomes gradually remote from the flange 5017.

On the other hand, even in a case of carrying out second hemming working, similar to the case of the first hemming working, at first and final time points, a state of erecting the flange 5017 is maintained and at a center portion, the flange 5017 is inclined to bend by 90° to the inner side direction. In this way, according to the hemming working method using the moving die 5100, the hemming roller 5030 is rolled while being displaced in the direction (X direction) orthogonal to the direction (Z direction) of extending the flange 5017 and the fold-to-bend angle can be adjusted in accordance with a portion to be worked. Therefore, similar to the case of using the moving die 5018, a change in the shape of the flange 5017 becomes gradual, and wrinkle, crack or the like can be prevented from being brought about. At this occasion, adjustment of the displacement of the hemming roller 5030 can simply and conveniently be set by arrangements of the first groove 5104 and the second groove 5106.

Although according to the above-described example, the hemming roller 5030 is rolled while being displaced in the direction (X direction or Y direction) orthogonal to the direction of extending the flange 5017 by the inclined portions 5063a and 5063b or the both end portions 5104a, 5104b, 5106a, 5106b of the first groove 5104 and the second groove 5106, means for displacing the hemming roller 5030 is not limited thereto. For example, the hemming roller 5030 per se may be displaced by a servo motor or the like while feeding back a displacement amount by a predetermined sensor.

Further, although one piece of the robot 5022 is made to serve as means for carrying the moving die 5018 and means for moving the hemming unit 5020, a function as means for carrying the moving die 5018 and a function as means for moving the hemming unit 5020 may be distributed to individual robots. Further, a system of folding to bend the flange 5017 is not limited to a system of simply folding to bend the flange 5017 to the inner side, but the flange 5017 may be folded to bend to pinch a predetermined inner panel or the like.

<Fourth Exemplary Embodiment>

An explanation will be given of a roll hemming method and a hemming roller according to a fourth exemplary embodiment in reference to FIG. 55 through FIG. 70. A hemming roller 6010 according to the fourth exemplary embodiment is used in a roll hemming working apparatus 6011 shown in FIG. 55 and a roll hemming method according to the fourth exemplary embodiment is carried out by the roll hemming working apparatus 6011. Further, a welded structure according to the fourth exemplary embodiment is fabricated by using the roll hemming working apparatus 6011.

Figure 55:
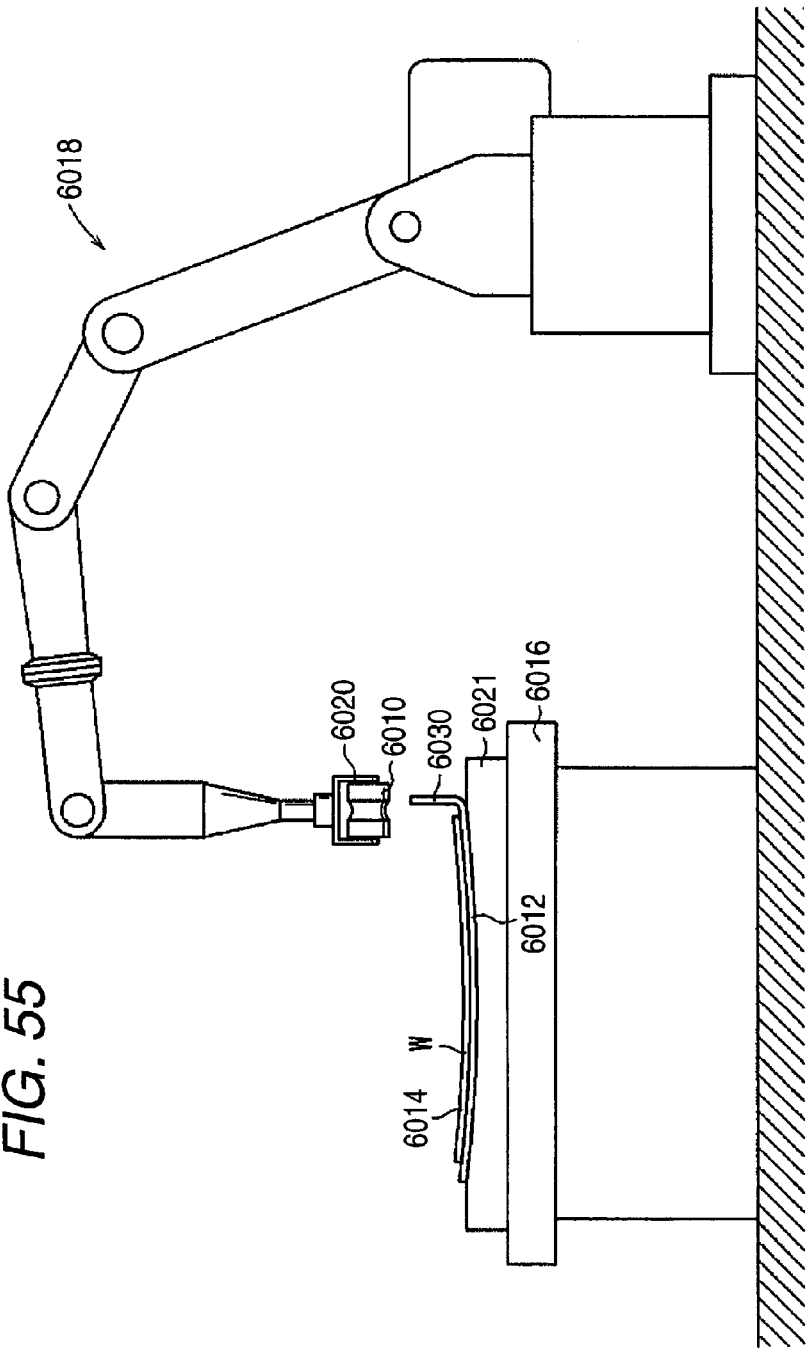
FIG. 55 is an outline constitution view of a roll hemming working apparatus according to a fourth exemplary embodiment.

As shown by FIG. 55, the roll hemming working apparatus 6011 is an apparatus for subjecting a hem portion of a work (welded structure) W constituted by an outer panel 6012 and an inner panel 6014 to roll hemming working, and includes a work table 6016 for supporting the work W, a robot 6018, and a work tool 6020 provided at a front end of the robot 6018. The work W is supported above the work table 6016 by way of a die 6021. The work W may be carried in and carried out to and from the work table 6016 by a predetermined work automatic exchanging means.

The robot 6018 is of an industrial articulated type and can be moved to an arbitrary position in an arbitrary attitude within a range of operating the work tool 6020. The robot 6018 can carry out a motion teaching while actually carrying out a motion by an operation of a teaching pendant, not illustrated. Further, motion teaching can also be carried out without making the actual robot 6018 motion by an off line processing using three-dimensional CAD (Computer Aided Design) or the like. The robot 6018 is operated under operation of a predetermined controller.

Figure 61:
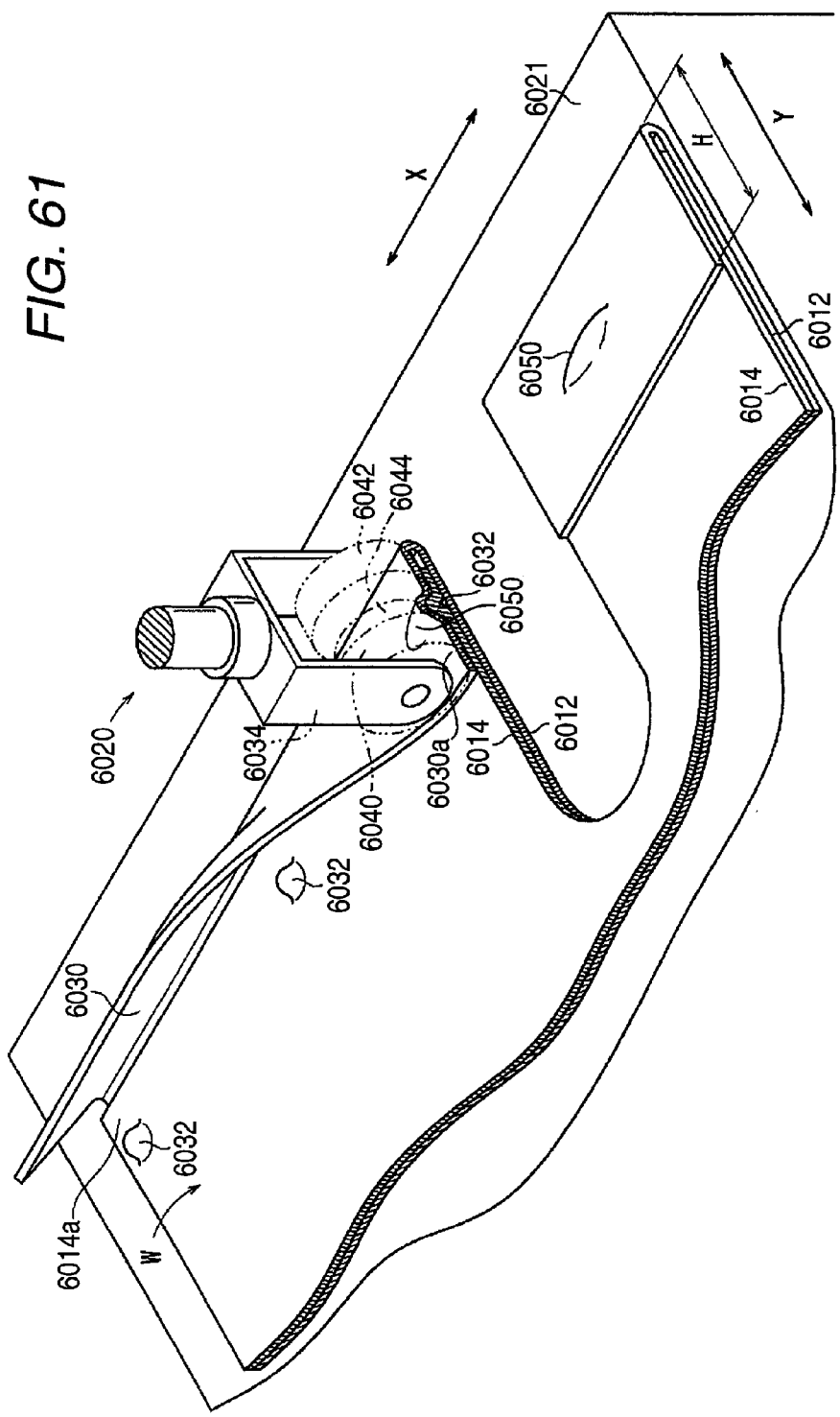
FIG. 61 is a partially sectional perspective view of the work and the work tool at the second time of roll hemming.

The work tool 6020 is a tool for folding to bend a flange 6030 in a shape of being erected substantially orthogonally from a hem portion of the outer panel 6012 in a direction of an inner side of the outer panel 6012 and can pinch a hem portion 6014a of the inner panel 6014 to integrate therewith (refer to FIG. 61). The work W is integrated such that the outer panel 6012 is disposed on a lower side and the inner panel 6014 is disposed on an upper side to be tackedly fixed onto the die 6021, and the hem portion 6014a of the inner panel 6014 is arranged along a portion to be bent of the outer panel 6012. At this occasion, the flange 6030 is extended in an upper direction.

The hem portion 6014a of the inner panel 6014 is provided with a plurality of pressed projections 6032. The projections 6032 are provided at positions of being pinched by the flange 6030 to be folded to bend, specifically, provided at positions of being pinched by substantially a middle height portion of the flange 6030. The projections 6032 are provided at, for example, predetermined equal intervals.

Figure 56:
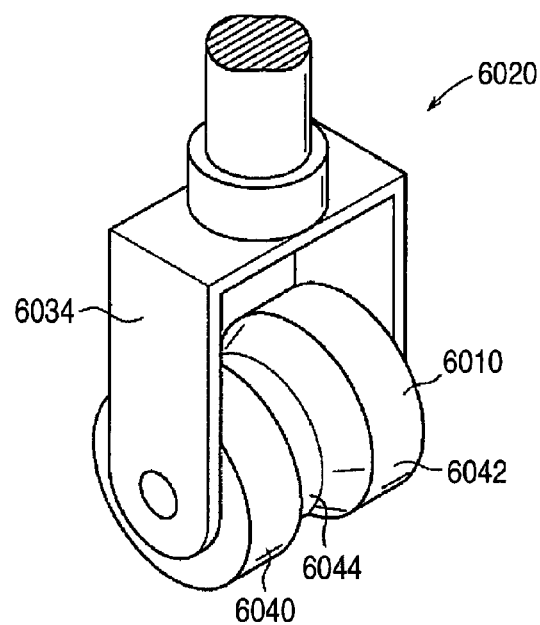
FIG. 56 is a perspective view of a work tool having a hemming roller.
Figure 57:
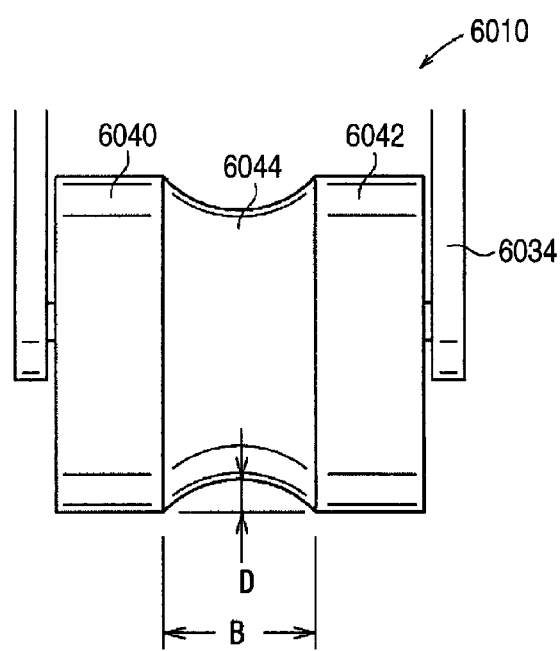
FIG. 57 is a front view of the hemming roller.

As shown by FIG. 56 and FIG. 57, the work tool 6020 includes a hemming roller 6010 and an arch member 6034 for rotatably holding both ends of the hemming roller 6010. The arch member 6034 is connected to a frontmost end shaft of the robot 6018. The work tool 6020 is made to be attachable and detachable to and from the robot 6018.

The hemming roller 6010 includes a first circular pillar 6040 for pressing an outer face end portion 6030a of the flange 6030, a second circular pillar 6042 coaxial with the first circular pillar 6040 and having a diameter the same as that of the first circular pillar 6040 for pressing an outer face base portion 6030b of the flange 6030, and a shallow ring-like recessed portion 6044 provided between the first circular pillar 6040 and the second circular pillar 6042. A width of the hemming roller 6010 is substantially equal to a height H of the flange 6030 (refer to FIG. 59).

Next, an explanation will be given of a procedure of carrying out a rolling hemming method of the work W by using the roll hemming working apparatus 6011 constituted in this way in reference to FIG. 58 through FIG. 68. In the following explanation, processings are carried out in an order of indicated step numbers.

Figure 58:
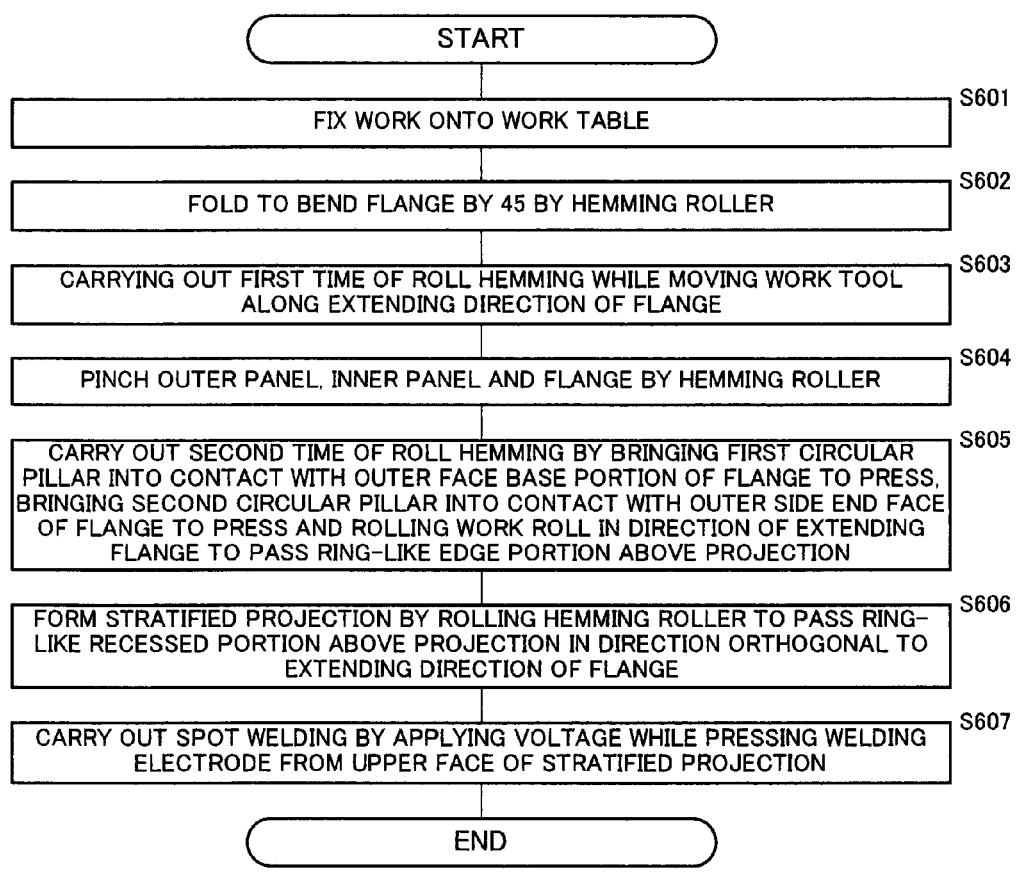
FIG. 58 is a flowchart showing a procedure of a roll hemming method according to the fourth exemplary embodiment.

At step S601 of FIG. 58, first, the work W is fixed above the work table 6010 such that the outer panel 6012 is disposed on the lower side and the inner panel 6014 is disposed on the upper side. At this occasion, assume that the flange 6030 is erected to direct in an upper direction.

At step S602, the robot 6018 is operated and the work tool 602 is moved. At this occasion, a side face of the flange 6030 is pressed by inclining the hemming roller 6010 by 45° by bringing the first circular pillar 6040 of the hemming roller 6010 into contact with an outer face end portion 6030a of the flange 6030 to press and bringing the second circular pillar 6042 into contact with an outer face base portion 6030b of the flange 6030 to press. Thereby, the flange 6030 is pressed in an arrow mark A direction of FIG. 59 and is folded to bend pertinently to incline by 45° substantially centering on a bending base point P.

Figure 59:
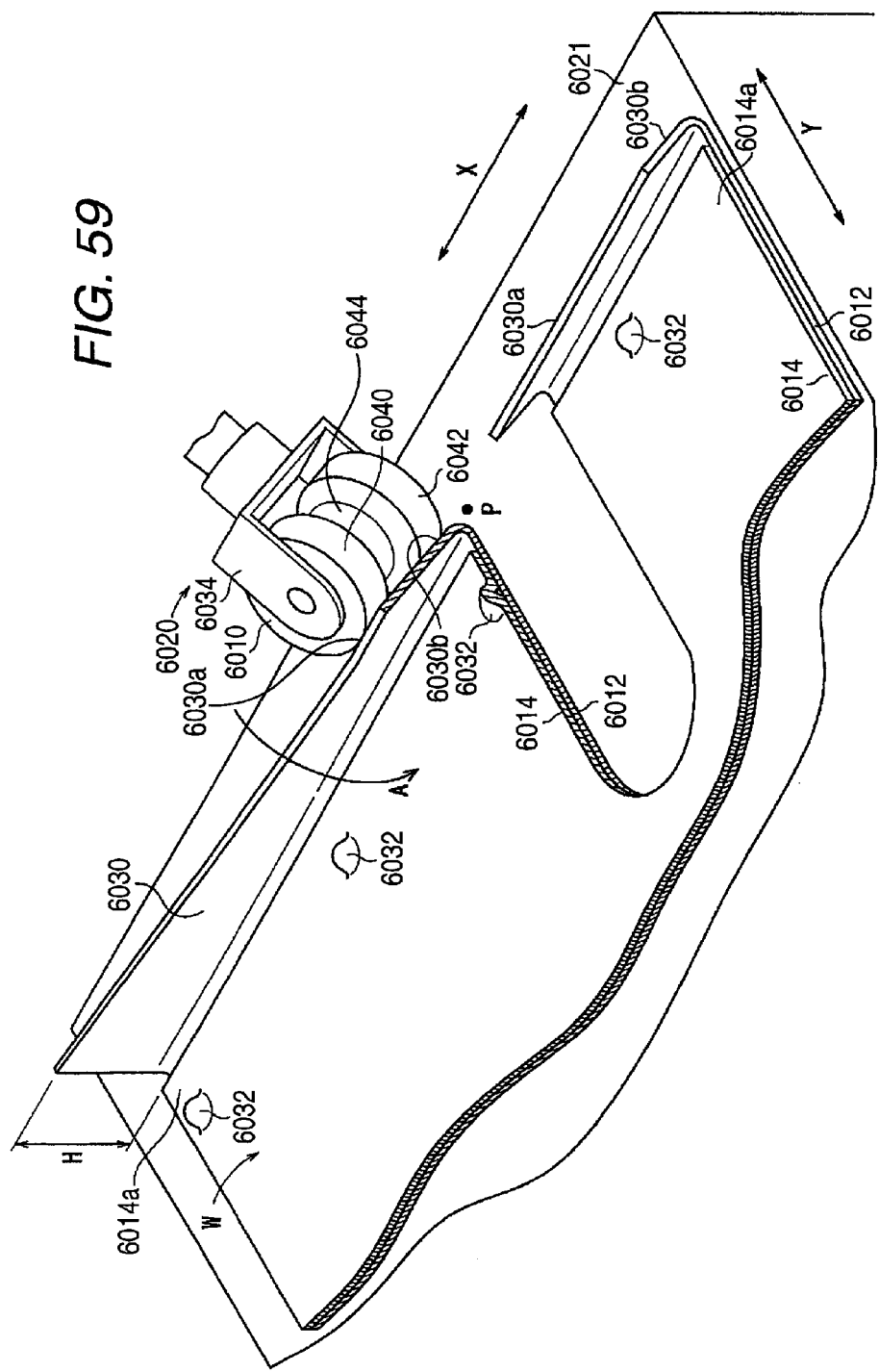
FIG. 59 is a partially sectional perspective view of a work and a work tool at a first time of roll hemming working.

At step S603, a first time of roll hemming working (also referred to as prehemming working) is carried out under a motion and operation of the robot 6018. That is, as shown by FIG. 59, there is continuously carried out roll hemming working of folding to bend the flange 6030 by 45° in the inner side direction by rolling the work tool 6020 in a direction of extending the flange 6030 while maintaining an attitude of the hemming roller 6010 relative to the work W. Further, a direction of extending the flange 3600 is defined as X direction (first direction), a direction in parallel with the inner panel 6014 and orthogonal to X direction is defined as Y direction (second direction), and a direction orthogonal to X direction and Y direction is defined as Z direction.

The first time of roll hemming working is carried out over an entire length from one end to other end of the flange 6030. Further, although in FIG. 59 and FIG. 61, FIG. 64 and FIG. 67 mentioned later, in order to facilitate understanding, the direction of extending the flange 6030 is illustrated in a linear shape, the direction of extending the flange 6030 may naturally be a two-dimensional or a three-dimensional curved shape. When the direction of extending the flange 6030 is constituted by a curved shape, the hemming roller 6010 is rolled under the operation of the robot 6018 while maintaining a direction of making an axis of the hemming roller 6010 orthogonal to the direction of the flange 3600 (X direction).

At step S604, the direction of the hemming roller 6010 is inclined further by 45° under the operation of the robot 6018 to move such that a rotating shaft thereof becomes in parallel with a surface of the inner panel 6014, and three sheets of the outer panel 6012, the hem portion 6014a of the inner panel 6014 and the flange 6036 are pinched by the first circular pillar 6040 and the second circular pillar 6042 and the die 6021. Thereby, the outer panel 6012, the hem portion 6014a of the inner panel 6014 and the flange 6030 are pressed to be integrated.

At step S605, a second time of roll hemming working (also referred to as regular hemming working) is carried out. That is, by operating the robot 6018, the work tool 6020 is moved over an entire length of the bent portion to carry out roll hemming working to integrate three sheets of the outer panel 6021, the hem portion 6014a of the inner panel 6014 and the flange 6030 (refer to FIG. 61).

Figure 60:
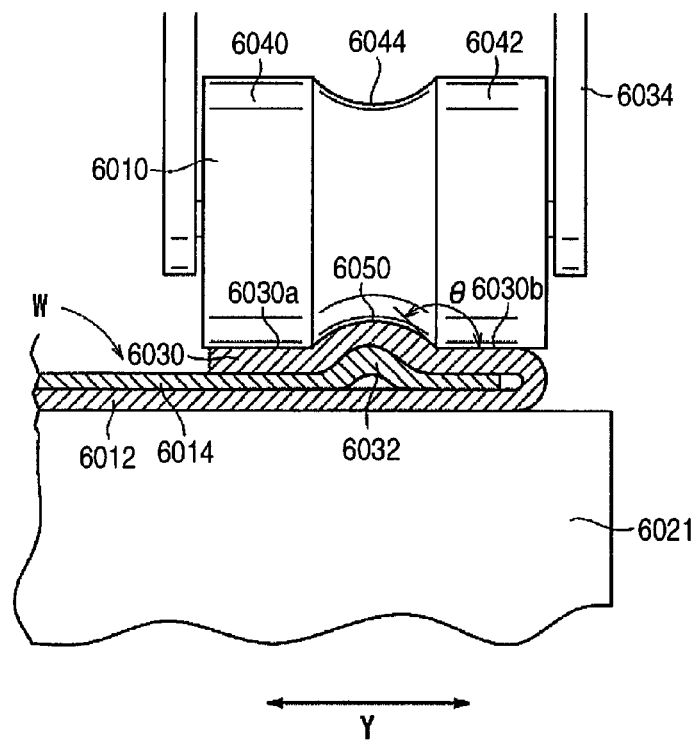
FIG. 60 is a sectional side view of the work and the work tool at a second time of roll hemming.

As shown by FIG. 60 and FIG. 61, at the second time of roll hemming working, similar to the first time of roll hemming working, the first circular pillar 6040 is brought into contact with the outer face end portion 6030a of the flange 6030 to press and the second circular pillar 6042 is brought into contact with the outer face base portion 6030b of the flange to press to roll in the arrow mark X direction. Further, the ring-like recessed portion 6044 is provided between the first circular pillar 6040 and the second circular pillar 6042, and therefore, the ring-like recessed portion 6044 is moved to pass above the projection 6032 and the projection 6032 is not crushed.

Further, in FIG. 61 (and FIG. 64), the work tool 6020 is illustrated perspectively in a two-dotted chain line to be able optically recognize a portion to be worked.

Figure 62:
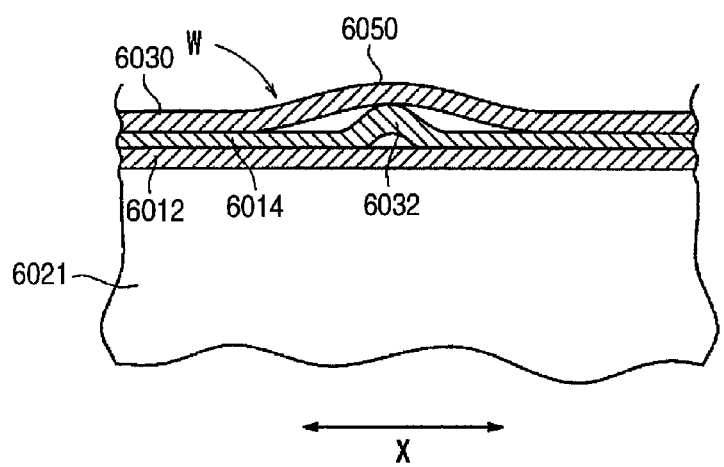
FIG. 62 is a sectional front view of a projection and a bulged portion formed centering on the projection.

In the second time of roll hemming working, a slender bulged portion 6050 extended in the arrow mark X direction remains as shown by FIG. 61 and FIG. 62. A width in Y direction of a center portion of the bulged portion 6050 centering on the projection 6032 in a plane view thereof is substantially equal to a width B of the ring-like recessed portion 6044, both ends in X direction are constituted by an acute angle shape and a portion other than the projection 6032 is constituted by a hollow structure. Further, the bulged portion 6050 is constituted by a shape of being lowered to left and right sides along an arrow X extending direction by constituting a top portion by a position of the projection 6032.

The bulged portion 6050 is formed because although portions of a face of the flange 6030 brought into contact with the first circular pillar 6040 and the second circular pillar 6042 of the hemming roller 6010 are pressed, a center position provided with the projection in Y direction is not pressed since the ring-like recessed portion 6044 is passed thereabove and the center position is plastically deformed by a reaction force of the projection 6032 to be bulged relatively.

Figure 63:
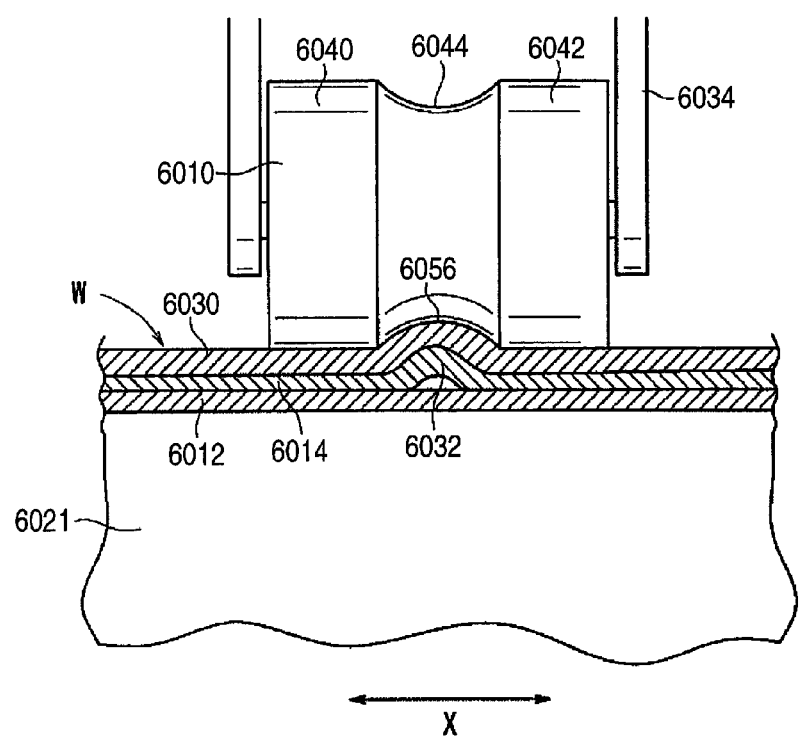
FIG. 63 is a sectional front view of a work and a work tool at a step of forming a stratified projection by crushing a hollow portion of the bulged portion.
Figure 64:
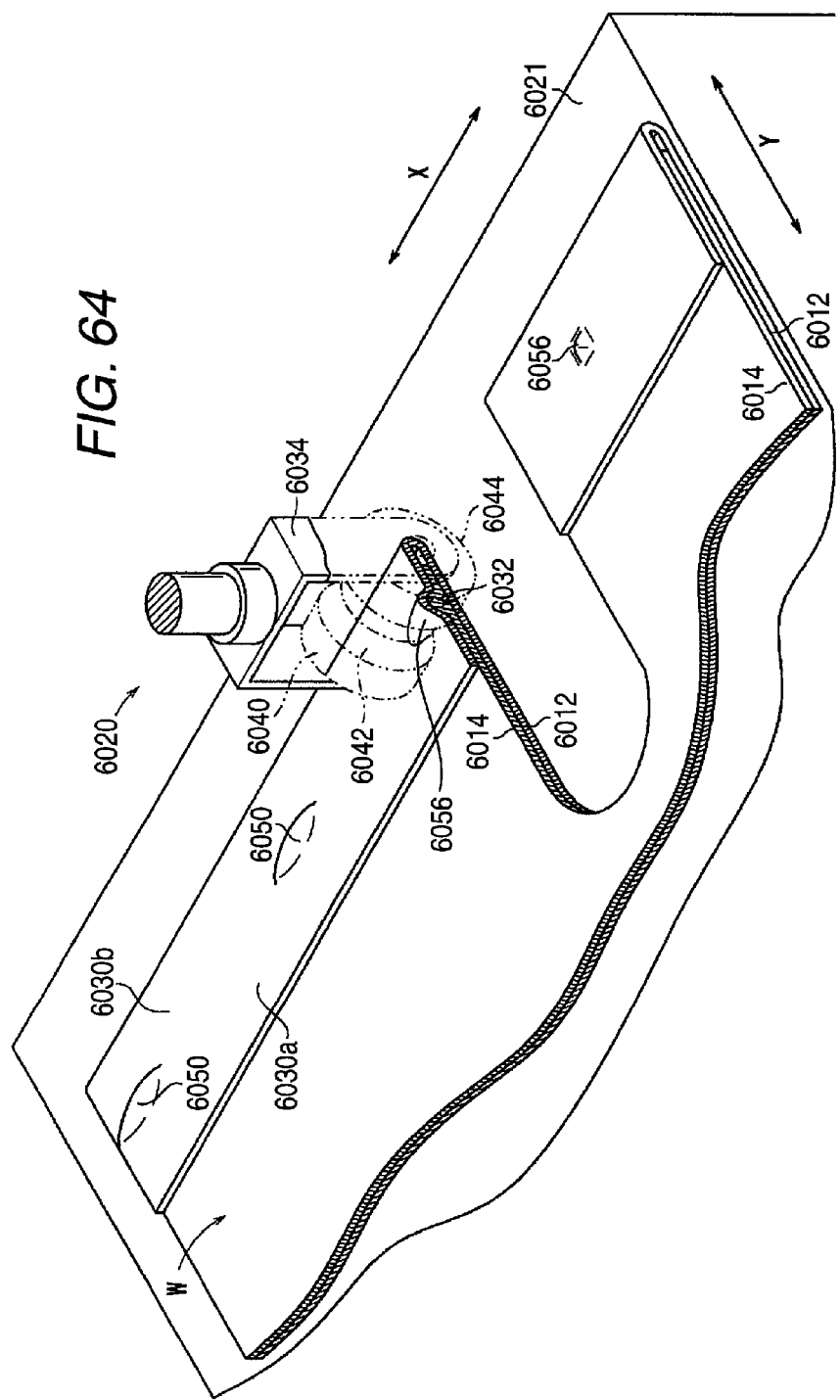
FIG. 64 is a partially sectional perspective view of the work and the work tool at the step of forming the stratified projection by crushing the hollow portion of the bulged portion.

Next, at step s606, the direction of the hemming roller 6010 is rotated by constituting a reference by Z direction under the operation of the robot 6018, thereafter, as shown by FIG. 63 and FIG. 64, the first circular pillar 6040 and the second circular pillar 6042 are brought into contact with the flange 6030 to press to roll in Y direction at a position of passing the ring-like recessed portion 6044 above the projection 6032.

At step S606, the ring-like recessed portion 6044 is passed above the projection 6032, and therefore, the projection 6032 is not crushed. Further, the first circular pillar 6040 and the second circular pillar 6042 are passed above a hollow structure portion of the bulged portion 6050 to press, and therefore, only the hollow portion is pressed to crush, as a result, a stratified projection 6056 is formed. The stratified projection 6056 forms a projection comprising two layers of the projection 6032 of the inner panel 6014 and a portion of the bulged portion 6050 of the outer panel 6012 remaining to cover an upper layer of the projection 6032 by removing the hollow portions extended to left and right sides thereof.

Figure 65:
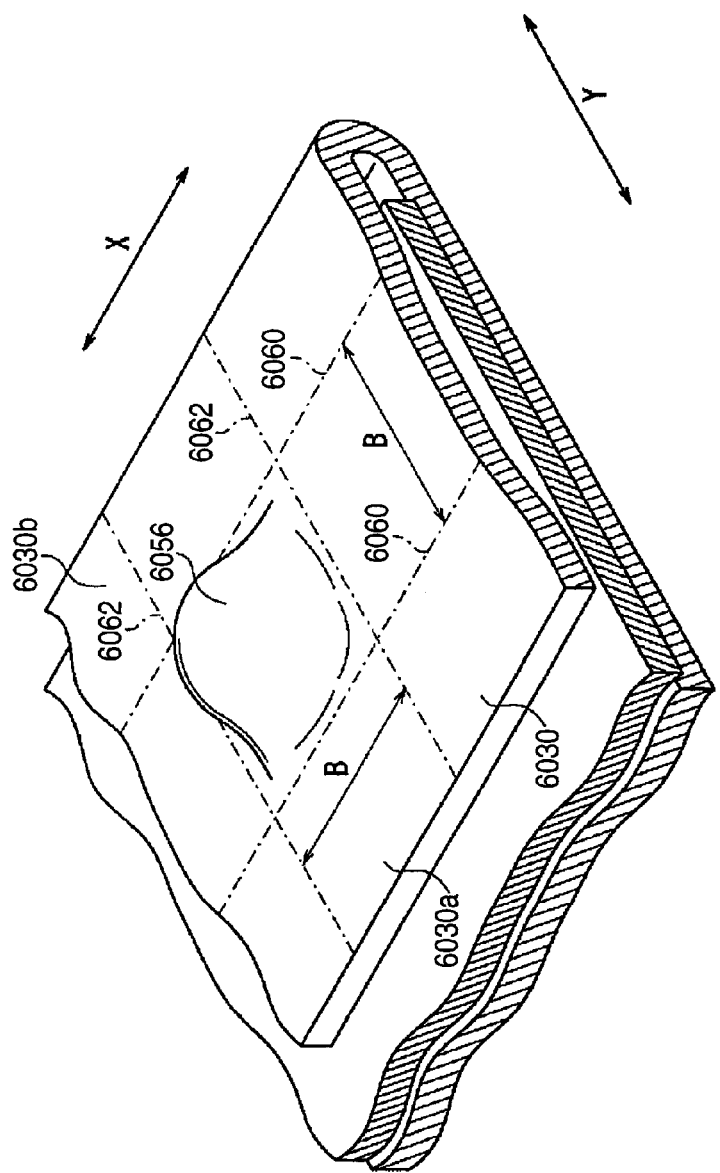
FIG. 65 is an enlarged perspective view of the stratified projection.

As shown by FIG. 65, a shape of the stratified projection 6056 is generally constituted by a frustum of a quadrangular cone constituting four sides of a bottom face by a pair of parallel imaginary lines 6060, 6060 extended in X direction and a pair of parallel imaginary lines 6062, 6062 extended in Y direction, further in details, respective faces forming the frustum of the quadrangular cone are smoothly connected and a top portion thereof is substantially constituted by a shape of a semi sphere. the imaginary lines 6060, 6060 are paths of the width B at which both end portions of the ring-like recessed portion 6044 pass at step S605, similarly, the imaginary lines 6062, 6062 are paths of the width B at which the both end portions of the ring-like recessed portion 6044 pass at step S606.

Further, the shallow ring-like recessed portion 6044 is constituted by a shape of a circular arc in a section thereof, and therefore, an angle θ made by faces of the first circular pillar 6040 and the second circular pillar 6042 at both end portions of the width B (refer to FIG. 60) constitutes an obtuse angle, and a press force exerted to the imaginary lines 6060, 6060 as well as 6062, 6062 constituting the paths in carrying out hemming working by the hemming roller 6010 is pertinently dispersed based on the obtuse angle shape and a press mark is difficult to be attached.

A step of forming the stratified projection 6056 of step S606 is carried out successively for all of the projections 6032. In the work W subjected to hemming working in this way, the projections 6032 are respectively engaged with the plurality of stratified projections 6056 almost without clearances therebetween, and therefore, the outer panel 6012 and the inner panel 6014 are connected considerably solidly, however, the panels are further solidly connected by next step S607 of welding step.

Further, although a direction of rolling the hemming roller 6010 at step S605 and a direction of rolling the hemming roller 6010 at step S606 are preferably directions orthogonal to each other, depending on a design condition, the roller may be in two different directions constituting an intersection thereof by the position of the projection 6032.

Figure 66:
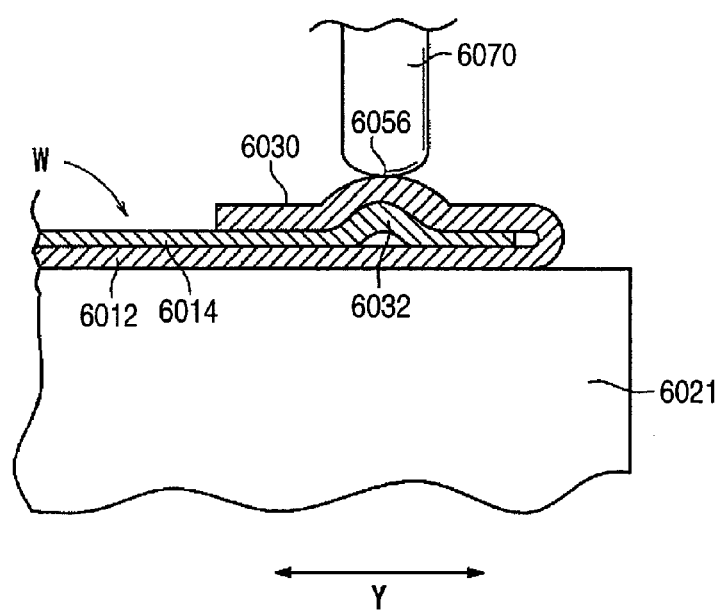
FIG. 66 is a sectional side view of a work and a work tool at a spot welding step.
Figure 67:
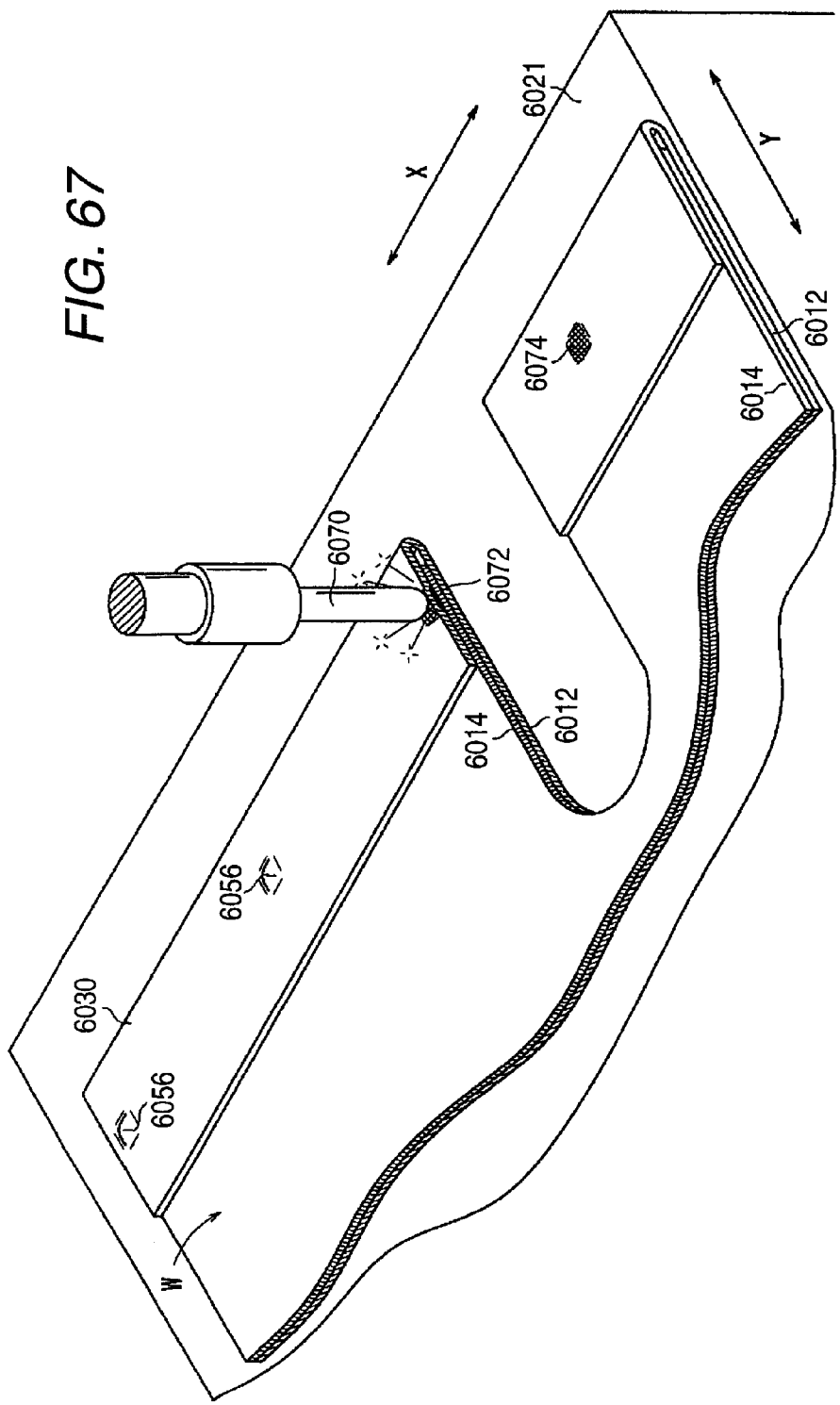
FIG. 67 is a partially sectional perspective view of the work and the work tool in the spot welding step.

At step S607, as shown by FIG. 66 and FIG. 67, spot welding is carried out by applying a voltage from an upper face of the stratified projection 6056 while pressing a welding electrode 6070. At this occasion, the work W is grounded.

Figure 68:
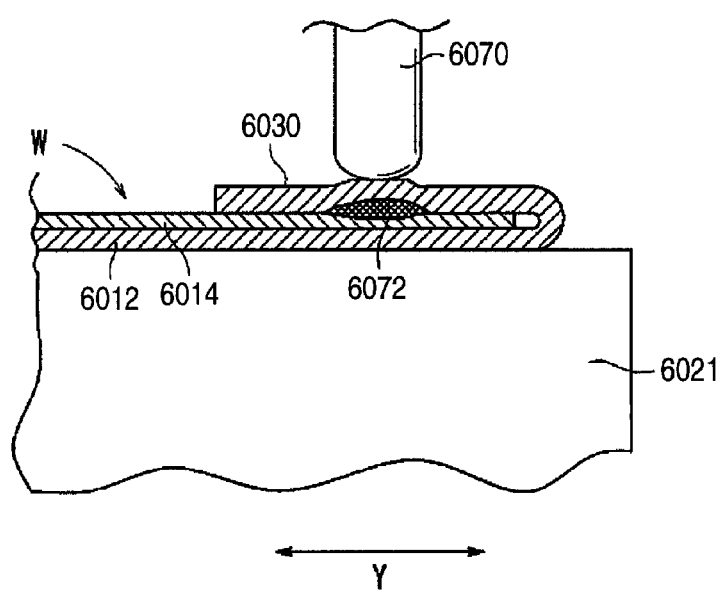
FIG. 68 is a sectional side view of a welded structure provided by spot welding.

By applying the voltage to the welding electrode 6070, as shown by FIG. 68, a nugget 6072 is formed by mainly melting a portion between the flange 6030 and the inner panel 6014. Further, the stratified projection 6056 is softened by heating and pressed to crush by a press force of the welding electrode 6070. Therefore, a welding mark 6074 of a portion finished with spot welding by being cooled and solidified by stopping electricity conduction is constituted substantially by a planar shape. The spot welding step of step S607 is successively carried out for all the stratified projections 6056. The spot welding step of step S607 may be carried out by moving the work W to a location other than the work table 6016.

As described above, according to the roll hemming method according to the fourth exemplary embodiment, when the hemming roller 6010 is rolled in X direction of extending the flange, the ring-like recessed portion 6044 is passed above the projection 6032 on top of the flange 6030 to be folded to bend, and therefore, the projection 6032 is not crushed. Further, the hemming roller 6010 is rolled again in Y direction orthogonal to X direction, also at this occasion, the ring-like recessed portion 6044 is passed above the projection 6032, and therefore, a portion of the bulged portion 6056 remaining as a hollow bulge along X direction centering on the projection 6032 is pressed. Thereby, the flange 6030 is formed with a small stratified projection 6056 covering the projection 6032 of the inner panel 6014 and a current can be concentrated thereon in spot welding thereafter.

Further, according to the hemming roller 6010 according to the fourth exemplary embodiment, the hemming roller 6010 is preferably used for the roll hemming method and the projection 6032 of the inner panel 6014 is not pressed to crush. Further, by rolling the hemming roller 6010 in two different directions constituting an intersection by the projection 6032, the stratified projection 6056 is provided by almost removing the hollow bulge at the bulged portion 6060 centering on the projection, and a current can be concentrated in spot welding thereafter.

Further, a deforming material of a gel material or the like is not used for the hemming roller 6010, and therefore, service life thereof is prolonged.

Further, a welded structure according to the fourth exemplary embodiment is provided by subjecting the work W to hemming working and spot welding, in spot welding, the current flows concentratedly between two layers of the stratified projection 6056, the stratified projection 6056 is firmly melted by generating heat sufficiently, and the high welding strength is achieved after having been solidified. The welded structure worked in this way can be identified by a portion of the stratified projection 6056 slightly remained at a surrounding of the welding mark 6074, small press marks of portions of the imaginary lines 6060, 6060 aw well as 6062, 6062 or the like.

Further, according to the hemming method and the welded structure according to the fourth exemplary embodiment, hemming rollers 6080 and 6090 or the like according to the following modified example may be used other than the hemming roller 6010.

Figure 69:
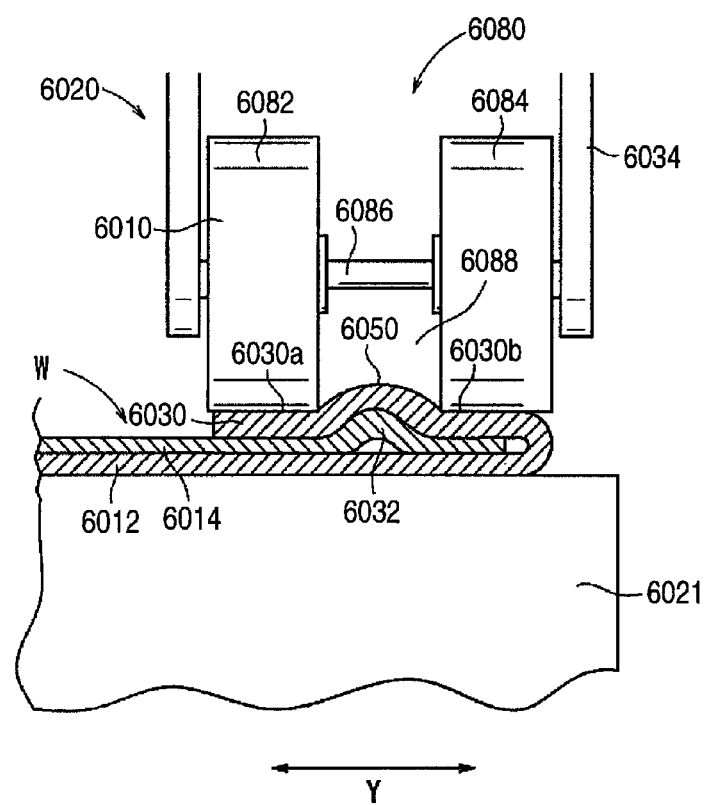
FIG. 69 is a side view of a hemming roller and a work according to a first modified example of the fourth exemplary embodiment.

As shown by FIG. 69, a hemming roller 6080 includes a first circular pillar 6082 and a second circular pillar 6084 coaxial and having the same diameter, and a spacer 6086 having a small diameter provided between the first circular pillar 6082 and the second circular pillar 6084. As is apparent from FIG. 69, a ring-like recessed portion 6088 is formed between the first circular pillar 6042 and the second circular pillar 6084 of the hemming roller 6080. The hemming roller 6080 is constructed by a simple constitution of using two circular pillar members as the first circular pillar 6082 and the second circular pillar 6084 and inserting the spacer 6086 therebetween, constituted by only an integrating step, fabrication thereof is not provided with a working step and the hemming roller 6080 can inexpensively be fabricated.

Figure 70:
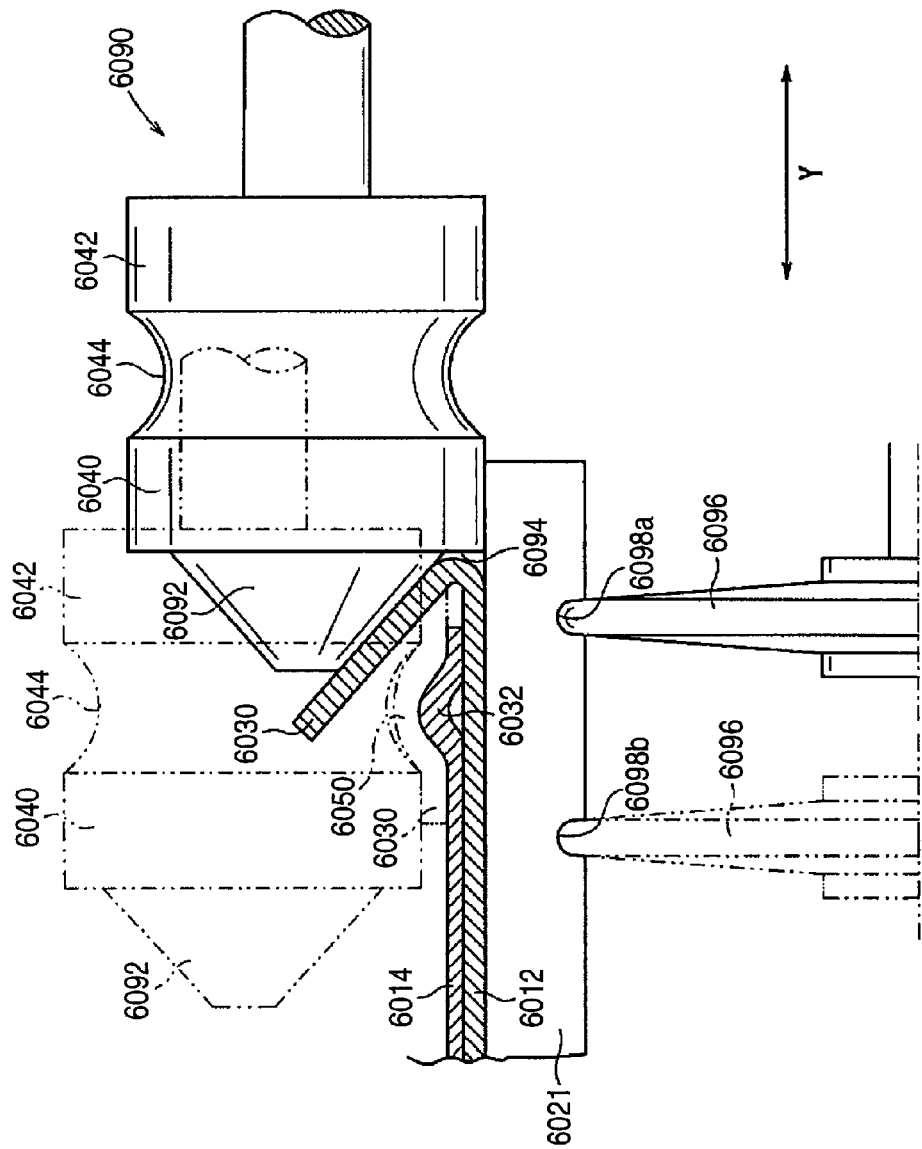
FIG. 70 is a side view of a hemming roller and a work according to a second modified example of the fourth exemplary embodiment.

As shown by FIG. 70, a hemming roller 6090 includes a first circular pillar 6040, a second circular pillar 6042, and a circular cone portion 6092 having an angle of inclination of 45° provided on a front side of the first circular pillar 6040 similar to those of the hemming roller 6010. A small stepped difference 6094 is provided between the circular cone portion 6092 and the first circular pillar 6040. According to the hemming roller 6090, at a first time of roll hemming working, working to bend by 45° can be carried out by bringing the first circular pillar 6040 into contact with a die and bringing the circular cone portion 6092 into contact with the flange 6030. Further, at a second time of roll hemming, as shown by an imaginary line, bending working can be carried out by bringing the first circular pillar 6040 into contact with an outer face end portion 6030a of the flange 6030 to press, bringing the second circular pillar 6042 into contact with an outer face base portion 6030b to press and rolling the ring-like recessed portion 6044 to pass above a projection 6032. Therefore, it is not necessary to change the direction of the hemming roller 6090 between the first time and the second time of roll hemming working. Further, a guide roller 6096 in a shape of a disk may be provided by a constitution of being moved integrally in a state in which an axis thereof is in parallel with the hemming roller 6090 and a first guide roll groove 6098a and a second guide groove 6098b engaged with the guide roller 6096 and extended in X direction may be provided at a back face of the die 6021. The guide roller 6096 is engaged with and rolled on the first guide groove 6098a at the first time of roll hemming working to guide the circular cone portion 6092 of the hemming roller 6090 to bend the flange 6030 by 45°. The guide roller 6096 is engaged with and rolled on the second guide groove 6098b at the second time of roll hemming working to guide such that the first circular pillar 6040 and the second circular pillar 6042 of the hemming roller 6090 press the flange 6030 and the ring-like recessed portion 6044 passes above the projection 6032.

<Fifth Exemplary Embodiment>

Figure 71:
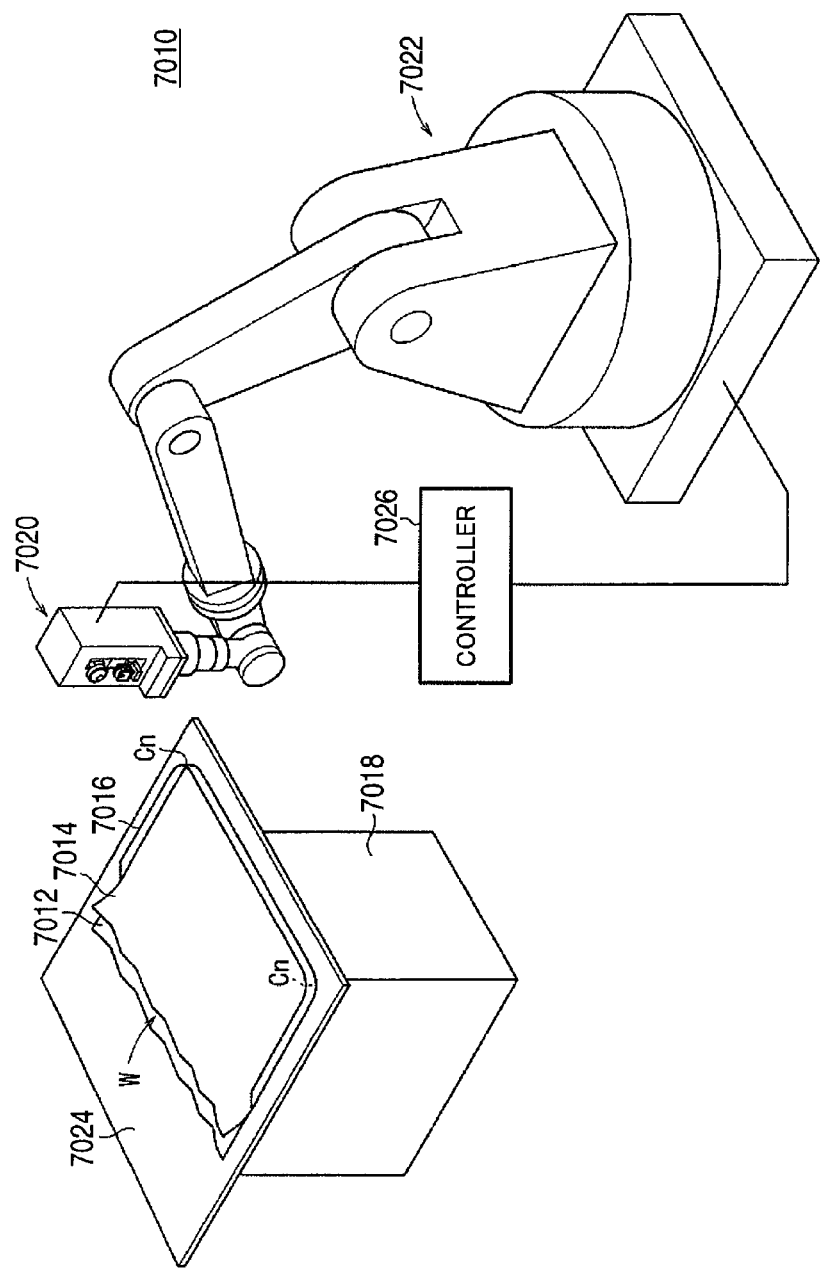
FIG. 71 is a perspective view for explaining a behavior of carrying out hemming working for a hem portion of a work by a hemming working apparatus according to a fifth exemplary embodiment of the invention.

FIG. 71 is a perspective view for explaining a behavior of carrying out hemming working for a hem portion of a work W constituted by an outer panel 7012 and an inner panel 7014 by a hemming working apparatus 7010 according to a fifth exemplary embodiment of the invention. The hemming working apparatus 7010 according to the fifth exemplary embodiment carries out hemming working for the work W by folding to bend a flange 7016 of a shape of being erected from a hem portion of the outer panel 7012 of the work W substantially orthogonally. A hemming working method according to the fifth exemplary embodiment is carried out by the hemming working apparatus 7010.

As shown by FIG. 71, the hemming working apparatus 7010 includes a work table 7018 for mounting the work W, and a robot (moving means) 7022 for supporting a hemming unit 7020 at a front end thereof. The work W is supported above the work table 7018 by way of a die 7024. Further, the work W may be carried in and carried out to and from the work table 7018 by predetermined work automatic exchanging means.

The robot 7022 is of an industrial articulated type and can move the hemming unit 7020 to an arbitrary position and in an arbitrary attitude by a programmed operation. The robot 7022 can carry out motion teaching while actually carrying out a motion by an operation of a teaching pendant, not illustrated. Further, the operation teaching can also be carried out by an offline processing using a three-dimensional CAD (Computer Aided Design) or the like without operating the actual robot 7022. The robot 7022 is operated under a control of a controller 7026 constituting a control apparatus.

Figure 72:
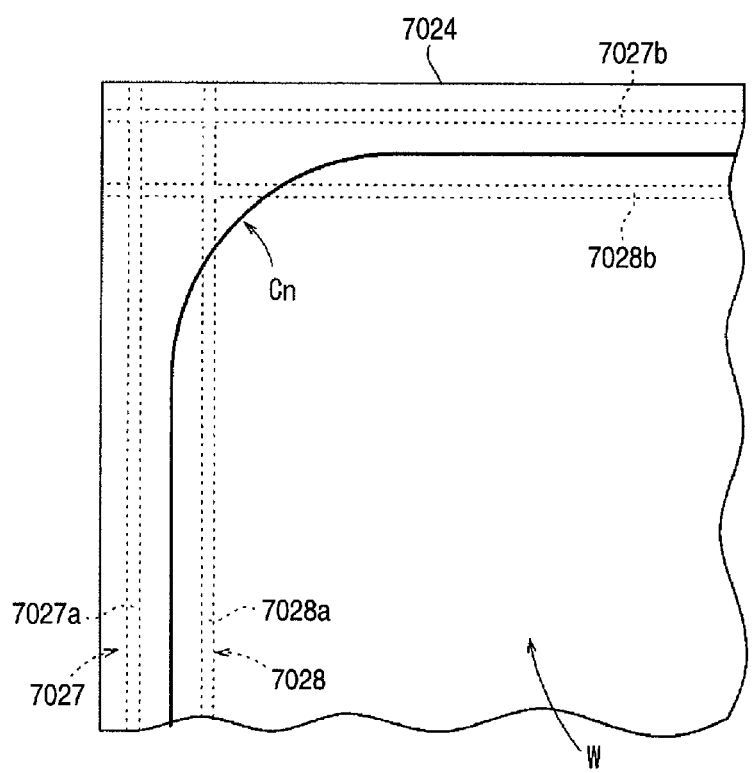
FIG. 72 is a partially enlarged plane view showing a periphery of a corner portion of a work supported on a die.

FIG. 72 is a partially enlarged plane view showing a periphery of a corner portion Cn constituting a portion having a radius of curvature of the hem portion of the work W supported on the die 7024. Further, FIG. 72 illustrates the outer panel 7012, the inner panel 7014 and the flange 7016 summarizingly as the work W for simplicity.

Whereas the die 7024 is mounted with the work W at a surface (upper face thereof), a back face (lower face) is formed with a first groove 7027 and a second groove 7028 indicated by a dotted line in FIG. 72. The first groove 7027 and the second groove 7028 are groove portions functioning as guide portions of guiding a guide roller 7032 mentioned later and are formed in a linear shape in parallel with a linear portion of the hem portion of the work W. That is, the first groove 7027 and the second groove 7028 are provided substantially in parallel with the linear portion of the work W and provided to be gradually remote or proximate to and from the corner portion Cn of the work W. This is because when the first groove 7027 and the second groove 7028 are constituted by a bent shape along the corner portion Cn at the corner portion Cn constituted by a comparatively small radius of curvature, there is a possibility of derailing the guide roller 7032 or making the guide roller 7032 bite or the like as described above.

The first groove 7027 and the second groove 7028 are constituted by a first groove prestep portion 7027a and a second groove prestep portion 7028a extended in a vertical direction, and a first groove post step portion 7027b and a second groove post step portion 7028b extended in a horizontal direction in FIG. 72. Although these are selectively used in subjecting a periphery of the corner portion Cn of the work W to hemming working, a detailed thereof will be described later.

Figure 73:
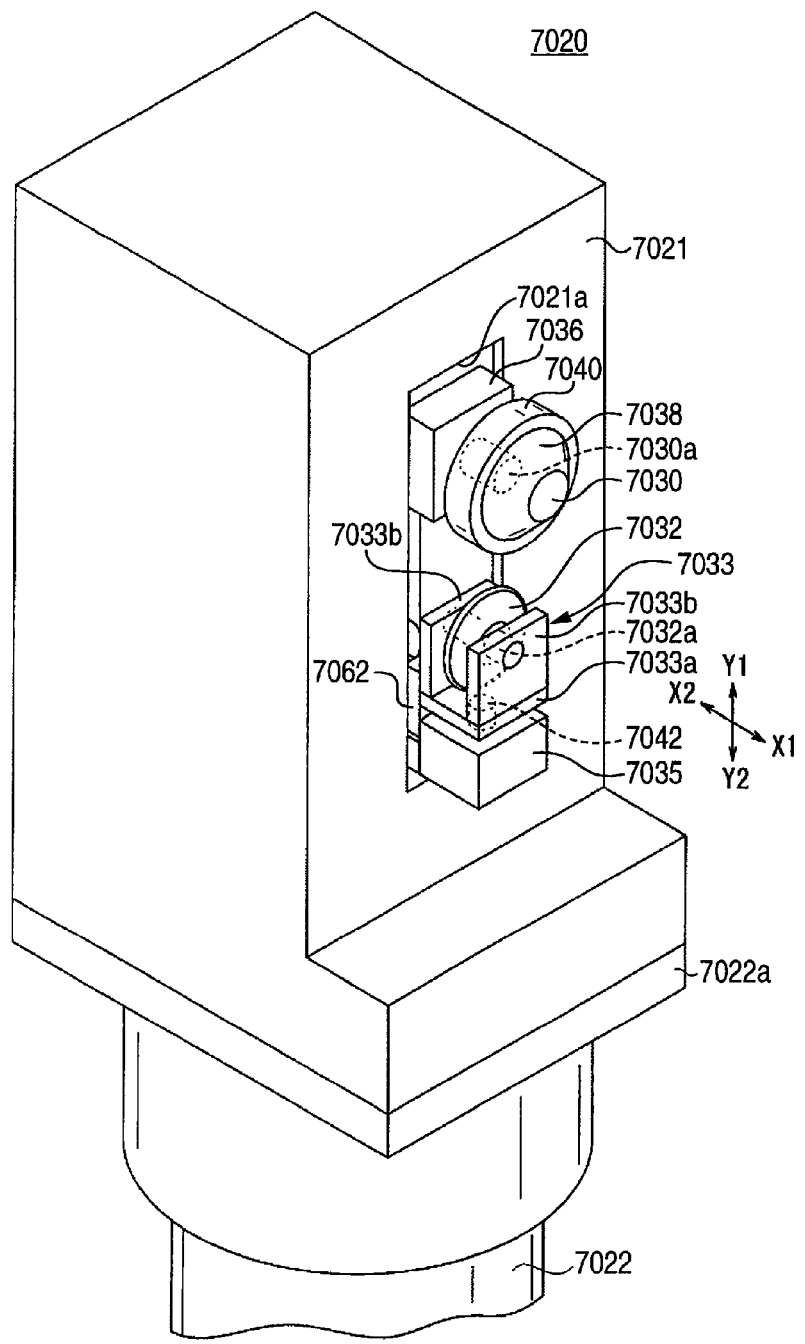
FIG. 73 is a perspective view of a hemming unit provided at a front end of a robot of a hemming working apparatus shown in FIG. 71.

As shown by FIG. 73, the hemming unit 7020 is supported by way of a bracket 7022a fixed to a front end of the robot 7022 and is contained at inside of an outer box 7021 attached to the bracket 7022a. The hemming unit 7020 includes a hemming roller (work roller) 7030 and a guide roller 7032 projected from a long hole portion 7021a formed at a side face of the outer box 7021. Further, in respective drawings of FIG. 73 and thereafter, a direction of projecting a rotating shaft of the hemming roller 7030 from the hole portion 7021a is rectified as X1 direction, a direction opposed thereto is rectified as X2 direction, a direction directed from the guide roller 7032 to the hemming roller 7030 is rectified as Y1 direction and a direction opposed thereto is rectified as Y2 direction in a direction of aligning the hemming roller 7030 and the guide roller 7032. Further, there is a case in which X1 direction and X2 direction are summarizingly referred to as X direction and Y1 direction and Y2 direction are summarizingly referred to as Y direction.

The hemming roller 7030 is axially supported rotatably by a support shaft 7030a at a front end face of a slider 7036 constituting an extruding mechanism (position displacing means) 7034 projected from the hole portion 7021a in X1 direction.

A support frame 7033 in a U-like shape is constituted by a bottom plate 7033a and a pair of side plates 7033b, 7033b projected from both ends in X direction of the bottom plate 7033a in Y1 direction. The guide roller 7032 is axially supported rotatably by a support shaft 7032a between the pair of side plates 7033b, 7033b. Axial directions of the support shafts 7033a and 7032a are directed in X direction. Further, a lower face of the bottom plate 7033a is axially supported turnably by a turning shaft (direction changing means) 7042 projected from a support member 7035 projected from the hole portion 7021a in X1 direction, in a Y1 direction. An axis center of the turning shaft 7024 passes a center of the guide roller 7032. Therefore, according to the guide roller supported by the support frame 7033, a rolling direction thereof is constituted turnably by the turning shaft 7042.

Further, the hemming roller 7030 and the guide roller 7032 are made to be movable in Y direction, and by adjusting an interval between the support shaft 7030a and the support shaft 7032a, the work W pinched by the hemming roller 7030 and the guide roller 7032 can be pressed. The hemming roller 7030 and the guide roller 7032 are supported by the robot 7022 by way of a floating mechanism mentioned later, and constituted to be movable in X direction and Y direction while maintaining positions relative to each other drivenly and elastically movably by an external force.

The hemming roller 7030 is constituted by a taper roller 7038 provided at a front end side, and a circular cylinder roller 7040 provided on a base end side by a structure integral with the taper roller 7038. The taper roller 7038 is a frustum of a circular cone in a converging shape inclined by 45° in a side view thereof. The circular cylinder roller 3040 is constituted by a shape of a circular cylinder having a diameter slightly larger than that of a maximum diameter portion on the base end side of the taper roller 7038.

Figure 76:
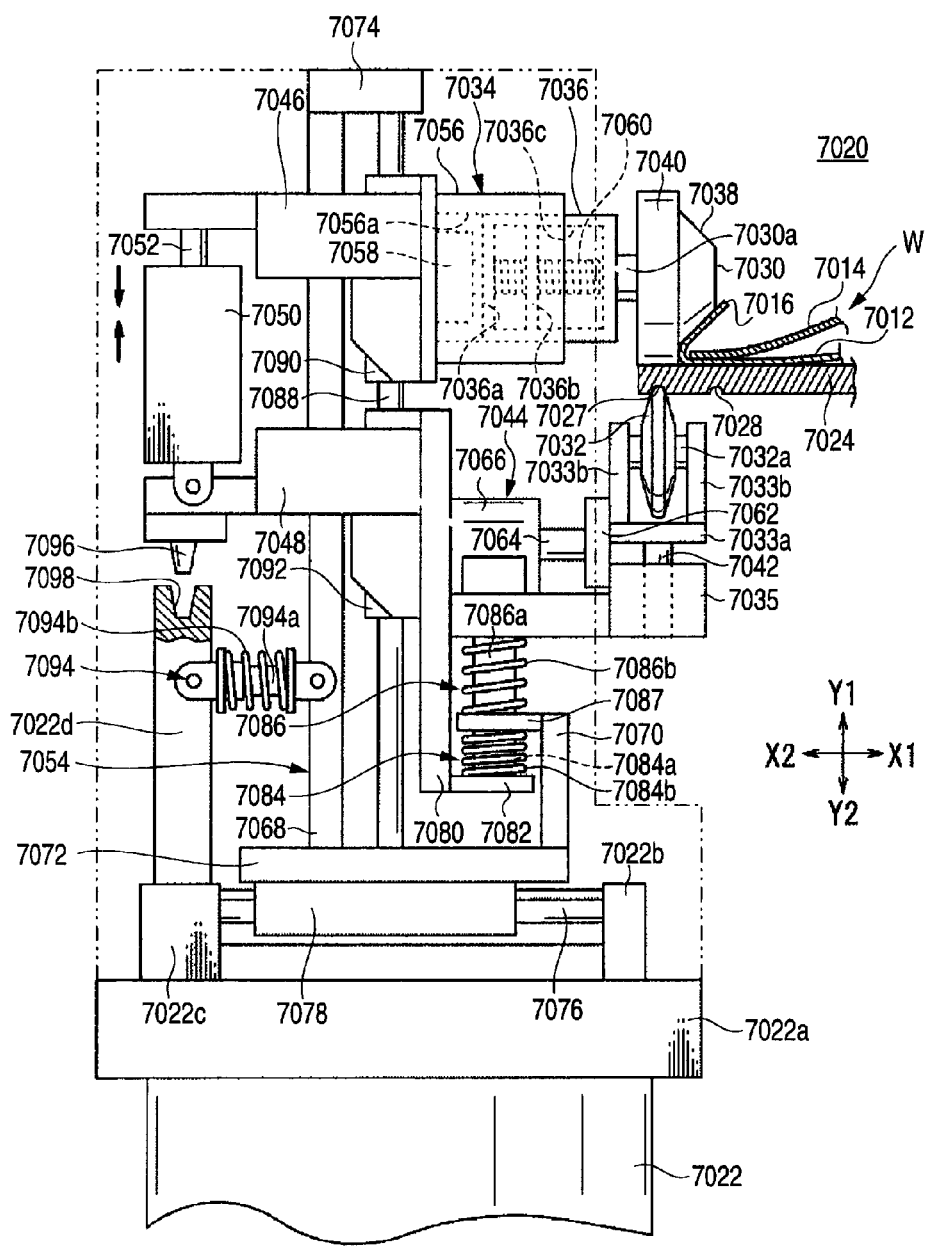
FIG. 76 is a partially sectional side view showing a state in hemming working of the hemming unit shown in FIG. 73.

The guide roller 7032 is constituted by a shape of a circular disk a surrounding of which is set to a narrow width and is made to be engageable with the first groove 7027 or the second groove 7028 provided at the die 7024 (refer to FIG. 76 or the like). The guide roller 7032 achieves a function of guiding the hemming roller 7030 along the flange 7016 while restraining a displacement in X direction and Y direction relative to the flange 7016 of the hemming roller 7030.

Figure 74:
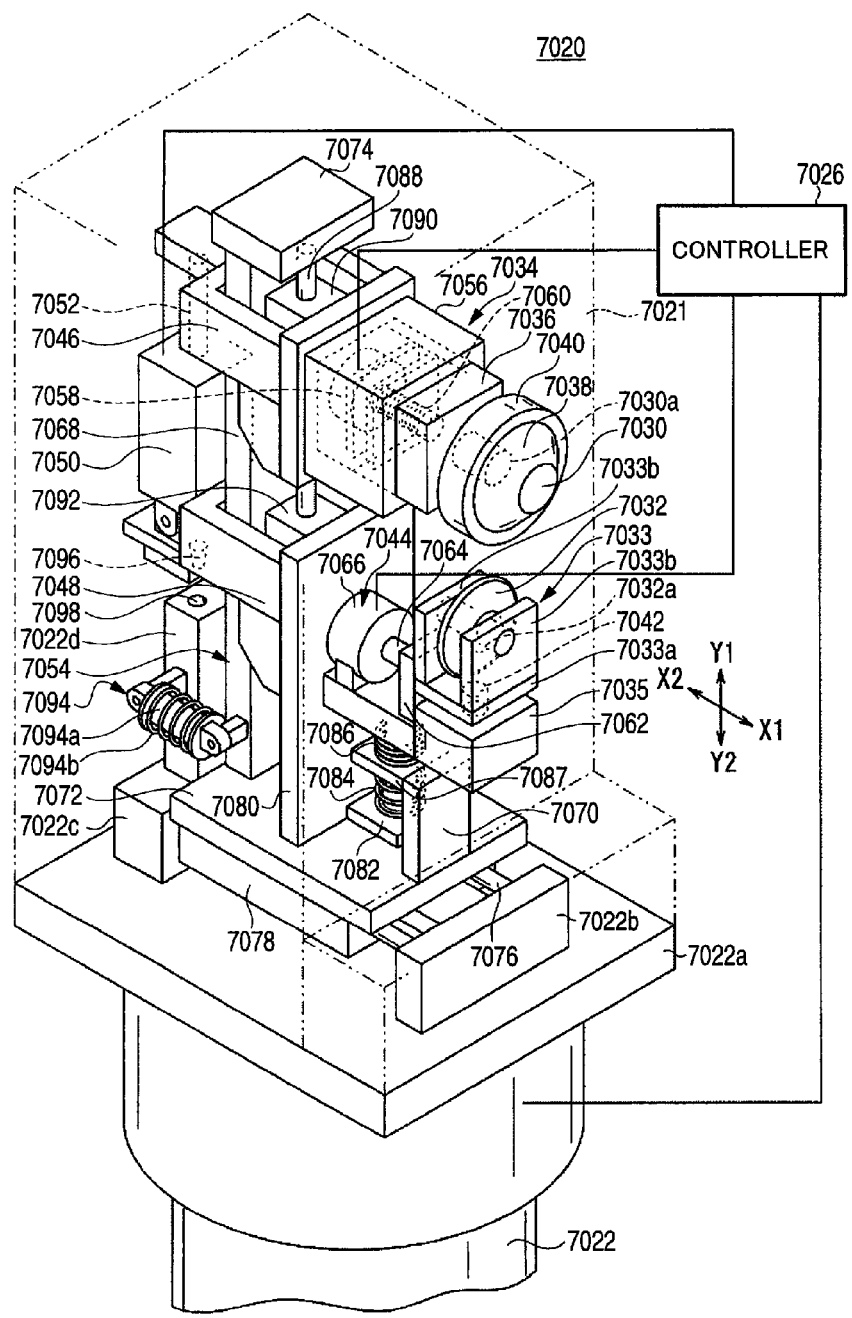
FIG. 74 is a perspective view showing a structure of a hemming unit shown in FIG. 73.
Figure 75:
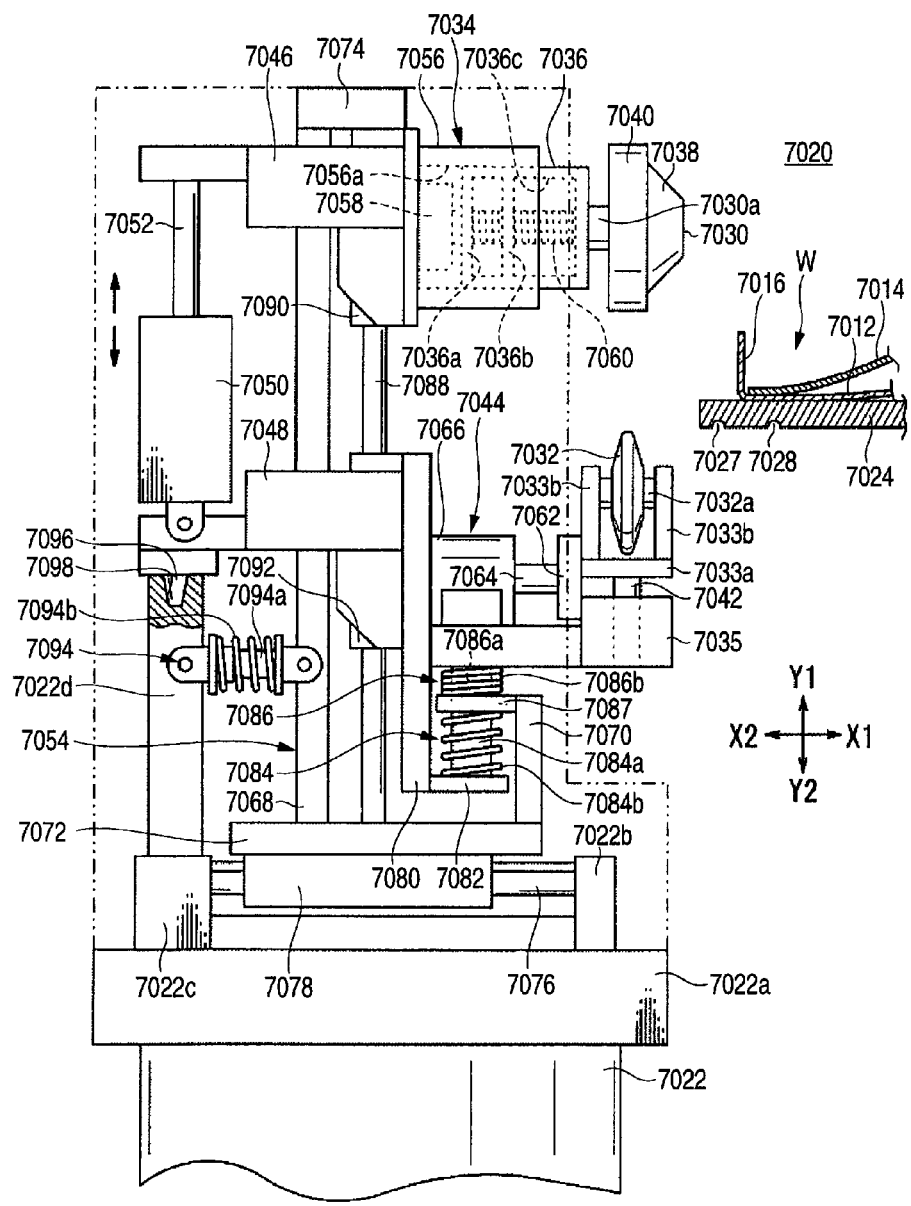
FIG. 75 is a partially sectional side view showing a state before hemming working of the hemming unit shown in FIG. 73.

Here, the hemming unit 7020 will be explained in details in reference to FIG. 74 through FIG. 76. FIG. 74 is a perspective view showing a structure of the hemming unit 7020, FIG. 75 is a partially sectional side view showing a state before hemming working of the hemming unit 7020, and FIG. 76 is a partially sectional side view showing a state in hemming working of the hemming unit 7020. Further, in FIG. 74 through FIG. 76, the outer box 7021 is illustrated perspectively by a two-dotted chain line to be able to optically recognize the structure of the hemming unit 7020.

The hemming unit 7020 includes an extruding mechanism 7034 for supporting the hemming roller 7030 displaceably in an axial direction thereof (X direction) and a locking mechanism 7044 for selectively controlling to switch an allowability of the turning operation of the guide roller 7032. Further, the hemming unit 7020 includes a first movable portion 7046 for supporting the extruding mechanism 7034 at a front end (end face in X1 direction), a second movable portion 7048 for supporting the support member 7035 and the locking mechanism 7044 at a front end (end face in X1 direction), and a cylinder 7050 and a rod 7052 for displacing the first movable portion 7046 and the second movable portion 7048 in Y direction. The first movable portion 7046, the second movable portion 7048 and the cylinder 7050 are supported by the robot 7022 by way of a base portion 7054.

The extruding mechanism 7034 includes a support member 7056 in a square pillar shape formed with a hole portion 7056a, a motor 7058, a ball screw 7060 connected to a rotating shaft of the motor 7058, and a slider 7036 formed with a hole portion 7036c inwardly mounted with nuts 7036a and 7036b screwed to the ball screw 7036. The motor 7058 is, for example, a servo motor. By driving to rotate the ball screw 7060 by the motor 7058, the slider 7036 and the hemming roller 7030 is made to be able to move to extract and retract and made to be able to be fixed at a desired position.

Figure 79:
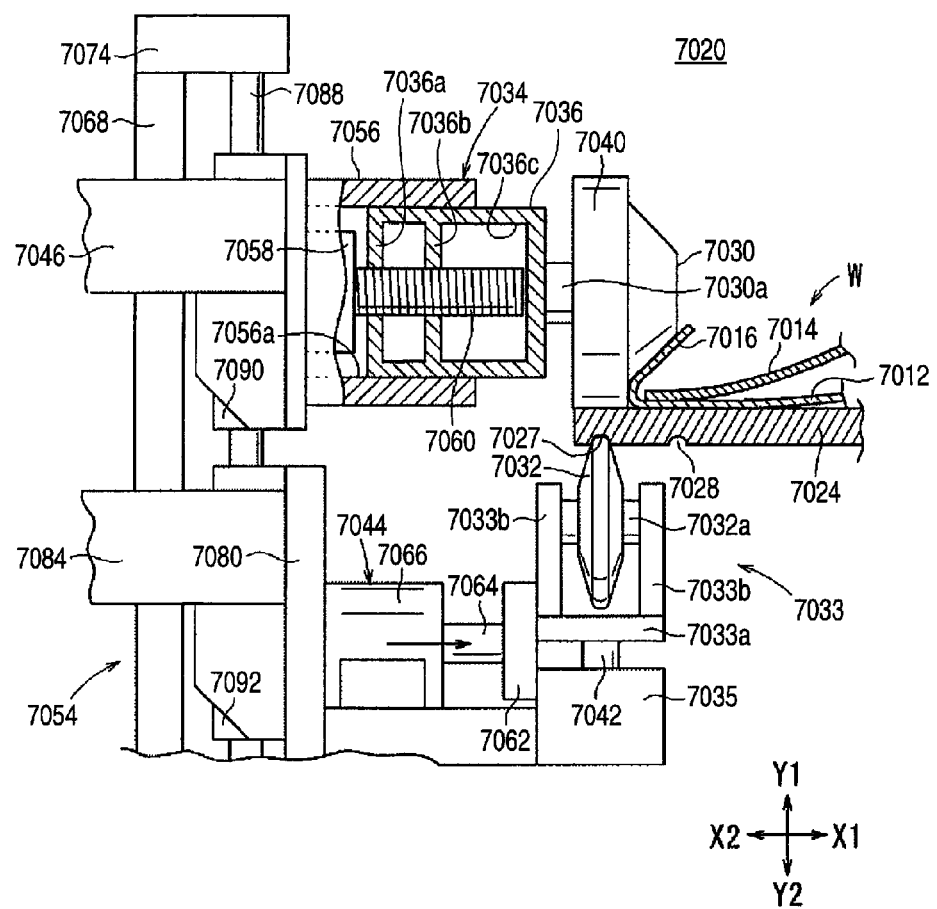
FIG. 79 is a partially sectional side view showing a state of locking a turning operation of a guide roller by a lock mechanism in the hemming unit shown in FIG. 73.

The locking mechanism 7044 includes a rod 7064 for supporting a butting portion 7062 in a flat plate shape at a front end thereof, and a cylinder 7066 for displacing the rod 7064 in X direction. According to the locking mechanism 7074, when the rod 7064 is extended in X1 direction and the butting portion 7062 is brought into contact with the side plate 7033b of the support frame 7033 for supporting the guide roller 7032 (refer to FIG. 79), the turning operation of the guide roller 7032 centering on the turning shaft 7042 is prohibited (locked) under a driving operation of the cylinder 7066. On the other hand, when the rod 7064 is retracted in X2 direction under the driving operation of the cylinder 7066 and the butting portion 7062 is separated from the support frame 7033 (refer to FIG. 80), the turning operation of the guide roller 7032 centering on the turning shaft 7042 is permitted (unlocked). Further, as shown in FIG. 79, the hemming unit 7020 is constituted such that a lower portion of the butting portion 7062 is also brought into contact with the side face in X2 direction of the support member 7035 when locked by the locking mechanism 7044. Thereby, when the butting portion 7062 is brought into contact with the support frame 7033 in extending the rod 7064, a load in X1 direction is produced at the turning shaft 7042 and a drawback of destructing the turning shaft 7042 can be prevented.

As described above, according to the hemming unit 7020, the hemming roller 7030 and the guide roller 7032 are constituted to be able to displace a position in the axial direction relatively under the operation of the extruding mechanism 7034 and constituted to be able to change a rolling (advancing) direction relatively under the operation of the turning shaft 7042.

Further, as shown by FIG. 74, the operation of the cylinder 7050, the motor 7058, and the cylinder 7066 are controlled to drive by the controller 7026 similar to the operation of the robot 7022.

Next, the base portion 7054 includes a long plate 7068 in a long flat plate shape extended in Y direction in a side view thereof (refer to FIG. 75), a flat plate 7070 shorter than the long plate 7068 provided to align in X1 direction of the long plate 7068, and a third movable portion 7072 for connecting the long plate 7068 and an end face of the flat plate 7070 on Y2 side.

The long plate 7068 is projected from a portion of the third movable portion 7072 slightly on X2 direction of a center thereof in Y1 direction. A front end (Y1 direction end face) of the long plate 7068 is fixed with the front end support member 7074 in the flat plate shape. The third movable portion 7072 is supported by a rail 7076 extended to be supported in X direction between support members 7022b and 7022c fixed to the bracket 7022a displaceably in X direction by way of a linear guide 7078. Further, first supporting means 7084 and second supporting means 7086 are arranged in series between the support member 7035 fixed to the second movable portion 7048 and a support member 7082 projected from a front end (Y2 direction end portion) of an extended portion 7080 extended from the second movable portion 7048 in Y2 direction in X1 direction so as not to be brought into contact with the flat plate 7070. A partitioning portion 7017 is provided between the first supporting means 7084 and the second supporting means 7086 to partition these.

A rail 7088 is extended in parallel with the long plate 7068 on X1 side of the long plate 7068. The first movable portion 7046 and the second movable portion 7048 are supported by the rail 7088 displaceably in Y direction respectively by way of linear guides 7090 and 7092. That is, the first movable portion 7046 and the second movable portion 7048 are supported by the base portion 7054 by way of the linear guides 7090 and 7092 and the rail 7088 or the like.

Here, the second movable portion 7048 is drivenly and elastically supported in Y direction by way of the first supporting means 7084 and the second supporting means 7086 by interposing the partitioning portion 7087. That is, when the second movable portion 7048 is displaced in a direction of being separated from the first movable portion 7046, the second supporting means 7086 is contracted by the partitioning portion 7087 (refer to FIG. 75), and when the second movable portion 7048 is displaced in a direction of being proximate to the first movable portion 7046, the first supporting means 7084 is contracted by the partitioning portion 7087 (refer to FIG. 76).

Further, the projected portion 7022d projected from the support member 7022c in Y1 direction and the long plate 7068 are drivenly and elastically supported by third supporting means 7094. Although it is preferable to provide a pair of two pieces of the third supporting means 7094 to connect both side end portions of the projected portion 7022d and the long plate 7068 in a width direction (direction orthogonal to X direction and Y direction), one piece thereof can also be constituted to connect center portions in width directions of the projected portion 7022d and the long plate 7068.

All of the first supporting means 7084, the second supporting means 7086 and the third supporting means 7094 are constituted by a similar constitution. The first supporting means 7084 is constituted by a shaft portion 7084a and a spring 7084b installed at a surrounding of the shaft portion 7084a. The second supporting means 7086 is constituted by a shaft portion 7086a and a spring 7084b installed at a surrounding of the shaft portion 7084a. Similarly, the third supporting means 7094 is constituted by a shaft portion 7094 and a spring 7094b installed at a surrounding of the shaft portion 7094a. Further, the respective shaft portions 7084a, 7086a, 7094a may be constituted by, for example, hydraulic dumpers or pneumatic dumpers or the like.

According to the hemming unit 7020, the first supporting means 7084 and the second supporting means 7086 are constructed by the above-described constitutions. Therefore, the second movable portion 7048 is supported by the linear guide 7092 displaceably in Y direction relative to the base portion 7054, and drivenly and elastically supported in Y direction relative to the first supporting means 7084, the second supporting means 7086 and the partitioning portion 7087. Similarly, the third supporting means 7094 is constructed by the above-described constitution, and therefore, the base portion 7054 is drivenly and elastically supported in X direction relative to the projected portion 7022d fixed to the robot 7022 by the third supporting means 7094.

Meanwhile, a first stopper 7096 projected in Y2 direction is provided at a back face of a portion of the second movable portion 7048 connected with the cylinder 7050 on the base end side extended in X2 direction. The first stopper 7096 is engageable with a second stopper 7098 opened in Y1 direction at a front end (Y1 direction end portion) of the projected portion 7022d. That is, a front end of the first stopper 7096 is constituted by a projected shape substantially in a shape of a frustum of a circular cone, and the second stopper 7098 is constituted by a recessed shape substantially in a shape of a cone capable of inserting the front end of the first stopper 7096. Thereby, as shown by FIG. 75, the first stopper 7096 and the second stopper 7098 are engaged with each other in a state in which a rod 7052 of the cylinder 7050 is extended and an interval between the hemming roller 7030 and the guide roller 7032 is maximally opened, that is, in a state in which the hemming roller 7030 is remote from the work W before hemming working or after hemming working mentioned later.

On the other hand, the first stopper 7096 and the second stopper 7098 are not engaged with each other in a state in which the rod 7052 of the cylinder 7050 is contracted and the interval between the hemming roller 7030 and the guide roller 7032 are narrowed as shown by FIG. 76, that is, in a state in which the hemming roller 7030 is brought into contact with the work W in hemming working mentioned later.

Further, the first movable portion 7046 is brought into contact with and supported by the front end support member 7074 by a press force in Y1 direction by the rod 7052 connected to the cylinder 7050 in a state in which the first stopper 7096 and the second stopper 7098 are engaged with each other (refer to FIG. 75). On the other hand, in a state in which the rod 7052 of the cylinder 7050 is retracted, and the first stopper 7096 and the second stopper 7098 are not engaged with each other (refer to FIG. 76), the first movable portion 7046 is held in a state of being proximate to the second movable portion 7048 by an attracting force in Y2 direction by the rod 7052.

The hemming unit 7020 of the hemming working apparatus 7010 according to the fifth exemplary embodiment is constituted as described above. That is, the hemming roller 7030 is constituted to be displaceable by the extruding mechanism 7034 in the axial direction (X direction) of the support shaft 7030a. Further, the guide roller 7032 is constituted to be turnable by the turning shaft 7042 along with the support frame 7033 for pinching the support shaft 7032a. Further, the operation of turning the guide roller 7032 by such a turning shaft 7042 can be locked or unlocked under the operation of the locking mechanism 7044.

Further, according to the hemming unit 7020 according to the fifth exemplary embodiment, in a state in which the first stopper 7096 and the second stopper 7098 are not engaged with each other (refer to FIG. 76), the first movable portion 7046 and the second movable portion 7048 are supported by the base portion 7054 integrally and displaceably in Y direction by way of the linear guides 7090 and 7092, and the displacement in Y direction is drivenly and elastically supported by the first supporting means 7084 and the second supporting means 7086. Further, the base portion 7054 for supporting the first movable portion 7046 and the second movable portion 7048 in this way is supported by the robot 7022 displaceably in X direction by way of the linear guide 7078 and the displacement in X direction is drivenly and elastically supported by the third supporting means 7094. Therefore, the first movable portion 7046 and the second movable portion 7048, that is, the hemming roller 7030 and the guide roller 7032 are supported by the robot 7022 displaceably in X direction and Y direction and drivenly and elastically.

In this way, according to the hemming unit 7020, the linear guides 7078, 7090, 7092, the first supporting means 7084, the second supporting means 7086 and the third supporting means 7094 are operated as a floating mechanism interposed between the hemming unit 7020 and the robot 7022.

On the other hand, in the state in which the first stopper 7096 and the second stopper 7098 are engaged with each other (refer to FIG. 75), the displacement of the first movable portion 7046 and the second movable portion 7048 in Y direction is restricted by a force of extending the rod 7052 of the cylinder 7050, and the displacement in X direction of the base portion 7054 is restricted by engaging the first stopper 7096 and the second stopper 7098. That is, in this case, the floating operation by the floating mechanism is restricted, and the hemming roller 7030 and the guide roller 7032 are rigidly and fixedly supported by the robot 7022.

Next, an explanation will be given of a hemming working method for subjecting the flange 7016 of the work W including the corner portion Cn to hemming working by using the hemming working apparatus 7010 constituted as described above in reference to FIG. 77 through FIG. 82. In this case, an explanation will be given of the hemming working method according to the fifth exemplary embodiment by exemplifying a case of carrying out hemming working in an order of arrow marks 1 through 4 for a linear portion of the work W indicated by arrow marks 1, 3 and a corner portion Cn indicated by arrow marks 2, 4 of FIG. 78A and FIG. 78B. Further, in FIG. 78A and FIG. 78B, arrow marks 1 through 4 indicate directions of rolling (advancing) the hemming roller 7030 and arrow marks A and B indicate a direction of rolling (advancing) the guide roller 7032. Further, in FIG. 78A and FIG. 78B, for simplicity, the second groove 7028 is omitted and the outer panel 7012, the inner panel 7014 and the flange 7016 are summarizingly illustrated as the work W.

Figure 77:
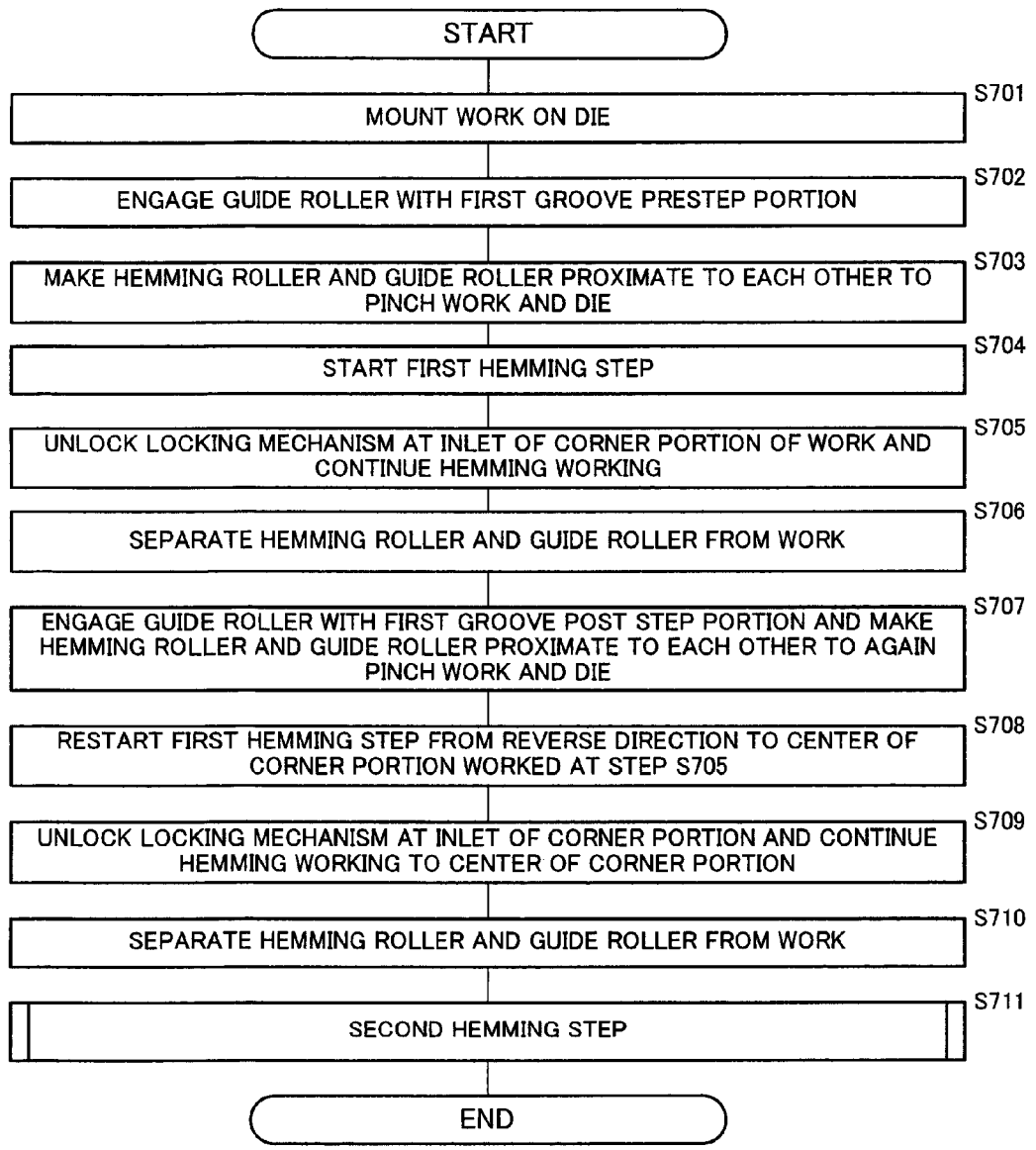
FIG. 77 is a flowchart showing a procedure of a hemming working method by the hemming working apparatus according to the fifth exemplary embodiment.

First, at step S701 of FIG. 77, the work W is mounted above the die 7024 fixed onto the work table 7018. At this occasion, the work W is arranged such that the linear portion and the first groove 7027 are in parallel with each other in a state of corresponding the corner portion Cn to a corner portion of the die 7024.

Figure 78A:
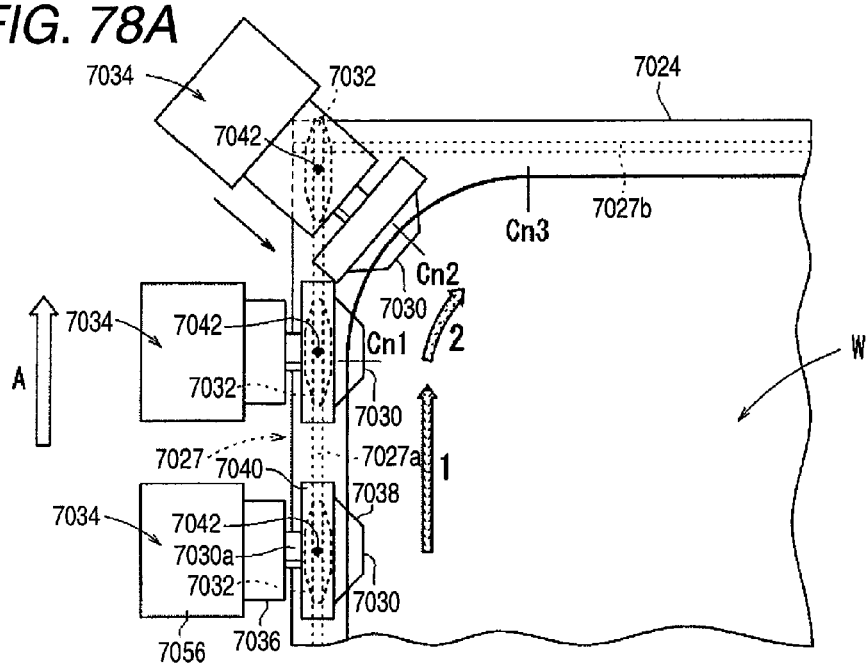
FIG. 78A is an explanatory view for explaining a state of starting hemming working to a center of a corner portion of a work by the hemming unit shown in FIG. 73.

At step S702, the robot 7022 is operated under the control of the controller 7026, and the guide roller 7032 is engaged with the first groove prestep portion 7027a of the first groove 7027 contiguous to the linear portion of the work W (refer to FIG. 78A).

At this occasion, in the hemming unit 7020, there is brought about a state in which the rod 7064 of the cylinder 7066 is extended in X1 direction and the butting portion 7062 is brought into contact with the side plate 7033b of the support frame 7033. That is, the locking mechanism 7044 is brought into the locked state. Thereby, the turning operation by the turning shaft 7042 of the guide roller 7032 is brought into the locked state, and the operation of engaging with the first groove prestep portion 7027a as described above can swiftly and easily be carried out.

Further, the rod 7052 of the cylinder 7050 is extended and the first stopper 7096 and the second stopper 7098 are brought into an engaged state. That is, the floating mechanism is brought into a restricted state. Thereby, the hemming roller 7030 and the guide roller 7032 are positioned in a state of being integrally fixed to the robot 7022 without bringing about rocking or rattling by the floating mechanism. Therefore, positioning of the hemming roller 7030 and the guide roller 7032 can further swiftly and accurately be carried out.

Next, at step S703, the rod 7052 of the cylinder 7050 is retracted, the guide roller 7032 and the hemming roller 7030 are made to be proximate to each other, and the die 7024 is pinched by the guide roller 7032 and the circular cylinder roller 7040 (refer to FIG. 79). Then, the flange 7016 is pressed by the taper roller 7038 to be inclined by 45° along the conical face to bend.

Further, in this case, simultaneously with the operation of pressing the flange 7016 to the taper roller 7038 by retracting the rod 7032 of the cylinder 7050, the engagement between the first stopper 7096 and the second stopper 7098 is disengaged, and the restriction of the floating mechanism at the hemming unit 7020 is released. That is, according to the hemming working apparatus 7010, by the simple operation of retracting the rod 7052 of the cylinder 7050, also the restriction of the floating mechanism can be released along with the operation of pressing the flange 7016 and the taper roller 7038 to be able to be prepared for hemming working explained at the following steps.

Figure 81:
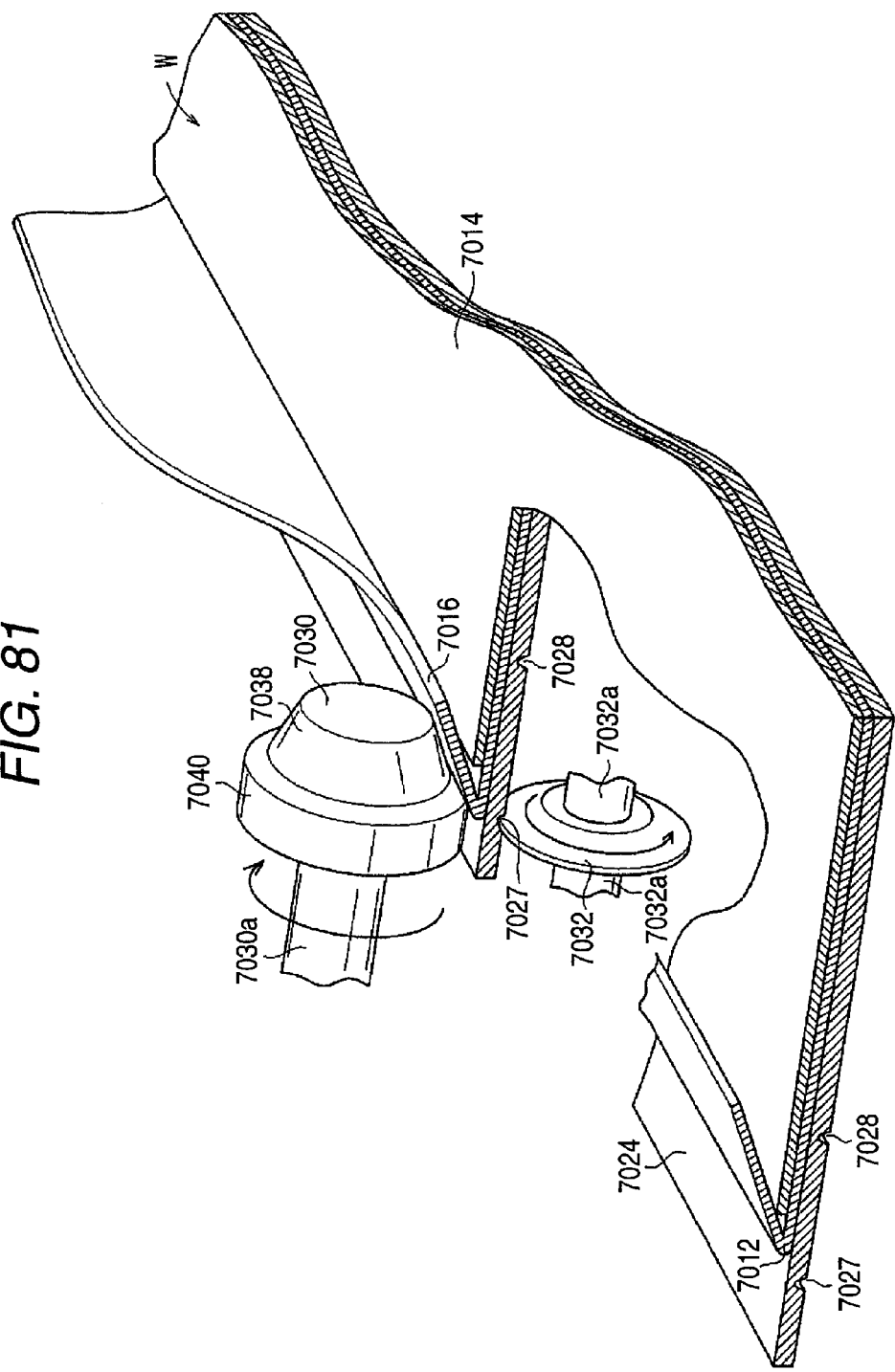
FIG. 81 is a partially sectional perspective view for explaining a state of carrying out a first hemming step for a hem portion of a work by using the hemming unit shown in FIG. 73.
Figure 82:
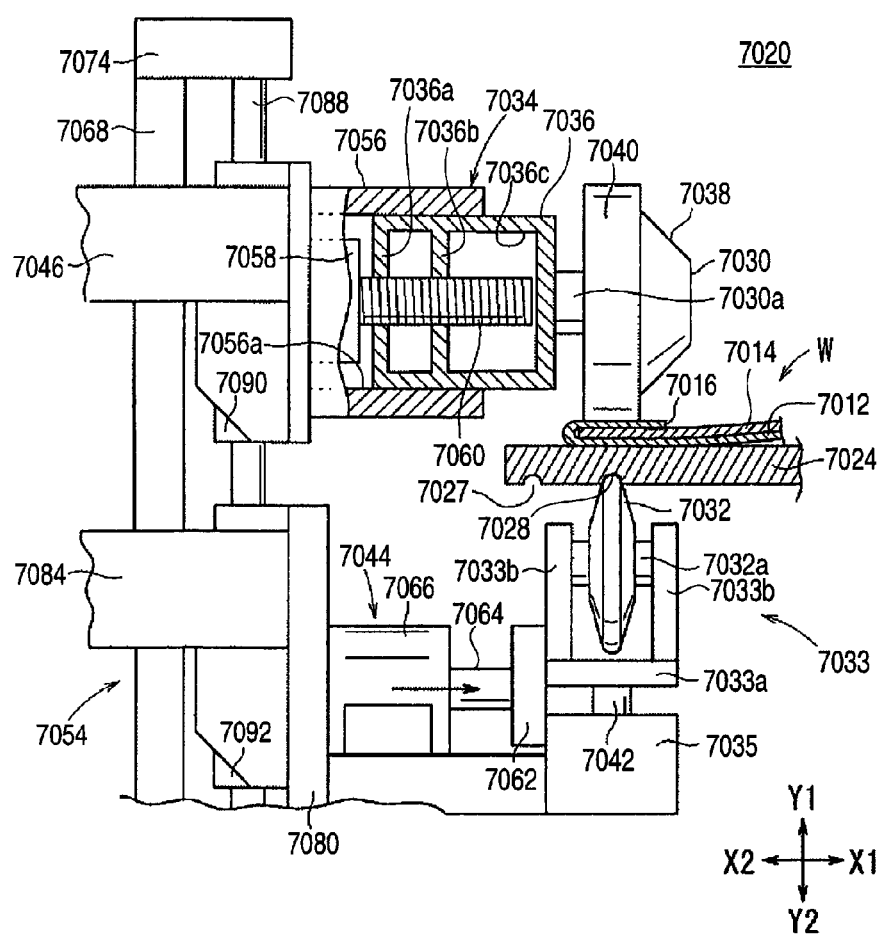
FIG. 82 is a partially sectional side view for explaining a state of carrying out a second hemming step for the hem portion of the work by using the hemming unit shown in FIG. 73.

At step S704, there is started the first hemming step for inclining the flange 7016 of the linear portion of the work W by 45° in the inner side direction to bend along the arrow mark 1 by the hemming roller 7030 by rolling the guide roller 7032 in the arrow mark A direction of FIG. 78A while being engaged with the first groove prestep portion 7027a by bringing the locking mechanism 7044 into the locked state (refer to FIG. 81). That is, there is carried out the first hemming step of continuously bending the flange 7016 by the circular conical face of the taper roller 7038 by rolling the hemming roller 7030 and the guide roller 7032 in the same direction (arrow mark 1 direction) while rotating the hemming roller 7030 and the guide roller 7032 in directions reverse to each other in a state of maintaining a press force or a distance therebetween at a predetermined value.

At this occasion, the locking mechanism 7044 is brought into a locked state as described above, and therefore, the guide roller 7032 and the hemming roller 7030 are rolled respectively in directions along the arrow mark A and the arrow mark 1 without shifting the rolling directions. At this occasion, the hemming roller 7030 and the guide roller 7032 are supported by way of the floating mechanism, and therefore, the hemming roller 7030 and the guide roller 7032 are displaceable in X direction and Y direction while maintaining positions thereof relative to each other. Therefore, even when there is a more or less error in the locus of operating the robot 7022, the guide roller 7032 can be moved to accurately follow the first groove prestep portion 7027*a*, and the speed of rolling the hemming roller 7030 and the guide roller 7032 can be made to be a high speed.

Further, when the hemming working for the arrow mark 1 portion of FIG. 78A is finished and the hemming roller 7030 and the guide roller 7032 reach a corner portion inlet (point Cn1) of the work W, successively, step S705 is carried out.

Figure 80:
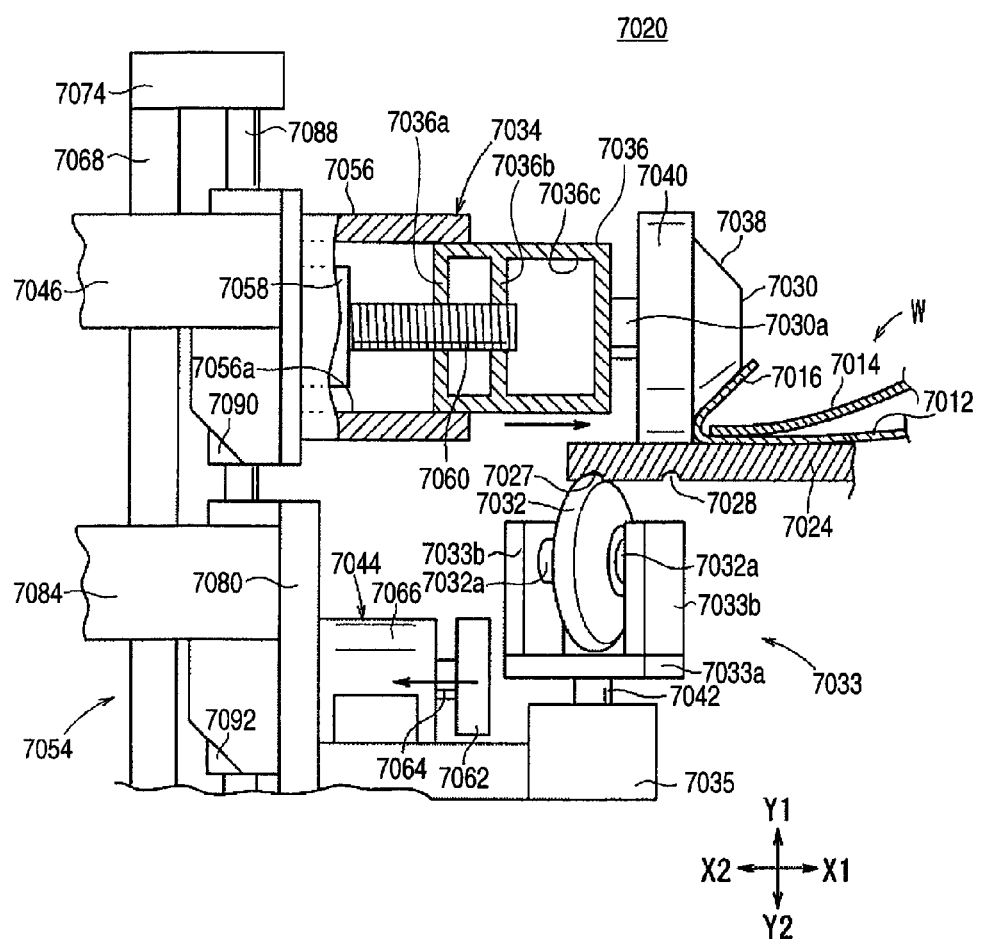
FIG. 80 is a partially sectional side view showing a state of unlocking the lock mechanism in the hemming unit shown in FIG. 73.

That is, at step S705, when the hemming roller 7030 and the guide roller 7032 reach the corner portion inlet, as shown by FIG. 80, the rod 7064 of the cylinder 7066 is retracted, and the locking mechanism 7044 is brought into the unlocked state. Simultaneously, the robot 7022 is going to move the hemming roller 7030 along a shape of the corner portion Cn of the work W, that is, in the arrow mark 2 direction. Then, since the locking mechanism 7044 is brought into the unlocked state as described above, the guide roller 7032 is operated to turn centering on the turning shaft 7042. Therefore, as shown by FIG. 78A, the guide roller 7032 is rolled in the arrow mark A direction and the hemming roller 7030 is rolled in the arrow mark 2 direction by the robot 7022.

Meanwhile, when the guide roller 7032 is rolled in the arrow mark A direction along the first groove prestep portion 7027*a* as described above and is gradually separated from the corner portion Cn, also the hemming roller 7030 is going to be gradually separated from the corner portion Cn by being dragged by the guide roller 7032. However, according to the hemming working apparatus 7010 according to the fifth exemplary embodiment, the hemming roller 7030 is supported by the extruding mechanism 7034, and therefore, the hemming roller 7030 can be extruded in the axial direction by the extruding mechanism 7034 relative to the guide roller 7032 gradually separated from the corner portion Cn. That is, when hemming working is carried out in the arrow mark 2 direction to be along the shape of the corner portion Cn, by carrying out the working while gradually extruding the hemming roller 7030 by the extruding mechanism 7034, the hemming roller 7030 can be rolled to be along the corner portion Cn of the work W. Thereby, the flange 7016 of the corner portion Cn can firmly be subjected to hemming working by the hemming roller 7030.

Further, when hemming working for the arrow mark 2 portion of FIG. 78A is finished as described above and the hemming roller 7030 reaches a center (point Cn2) of the corner portion Cn of the work W, step S706 is carried out successively.

At step S706, the hemming roller 7030 and the guide roller 7032 are separated from the work W and the die 7024 by prolonging the distance between the hemming roller 7030 and the guide roller 7032 by extending the rod 7052 of the cylinder 7050.

Next, at step S707, by extending the rod 7064 of the cylinder 7066, the butting portion 7062 is brought into contact with the side plate 7033*b* of the support frame 7033, the guide roller 7032 is returned to an original point position (position at which the direction of rolling the guide roller 7032 and the direction of rolling the hemming roller 7030 become the same direction) and the locking mechanism 7044 is brought into the locked state. Further, the robot 7022 is operated in the state of restricting the floating mechanism, and the guide roller 7032 is engaged with the first groove post step portion 7027*b* contiguous to the linear portion of the work (arrow mark 3 in FIG. 78B).

Further, similar to step S703, the rod 7052 of the cylinder 7050 is retracted, the guide roller 7032 and the hemming roller 7030 are made to be proximate to each other, and the die 7024 is pinched by the guide roller 7032 and the circular cylinder roller 7040 (refer to FIG. 79). Then, the flange 7016 is pressed by the taper roller 7038 and is inclined by 45° along the conical face to bend.

Figure 78B:
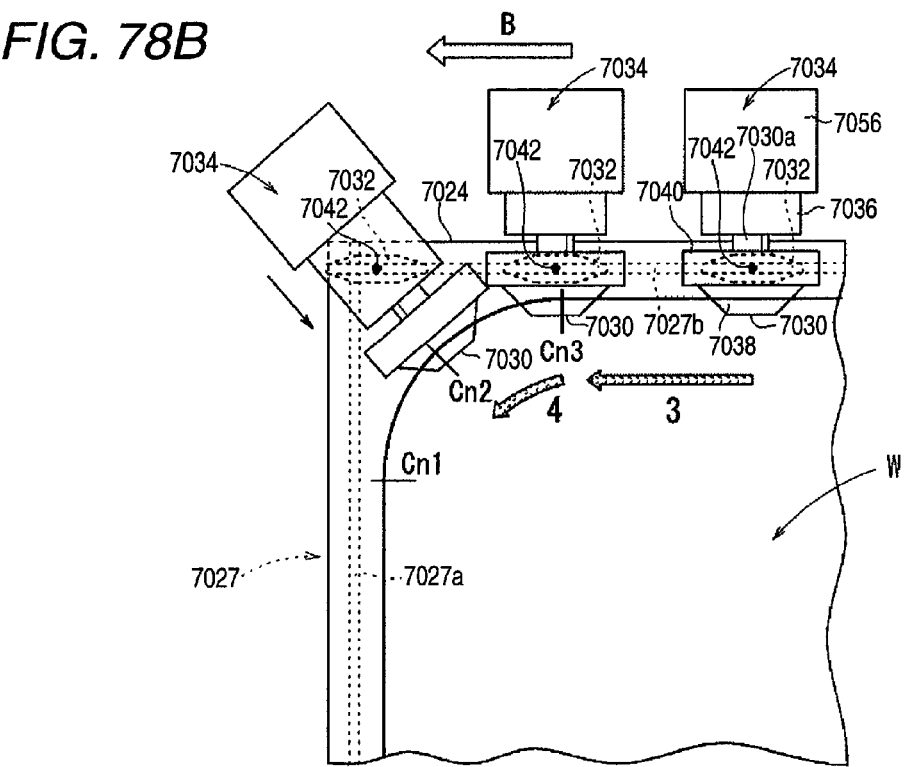
FIG. 78B is an explanatory view for explaining a state of restarting hemming working to the center of the corner portion of the work from a reverse direction after finishing hemming working shown in FIG. 78A.

At step S708, similar to step S704, there is restarted the first hemming step of inclining the flange 7010 of the linear portion of the work W by 45° in the inner side direction to bend along the arrow mark 3 direction by the hemming roller 7030 by rolling the guide roller 7032 in the arrow mark B direction of FIG. 78B while engaging the guide roller 7032 with the first groove post step portion 7027B while bringing the locking mechanism 7044 into the locked state. That is, hemming working is started from a direction reverse to that of step S704 to the center (point Cn2) of the corner portion Cn.

Further, when hemming working for the arrow mark 3 portion of FIG. 78B is finished and the hemming roller 7030 and the guide roller 7032 reach a corner portion inlet (point Cn3), step S709 is successively carried out.

That is, at step S709, when the hemming roller 7030 and the guide roller 7032 reach point Cn3, as shown by FIG. 80, the rod 7064 of the cylinder 7066 is retracted, and the locking mechanism 7044 is brought into the unlocked state. Simultaneously, the robot 7022 is going to move the hemming roller 7030 along the shape of the corner portion Cn of the work W, that is, in the arrow mark 4 direction. Then, the locking mechanism 7044 is brought into the unlocked state as described above, and therefore, the guide roller 7032 is operated to turn centering on the turning shaft 7042. Therefore, similar to step S705, as shown by FIG. 78B, the guide roller 7032 is rolled in the arrow mark B direction and the hemming roller 7030 is rolled in the arrow mark 4 direction by the robot 7022.

Further, when the hemming roller 7030 is rolled in the arrow mark 4 direction, similar to step S705, by extending the hemming roller 7030 by the extruding mechanism 7034 to work, the hemming roller 7030 can be rolled along the corner portion Cn of the work W.

Further, when hemming working of the arrow mark 4 portion of FIG. 78B is finished and the hemming roller 7030 reaches the corner portion center (point Cn2) of the work W, the first hemming step for the flange 7016 at a periphery of the corner portion Cn of the work W is finished.

Thereafter, at step S710, the hemming roller 7030 and the guide roller 7032 are separated from the work W and the die 7024 by prolonging the distance between the hemming roller 7030 and the guide roller 7032 by extending the rod 7052 of the cylinder 7050.

When the first step (preliminary bending, prehemming) of folding to bend the flange 7016 of the work W by about 45° is finished, next, there is carried out a second hemming step (finish bending, regular hemming) of bending the flange 7016 to be brought into contact with the inner panel 7014.

That is, at step S711, first, the guide roller 7032 is engaged with the second groove prestep portion 7028*a* of the second groove 7028 in the state of restricting the floating mechanism by locking the locking mechanism. Successively, the work W and the die 7024 are pinched by making the hemming roller 7030 and the guide roller 7032 proximate to each other, and the flange 7016 is folded to bend by 90° (refer to FIG. 82). Thereafter, there is continuously carried out the second hemming step of bending the flange 7016 further by 45° from the first hemming step to the inner side direction, that is, by 90° from an initial angle by the circular cylinder roller 7040 of the hemming roller 7030 by rolling the guide roller 7032 while being engaged with the second groove 7028. That is, the second hemming step is carried out by continuously bending the flange 7016 by an outer peripheral circular cylinder face of the circular cylinder roller 7040 by rolling the hemming roller 7030 and the guide roller 7032 while being rotated in directions reverse to each other in a state of maintaining a press force or a distance therebetween at a predetermined value.

Also in the second hemming step, similar to the first hemming step explained in the steps S703 through S710, working is carried out in the order of arrow marks 1 through 4 shown in FIG. 78A and FIG. 78B. In this case, an operation of switching to lock and unlock the locking mechanism 7044, and an operation of switching to operate and restrict the floating mechanism may be carried out similar to the operations of the first hemming step.

Further, when the second hemming step is finished, the flange 7016 of the periphery of the corner portion Cn of the work W is firmly bent in the inner side direction to finish hemming working according to the fifth exemplary embodiment.

As described above, according to the hemming working apparatus 710 according to the fifth exemplary embodiment, by providing the turning shaft 7042, even when the first groove 7027 or the second groove 7028 constituting the direction of rolling the guide roller 7032 cannot be provided along the flange 7016 of the work W, the hemming roller 7030 can accurately follow the flange 7016 independently from the guide roller 7032. In other words, even when there is an error (difference) between the locus of the guide roller 7032 and the shape of the flange 7016, working can be carried out in a state of maintaining the rotating shaft of the hemming roller orthogonal to the flange 7016.

Further, by providing the extruding mechanism 7034, even when the error between the locus of the guide roller 7032 and the shape of the flange 7016 is large, the error can be absorbed by displacing the hemming roller 7030 in the axial direction. Further, when the hemming roller 7030 is displaced in the axial direction by using the extruding mechanism 7034 in this way, in a case of increasing, for example, a working speed, a case in which hardness of the work W is high or the like, depending on a condition of a use thereof, there is a case in which a resistance (working reaction force) of the flange 7016 produced at the hemming unit 7020 is varied. In this case, by a reactive operation to the robot 7022 by the working reaction force, there is a possibility of derailing the guide roller 7032 from the first groove 7027 or the second groove 7028, particularly, in a case in which the error between the locus of the guide roller 7032 and the shape of the flange 7016 is large as described above or in a case in which the error of the locus of operating the robot 7022 is large, it is conceivable that the possibility become higher. However, according to the hemming working apparatus 7010 according to the embodiment, the working reaction force from the flange 7016 can be absorbed since the floating mechanism is provided. Therefore, the guide roller 7030 can be moved accurately along the first groove 7027 or the like.

Therefore, according to the hemming working apparatus 7010, derailing of the guide roller 7032 from the first groove 7027 and the second groove 7028, biting or the like of the first groove 7027 or the second groove 7028 or the like can firmly be prevented, the hemming roller 7030 can be made to follow accurately along the shape of the hem portion of the work W. Further, hemming working for the linear portion or the portion having the radius of curvature of the corner portion or the like of the work W can be carried out by one piece of the hemming working apparatus 7010, and therefore, a general purpose performance of an equipment is promoted, and cost can be reduced.

Figure 83:
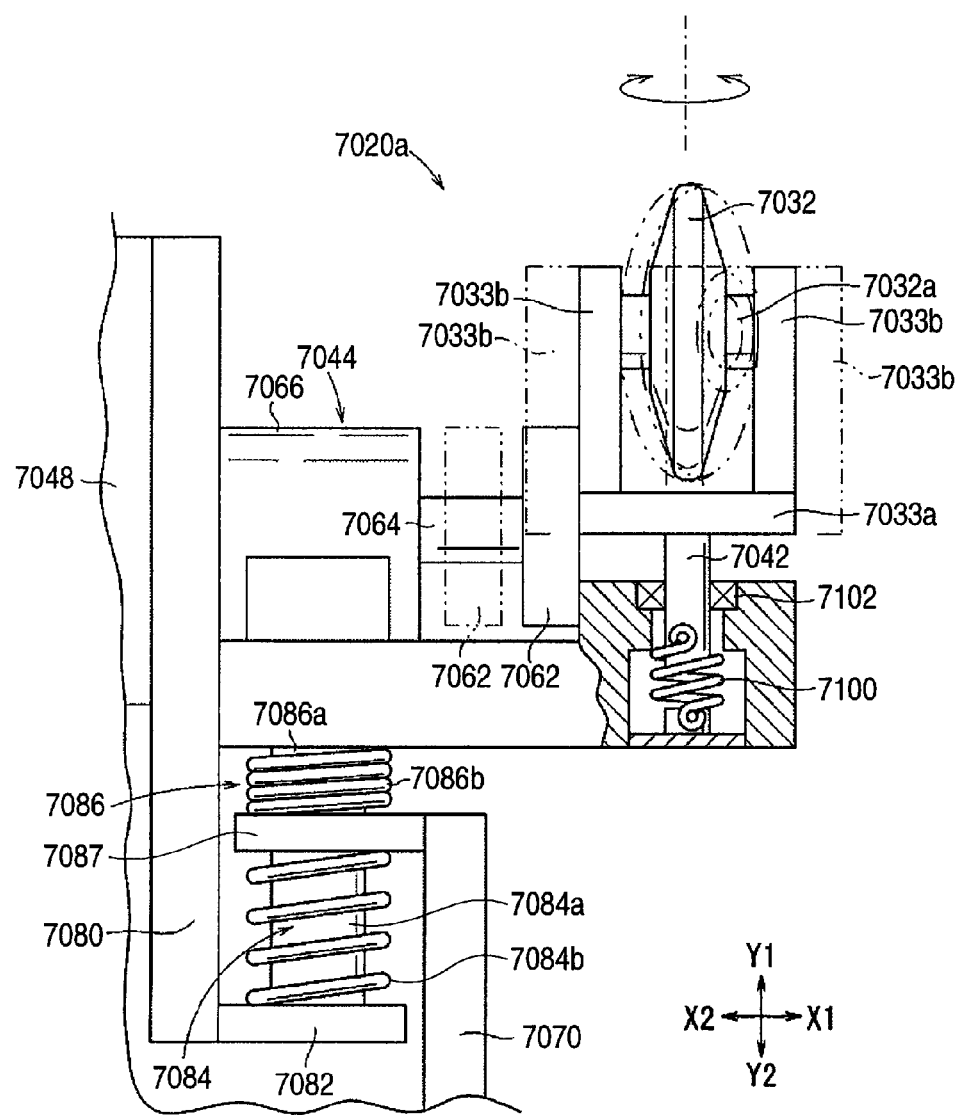
FIG. 83 is a partially sectional side view showing a modified example of providing an original point position returning mechanism for a guide roller of the hemming unit shown in FIG. 73.

Further, at the step S707, after finishing hemming working up to arrow mark 2 of FIG. 78A, the guide roller 7032 is returned to the original point position by extending the rod 7064 of the cylinder 7066. The operation of returning the guide roller 7032 to the original point position can further swiftly be carried out by using a hemming unit 7020a including a support member 7035a constituted by changing a front end portion (X1 direction end portion) of the support member 7035 by which the turning shaft 7042 is axially supported as shown by FIG. 83.

That is, the hemming unit 7020a includes the support member 7035a in place of the support member 7035 in comparison with the hemming unit 7020. Further, at the support member 7035a, the turning shaft 7042 is supported by a torsional coil spring (torsional spring) 7100 and a bearing 7102.

According to the hemming unit 7020a, the guide roller 7032 is swiftly returned to the original point position by a repulsive force of the torsional coil spring 7100 when the guide roller 7032 is detached from the first groove 7027 or the second groove 7028 after carrying out an operation of turning the guide roller 7032 centering on the turning shaft 7042, that is, after finishing hemming working up to, for example, arrow mark 2 of FIG. 78A. Therefore, steps thereafter can further swiftly be started. That is, the torsional coil spring 7100 is operated as an original point returning mechanism of the guide roller 7032. Further, the original point position returning mechanism can be realized even by, for example, a constitution of pinching the turning shaft 7042 by two of coil spring horizontally laid in X direction other than the constitution of using the coil spring 7100.

Figure 84:
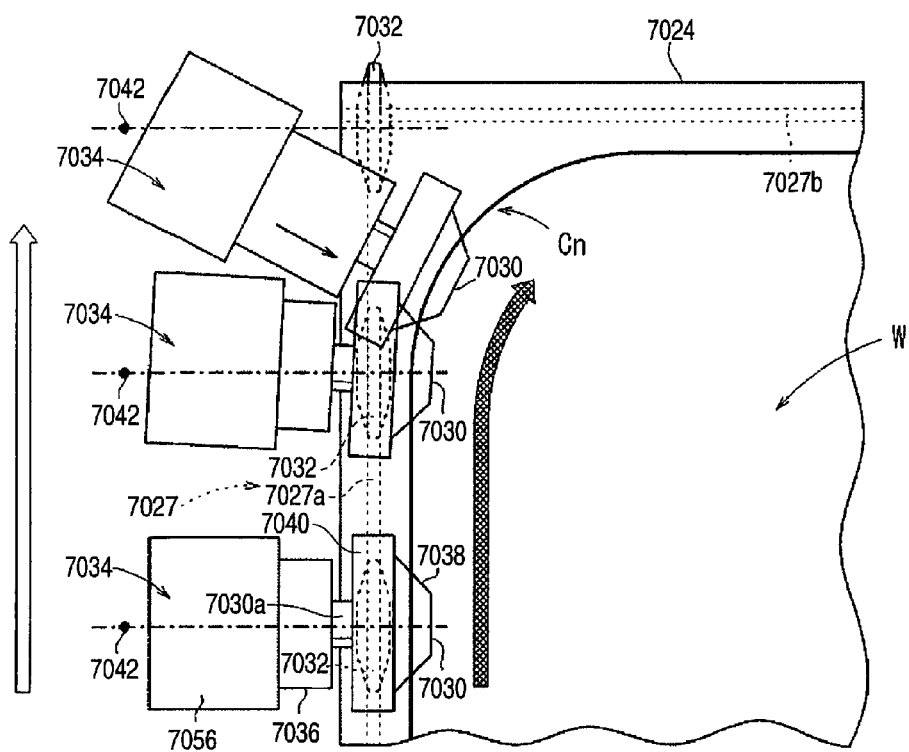
FIG. 84 is an explanatory view showing a modified example of offsetting a turning shaft of the guide roller of the hemming unit shown in FIG. 73 in a base end direction.
Figure 85:
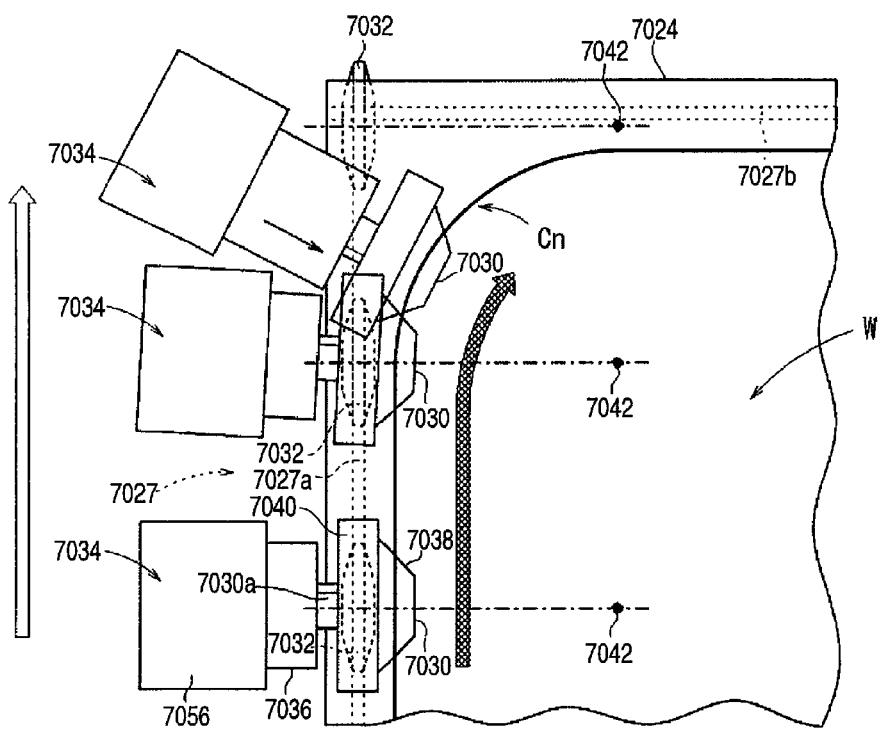
FIG. 85 is an explanatory view showing a modified example of offsetting the turning shaft of the guide roller of the hemming unit shown in FIG. 73 in a front end direction.

Further, although the hemming working apparatus 7010 according to the fifth exemplary embodiment is constituted such that an axis center of the turning shaft 7042 passes a center of the guide roller 7032, a position of installing the turning shaft 7042 in X direction can also be changed as shown by FIG. 84 or FIG. 85. That is, the position in X direction of the turning shaft 7042 may be set to a position offset in the base end direction (X2 direction) relative to the center of the guide roller 7032 (refer to FIG. 84), or a position offset in the front end direction (X1 direction) (refer to FIG. 85) or the like, and these may pertinently be set in accordance with the shape of the work W constituting an object of working, a size of the radius of curvature of the corner portion Cn or the like.

Figure 86:
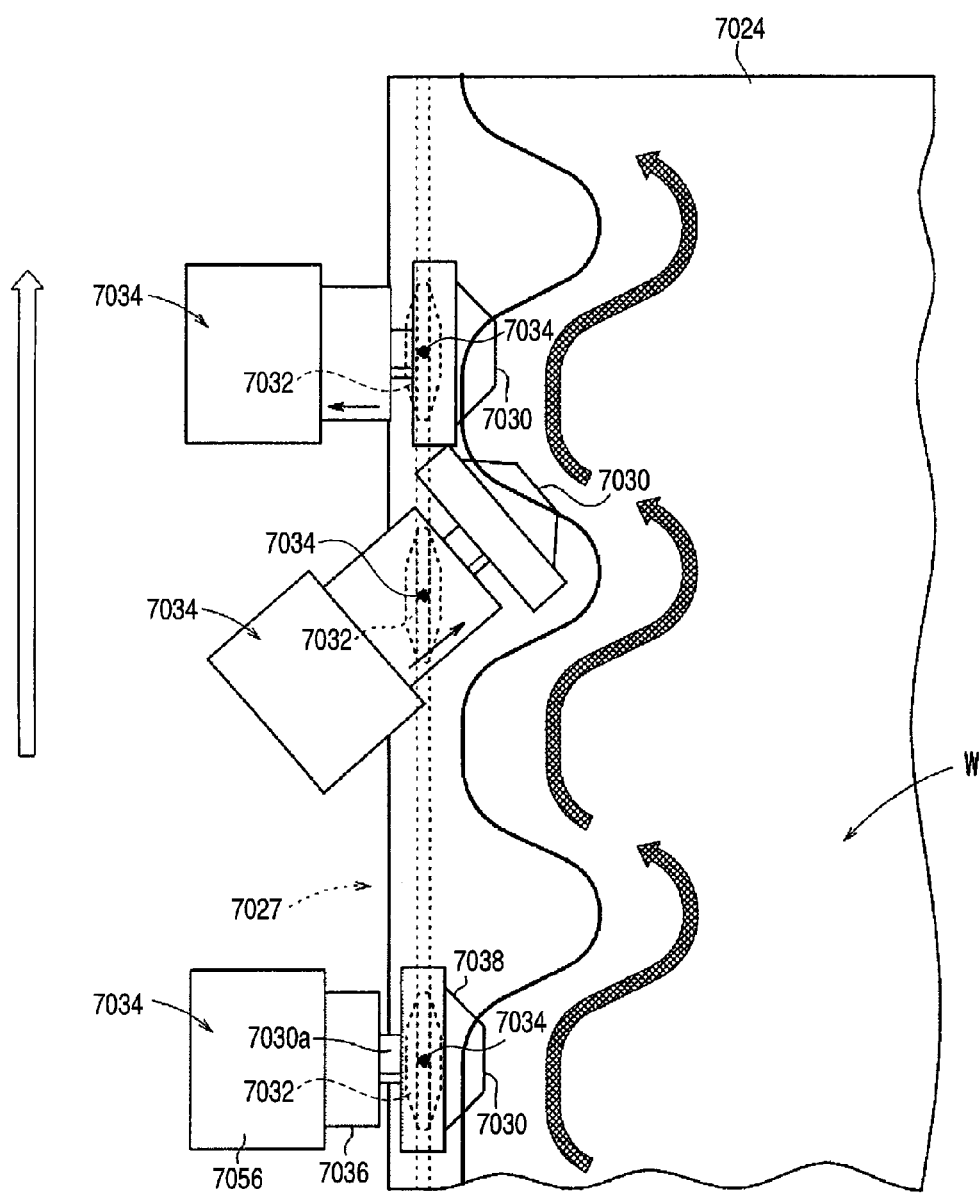
FIG. 86 is an explanatory view for explaining a state of carrying out hemming working for a work a hem portion of which is constituted by a meandering shape.
Figure 87:
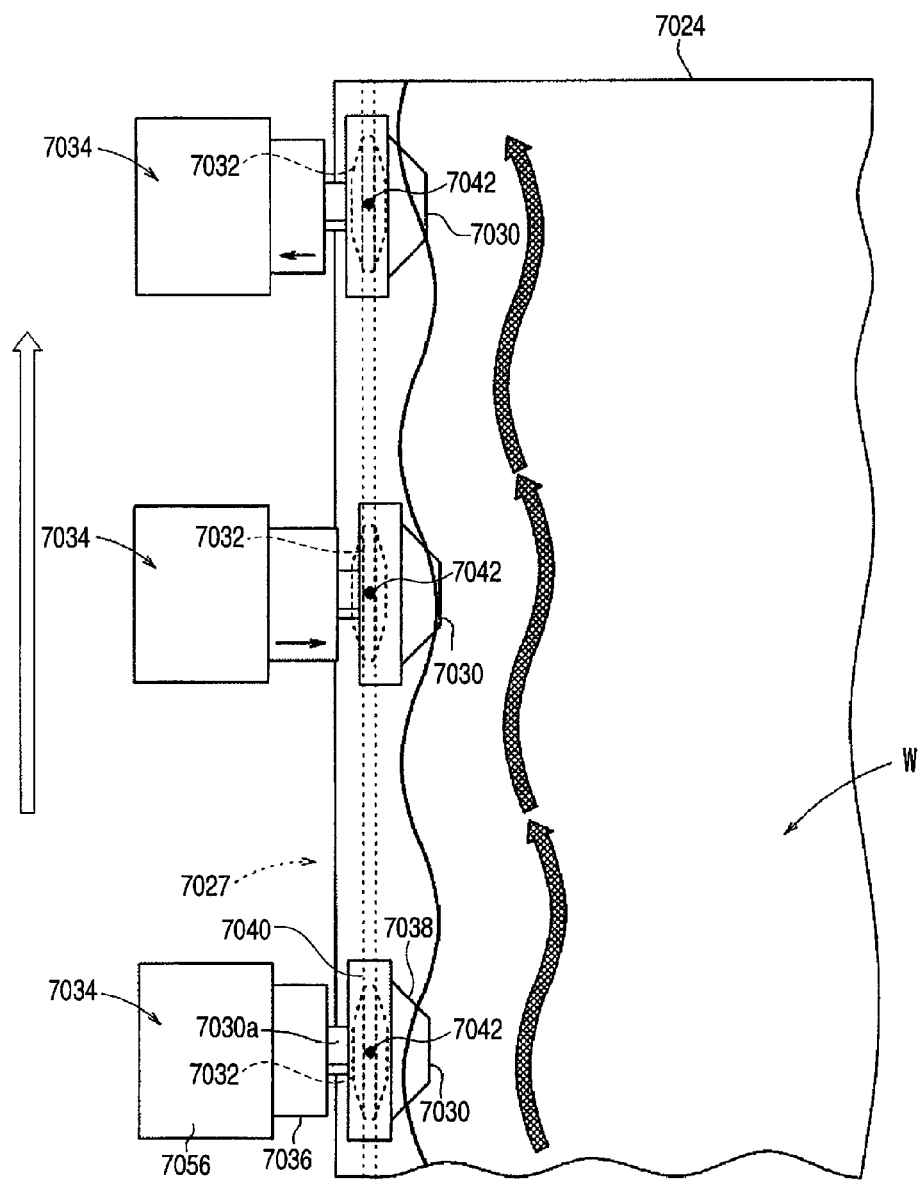
FIG. 87 is an explanatory view for explaining a state of carrying out hemming working for a work constituted by a meandering shape having a small amplitude.

Further, although according to the fifth exemplary embodiment, an explanation has been given of the invention by exemplifying the case of subjecting the periphery of the corner portion Cn of the work W to hemming working by the hemming working apparatus 7010, the hemming working apparatus 7010 can preferably be used for the radius of curvature portion of the work W other than the corner portion Cn. For example, the hemming working apparatus 7010 can effectively be used also for the work W a hem portion of which is constituted by a meandering shape (slalom shape) as shown by FIG. 86. Further, as shown by FIG. 87, hemming working can be carried out by utilizing an operation of pushing out or pulling in the hemming roller 7030 by the extruding mechanism 7034 while bringing the locking mechanism 7044 into the locked state and the work W having a corner portion or a hem portion constituted by a meandering shape having an amplitude smaller than the width of the hemming roller 7030. In this way, according to the hemming working apparatus 7010 according to the fifth exemplary embodiment, the portion having the radius of curvature at the hem portion of the work can effectively be worked other than the linear portion and the corner portion Cn of the work W.

Further, although according to the fifth exemplary embodiment, the hemming roller 7030 is displaced in the axial direction by the extruding mechanism 7034, there can also be constructed a constitution in which the extruding mechanism 7034 is mounted to a side of the guide roller 7032 and the guide roller 7032 is displaced in the axial direction. Similarly, although according to the fifth exemplary embodiment, the turning shaft 7042 and the locking mechanism 7044 are operated to the guide roller 7032, these can also be mounted to the side of the hemming roller 7030.

Further, the first groove 7027 and the second groove 7028 may be made to be able to guide the guide roller 7032, these are not limited to the groove shape but, for example, a ring-like groove may be provided at a peripheral face of the guide roller 7032 by constituting a projected rail (guide portion).

<Sixth Exemplary Embodiment>

Figure 88:
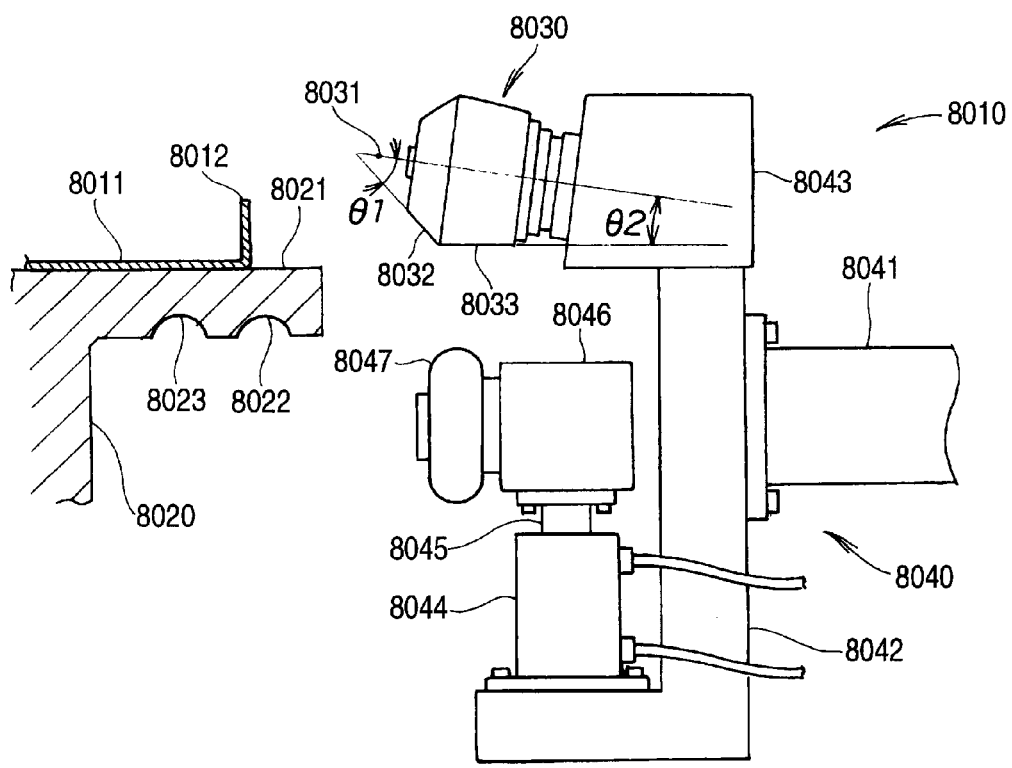
FIG. 88 is a side view of a roller hemming apparatus according to a sixth exemplary embodiment.

FIG. 88 is a side view of a roller hemming apparatus according to a sixth exemplary embodiment. A roller hemming apparatus 8010 includes a work mounting member 8020 for mounting a work 8011, a hemming working roller 8030 having a primary bending face 8032 comprising a taper face inclined to a roller rotating shaft 8031 by a first angle $\theta 1$ and a secondary bending face 8033 comprising a taper face inclined to the roller rotating shaft 8031 by a second angle $\theta 2$, a roller moving mechanism 8040 for relatively moving the hemming working roller 8030 along a flange 8012 erected orthogonally or substantially orthogonally from the work 8011, and a guide portion 8021 for guiding the secondary bending face 8033 when the flange 8012 is bent by the primary bending face 8032.

The work mounting member 8020 is a die fabricated by a stout member referred to as a lower die, preferably by hard steel and includes the guide portion 8021 at an end portion of an upper face thereof and includes a first guide groove 8022 and a second guide groove 8023 at a lower face thereof.

The roller moving mechanism 8040 is constituted by a robot arm 8041, an L-like frame 8042 provided at the robot arm 8041, a roller support block 8043 provided at an upper portion of the L-like frame 8042 for rotatably supporting the hemming working roller 8030, a cylinder unit 8044 provided at a lower portion of the L-like frame 8042, a guide support block 8046 provided at a piston rod 8045 of the cylinder unit 8044, a guide roller 8047 rotatably provided to the guide support block 8046.

The guide roller 8047 is a rotating member selectively fitted to the first groove 8022 and the second groove 8023. The cylinder unit 8044 is preferably a hydraulic cylinder to serve to make the guide roller 8047 proximate to the hemming working roller 8030.

Figure 89:
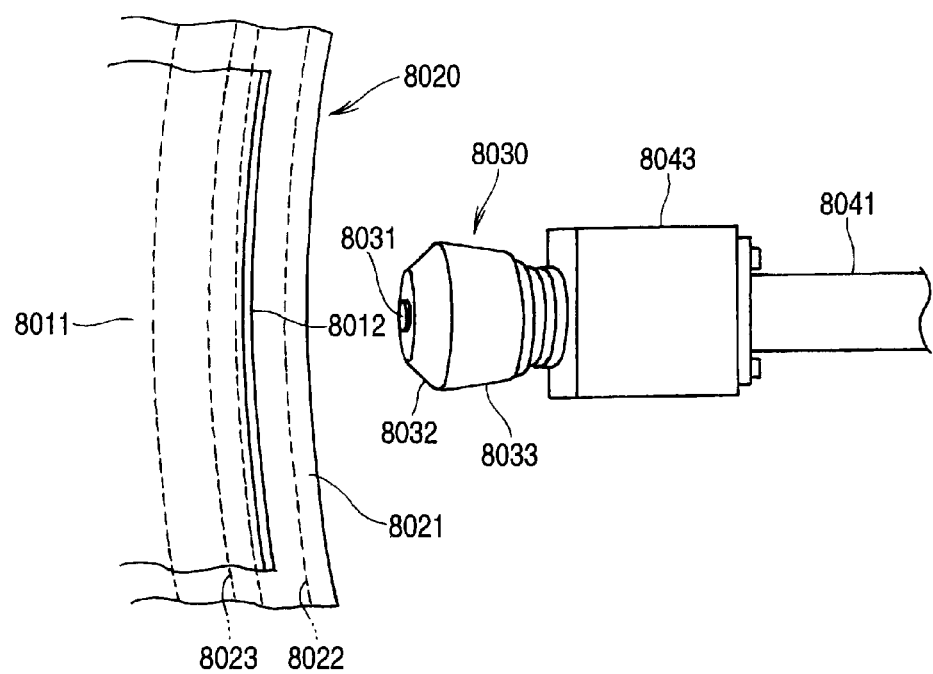
FIG. 89 is a plane view of the roller hemming apparatus according to the sixth exemplary embodiment.

FIG. 89 is a plane view of the roller hemming apparatus according to the sixth exemplary embodiment, the flange 8012 is bent in a recessed shape, and the guide portion 8021, the first guide groove 8022 and the second guide groove 8023 are bent by following the flange 8012.

Figure 90A:
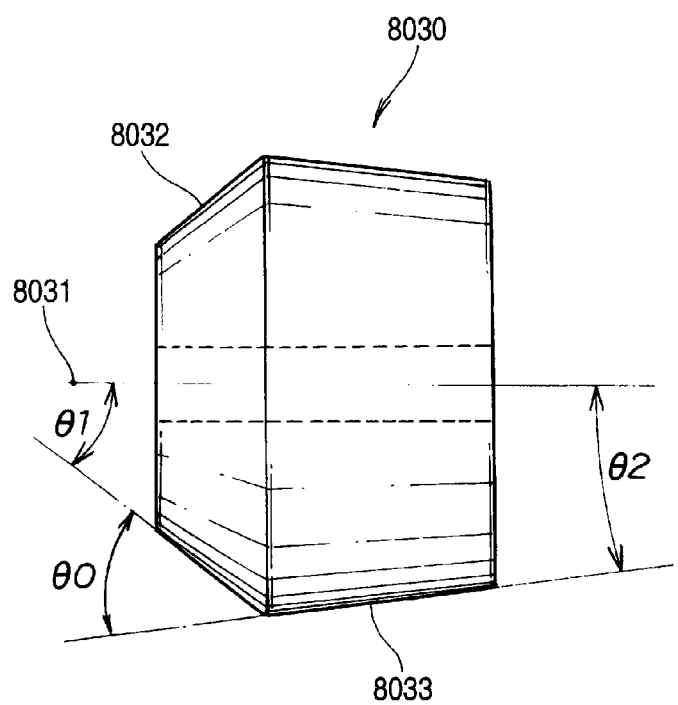
FIG. 90A and FIG. 90B are side views of a roller for hemming working according to the sixth exemplary embodiment.
Figure 90B:

FIG. 90A and FIG. 90B are side views of the hemming working roller according to the sixth embodiment, as shown by FIG. 90A, the hemming working roller 8030 includes the primary bending face 8032 comprising the taper face inclined to the roller rotating shaft 8031 by the first angle $\theta 1$ and the secondary bending face 8033 comprising the taper face inclined to the roller rotating shaft 8031 by the second angle. An angle made by the primary bending face 8032 and the secondary bending face 8033 is defined as $\theta 0$.

The angle $\theta 0$, the first angle $\theta 1$ and the second angle $\theta 2$ will be explained. The angle $\theta 0$ corresponds to a primary bending angle of the flange as can be easily understood from FIG. 91B mentioned later, and is an angle in correspondence with about a half of a total bending angle of the flange. Generally, the total bending angle of the flange is about 90°. At this occasion, $\theta 0$ is set to about 45°.

The second angle $\theta 2$ is determined in correspondence with the bent guide portion 8021. That is, a taper angle is set such that a peripheral speed difference is not brought about between the guide portion 8021 and the secondary bending face 8033 even when the secondary bending face 8033 is rotated on the bent guide portion 8021. The taper angle at this occasion constitutes the second angle $\theta 2$.

The angles $\theta 0$, $\theta 1$, $\theta 2$ shown in FIG. 90A can be shifted to a triangle ABC shown in FIG. 90B. When an angle A is designated by $\theta 1$ and an angle B is designated by $\theta 2$, $\theta 0$ becomes an external angle of an angle C to establish a relationship of $\theta 0 = \theta 1 + \theta 2$. The first angle $\theta 1$ can be determined by a calculation equation of $(\theta - \theta 2)$ from the equation.

Figure 91A:
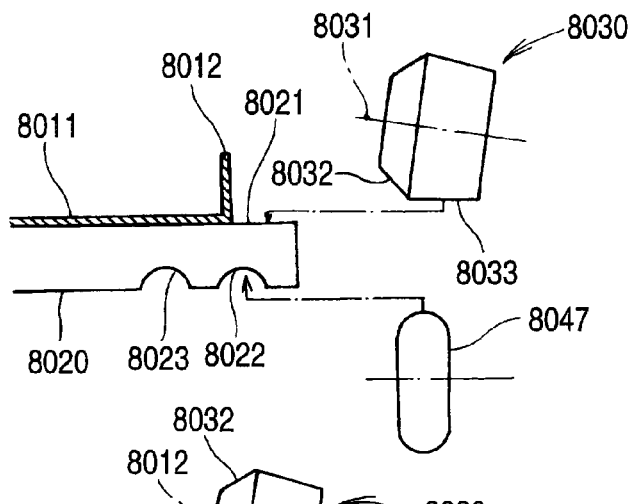
FIG. 91A through FIG. 91C are explanatory views of a primary bending step according to the sixth exemplary embodiment.

Operations of the hemming working roller 8030 and the roller hemming apparatus 8010 will be explained based on FIG. 91A through FIG. 91C (drawings for explaining a primary bending step), and FIG. 92A through FIG. 92C (drawings for explaining a secondary bending step). In FIG. 91A, the work 8011 is mounted on the work mounting member 8020 to clamp. The flange 8012 is erected from the work 8011. The hemming working roller 8030 is moved as shown by an arrow mark to be brought into contact with the guide portion 8021. Simultaneously therewith, the guide roller 8047 is moved as shown by an arrow mark to be brought into contact with the first guide groove 8022.

Figure 91B:
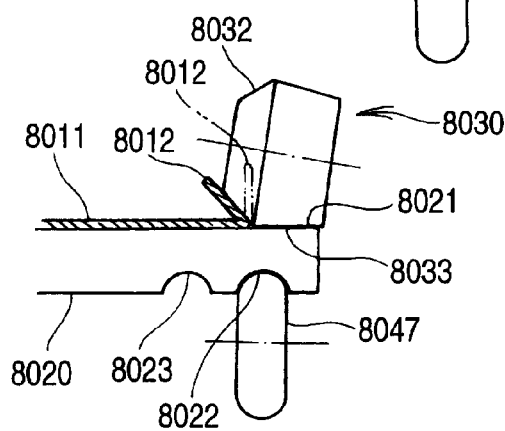
Figure 92A:
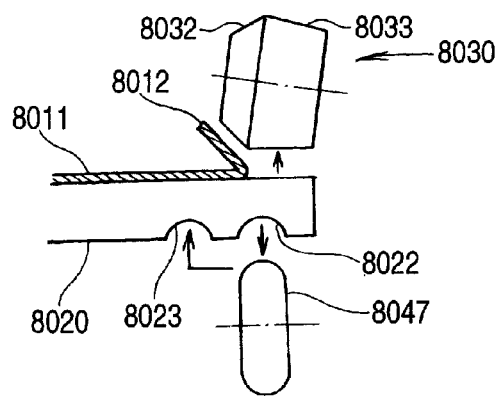
FIG. 92A through FIG. 92C are explanatory views of a secondary bending step according to the sixth exemplary embodiment.

In FIG. 91B, the hemming working roller 8030 is moved while being rotated from a surface side of the drawing to a depth side of the drawing. The guide roller 8047 is fitted to the first guide groove 8022, and therefore, there is not a concern that the hemming working roller 8030 is fluctuated in a left and right direction of the drawing. The flange 8012 shown by an imaginary line is subjected to primary bending as shown by a bold line by the operation of the primary bending face 8032.

Figure 91C:
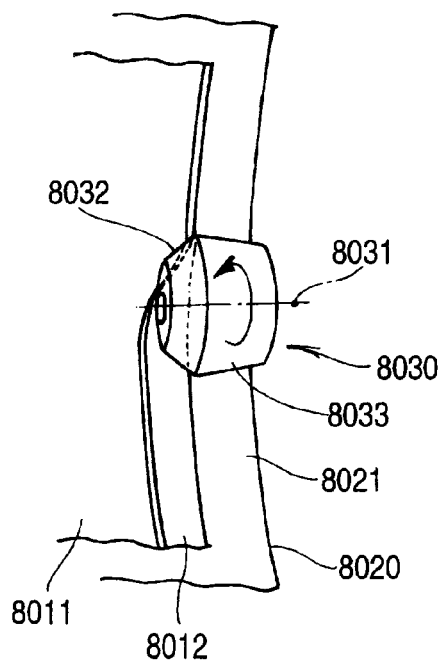

As shown by FIG. 91C constituting a plane view of FIG. 91B, the flange 8012 is primarily bent by the operation of the primary bending face 8032. Although the guide portion 8021 is bent, the secondary bending face 8033 is constituted by the taper face, and therefore, a slip is not brought about between the guide portion 8021 and the secondary bending face 8033. Therefore, there is not a concern of bringing about harmful wear or a scratch at the guide portion 8021 or the secondary bending face 8033.

Secondary bending is carried out successive to the primary bending. In FIG. 92A, the hemming working roller 8030 is moved up. Further, the guide roller 8047 is moved down. The hemming working roller 8030 and the guide roller 8040 are moved to a left side of the drawing, and the guide roller 8047 is fitted to the second guide groove 8023. The flange 8012 shown by an imaginary line is completely bent to a position of a bold line in FIG. 92B.

Figure 92B:
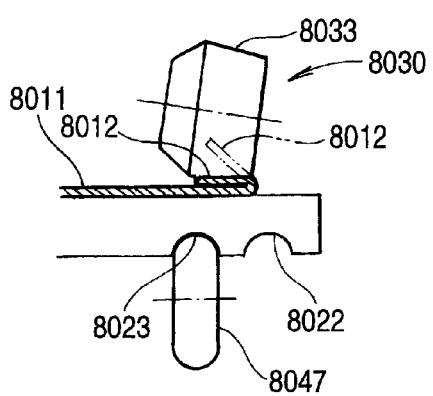
Figure 92C:
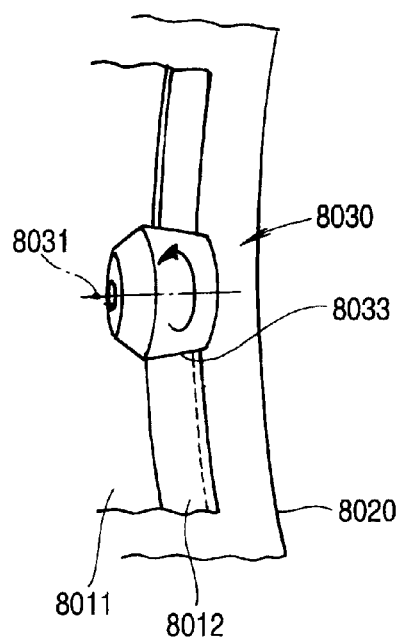

As shown by FIG. 92C constituting a plane view of FIG. 92B, the flange 8012 is secondarily bent by an operation of the secondary bending face 8033. Although the flange 8012 is bent, the secondary bending face 8033 is constituted by the taper face, and therefore, a slip is hardly brought about between the flange 8012 and the secondary bending face 8033. Therefore, there is not a concern of bringing about a harmful scratch at the flange 8012.

Figure 93:
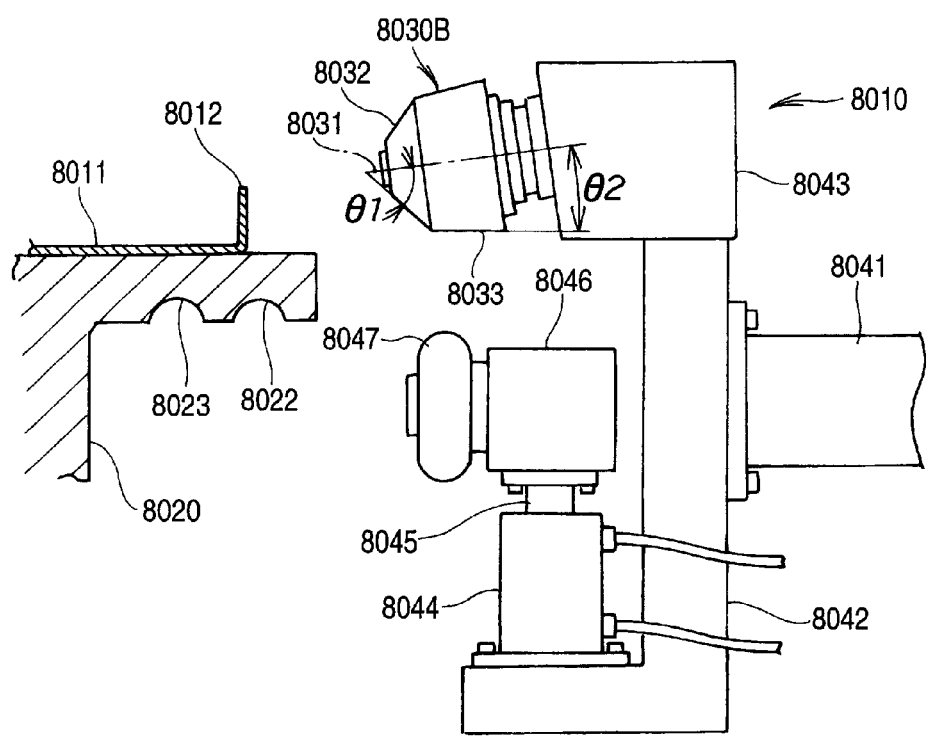
FIG. 93 is a side view of a roller hemming apparatus according to a modified example of the sixth exemplary embodiment.

Next, an explanation will be given of a roller hemming apparatus according to a modified example of the sixth exemplary embodiment. FIG. 93 is a view for showing a modified example of the sixth exemplary embodiment of FIG. 88, and the hemming working roller 8030 of FIG. 88 is changed to a hemming working roller 8030B. A detailed explanation of the other will be omitted by utilizing notations of FIG. 88. That is, the hemming working roller 8030B is provided in a lower skewed direction to the work 8011.

Figure 94:
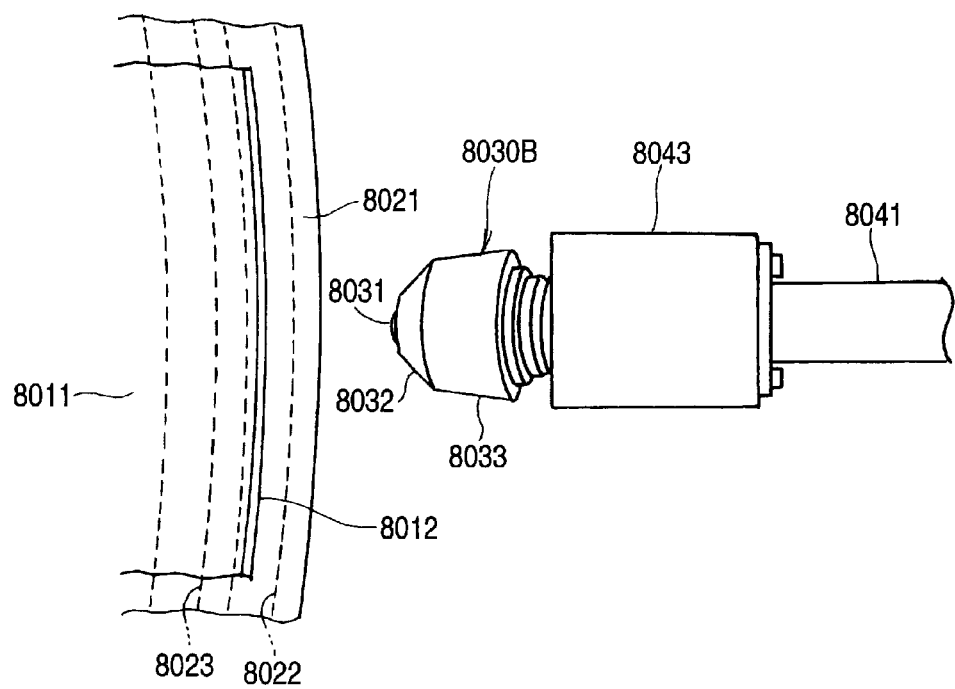
FIG. 94 is a plane view of the roller hemming apparatus according to the modified example of the sixth exemplary embodiment.

FIG. 94 is a plane view of FIG. 93, and the flange 8012 of the work 8011 is bent to be convex to a side of the hemming working roller 8030. This corresponds to a front hem of a bonnet. Also the guide portion 8021, the first guide groove 8022 and the second guide groove 8023 are bent to be convex to the side of the hemming working roller 8030.

Figure 95A:
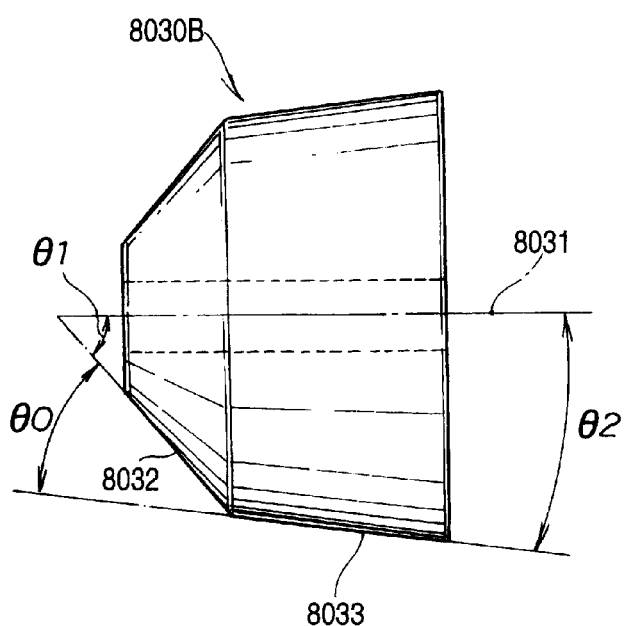
FIG. 95A and FIG. 95B are side views of a roller for hemming working according to a modified example of the sixth exemplary embodiment.
Figure 95B:
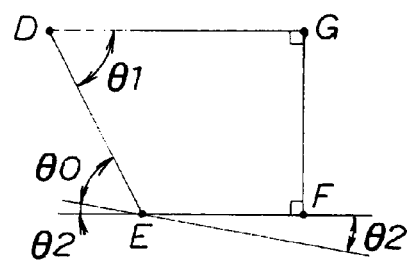

FIG. 95A and FIG. 95B are side views of the hemming working roller according to the modified example of the sixth exemplary embodiment, as shown by FIG. 95A, the hemming working roller 8030B includes the primary bending face 8032 comprising the taper face inclined to the roller rotating shaft 8031 by the first angle θ1 and the secondary bending face 8033 comprising the taper face inclined to the roller rotating shaft 8031 by the second angle. θ0 is an angle made by the primary bending face 8032 and the secondary bending face 8033.

The angle θ0, the first angle θ1 and the second angle θ2 will be explained. The angle θ0 corresponds to the primary bending angle of the flange and is an angle in correspondence with about a half of the total bending angle of the flange. Generally, the total bending angle of the flange is about 90°. At this occasion, θ0 is set to about 45°.

The second angle θ2 is determined in correspondence with the bent guide portion 8021. That is, the taper angle is set such that there is not a peripheral speed difference between the secondary bending face 8033 and the guide portion 8021 even when the hemming working roller is rotated relative to the bent guide portion 8021. The taper angle at this occasion becomes the second angle θ2.

The angles θ0, θ1, θ2 shown in FIG. 95B can be shifted to a trapezoid DEFG shown in FIG. 95B. Side DG and side EF are parallel. Angle D becomes θ1 and an external angle of angle E becomes (θ0+θ2). As a result, relationship of θ1= (θ0+θ2) is established, and the first angle θ1 can be determined as (θ0+θ2).

Figure 96A:
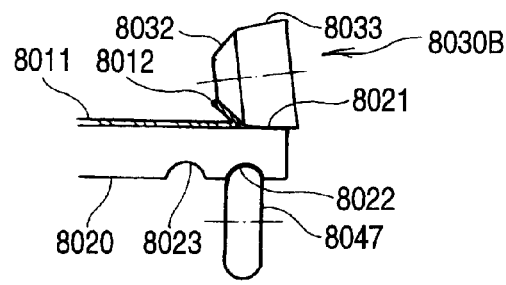
FIG. 96A through FIG. 96D are explanatory views of steps of a modified example of the sixth exemplary embodiment.

An operation of the hemming working roller 8030B described above will be explained in reference to FIGS. 96A through FIG. 96D. In FIG. 96A, the hemming working roller 8030B is moved while being rotated from a surface side of the drawing to a depth side of the drawing.

Figure 96B:
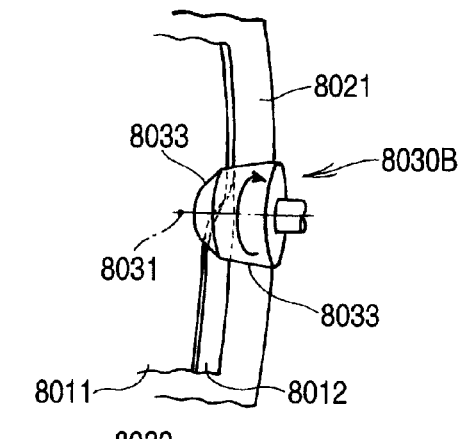

As shown by FIG. 96B constituting a plane view of FIG. 96A, the flange 8012 is primarily bent by an operation of the primary bending face 8032. Although the guide portion 8021 is bent, the secondary bending face 8033 is constituted by the taper face, and therefore, a slip is not brought about between the guide portion 8021 and the secondary bending face 8033. Therefore, there is not a concern of bringing about harmful wear or a scratch at the guide portion 8021 or the secondary bending face 8033.

Figure 96C:
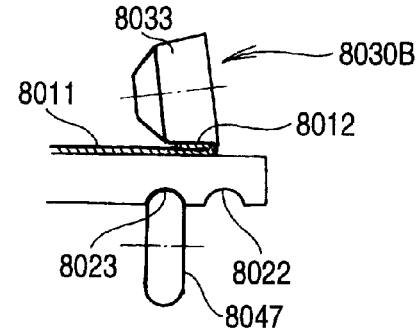
Figure 96D:
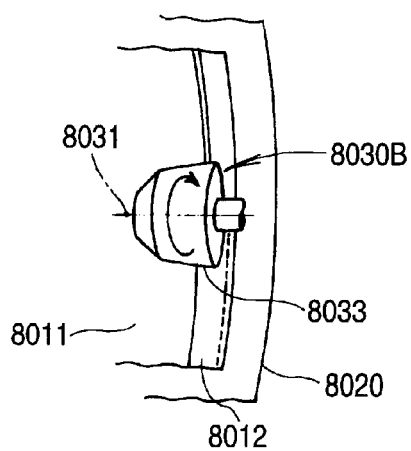

Secondary bending is carried out successive to the primary bending. In FIG. 96C, the hemming working roller 8030B is moved while being rotated from the surface side of the drawing to the depth side of the drawing. As shown by FIG. 96D constituting a plane view of FIG. 96C, the flange 8012 is secondarily bent by an operation of the secondary bending face 8033.

Further, the invention is preferable for a hemming technology of folding to bend a bent hem of a bonnet, a roof or the like of a vehicle. Any kind of the work will do so far as the hem is bent. Further, although according to the roller moving mechanism 8040, a drive source is constituted by the robot arm, the roller moving mechanism 8040 may be a moving mechanism constituting a drive source by an electric motor or a hydraulic cylinder.

Further, the guide portion 8021 may be provided independently by being separated from the work mounting member 8020 other than being integrally formed to the work mounting member 8020.

<Seventh Exemplary Embodiment>

Figure 97:
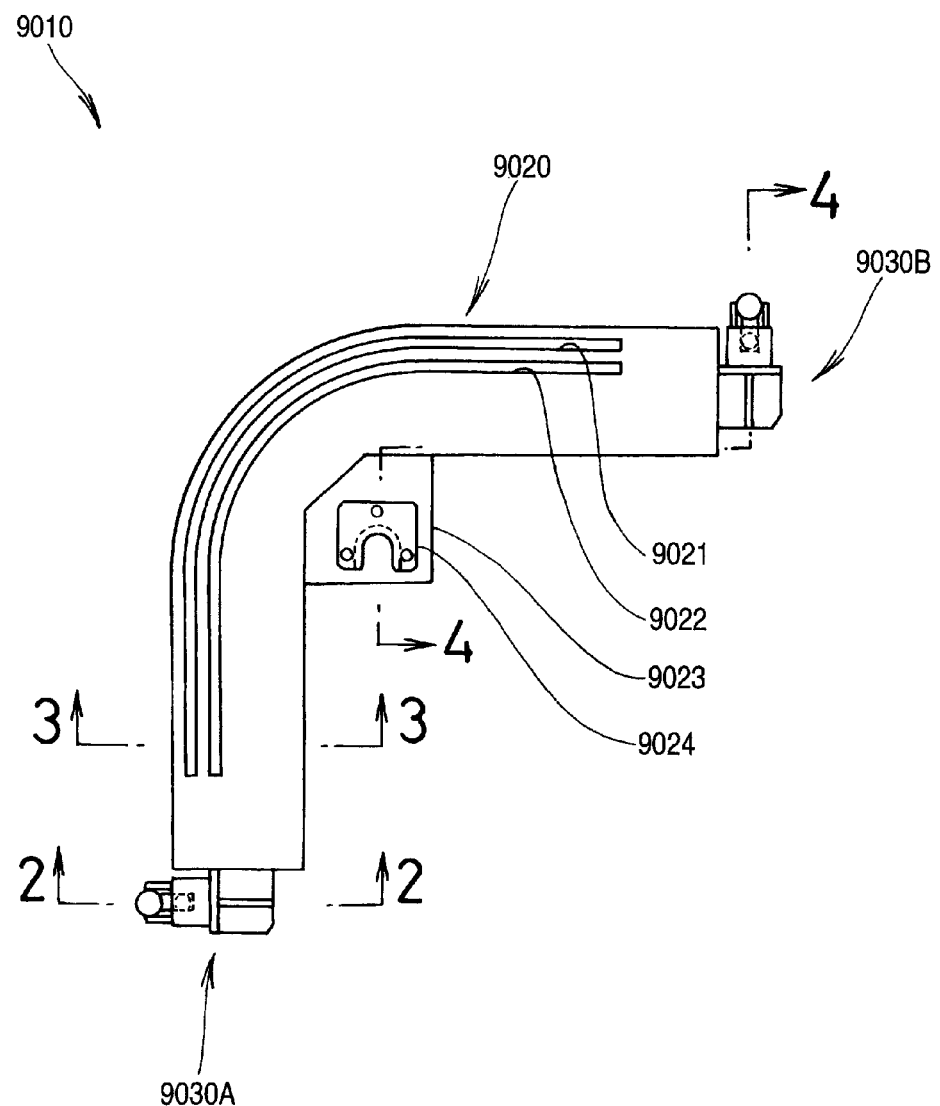
FIG. 97 is a front view of a die of a roll hemming apparatus according to a seventh exemplary embodiment.

A seventh exemplary embodiment of the invention will be explained in reference to FIG. 97 through FIG. 106D. Further, the drawings are assumed to be viewed in directions of the notations. FIG. 97 is a front view of a die of a roller hemming apparatus according to the invention, a roller hemming apparatus 9010 is constituted by an attachment (details of which will be described later) attached to a robot arm and a die 9020 attachably and detachably attached to and from the attachment.

The die 9020 includes a first guide groove 9021 (details of which will be described later), a second guide groove 9022 (details of which will be described later) and a chuck portion 9024 by way of a support plate 9023, and includes clamp mechanisms 9030A and 9030B respectively at a left lower end and a right upper end.

Figure 98:
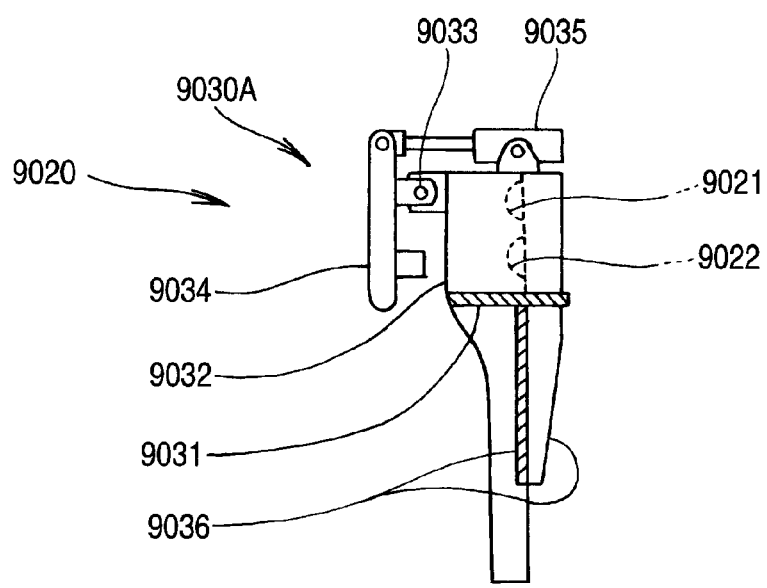
FIG. 98 is a sectional view taken along a line 2-2 of FIG. 97.

FIG. 98 is a sectional view taken along a line 2-2 of FIG. 97, and the clamp mechanism 9030A is constituted by a clamp block 9032 fixed to a side face (in a direction of a surface of the drawing) of the die 9020 by way of a support plate 9031, a clamp arm 9034 locked to the clamp lock 9032 pivotably by a pin 9033, and a cylinder unit 9035 attached to the clamp block 9032 for pivoting the clamp arm 9034. Numerals 9036, 9036 designate reinforcement plates.

Also the clamp mechanism 9030B shown in FIG. 97 is a constitution member similar to 9030A, and therefore, an explanation thereof will be omitted by utilizing notations.

Figure 99:
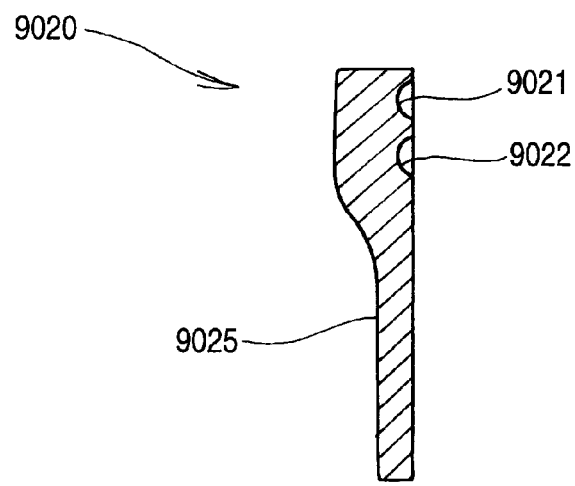
FIG. 99 is a sectional view taken along a line 3-3 of FIG. 97.

FIG. 99 is a sectional view taken along a line 3-3 of FIG. 97, and the die 9020 includes first guide groove 9021 or the second guide groove 9022 in a semicircular sectional shape provided on a right face of the drawing of the die 9020 and a receiving face 9025 provided for receiving a plate member constituting an object of working on a left face of the drawing of the die 9020 in addition to the above-described constitution.

Figure 100:
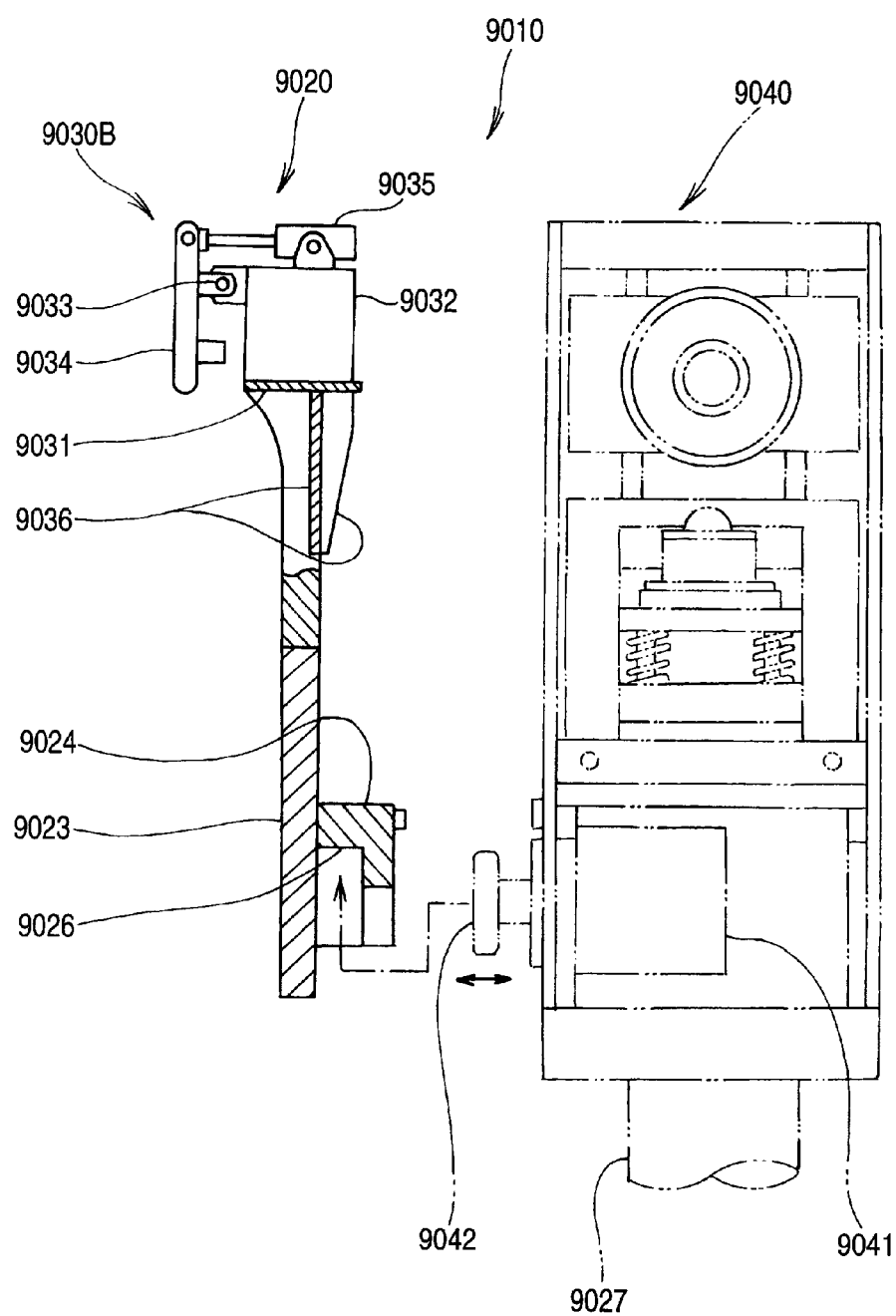
FIG. 100 is a sectional view taken along a line 4-4 of FIG. 97.

FIG. 100 is a sectional view taken along a line 4-4 of FIG. 97 and the chuck portion 9024 includes a pocket portion 9026. A member indicated by an imaginary line is an attachment 9040 attached to a front end of a robot arm 9027, the attachment 9040 includes an actuator 9041 and a front end of the actuator 9041 is attached with a chuck plate 9042. A detailed structure of the attachment 9040 will be described later.

The actuator 9041 can move the chuck plate 9042 in an arrow mark direction. Further, the chuck plate 9042 can be inserted into the pocket portion 9026 by operating the robot arm 9027 as shown by an arrow mark indicated by a one-dotted chain line. By moving the chuck plate 9042 to right of the drawing in a state of inserting the chuck plate 9042 into the pocket portion 9026, the die 9020 and the attachment 9040 can be coupled.

Figure 101:
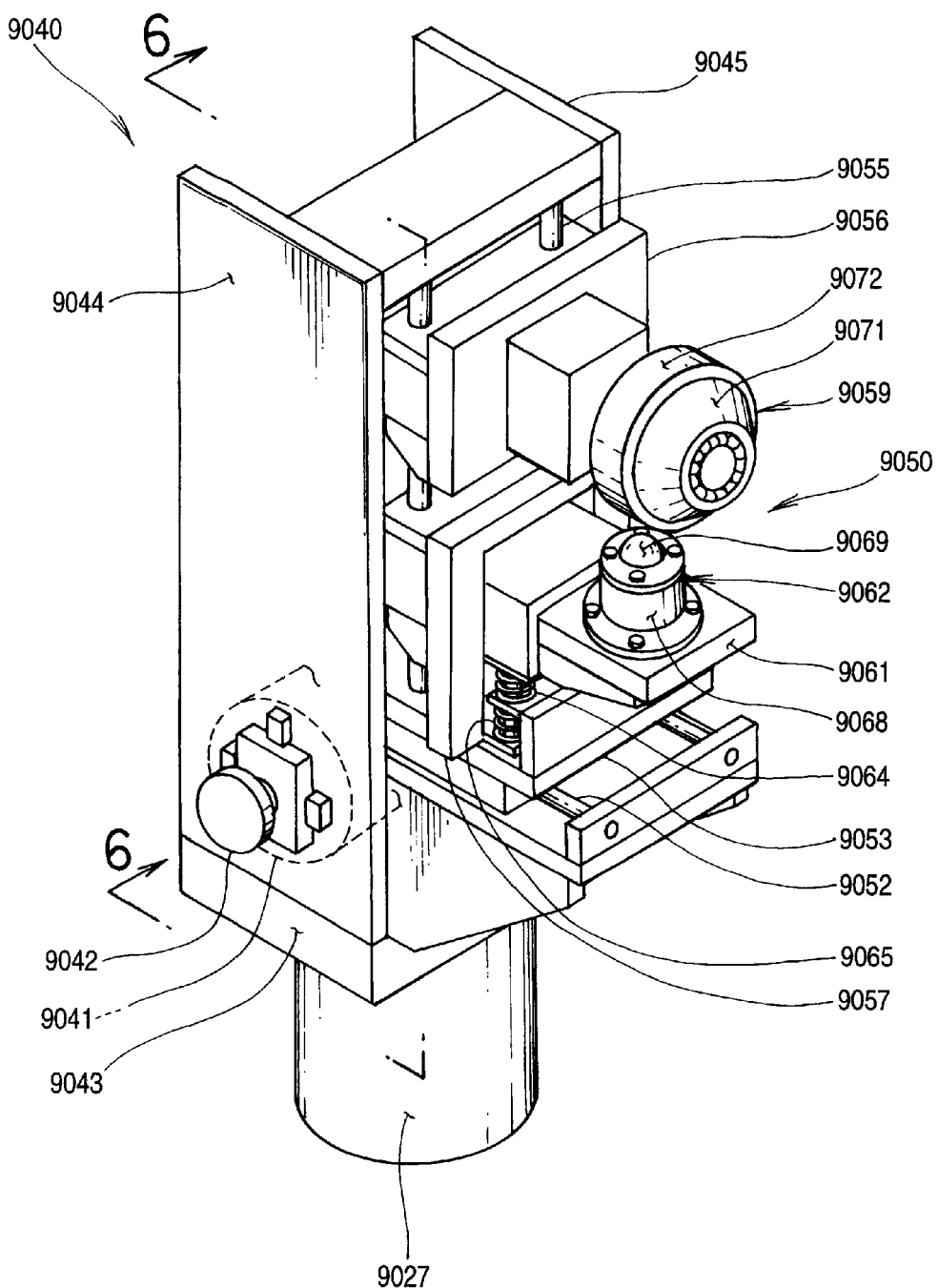
FIG. 101 is a perspective view of an attachment according to the seventh exemplary embodiment.

FIG. 101 is a perspective view of the attachment according to the seventh exemplary embodiment, and the attachment 9040 is constituted by a base plate 9043 provided at a front end of the robot arm 9027, two sheets of side plates 9044 and 9045 provided at both ends of the base plate 9043 and a roller mechanism 9050 (a detailed structure of which will be explained in a next drawing) provided between the side plate 9044 and the side plate 9045.

Figure 102:
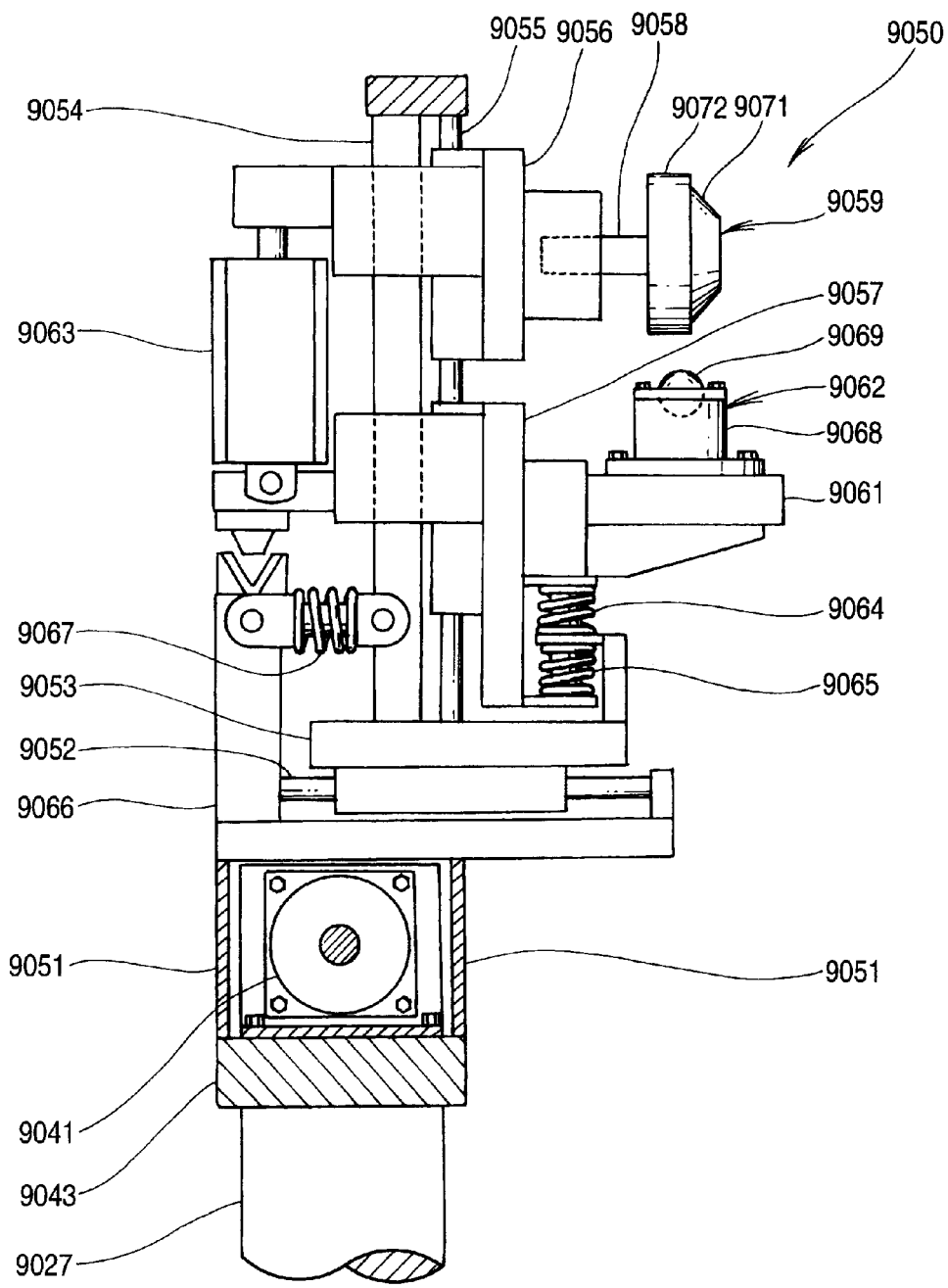
FIG. 102 is a sectional view taken along a line 6-6 of FIG. 101.

FIG. 102 is a sectional view taken along a line 6-6 of FIG. 101, and a roller mechanism 9050 is constituted by a first rail 9052 provided above a base plate 9043 by way of two sheets of support plates 9051, 9051, a first slider 9053 movably attached to the first rail 9052, a stay 9054 and a second rail 9055 extended from the first slider 9053 in a direction orthogonal to the first rail 9052, a second slider 9056 and a third slider 9057 movably attached to the second rail 9055, a press roller 9059 rotatably attached to the second slider 9056 by way of a shaft 9058, a free bearing 9062 constituting a guide member attached to the third slider 9057 by way of a support plate 9061, a hydraulic cylinder 9063 for connecting the third slider 9057 to the second slider 9056 and adjusting an interval between the sliders and a press force of the press roller 9059, elastic members 9064 and 9065 for elastically supporting the third slider 9057 by the first slider 9053, and an elastic member 9067 for elastically supporting the first slider 9053 by a support base 9066 attached above the support plates 9051, 9051.

The free bearing 9062 is a member constituted by fitting, for example, a steel member spherical member 9069 having a large diameter to a housing 9068 by way of a plurality of small ball bearings. Numeral 9071 designates an inclined face provided to the press roller 9059 and numeral 9072 designates a roller face provided to the press roller 9059. Further, although the elastic members 9064, 9065, 9067 are preferably springs, the elastic members may be constituted by cushion rubber or a product equivalent thereto.

Therefore, the free bearing 9062 of the roller hemming apparatus 9010 includes the steel made spherical member 9069 rolled along a first guide groove (notation 9021 of FIG. 99) and a second guide groove (notation 9022 of FIG. 99). An operation of the roller hemming apparatus constructed by the above-described constitution will be explained as follows.

Figure 103A:
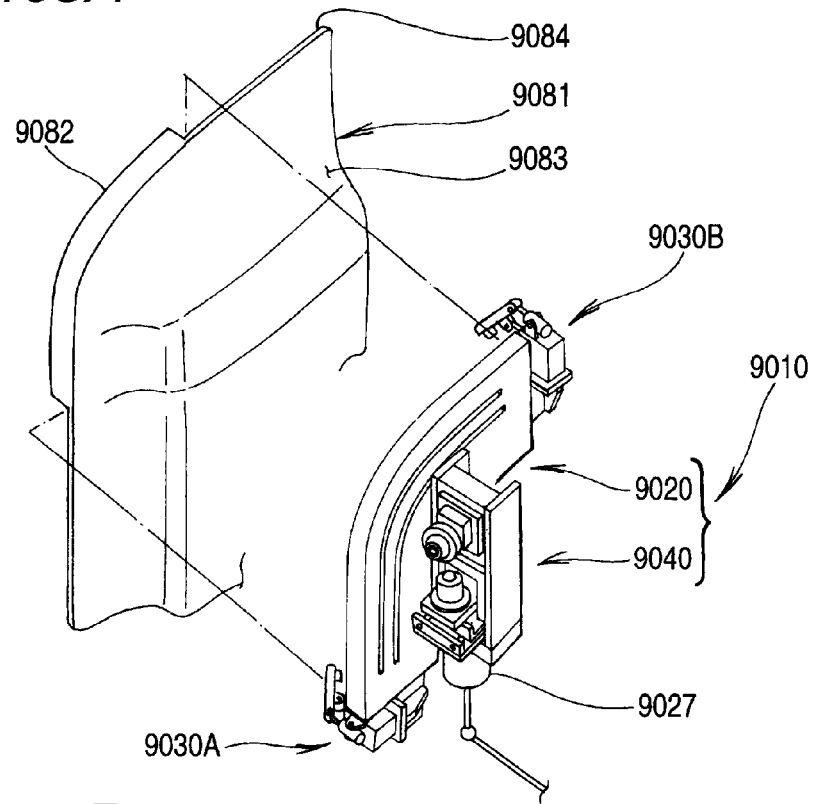
FIG. 103A and FIG. 103B are explanatory views of attaching a die according to the seventh exemplary embodiment.
Figure 103B:
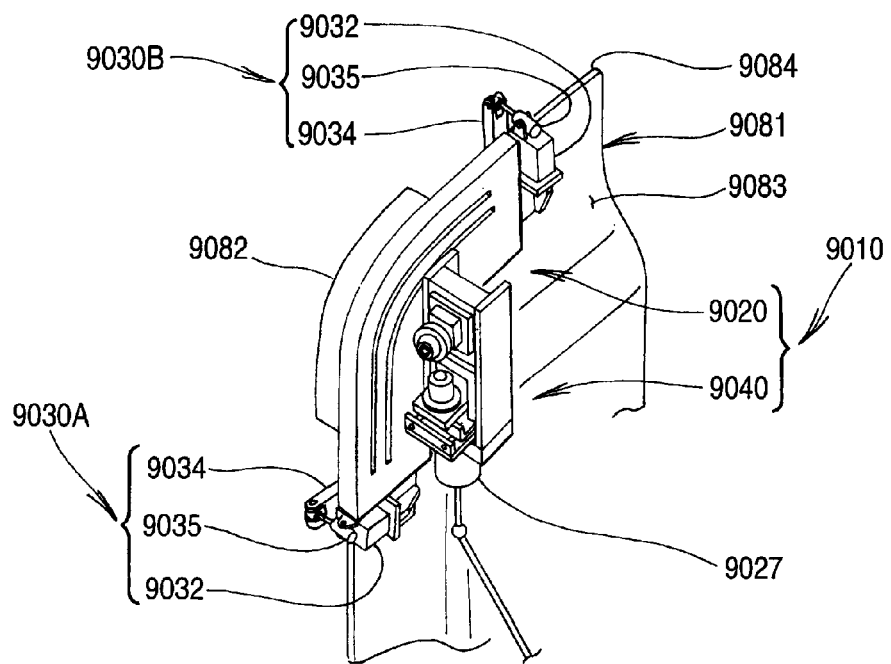

FIG. 103A and FIG. 103B are explanatory views of die attachment according to the seventh exemplary embodiment, in FIG. 103A, the die 9020 is advanced by the robot arm 9027 to an erected flange 9082 provided at a corner portion of a door 9081 upper and lower sides of which are inverted. In FIG. 103B, the die 9020 is brought into a state of being brought into contact with a surface of an outer panel 9083. Under the state, clamp arms 9034, 9034 are pivoted to a door flange portion 9084 by cylinder units 9035, 9035 and the door flange portion 9084 is pinched by clamp blocks 9032, 9032 and clamp arms 9034, 9034. Thereby, the die 9020 is supported by the door flange portion 9014 by way of clamp mechanisms 9030A and 9030B.

Figure 104A:
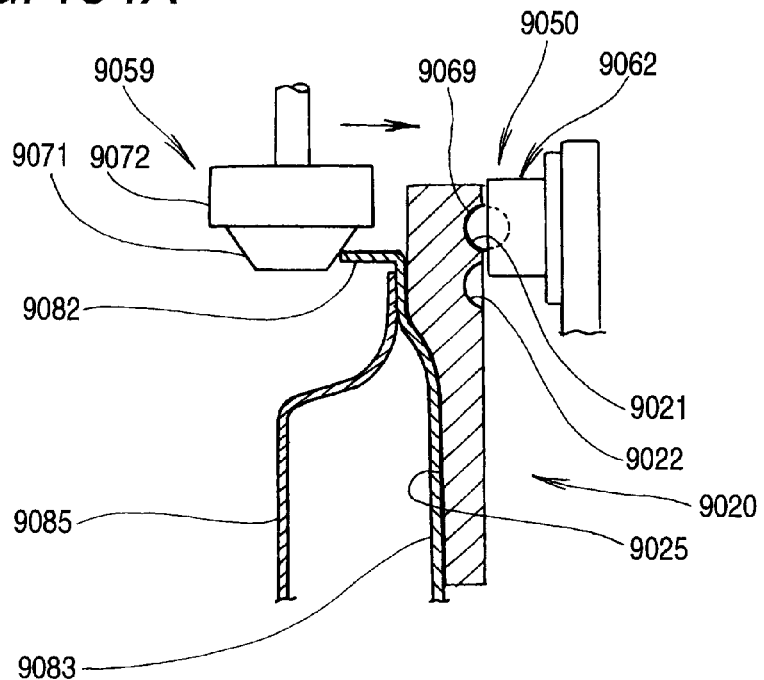
FIG. 104A and FIG. 104B are explanatory views of a preparatory hemming processing according to the seventh exemplary embodiment.
Figure 104B:
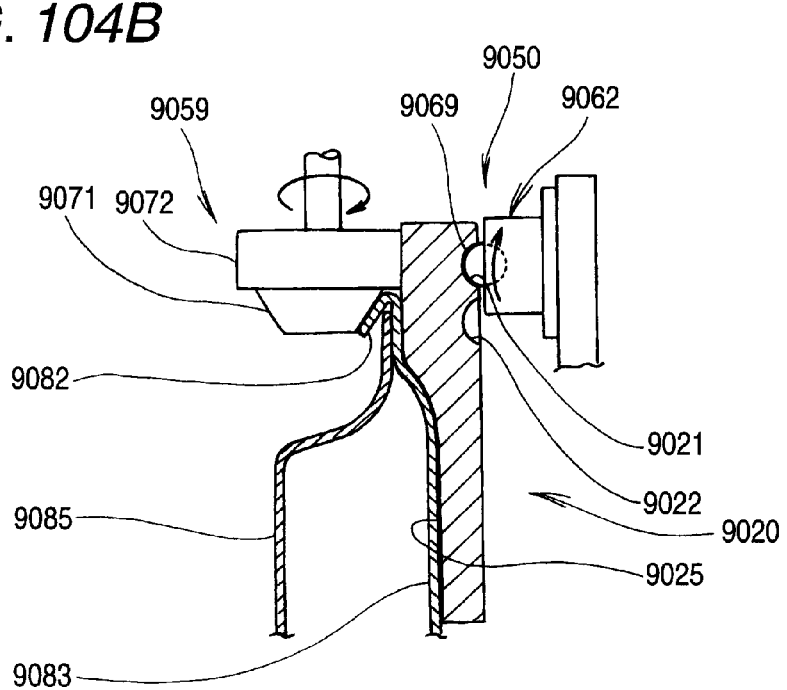

FIG. 104A and FIG. 104B are explanatory views of a preparatory hemming processing according to the seventh exemplary embodiment. At the time point, an inner panel 9085 is overlapped on the outer panel 9083 including the erected flange 9082 at an upper end thereof, and the die 9020 is brought into contact with the outer face of the outer panel 9083. In FIG. 104A, the steel made spherical member 9069 provided at the free bearing 9062 is fitted to the first guide groove 9021 and the press roller 9059 is made to be proximate to the steel made spherical member 9069. The operation is carried out by the hydraulic cylinder (notation 9063 of FIG. 102).

In FIG. 104B, the press roller 9059 and the steel made spherical member 9069 are moved in ahead and tail direction of the drawing. The erected flange 9082 can be bent by about 45° by an inclined face 9071 provided at the press roller 9059. A processing of bending by about 45° is referred to as a preliminary hemming processing. When the preliminary hemming processing is finished, the press roller 9059 is separated from the steel made spherical member 9069 and the press roller 9059 and the steel made spherical member 9069 are moved by a constant distance.

Figure 105A:
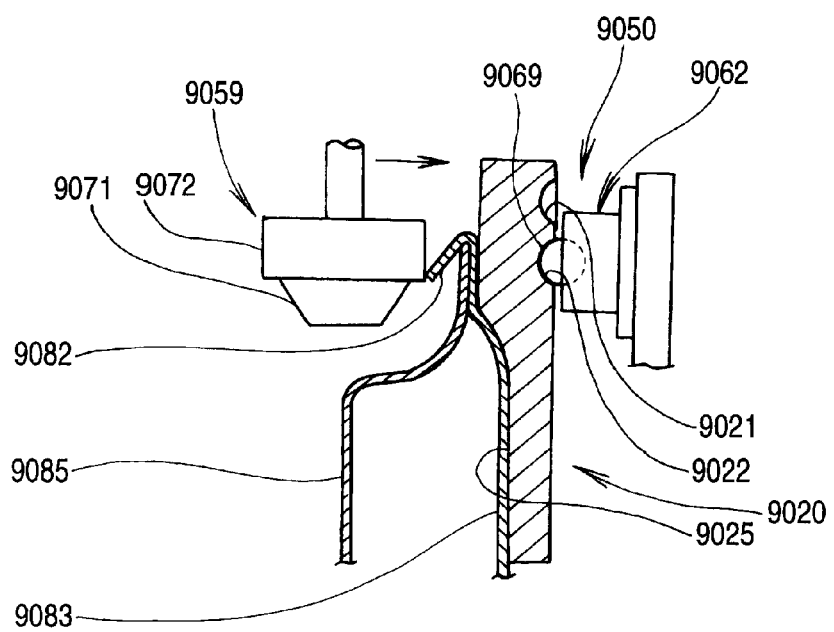
FIG. 105A and FIG. 105B are explanatory views of a regular hemming processing according to the seventh exemplary embodiment.
Figure 105B:
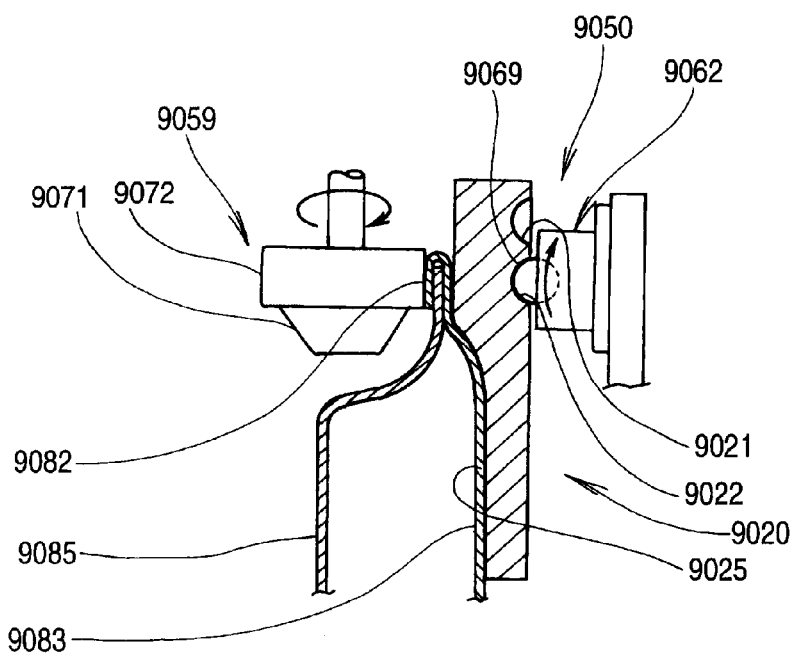

FIG. 105A and FIG. 105B are explanatory views of a regular hemming processing according to the seventh exemplary embodiment. In FIG. 105A, the steel made spherical member 9069 is fitted to the second guide groove 9012 and the press roller 9059 is made to be proximate to the steel made spherical member 9069 again. At the time point, not the inclined face 9071 but the roller face 9072 faces the erected flange 9082.

In FIG. 105B, the press roller 9059 and the steel made spherical member 9069 are moved in the head and tail direction of the drawing. The erected flange 9082 can completely be bent by the roller face 9072 provided to the press roller 9059. The bending processing is referred to as a regular hemming processing. When the regular hemming processing is finished, the press roller 9059 may be separated from the steel made spherical member 9069.

Figure 106A:
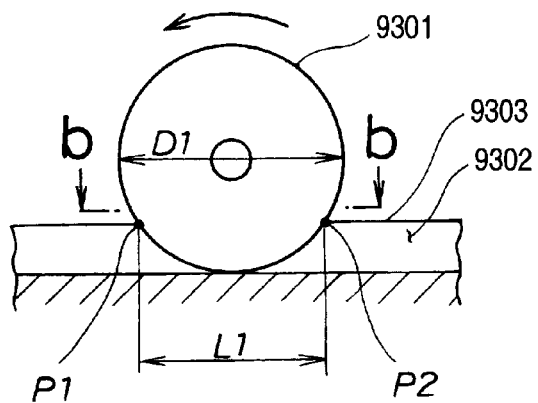
FIG. 106A through FIG. 106D are comparative explanatory views of a guide groove of a roller hemming apparatus.

FIG. 106A through FIG. 106D are comparative explanatory views of the guide groove of the roller hemming apparatus. A comparative example is explained in FIG. 106C and the embodiment is explained in FIG. 106D. FIG. 106A is a sectional view showing a state of running the guide roller 9301 on the guide groove 9302. Notation D1 designates a diameter of the guide roller 9301, and notation L1 designates a distance between P1 and P2 when an outer peripheral circle of the guide roller 9301 and an upper edge line of the guide groove 9302 are overlapped each other at two points P1 and P2.

Figure 106B:
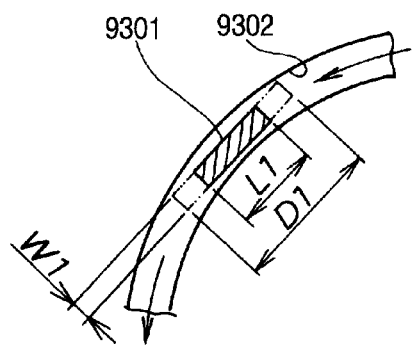

FIG. 106B is a sectional view taken along a line b-b of FIG. 106A, and when a rectangular sectional portion (rectangular sectional portion having a width W1 and a length L1 attached in the drawing) cut by a level of the upper edge line 9303 is made to be movable as shown by an arrow mark when the guide groove 9032 is constituted by a sufficiently gradual (having a small radius of curvature) curve and there is not a concern of detaching the guide roller 9301 from the guide groove 9302.

Figure 106C:
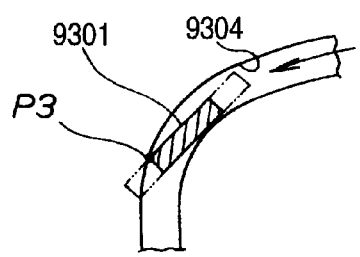

However, when the radius of curvature of the guide groove 9304 becomes large as shown by FIG. 106C, the guide roller 9301 is brought into contact with the guide groove 9304 at point P3 in the drawing. As a result, running the guide roller 9301 is devoid of smoothness, and depending on cases, the guide roller 9301 is detached from the guide groove 9304.

Figure 106D:
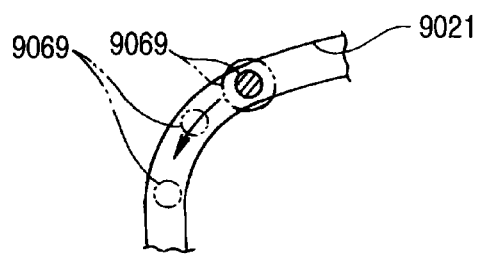
Figure 107A:
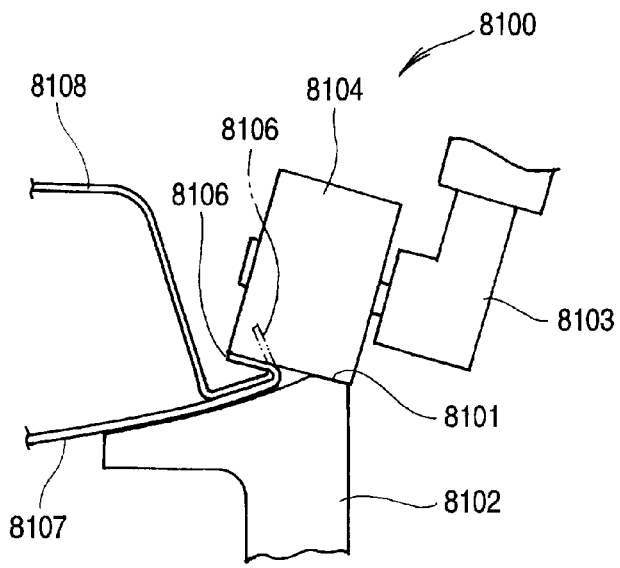
FIG. 107A and FIG. 107B are views for explaining a basic principle of a related art.
Figure 107B:
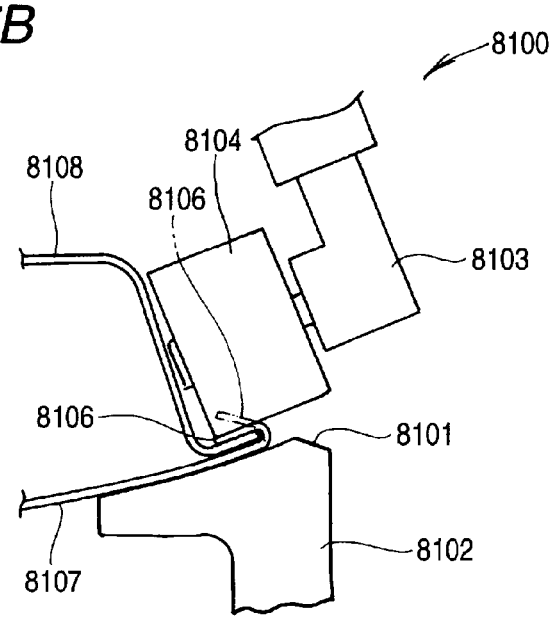
Figure 108A:
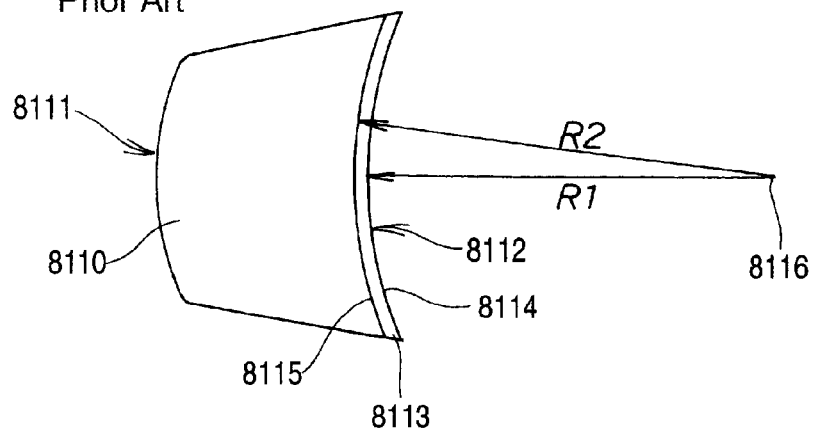
FIG. 108A and FIG. 108B are views for explaining a problem of a related art.
Figure 108B:
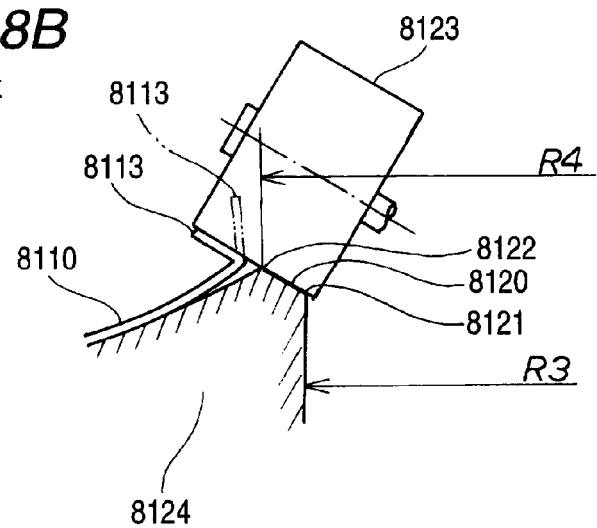
Figure 109:
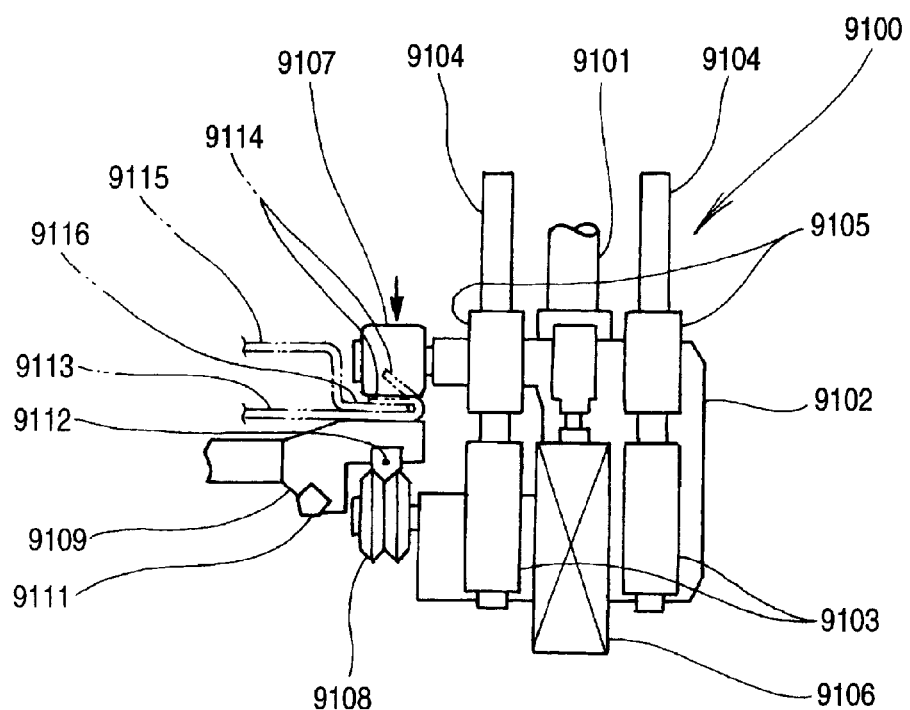
FIG. 109 is a view for explaining a basic constitution of other related art.
Figure 110:
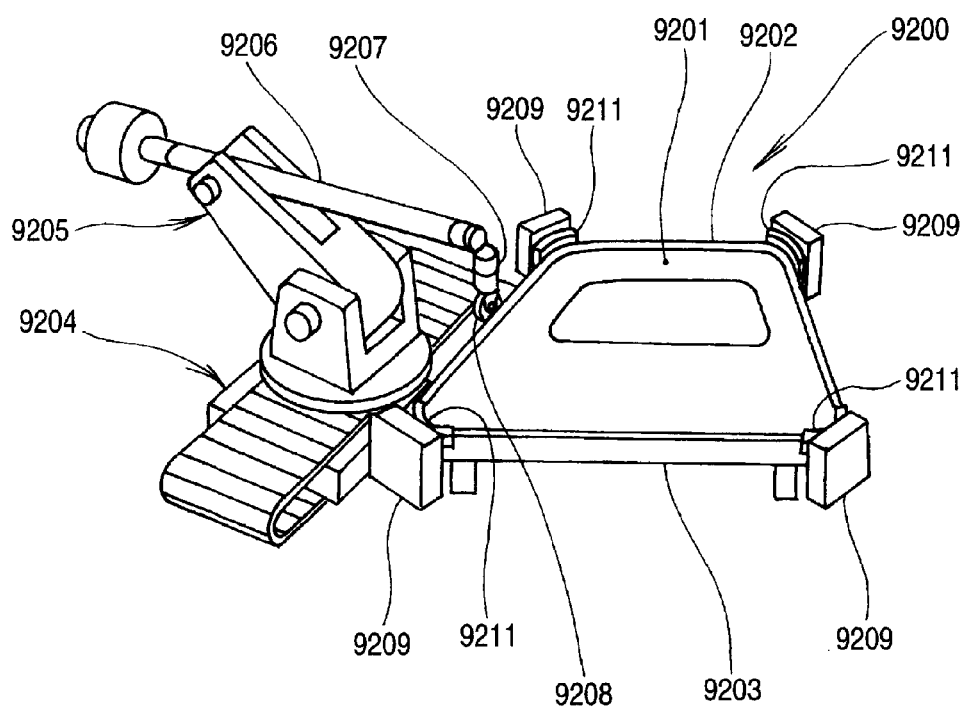
FIG. 110 is a view for explaining a basic constitution of still other related art.

In this respect, as shown by FIG. 106D, the steel made spherical member 9069 can smoothly be run without being detached even from the first guide groove 9021 having a large radius of curvature.

Therefore, in FIG. 105A and FIG. 105B, the free bearing 9062 as the guide member of the roll hemming apparatus includes the steel made spherical member 9069 rolled along the first guide groove 9021 or the second guide groove 9022. The steel made spherical member 9069 is not detached from the first guide groove 9021 or the second guide groove 9022 having the large radius of curvature. Therefore, a portion having a large radius of curvature can be subjected to hemming working and an inexpensive roller hemming apparatus can be provided.

In addition thereto, the roller hemming apparatus is a simple apparatus constituted by the die 9020 including the first guide groove 9021 or the second guide groove 9022, the press roller 9059, and the free bearing 9062 as a guide member, and low cost formation of the roller hemming apparatus can easily be achieved.

Further, a material of the spherical member used for the guide member of the seventh exemplary embodiment may be applied to any material made of a nonferrous metal, or made of ceramic other than made of steel.

The hemming working method, the working apparatus, and the welded structure according to the invention are not limited to those of the above-described embodiments but can naturally adopt various constitutions or steps without deviating from the gist of the invention.

The application is based on Japanese Patent Application (Japanese Patent Application No. 2005-350809) filed on Dec. 5, 2005, Japanese Patent Application (Japanese Patent Application No. 2005-350821) filed on Dec. 5, 2005, Japanese Patent Application (Japanese Patent Application No. 2005-350884) filed on Dec. 5, 2005, Japanese Patent Application (Japanese Patent Application No. 2005-350615) filed on Dec. 5, 2005, Japanese Patent Application (Japanese Patent Application No. 2005-350619) filed on Dec. 5, 2005, Japanese Patent Application (Japanese Patent Application No. 2006-051234) filed on Feb. 27, 2006, Japanese Patent Application (Japanese Patent Application No. 2006-066738) filed on Mar. 10, 2006, Japanese Patent Application (Japanese Patent Application No. 2006-187582) filed on Jul. 7, 2006, and Japanese Patent Application (Japanese Patent Application No. 2006-202039) filed on Jul. 25, 2006, a content thereof is incorporated herein by reference.

Industrial Applicability

A hemming working method and working apparatus according to the invention are optimum for fabricating a vehicle body of a vehicle.

The invention claimed is:

1. A hemming working apparatus having a hemming roller for carrying out hemming working for a flange of a work, the hemming working apparatus comprising:
   a rotating shaft that rotatably supports the hemming roller so as to define a hemming roller rotation axis;
   a moving mechanism that supports the hemming roller through the rotating shaft and moves the hemming roller to a predetermined position; and
   a guide member that guides the hemming roller along the flange while restricting a displacement of the hemming roller relative to the flange along the hemming roller rotation axis;
   wherein the hemming roller is displaceable along the hemming roller rotation axis relative to the moving mechanism while the hemming working apparatus is hemming the flange.

* * * * *